US 9,582,154 B2

(12) United States Patent
Greenberg et al.

(10) Patent No.: US 9,582,154 B2
(45) Date of Patent: *Feb. 28, 2017

(54) INTEGRATION OF SOCIAL MEDIA WITH CARD PACKAGES

(71) Applicant: Wrap Media, LLC, San Francisco, CA (US)

(72) Inventors: Eric H. Greenberg, Ross, CA (US); Ian McFarland, San Francisco, CA (US)

(73) Assignee: Wrap Media, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,671

(22) Filed: Aug. 12, 2016

(65) Prior Publication Data

US 2016/0349951 A1 Dec. 1, 2016

Related U.S. Application Data

(63) Continuation of application No. 14/866,904, filed on Sep. 26, 2015.

(Continued)

(51) Int. Cl.
*G06F 3/14* (2006.01)
*G06F 3/0482* (2013.01)
(Continued)

(52) U.S. Cl.
CPC .......... *G06F 3/0482* (2013.01); *G06F 3/0485* (2013.01); *G06F 3/0488* (2013.01);
(Continued)

(58) Field of Classification Search
CPC .. G06F 17/212; G06F 17/248; G06F 17/2247; G06F 3/0482; G06F 3/0485;
(Continued)

(56) References Cited

U.S. PATENT DOCUMENTS 5,228,123 A 7/1993 Heckel
5,880,740 A 3/1999 Halliday et al.
(Continued)

OTHER PUBLICATIONS

Stackoverflow, Aug. 15, 2009.
(Continued)

*Primary Examiner* — Scott Baderman
*Assistant Examiner* — Hassan Mrabi
(74) *Attorney, Agent, or Firm* — Beyer Law Group LLP

(57) ABSTRACT

Data structures, components, runtime viewers and methods are described for integrating wrapped packages of cards into various social media feeds and for integrating social media feeds into wraps. In some embodiments, a wrap identifier or cover is provided within a social media feed. In response to selection of the wrap identifier a runtime viewer is initiated and a descriptor that defines the selected wrap is obtained. The runtime viewer creates a wrap instance based on the descriptor. The instance may be displayed in-line within the social media feed, in an overlay frame, a new browser tab or using other suitable mechanisms. Preferably, each card in the wrap is rendered at the same portrait aspect ratio. Within each card, the relative positioning of the card content is immutable. In a separate aspect, a wrap package may include a social media card arranged to display a social media feed.

29 Claims, 63 Drawing Sheets

Related U.S. Application Data

(60) Provisional application No. 62/062,056, filed on Oct. 9, 2014, provisional application No. 62/062,061, filed on Oct. 9, 2014, provisional application No. 62/084,171, filed on Nov. 25, 2014, provisional application No. 62/091,866, filed on Dec. 15, 2014, provisional application No. 62/114,675, filed on Feb. 11, 2015, provisional application No. 62/133,574, filed on Mar. 16, 2015, provisional application No. 62/195,642, filed on Jul. 22, 2015, provisional application No. 62/210,585, filed on Aug. 27, 2015, provisional application No. 62/145,360, filed on Apr. 9, 2015, provisional application No. 62/170,438, filed on Jun. 3, 2015, provisional application No. 62/170,569, filed on Jun. 3, 2015, provisional application No. 62/193,830, filed on Jul. 17, 2015.

(51) Int. Cl.
*G06F 3/0485* (2013.01)
*G06F 3/0488* (2013.01)
*G06F 17/30* (2006.01)
*G06F 17/22* (2006.01)
*H04L 29/08* (2006.01)

(52) U.S. Cl.
CPC .... *G06F 17/2247* (2013.01); *G06F 17/30896* (2013.01); *H04L 67/02* (2013.01)

(58) Field of Classification Search
CPC .............. G06F 3/0488; G06Q 30/0635; G06Q 30/0643; H04L 67/02
USPC .................. 715/201, 202, 244, 243, 764
See application file for complete search history.

(56) References Cited

U.S. PATENT DOCUMENTS

| | | | |
|---|---|---|---|
| 6,216,112 B1 | 4/2001 | Fuller et al. | |
| 6,321,244 B1 | 11/2001 | Liu et al. | |
| 6,553,403 B1 | 4/2003 | Jarriel et al. | |
| 6,738,079 B1 | 5/2004 | Kellerman et al. | |
| 8,291,312 B1 | 10/2012 | Zhou | |
| 9,275,403 B2* | 3/2016 | Pedregal | G06Q 30/0282 |
| 9,285,977 B1 | 3/2016 | Greenberg et al. | |
| 9,330,192 B1 | 5/2016 | Greenberg et al. | |
| 2001/0034746 A1 | 10/2001 | Tsakiris et al. | |
| 2003/0093572 A1 | 5/2003 | Laux et al. | |
| 2003/0101092 A1 | 5/2003 | Fuller et al. | |
| 2003/0169282 A1 | 9/2003 | Herigstad et al. | |
| 2004/0111673 A1 | 6/2004 | Bowman et al. | |
| 2004/0177327 A1 | 9/2004 | Kieffer | |
| 2005/0022116 A1 | 1/2005 | Bowman et al. | |
| 2005/0027820 A1 | 2/2005 | O'Laughlen et al. | |
| 2005/0071783 A1 | 3/2005 | Atkins | |
| 2005/0210416 A1 | 9/2005 | MacLaurin et al. | |
| 2005/0245241 A1 | 11/2005 | Durand et al. | |
| 2006/0048076 A1 | 3/2006 | Vronay et al. | |
| 2006/0259462 A1 | 11/2006 | Timmons et al. | |
| 2007/0028166 A1 | 2/2007 | Hundhausen et al. | |
| 2007/0208704 A1 | 9/2007 | Ives | |
| 2007/0232399 A1 | 10/2007 | Kathman et al. | |
| 2008/0077852 A1 | 3/2008 | Fleishman et al. | |
| 2009/0119615 A1 | 5/2009 | Huang | |
| 2009/0300511 A1 | 12/2009 | Behar et al. | |
| 2010/0070876 A1 | 3/2010 | Jain et al. | |
| 2011/0060993 A1* | 3/2011 | Cotter | H04N 21/2743 715/720 |
| 2011/0113124 A1 | 5/2011 | Zhang | |
| 2011/0214015 A1 | 9/2011 | Li et al. | |
| 2011/0214075 A1 | 9/2011 | Vongphouthone et al. | |
| 2012/0011430 A1 | 1/2012 | Parker et al. | |
| 2012/0054596 A1 | 3/2012 | Kroger et al. | |
| 2012/0117534 A1 | 5/2012 | Hershenson et al. | |
| 2012/0131427 A1 | 5/2012 | Artin | |
| 2012/0278704 A1 | 11/2012 | Ying et al. | |
| 2012/0313876 A1 | 12/2012 | Smith | |
| 2013/0007603 A1 | 1/2013 | Dougherty | |
| 2013/0021377 A1 | 1/2013 | Doll | |
| 2013/0024757 A1 | 1/2013 | Doll et al. | |
| 2013/0061160 A1 | 3/2013 | Tseng | |
| 2013/0067313 A1 | 3/2013 | Leguin et al. | |
| 2013/0097186 A1 | 4/2013 | Van Hoff | |
| 2013/0099447 A1 | 4/2013 | Patton | |
| 2013/0111395 A1 | 5/2013 | Ying et al. | |
| 2013/0151959 A1 | 6/2013 | Flynn, III et al. | |
| 2013/0179761 A1* | 7/2013 | Cho | G06F 17/21 715/202 |
| 2013/0219255 A1 | 8/2013 | Van Hoff et al. | |
| 2013/0254063 A1 | 9/2013 | Stone et al. | |
| 2013/0254705 A1 | 9/2013 | Mooring et al. | |
| 2013/0283194 A1 | 10/2013 | Kopp | |
| 2013/0290887 A1 | 10/2013 | Sun et al. | |
| 2013/0311870 A1 | 11/2013 | Worsley et al. | |
| 2013/0318042 A1 | 11/2013 | Rajabi et al. | |
| 2013/0339830 A1 | 12/2013 | Yuan et al. | |
| 2014/0032525 A1 | 1/2014 | Merriman et al. | |
| 2014/0033047 A1 | 1/2014 | Poling et al. | |
| 2014/0074624 A1 | 3/2014 | Ying et al. | |
| 2014/0074863 A1 | 3/2014 | Walkingshaw et al. | |
| 2014/0074934 A1 | 3/2014 | Van Hoff et al. | |
| 2014/0075275 A1 | 3/2014 | Aleksandrovsky et al. | |
| 2014/0075289 A1 | 3/2014 | Brant | |
| 2014/0075339 A1 | 3/2014 | Weskamp et al. | |
| 2014/0089789 A1 | 3/2014 | Schowtka et al. | |
| 2014/0096014 A1 | 4/2014 | Johnson et al. | |
| 2014/0101539 A1 | 4/2014 | Ma et al. | |
| 2014/0173417 A1 | 6/2014 | He | |
| 2014/0198127 A1 | 7/2014 | Ying | |
| 2014/0210843 A1 | 7/2014 | VanCurren, Jr. et al. | |
| 2014/0245128 A9 | 8/2014 | Brant | |
| 2014/0280852 A1 | 9/2014 | Griffiths et al. | |
| 2014/0320535 A1 | 10/2014 | Ying | |
| 2014/0351268 A1 | 11/2014 | Weskamp et al. | |
| 2015/0088655 A1 | 3/2015 | Taylor | |
| 2015/0100587 A1 | 4/2015 | Walkingshaw et al. | |
| 2015/0120767 A1* | 4/2015 | Skeen | G06F 17/30752 707/754 |
| 2015/0193857 A1 | 7/2015 | Reed et al. | |
| 2015/0331675 A1 | 11/2015 | De Magalhaes | |
| 2016/0063580 A1* | 3/2016 | Greenberg | G06Q 30/0282 705/347 |
| 2016/0103565 A1 | 4/2016 | Greenberg et al. | |
| 2016/0103794 A1 | 4/2016 | Greenberg et al. | |
| 2016/0103795 A1 | 4/2016 | Greenberg et al. | |
| 2016/0103798 A1 | 4/2016 | Greenberg et al. | |
| 2016/0103805 A1 | 4/2016 | Greenberg et al. | |
| 2016/0103926 A1 | 4/2016 | Greenberg et al. | |
| 2016/0124913 A1 | 5/2016 | McFarland et al. | |
| 2016/0196244 A1 | 7/2016 | Greenberg et al. | |

OTHER PUBLICATIONS

Web Monkey Internet Publication, Feb. 15, 2010.
MSDN, Introduction to DHTML Behaviors, [retrieved on Apr. 4, 2016].Retrieved from the internet: https://msdn.microsoft.com/en-us/library/ms531079(v=vs.85).aspx .Jun. 12, 2014. (Intro_to_DHTML_Behaviors).
Hypercard.org, http://web.archive.org/web/20121114055910/http://hypercard.org/hypercard_file_format.php, from Wayback Machine indicating Wayback retrieval date of Nov. 14, 2012, downloaded on Jun. 13, 2016.
Vito Tardia, "Building ePub with PHP and Markdown", https://www.sitepoint.com/building-epub-with-php-and-markdown/, Mar. 1, 2013.
Siegman et al., "Epub Zero, A Collection of Interesting Ideas", https://dauwhe.github.io/epub-zero/#compare, Sep. 28, 2015.
Gylling et al., "EPUB 3 Fixed-Layout Documents", http://www.idpf.org/epub/fxl/#dimensions, International Digital Publishing Forum, 2012.

(56) References Cited

OTHER PUBLICATIONS

Adobe InDesign CC, "How to Design Fixed Layout EPUB", https://web.archive.org/web/20140626152711/https://helpx.adobe.com/indesign/how-to/ebook-fixed-layout.html, from Wayback Machine indicating Wayback retrieval date of Jun. 26, 2014, downloaded on Sep. 13, 2016.
Gardeur et al., "Collection + JSON vs collection in EPUB", https://groups.google.com/forum/#!topic/epub-working-group/2aK4-jezWNE, Apr. 18, 2016.
Wikipedia, http://web.archive.org/web/20040309172512/http://en.wikipedia.org/wild/HyperCard, from Wayback Machine indicating Wayback retrieval date of Mar. 9, 2004, downloaded from the internet on Jun. 21, 2016.
International Search Report dated Dec. 17, 2015 from International Application No. PCT/US15/052520.
Written Opinion dated Dec. 17, 2015 from International Application No. PCT/US15/052520.
Sarah Sluis, "Harper's Bazaar Pursues Shoppable Ads With Streamwize", http://adexchanger.com/publishers/harpers-bazaar-pursues-shoppable-ads-with-streamwize/, Jul. 24, 2014, downloaded on May 22, 2015.
Paul Adams, "The End of Apps as We Know Them", https://blog.intercom.io/the-end-of-apps-as-we-know-them/, published around Nov. 2014, downloaded on May 22, 2015.
Paul Adams, "Why Cards are the Future of the Web", https://blog.intercom.io/why-cards-are-the-future-of-the-web/, published around Sep. 2013, downloaded on May 22, 2015.
Allison Schiff, "Sharethrough Brings Its Version of Twitter Cards to the Masses", http://adexchanger.com/native-advertising-2/sharethrough-brings-its-version-of-twitter-cards-to-the-masses/, Dec. 17, 2014, downloaded on May 26, 2015.
Sarah Perez, "Storytelling App Steller Becomes More of a Social Network", http://techcrunch.com/2014/08/21/storytelling-app-steller-becomes-more-of-a-social-network/, Aug. 21, 2014, downloaded on May 26, 2015.
Kaylene Hong, "Steller is a Beautiful Visual Storytelling App, Similar to Storehouse, but for Your iPhone Instead", http://thenextweb.com/apps/2014/03/13/steller-is-a-beautiful-visual-storytelling-app-similar-to-storehouse-but-for-your-iphone-instead/, Mar. 13, 2014, downloaded on May 27, 2015.
Jayanth Prathipati, "Why Do All Mobile Roads Lead Back to the Palm Pre?", http://thetechblock.com/mobile-roads-lead-back-palm-pre/, published on Jun. 11, 2014, downloaded on May 27, 2015.
Pictela, "Introduction to Pictela", http://www.pictela.com/docs/getting-started/introduction-to-pictela, from Wayback Machine indicating Wayback retrieval date of Mar. 18, 2015, downloaded on Jun. 5, 2015. (Pictela_Intro).
Pictela, https://web.archive.org/web/20130908132533/http://www.pictela.com/formats, from Wayback Machine indicating Wayback retrieval date of Sep. 8, 2013, downloaded on Jun. 5, 2015. (Pictela_Formats).
Twitter, https://web.archive.org/web/20150324121730/https://dev.twitter.com/cards/getting-started, from Wayback Machine indicating Wayback retrieval date of Mar. 24, 2015, downloaded on Jun. 5, 2015. (Twitter_Getting_Started).
Twitter, https://web.archive.org/web/20140929154946/https://dev.twitter.com/cards/overview, from Wayback Machine indicating Wayback retrieval date of Sep. 29, 2014, downloaded on Jun. 5, 2015. (Twitter_Overview).
Max Bulger, "Why Cards?", http://blog.trywildcard.com/post/93983166893/why-cards, published on Aug. 6, 2014, downloaded on May 26, 2015.
Streamwize, http://www.streamwize.com, downloaded on May 22, 2015. (Streamwise).
Streamwize, https://web.archive.org/web/20141222085204/http://www.streamwize.com/#introduction, from Wayback Machine indicating Wayback retrieval date of Dec. 22, 2014, downloaded on Jun. 5, 2015. (Streamwize V2).
Steller, "Everyone has a story to tell. Tell yours with photos, videos and texts", https://steller.co, from Wayback Machine indicating Wayback retrieval date of Apr. 5, 2014, downloaded on Jun. 5, 2015.
Max Bulger, "Introducing the Wildcard iOS SDK", http://blog.trywildcard.com/, Feb. 23, 2015, downloaded on May 26, 2015.
Wildcard, http://www.trywildcard.com/, from Wayback Machine indicating Wayback retrieval date of Feb. 8, 2014, downloaded on Jun. 5, 2015. (WC_homepage).
Wildcard, https://web.archive.org/web/20141115090135/http://www.trywildcard.com/docs/intro, from Wayback Machine indicating Wayback retrieval date of Nov. 15, 2014, downloaded on Jun. 5, 2015. (intro V1).
Wildcard, https://web.archive.org/web/20150321155952/http://www.trywildcard.com/docs/intro, from Wayback Machine indicating Wayback retrieval date of Mar. 21, 2015, downloaded on Jun. 5, 2015. (intro V2).
Wildcard, https://web.archive.org/web/20141115171158/http://www.trywildcard.com/docs/overview, from Wayback Machine indicating Wayback retrieval date of Nov. 15, 2014, downloaded on Jun. 5, 2015. (arch Overview V1).
Wildcard, https://web.archive.org/web/20150321162417/http://www.trywildcard.com/docs/overview, from Wayback Machine indicating Wayback retrieval date of Mar. 21, 2015, downloaded on Jun. 5, 2015. (arch overview V2).
Wildcard, https://web.archive.org/web/20150520042344/http://www.trywildcard.com/docs/overview/, from Wayback Machine indicating Wayback retrieval date of May 20, 2015, downloaded on Jun. 5, 2015. (arch overview V3).
Wildcard, https://web.archive.org/web/20141115090625/http://www.trywildcard.com/docs/sdk/quickstart_sdk, from Wayback Machine indicating Wayback retrieval date of Nov. 15, 2014, downloaded on Jun. 5, 2015. (SDK_QS_V1).
Wildcard, https://web.archive.org/web/20150321172000/http://www.trywildcard.com/docs/sdk/quickstart_sdk, from Wayback Machine indicating Wayback retrieval date of Mar. 21, 2015, downloaded on Jun. 5, 2015. (SDK_QS_V2).
Wildcard, https://web.archive.org/web/20141115090143/http://www.trywildcard.com/docs/sdk/java_sdk, from Wayback Machine indicating Wayback retrieval date of Nov. 15, 2014, downloaded on Jun. 5, 2015. (WC_Java_V1).
Wildcard, https://web.archive.org/web/20150321184716/http://www.trywildcard.com/docs/sdk/java_sdk, from Wayback Machine indicating Wayback retrieval date of Mar. 21, 2015, downloaded on Jun. 5, 2015. (WC_Java_V2).
Wildcard, https://web.archive.org/web/20141115090150/http://www.trywildcard.com/docs/sdk/ruby_sdk, from Wayback Machine indicating Wayback retrieval date of Nov. 15, 2014, downloaded on Jun. 5, 2015. (WC_Ruby_V2).
Wildcard, https://web.archive.org/web/20150321180400/http://www.trywildcard.com/docs/sdk/ruby_sdk, from Wayback Machine indicating Wayback retrieval date of Mar. 21, 2015, downloaded on Jun. 5, 2015. (WC_Ruby).
Wildcard, https://web.archive.org/web/20141115090647/http://www.trywildcard.com/partners, from Wayback Machine indicating Wayback retrieval date of Nov. 15, 2014, downloaded on Jun. 5, 2015. (WC_Partners_V1).
Wildcard, https://web.archive.org/web/20150315070647/http://www.trywildcard.com/partners, from Wayback Machine indicating Wayback retrieval date of Mar. 15, 2015, downloaded on Jun. 5, 2015. (WC_Partners_V2).
Wildcard, https://web.archive.org/web/20141126020058/http://www.trywildcard.com/docs/faq/, from Wayback Machine indicating Wayback retrieval date of Nov. 26, 2014, downloaded on Jun. 5, 2015. (FAQ_V1).
Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_ IOS_Tutorials_V1).
Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Sample_Projects_V1).

(56) References Cited

OTHER PUBLICATIONS

Wildcard, https://web.archive.org/web/20141115171308/http://www.trywildcard.com/docs/schema, from Wayback Machine indicating Wayback retrieval date of Nov. 15, 2014, downloaded on Jun. 5, 2015. (WC_Card_Schema_V1).
Wildcard, https://web.archive.org/web/20150518060819/http://www.trywildcard.com/docs/schema, from Wayback Machine indicating Wayback retrieval date of May 18, 2015, downloaded on Jun. 5, 2015. (WC_Card_Schema_V2).
Wildcard, http://www.trywildcard.com/docs/faq#shopify, not available on Wayback Machine, downloaded on Jun. 5, 2015. (WC_FAQ_V2).
Friendly Bit, "Rendering a Web Page—Step by Step", published on Jan. 11, 2010.
Hegaret et al., "What is the Document Object Model", published on Nov. 7, 2003.
GitHub, "Reading & Writing JSON", published on Oct. 6, 2013.
Jacqueline Thomas, A Serious Look at Card Based Design, [retrieved on Nov. 17, 2015].Retrieved from the internet: http://webdesignledger.com/card-based-design.Jun. 12, 2014.
Wikipedia, HyperCard, https://en.wikipedia.org/wild/HyperCard, downloaded on Feb. 3, 2016.
International Search Report dated Feb. 2, 2016 from International Application No. PCT/US2015/54599.
Written Opinion dated Feb. 2, 2016 from International Application No. PCT/US2015/54599.
U.S. Final Office Action dated Feb. 25, 2016 from U.S. Appl. No. 14/678,308.

\* cited by examiner

| CARD | | | 14 |
|---|---|---|---|
| DESIGN QUALITY | TEMPLATE BASED AUTHORING | AUTHORING TOOL THAT ENABLES THE CREATION OF BEAUTIFUL CARDS THAT INCLUDE NATIVE AND OTHER MEDIA CONTENT | |
| | BEAUTIFUL, WELL DESIGNED TEMPLATES | | |
| FUNCTION | A DIVERSE COMPONENT LIBRARY | AUTHORING OBJECTS THAT EXPOSE DEEP FUNCTIONALITY IN EASILY USABLE MODULES | |
| | POWERFUL AND EXTENSIBLE MODULES | | |
| INTEGRATION | STRUCTURED DATA INTEGRATORS | CONNECTORS THAT INPUT AND OUTPUT DATA TO AND FROM OTHER SYSTEMS | |
| | UNSTRUCTURED DATA GATHERERS | | |

FIG. 2

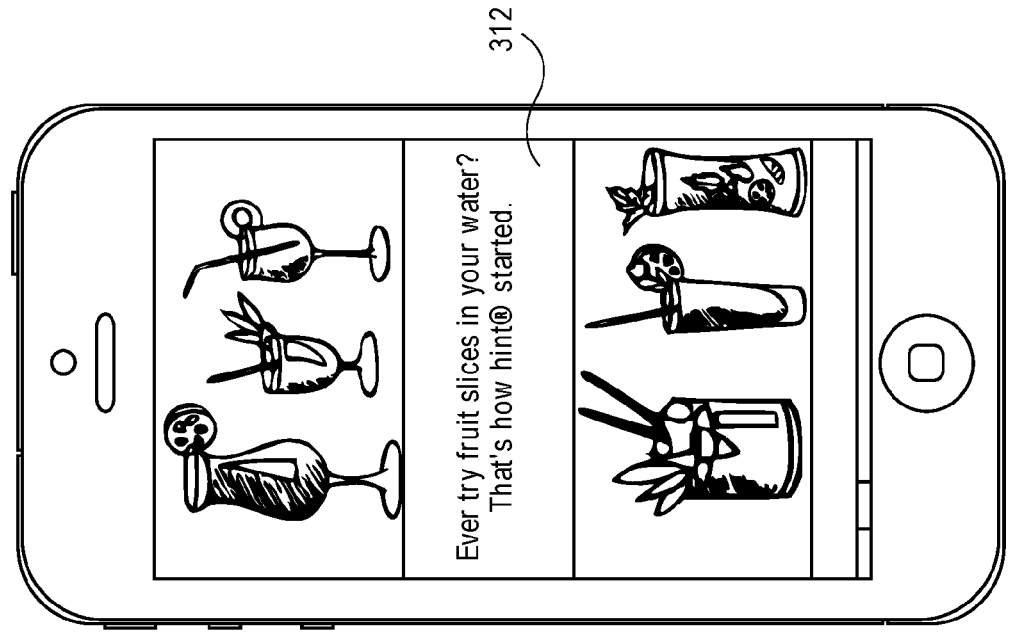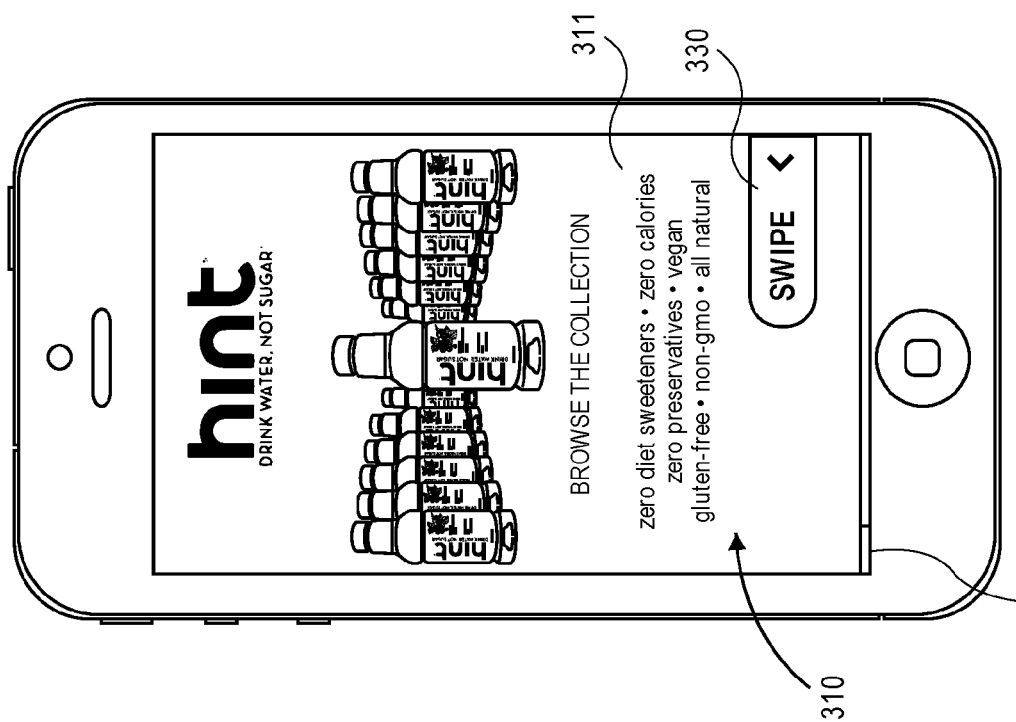
FIG. 7B
FIG. 7A

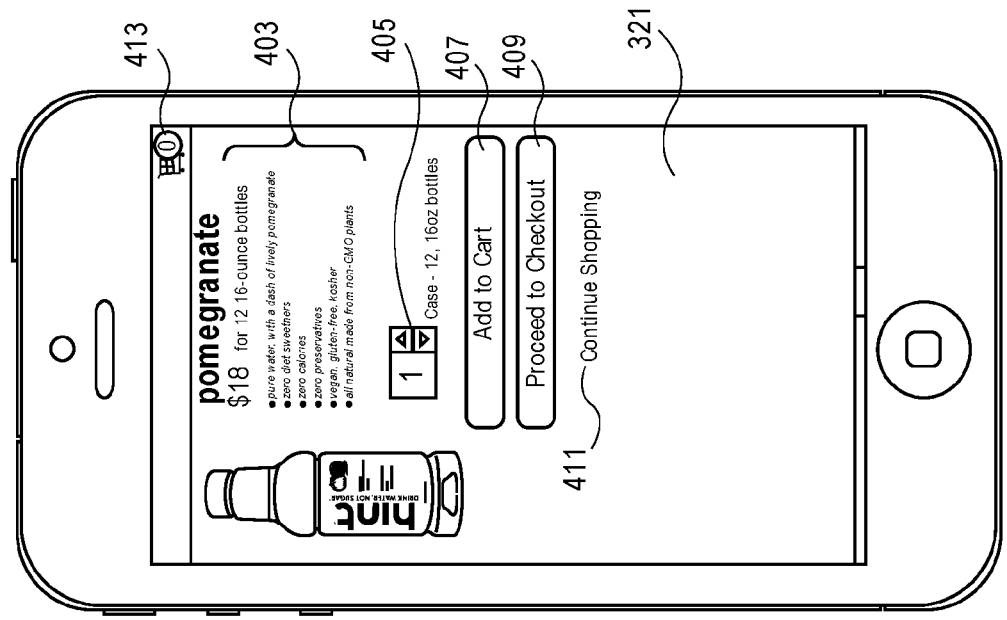
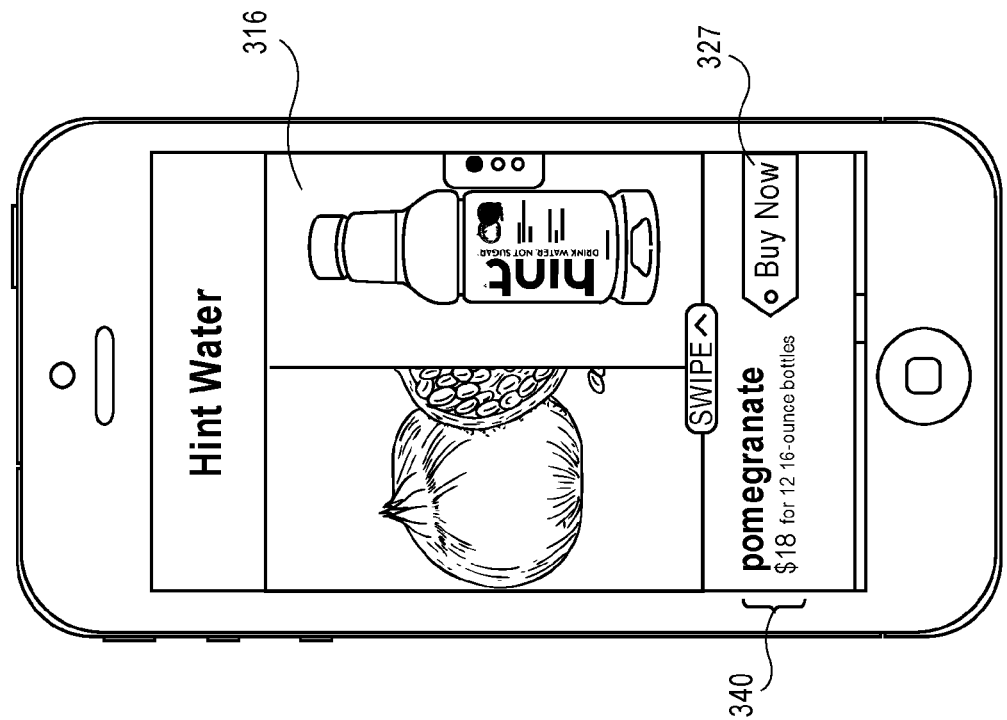

```
<!DOCTYPE html>
<html>
    <head>
        <meta charset="utf-8" />
        <meta name="viewport" content="width=device-width,
initial-scale=1, maximum-scale=1, user-scalable=no, minimal-ui" />
        <title>Wrap</title>
        <link href="//fonts.googleapis.com/
css?family=Open+Sans:300,400,600,700" rel="stylesheet" type="text/
css" />
        <link href="/main.css?1421357063794" rel="stylesheet" />
        <link rel="icon" type="image/png" href="/images/wrapfavicon-
transparent.png" />
        <base href="/" />
    </head>
    <body id="body">
        <div class="ng-view wrap-container"></div>
        <script src="/main.js?1421357063794"></script>
    </body>
</html>
```

FIG. 13

Sam Jones

Position: Running Back

College: Alabama State University

Profile: _____
_____
_____
_____
_____
_____

772a

Tim Johnson

Position: Quarterback

College: UCLA

Profile: _____
_____
_____
_____
_____
_____

772b

Joe Flowers

Position: Center

College: Notre Dame University

Profile: _____
_____
_____
_____
_____
_____

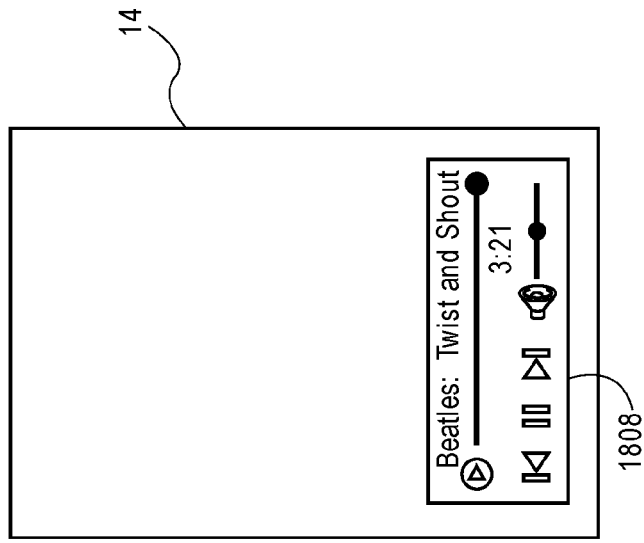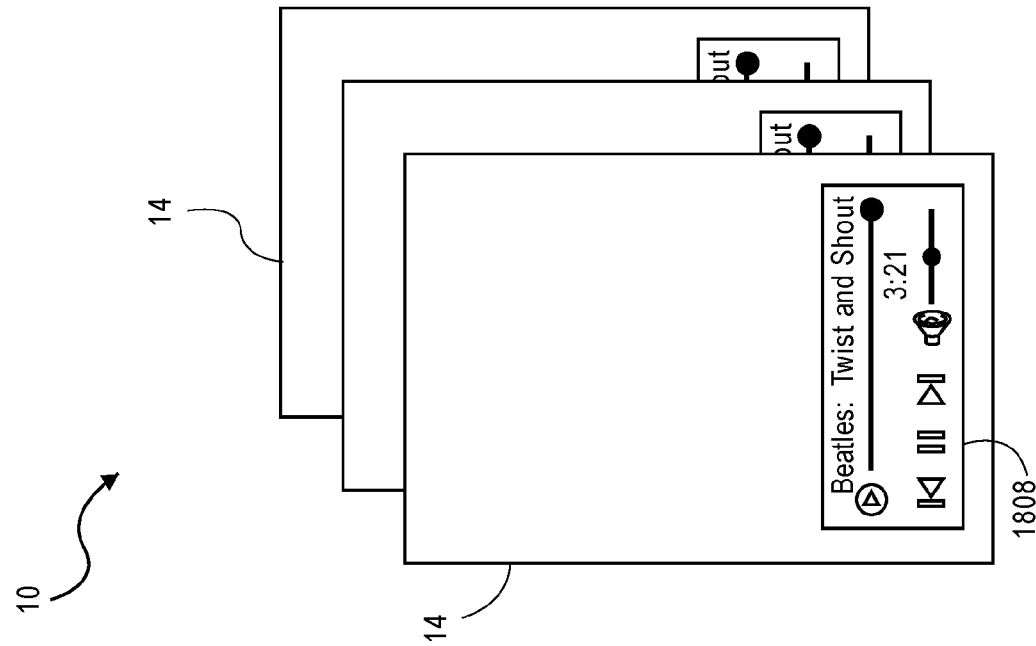
FIG. 29

INTEGRATION OF SOCIAL MEDIA WITH CARD PACKAGES

CROSS REFERENCE TO RELATED APPLICATIONS

This application is a Continuation of U.S. application Ser. No. 14/866,904, filed Sep. 26, 2015, which claims the benefit of U.S. Provisional Patent Application Nos. 62/062,056 and 62/062,061, both filed on Oct. 9, 2014 and both entitled "Wrap Package of Cards for Conveying a Narrative With Media Content, Providing Application Functionality, and Engaging Users in E-Commerce". U.S. application Ser. No. 14/866,904 further claims priority of U.S. Provisional Patent Application Nos. 62/084,171, filed Nov. 25, 2014; 62/091,866, filed Dec. 15, 2014; 62/114,675, filed Feb. 11, 2015, 62/133,574 filed Mar. 16, 2015, 62/195,642 filed Jul. 22, 2015; and 62/210,585, filed Aug. 27, 2015, each entitled "Card Based Package for Distributing Electronic Media and Services. In addition, U.S. application Ser. No. 14/866,904 claims the benefit of U.S. Provisional Application Nos. 62/145,360, filed Apr. 9, 2015; 62/170,438 filed Jun. 3, 2015; 62/170,569 filed Jun. 3, 2015; and 62/193,830, filed Jul. 17, 2015. Each of these priority applications is incorporated herein by reference for all purposes.

BACKGROUND

The present invention relates generally to the distribution of media, and more particularly, to integration of wrapped packages of cards into media feeds.

Media content developers have a variety of authoring tools, document formats and content delivery schemes that can be used to create and present media content to users over networks, such as the Internet. The content may be presented to users through a variety of mechanisms, including via web-sites, through the use of a mobile application (i.e., a mobile app) and downloadable documents such as PDF files, PowerPoint presentations, etc. Each of these delivery mechanisms, however, has limitations, particularly within a mobile computing environment.

PDF files, while relatively simple to author, have a number of limitations. The content of PDF files is static. Once created and delivered to a user over a network, there is no way for the viewer to interact, through the PDF file, with the distributor. For example, retailers commonly create PDF versions of product catalogs, which are distributed via a web page or email. When the PDF file is opened, however, the document is limited to only viewing. The viewer is unable to interact through the PDF file with the retailer, for instance, to ask questions about a particular item or to make a purchase. Also since PDFs are not dynamic documents, they need to be delivered to a consuming device as a single binary block. As a result PDFs, especially if they are graphic intensive, are typically large files, which may be difficult to distribute, especially over wireless networks to mobile devices. Furthermore, most PDF files are created for viewing on desktop computers, which have relatively large display screens. As a result, the viewing of these PDF files on a mobile device, such as a mobile phone with a relatively small viewing screen, often provides a poor user experience.

Websites typically include one or more web pages that are accessed and viewable through a browser. Web pages are typically written in HTML5, CSS and JavaScript and include information such as text, colors, backgrounds, and often links to images and other types of media, to be included in the final view of the web page when displayed through the browser. Layout, typographic and color-scheme information is typically defined by a style sheet language (CSS), which can either be embedded in the HTML or can be provided by a separate file, which is referenced from within the HTML. When the URL of a web page is accessed, the hosting web server will access and serve the appropriate files during a session with the requesting device. The browser, running on the requesting device, will then present to the user the media content in the format dictated by the HTML, as authored by the web page designer. In addition, web pages often include embedded hyperlinks. When selected, typically with a pointing device such as a mouse, stylus or a finger, the hyperlink will navigate to a new web page or media.

There are a number of advantages and disadvantages of using web sites for presenting media content to users. Web sites are typically "destinations", meaning a potential viewer is usually required to navigate to the web site to consume its content and functionality. Web sites are thus generally not considered as portable objects that can be readily delivered to consumers and other viewers, similar to messages. In addition, web sites are typically optimized for desktop computing, providing a rich opportunity for user interaction. With mobile devices, however, particularly mobile phones or wearable computing devices such as smart watches, small display screens and limited input/output capabilities, often results in a poor user experience. When viewing a web site through a screen on a mobile phone for example, it is often very difficult to read text and view images. It is also very difficult to input data and navigate from one web page to another. As a result, the user experience of accessing and viewing web sites on mobile computing devices is often frustrating, resulting in a poor user experience. In addition, the authoring of highly interactive, content-driven, web sites designed to create a positive user experience often requires a high degree of software expertise and sophistication. As a result, the creation of web sites designed for Internet commerce, for instance, is often very expensive and beyond the financial means of many small businesses and organizations.

More recently with the proliferation of "smart" mobile phones and tablets, mobile applications (often referred to as "apps") have become exceedingly popular. Mobile apps are typically "stand alone" or monolithic software programs, designed to perform a specific task or function, and intended to run on smart phones, tablet computers and other mobile devices. An extremely wide variety of apps are now commonplace, such as productively tools like email, calendars, etc., gaming, GPS services such as Google Maps, text and/or voice messaging, live communication such as Skype, online banking, etc., to name just a few. With their growing popularity, to a significant degree, apps have replaced web sites as the preferred method for content providers to create and distribute media content to mobile computing device users.

Apps also have many advantages and disadvantages. On the positive side, apps often provide a content-rich, rewarding, user experience. A well-designed app allows users to sequence through a number of views, presenting content to users in an orderly fashion. On the negative side, apps are typically "stand alone" software applications that do not easily interact with other software applications. As result, the functionality of apps is often limited, typically only capable of performing the specific task(s) that they were designed to perform, and working only with the specific endpoints contemplated at the time they were developed. As a result, it is often difficult, although not impossible, to create the necessary integration functionality for a user to purchase a product and/or service through the app. Also, the design and authoring of apps is typically very complex and requires a very high level of design engineering expertise to create apps that are professional-looking and appealing. In addition, apps typically are not cross-platform. App developers usually have to create and distribute multiple versions of the same app for the iOS/Apple, Android/Google and the Microsoft platforms for example. As a result, the development and maintenance costs associated with creating and distributing an app is complex and very expensive. Finally, apps typically have to be distributed through an application aggregator, such as the Apple App Store or Google Play. Apps, therefore, typically cannot be directly downloaded from the author/creator to users or consumers.

Recent advances in iOS 8 and Android, with multiple APIs, are making it easier for multiple apps to communicate with one another. It is now possible, for example, to integrate iTune purchases as in-app purchase or to purchase a physical product using an app like Shopify outside of the Apple environment and not bound by Apple purchase policies. In addition, tools are now available, such as Sencha and PhoneGap, to create a web-based multi-platform native app using HTML/CSS/JS (JavaScript) and embed them into a web view container inside of a native app package.

However, even with these recent advances, it is still very difficult for content providers to create a package of media content and functionality that conveys a compelling narrative, is portable and designed to provide a similar user experience on multiple devices, including mostly mobile devices, and is self-contained, meaning the recipient typically does not need to navigate to other sites to reap all the desired benefits and/or advantages contemplated by the distributor of the media.

SUMMARY

Systems and methods for creating and delivering wrapped packages of cards are disclosed. With wrap packages, each card is selectively authored to include (i) media content, (ii) application functionality and/or (iii) e-commerce related services. In addition, the cards can be authored in one or more linear sequences so that the media content conveys a "narrative" or "story" that unfolds as the wrap is consumed. Thus, the viewer is enticed to engage and use the application and/or e-commerce functionality, all within the context of the narrative story. In addition, wrap packages are portable objects that can be saved and readily distributed similar to electronic messages.

Wrap packages offer a number of benefits and attributes currently not available with conventional methods of distributing content, such as with PDFs, web sites, or stand-alone apps. Wrap packages offer a new platform for storytelling, communicating ideas, and delivering highly visual and functional user experiences. Wrap packages enable a new business paradigm for selling, advertising, publishing, increasing brand loyalty, offering services, and contacting and engaging new and old customers alike, all ideally delivered to consumers on their mobile devices, where they spend their time and consciousness. Where businesses previously used to have to build destinations (e.g., websites) or monolithic systems (e.g., "apps"), they can now, instead, provide consumers with wrap packages, that are delivered like messages, and that provide the user experiences and functionality they really want and need. As a result, wrap packages create opportunities for business to innovate and improve products and services, leveraging the mobile web in ways not before possible, because a convenient, enabling interface and platform did not previously exist.

A variety of data structures, components, runtime viewers and methods are described for integrating wrapped packages of cards into various social media feeds and for integrating social media feeds into wrap packages.

In a non-exclusive embodiment, a wrap identifier is provided within a social media feed. The wrap identifier may optionally be included in a wrap cover that also includes an image representative of the wrap. A wrap runtime viewer is initiated in response to selection of the wrap (e.g., by way of selection of a cover) from within the social media feed and a wrap descriptor that defines the selected wrap is obtained. The runtime viewer creates a wrap instance at the consuming device based on the wrap descriptor. The cards of the wrap instance are arranged to be displayed sequentially, a single card at a time, in response to navigational inputs. When the runtime viewer is not already present on the consuming device, it may be obtained in cooperation with the delivery of the wrap descriptor. The wrap instance may be displayed in-line within the social media feed, in an overlay frame, in a new browser tab or using any other suitable mechanism. Preferably, each of the cards in the wrap package is rendered at the same portrait aspect ratio at runtime, and within each card, the relative positioning of the card content is immutable.

The wrap can be viewed in conjunction with a variety of different social media feeds including, Twitter, Facebook, Instagram, Pinterest, etc.

In an entirely separate aspect, a wrap package of cards may include a social media card arranged to display a social media feed. In some embodiments, the wrap package is defined by a wrap descriptor that includes a plurality of card descriptors, each of the card descriptors is arranged to define the content, structure and layout of an associated card. The card descriptors include a social media card descriptor that defines the content, structure and layout of the social media card.

In some embodiments, the social media feed is displayed within an iframe contained within the social media card. In such embodiments, the social media card descriptor may include a widget descriptor that (i) defines a position within the social media card for the iframe, (ii) identifies a widget server from which the content of the social media feed may be obtained, and (iii) provides parameters to be passed to the widget server at runtime to identify the social media feed to be displayed.

In other embodiments, the social media card descriptor may include a feed descriptor that is used by a runtime viewer to establish the social media feed.

Social media cards may be arranged to display a variety of different types of social media feeds, as for example, a Facebook feed, a Twitter feed, an Instagram feed, a Pinterest feed, etc.

In some embodiments, the wrap descriptor takes the form of a JSON or a BSON data object. The wrap instance may be generated at the consuming computing device by creating an object graph from the wrap descriptor, generating a document object model from the object graph, and generating the wrap instance from the document object model.

BRIEF DESCRIPTION OF THE DRAWINGS

The invention and the advantages thereof, may best be understood by reference to the following description taken in conjunction with the accompanying drawings in which:

FIG. 2 is a diagram depicting the design, functionality and data integration capabilities of a representative card in a digital companion wrap package according to the principles of the present invention.

FIGS. 7A-7M are a series of cards of an exemplary wrap package.

FIGS. 8A-8H are a series of cards for implementing an exemplary purchase of products through a wrap package.

FIG. 13 illustrates the contents of a representative shim suitable for use in the method of FIG. 11.

FIGS. 23A-23D illustrates an exemplary wrap package with a media feed card embedded therein.

FIG. 29 illustrates a global media player widget appearing within all of the cards of a wrap.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
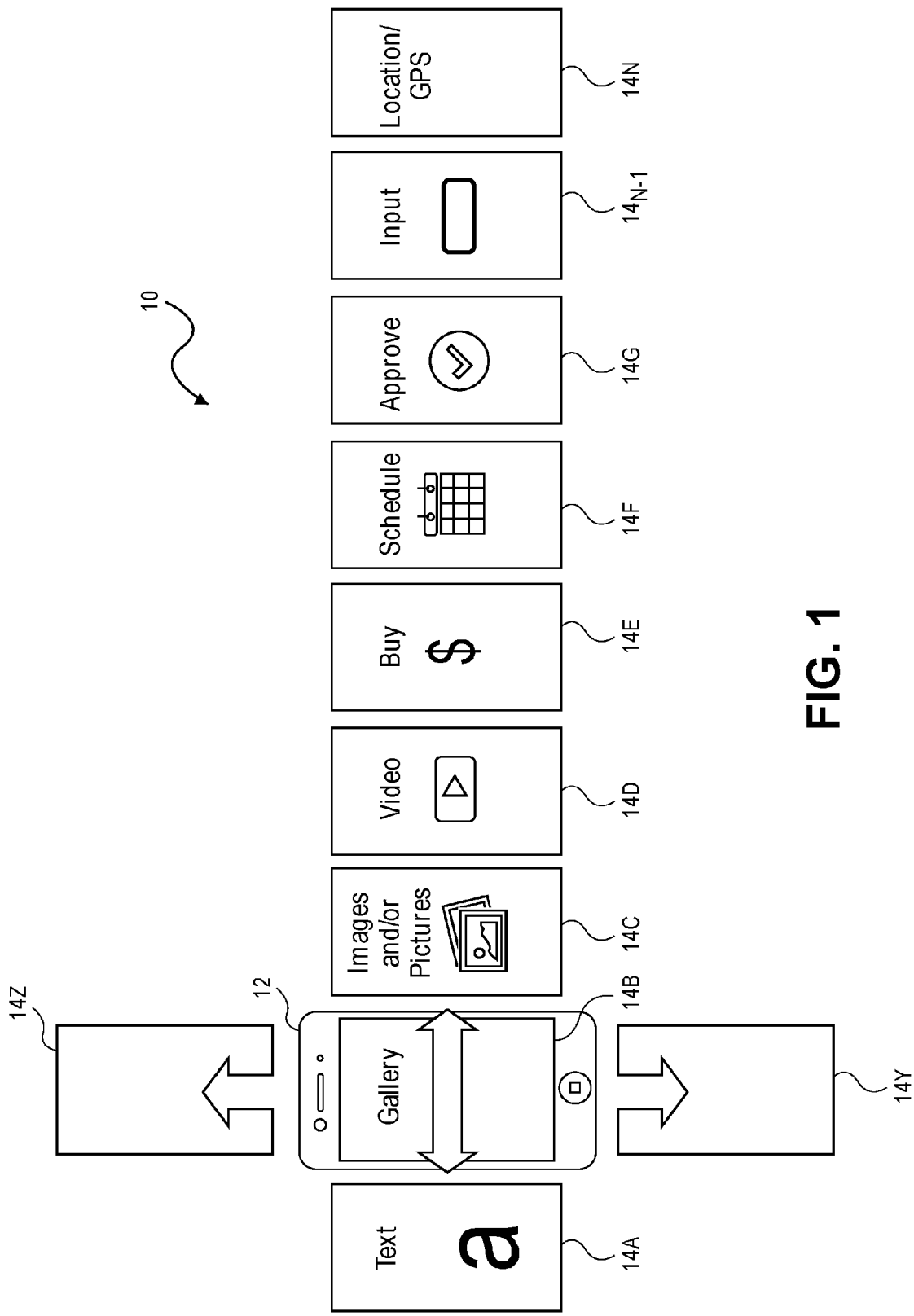
FIG. 1 is a diagram illustrating a wrap package layout that includes a plurality of cards threaded together so as to be viewable in linear arrays in accordance with the principles of the present invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The present disclosure is directed to the mechanisms that support the distribution of media content, and a corresponding palette of application functionality and/or e-commerce related services, in the form of wrapped packages of cards (interchangeably referred to herein as a "wrap", "package" or "wrap package").

A wrap package, which includes a set of cards arranged in one or more predefined sequences, is a unique delivery mechanism for the distribution of authored content and functionality. Wraps are typically characterized by the following:

(a) Each card is selectively authored to include media, such as text, photos, images, video, documents, etc. Since the cards are arranged in their one or more sequences, the media can be authored to convey a "story telling" narrative that unfolds as the cards are sequentially browsed;

(b) The cards of wraps can also be selectively authored to include web or application like functionality;

(c) The layout of the content of any particular card is immutable. That is, the positional relationship between the displayed components of any given card remains the same, regardless of the size, width, height, or type of display on which the wrap is rendered;

(d) The cards of a wrap all have a defined presentational aspect ratio (typically, but not necessarily, a portrait view);

(e) Wraps are designed for, although not necessarily limited to, mobile. On mobile devices having touch sensitive screens, the cards of wraps are navigated by swipe-browsing. Wraps thus mimic the way people already use their smartphones and other mobile devices such as tablets. Every swipe reveals a new card with a "bite-size" message and/or content.

As the cards are sequentially swiped during consumption, the story-telling narrative of the wrap unfolds. In addition, the user experience in viewing a given wrap is almost always the same, regardless of the type of viewing device, since each card is immutable and maintains the defined aspect at runtime.

Wraps are authored using a template-based authoring tool that requires little to no technical expertise. Wraps can, therefore, be simply and inexpensively created, allowing online retailers and others to promote and deliver their brand, products and/or interactive services through the web with an ease previously not possible. Up to now, developing apps or web sites typically required a high degree of software sophistication, significant cost, and took months or weeks to create. Now with wrap, businesses and other content providers can inexpensively create, with little software expertise, interactive wrap packages in hours or minutes.

Another advantage of wraps is that they do not require a dedicated infrastructure for distribution and viewing. By using wrap identifiers, such as URLs, wraps can be distributed to a specific individual or widely to many either by including the wrap identifiers in messages (e.g., emails, texts, etc.), by posting in social media feeds (Facebook, Twitter, etc.), and/or embedding in online advertisements, etc. This attribute, meaning the ability to easily share and distribute wraps over already pervasive communication channels, is likely to increase the possibility of (i) wraps in general becoming ubiquitous in the mobile economy and (ii) individual wraps going "viral".

Consumers now spend vast amounts of their time and consciousness on their mobile phones and tablets. As a result, the ability to easily distribute wraps to mobile devices helps brands intimately deliver elegant, user experiences, precisely where it matters the most. Wraps thus have the ability to transform mobile devices into powerful business tools. By delivering wraps to mobile devices, it helps brands sell more and build recognition, relationships and loyalty among customers.

In most situations, all that is needed to view a wrap is a browser. When a wrap is requested for viewing, a runtime viewer is provided along with a wrap descriptor. On the consuming device, the runtime viewer is arranged to deserialize the cards of the wrap descriptor and to generate a runtime instance of the wrap. In other situations, the runtime viewer may already be included in a native application residing on the consuming device.

Wraps are thus a groundbreaking, mobile-first, storytelling and e-commerce platform. By making it simple, inexpensive and easy to (i) author narrative wraps with interactive functionality and (ii) to distribute wraps like messages, wraps have the unique ability to:

(a) "democratize" the web by providing a powerful, low barrier, low cost alternative to apps and web sites;

(b) unlock the vast story-telling potential of the Internet, and (c) drive e-commerce by building customer relationships and increasing web conversion rates via the interactive functionality provided in wraps.

Wraps thus solve many of the problems and limitations associated with the existing methods for distributing content and conducting e-commerce, such as PDF files, web sites, dedicated apps, and the like. With all these benefits, wraps have the potential of becoming ubiquitous, ushering in a new paradigm referred to herein as the "Narrative Web".

A wrap descriptor is composed of a set of card descriptors, each defining a structure, layout and content of an associated card. The wrap descriptor may also include various wrap level components, attributes, behavior declarations and/or metadata.

Wrap and/or card descriptors will often separate content from their presentation. In other words, descriptors with content of any appreciable size will typically reference these asset(s), as opposed to incorporating them into the descriptor itself. With this approach, the runtime viewer is responsible for obtaining the external assets at runtime. Wraps are thus "lightweight", meaning they are easier to download and distribute over mobile and cellular networks, which tend to be relatively low bandwidth.

Each card descriptor also commonly includes component descriptor(s) identifying the component(s) in the card and any behaviors or other attributes associated with such component(s). Behaviors are often declared rather than being explicitly defined within the descriptors. Thus, the runtime viewer is responsible for associating the behaviors declared in the descriptor with their associated components in the runtime instance. In other embodiments, card behaviors can be authored inline or otherwise associated with the cards.

During consumption of a wrap, the runtime viewer on the consuming device initially generates an object graph from the wrap descriptor and then subsequently generates a Document Object Model ("DOM") from the object graph. The runtime viewer then cooperates with the browser on the device to generate a runtime instance of the wrap based on the DOM. This two-step approach differs from how conventional web pages are usually processed and displayed. Typically, the browser on a consuming device will convert Hyper Text Markup Language (HTML) defining a web page into a DOM, which is then used by the browser to directly display the web page. There is no intermediate transformation step of converting a "raw" wrap descriptor into an object graph prior to the browser displaying content based on a DOM.

In addition, the runtime viewer creates a card list in the sequence order(s) from the wrap descriptor and provides navigation tools that operate in cooperation with the browser to facilitate transitioning between cards during consumption. In non-exclusive embodiments, the order of the cards is implicit in the descriptor structure. Since the navigation functionality is provided by the runtime viewer, the cards themselves do not have to include navigational constructs. That is, there is no need to provide explicit linking or navigation components in the cards to facilitate normal navigation between adjacent cards in the wrap, which helps simplify card design. Since normal navigation is handled by the runtime viewer in cooperation with the browser, the cards only require navigational constructs when the author desires to override the standard wrap navigational features. This allows wrap authors to concentrate on creating the desired content and visual appearance of their wraps, without needing to worry about the platform dependent formatting or navigation requirements. In other embodiments, however, cards may include navigational constructs that operate either in place of or in cooperation with the navigation tools provided by the runtime viewer.

The navigation tools that are actually used for any particular wrap instance can be device and/or platform dependent. For example, swipe navigation is preferably facilitated when the consuming device has a touch sensitive screen, as is popular in most mobile computing devices such as smartphones and tablet computers. Selectable GUI navigation buttons (such as arrows, buttons, text-based swipe directions, etc.) may also be displayed on the screen to facilitate navigation between cards. In addition, non-touch screen based navigation may be facilitated when the consuming device has as a selection device (e.g., a mouse) and/or a keyboard or keypad where various keys (e.g., right, left, up and down arrow keys, etc.) may be used to navigate between cards.

In a non-exclusive embodiment, wrap packages are a mobile-first marketing and commerce platform that ideally provides a beautiful world of storytelling in bite-size moments that get and hold attention. In other embodiments, wrap packages can be used and distributed to other platforms, such a desktop computers or Smart TVs for example. Wrap packages, although highly suitable for mobile, are not limited only to mobile devices.

Wrap packages takes content combined with mobile app and website functionality and makes them into an elegant card-based narrative that is delivered in the browser as a sharable and savable message. Wrap packages thus provides an app-like user experience that is delivered as a live, interactive message from a cloud-based platform, using for example, the Software as a Service (SaaS) model.

The uniqueness of wrap packages creates opportunities for business and other organizations alike to innovate and improve marketing efforts, customer support, and user experiences in ways previously not possible, because an enabling interface and platform did not exist. Wrap packages can thus potentially define the next generation interactive web paradigm, particularly for mobile, although for desktop and other types of devices as well.

By authoring wrap packages, businesses and other organizations can simply and cheaply create, distribute, and manage storytelling mobile web user experiences, app like functionality, all in the context of wrap packages delivered directly to consumers. Where businesses used to have to build destinations (websites) or use monolithic systems (apps), they can now provide consumers, particularly mobile device users, with a user experience that delivers the content they want combined with a complementary palette of functions and/or e-commerce related services.

Wrap packages are also platform and device independent. Wraps do not have to be written for any specific platform, such as iOS or Android, or for any specific device or class of devices (e.g. smart phones, tablets, desktops, etc.). On the contrary, a wrap package need be authored once and it will run on almost any device, regardless of the operating system or the type. This ubiquity, along with the ability to easily distribute wrap packages similar to messages, is a powerful construct that potentially can make the use of wrap packages near universal.

Wrap packages thus solves a number of current problem with the mobile web. Unlike web sites, wrap packages are easy to consume on mobile devices and offer the opportunity to create compelling narratives and user experiences. In addition, the ability to incorporate app-like functionality into wraps provides a multi-function app-like experience, without having to be in an app, download an app, or open several apps.

A wrap is a portable container of multimedia content, such as text, images, photos, audio, video and the like, and interactive services designed for ease of delivery, exchange, and consumption. It is comprised of a collection of cards, which, from an end-user/consumer perspective, are atomic units of the aforementioned multimedia content and interactive services.

The cards in a wrap have an explicit sequence so that, when taken as a whole, they are ideal for, but not necessarily limited to, creating a narrative story as the cards are browsed in the defined sequence. The multimedia content and/or interactive services contained by any given card can be determined entirely in advance or as late as the moment the wrap is consumed by the end-user.

Cards have a visual representation intended to evoke similarities to their physical counterparts. They have a fixed portrait aspect ratio that makes them ideally suited to current mobile computing devices as well as easy to scale up to and arrange to fit other display form factors, such as provided on laptop and desktop computers as well as smart TVs. The physical card metaphor can also extend to the interactive behavior of cards in a wrap, as the user can use gestures that evoke the "flipping" of cards in a deck or bound booklet to navigate between them.

Cards, however, however can differ from their physical counter-parts in ways that provide for unique presentations of content or the aforementioned interactive services. For example, a gallery card provides the ability to present an expanded amount of content in a vertically stacked orientation such that the overall length (i.e., the number of cards in a horizontal sequence) of the wrap is not affected by the amount of content in the wrap. This aids in navigation since the user can flip to the previous or next card regardless of their current position in the gallery.

The app-like functionality and interactive features implemented within cards include, but are not limited to, for example the ability to open hyperlinks to additional content on the web, such as maps or a shopping cart, which can be presented in a modal overlay called a cul-de-sac. The cul-de-sac allows for interaction with a traditional flow of web content without losing a viewer's position within the wrap. When the interaction is complete, the cul-de-sac is dismissed, returning the viewer to the original card in which the cul-de-sac was initiated. Other services may use input from the user or a remote source to dynamically generate the content on a card. These are just a few illustrative examples of the app-like functionality and interactivity that can be built into the cards of wrap packages.

The wrap package data structure definition, or schema, contains a unique identifier and descriptive metadata for the wrap and contains a card package for each card in the wrap. Similar to the wrap package, the card package is an abstract, platform-independent data structure representing the contents of a card, which is a composition of components representing internal atomic units of content such as text or an image or other nested containers of components. Components may also represent content that is dynamically generated at the time of consumption, for example, by fetching content from the Internet or by processing input from the user.

Cards are thus like containers for holding and distributing media content, such as text, images, photos, audio, video and the like. In addition, cards may also contain or hold executable objects that provide or enable real-time features, such as application functionality (i.e., the ability to schedule appointments, engage in online chats or conversations) and support e-commerce related services (i.e., the ability to purchase goods and/or services). Such media content and executable objects are sometimes referred to herein as card "assets." Cards are also consumable anywhere, meaning they have the ability to be resolved and displayed on just about any type of device (mobile phones, laptops, tablets, wearable computing devices such as smart watches, desktop computers, smart TVs, etc.), regardless of the platform (e.g., iOS. Android, Microsoft, etc.). In addition, cards are a navigation metaphor. Each card can be authored to group related information that can be easily consumed within a user interface experience by swipe (or other simple gesture) navigation from card-to-card. Wrap packages thus represent a holistic, book like, narrative approach to presenting information and providing application and/or e-commerce related services to users and consumers, particularly those using mobile devices, such as smart phones and tablet computers.

In addition, each card in a wrap has defined content that is displayed in a predefined layout. In general, the cards in a wrap have the same size and aspect ratio. The aspect ratio is preferably device independent and is preferably maintained regardless of device orientation and/or display window size.

The cards of the wrap packages are ideally authored in one or more linear sequences so that a book-like narrative unfolds, not only through the cards themselves, but also by the transition between the cards, as they are sequentially browsed. In addition, the wrap packages are portable objects that may exist within a social data feed or within a custom application. Wrap packages are also readily distributed, similar to electronic messages, through e-mail, messaging, social-media, or via a variety of other electronic communication platforms. As a result, wrap packages are consumable, sharable and savable objects. As the cards are browsed in the one or more linear sequences during consumption, the user experiences the unfolding of the authored narrative, including the defined media content interwoven with the complementary application functionality and/or e-commerce related services. As a result, the entire user experience including any application functionality and/or e-commerce related services is substantially contained within the context of the wrap package itself, often (but not necessarily) without the need to navigate to other sites.

Referring to FIG. 1, a diagram of a non-exclusive embodiment of a wrap package 10 viewable on a computing device 12 is illustrated. The wrap package 10 includes a plurality of cards 14 that are threaded together an as to enable browsing by swiping in one or more linear sequences. Any of the cards 14 may optionally include various types of media, such as text, images or photos, audio, video, a live or streaming feed of media, 3-D objects, or content from other wrap packages (not illustrated). Any of the cards 14 may also optionally provide application functionality, such as the ability to receive input data or display dynamically generated data, a calendar for scheduling or booking appointments or making reservations for goods and/or services, location/GPS, etc. In addition, any of the cards 14 may optionally provide or support e-commerce services, such as the ability to browse products in a catalog, communicate with an online sales representative, and/or purchase product(s).

By way of example, in the schematically illustrated wrap package 10, card $14_A$ includes text, card $14_B$ presents a gallery, card $14_C$ includes images or pictures, card $14_D$ includes a video, card $14_E$ includes e-commerce related service(s), card $14_F$ includes a calendar function for scheduling appointments and/or booking reservations, card $14_G$ includes a user approval function, $14_{n-1}$ includes a data entry function, card $14_N$ includes location or GPS services, etc.

On computing devices with touch sensitive screens, the cards 14 of wrap packages 10 can be navigated linearly by swiping or by using other suitable interfaces, such as a stylus or pen. In devices without a touch sensitive screen, alternative user interfaces are provided to facilitate transition (e.g., flipping) from one card to the next. In the context of the present application, the terms "swipe-browsing" or "swiping" is intended to mean the navigation from one card to an adjacent next card. With devices with touch sensitive screens, swipe browsing is typically implemented by the sliding of a finger or other input device across the display. With devices without touch-sensitive screens, other navigation tools such as a mouse, keyboard or remote control, can be used for swipe browsing. When a swipe is performed, the content of the next card in the sequence is displayed. For example, by swiping either right to left or vice versa, the next card, depending on the swipe direction, in the horizontal sequence is displayed. Similarly, by swiping up and/or down, the next card in either the up or down sequence is displayed. Thus, the user experience when consuming a wrap package is the wrap package itself (as opposed to a remote web site for example), viewable via a swipe-able interface.

Additionally, some cards may also include one or more embedded link(s) that, when selected, enable navigation to either a non-adjacent card not in linear sequence or to another wrap package, a web page or some other location entirely outside of the wrap package.

It should be noted that the particular layout of cards 14 in the wrap package 10 illustrated in FIG. 1 is merely illustrative. Both the number of rows and/or columns, and the number of sequential cards 14 within any given row or column, may vary widely as appropriate to deliver the desired user experience, narrative, content, functionality and services of the wrap package 10.

With gallery cards, such as card $14_B$ of FIG. 1, swiping allows for the scrolling through of the contents of a card 14, which are typically too voluminous to be displayed within the size of a fixed screen display, such as that provided on a mobile phone. In an illustrative example, a particular wrap package 10 may include a plurality of cards organized in a horizontal sequence. By swiping right to left or vice versa, the next card 14 or the previous card 14 in the horizontal sequence is displayed. In the vertical direction, however, one or more selected cards $14_B$ may be configured in the gallery format, allowing the viewer to scroll up or down by swiping through media content of the gallery. In an illustrative but non-exclusive example, a wrap package 10 authored and distributed by a car rental business may include a horizontal sequence of cards 10, each dedicated to a category of information pertinent to a traveler (i.e., cards dedicated to local hotels, restaurants, local tourist attractions respectively). By swiping up or down for a given card, relevant material within each category is displayed in a gallery format. For instance by swiping up or down the hotel card (not illustrated), a gallery of a number of local hotels is displayed. In variations of the gallery card format, the behavior invoked by an up or down swipe may differ. For example, swiping up or down my result in a continuous "rolling" of the content of the gallery card. In other embodiments, an up or down swipe may result in a "snap" action with the next item of content appearing after the snap, for example, as illustrated as cards 14Y and 14Z in FIG. 1.

The wrap package 10 is identified, as described in more detail below, through the use of a unique identifier (wrap ID 42) assigned to the package 10. By way of example, the wrap ID 42 may take the form of a Uniform Resource Identifier (URL). As such, the wrap ID may thus be provided as a link, which can readily be used to effectively send or retrieve the wrap package. That is, the wrap package may effectively be "sent" to a potential viewer as a link using any of the wide variety of mechanism that can currently—or in the future—be used to send a link or convey the URL. By way of example, this may include e-mail messages, text messages, SMS messages, via a Twitter tweet, as a post on social media such as Facebook, etc., discussion forums, walls or the like, as a link embedded in a document, an image, or a web page or any other media type, in a blog or microblog (e.g. Tumblr), or any other messaging or electronic content distribution mechanism or communication platform currently known or developed in the future.

Wrap packages are therefore significantly different and more powerful than web sites. For example with wrap packages, they can be consumed "on the spot" where it is located (i.e., when delivered to a mobile device for example). In contrast with the selection of a banner ad appearing within a web site, where the viewer is taken to a new web page that is not (a) necessarily designed for mobile devices and (b) is self navigating, making it very difficult for a narrative to be conveyed. As a result, the user experience, particularly on mobile devices, may be very poor. Hence, the friction of providing a compelling user experience with wrap packages is far less than with web site.

The cards 14 of a wrap 10 can be displayed on the screen of virtually any type of computing device. It should be appreciated that the card metaphor is particularly well suited for use on mobile devices such as smart phones, tablet computers, etc., which makes the format particularly powerful for authors interested in developing content tailored for mobile devices. By delivering wrap packages 10 to mobile devices, users and potential customers can be won over at their point of intimacy, where they spend their time and consciousness. Wrap packages thus allow authors, merchants and other content providers to create compelling narratives and provide ongoing application functionality and/or e-commerce support directly delivered anytime and anywhere to users, transforming their mobile devices into a powerful business tool that enhances mobile engagement and relationships. As a result, higher customer satisfaction, better brand engagement, and a higher conversion (i.e., click-through rates) and repeat e-commerce related activity compared to other forms of after sale promotions and merchandising will likely result.

Referring to FIG. 2, a diagram depicting the design, functionality and data integration capabilities of a representative card 14 in a wrap package 10 is shown.

By using card templates, authoring tools and media collaboration tools, beautiful, content-rich, cards 14 may be created either by automation or by individuals with even minimal design skills and experience. As such, the author, either a person or an automated process, has the ability to easily create beautiful content-rich cards 14 that can selectively include text, images, photos, and other media similar to PDF files, but optionally, with the added benefit of additional application functionality and/or e-commerce related services, either embedded in the same card 14, or other cards 14, in the wrap package 10. In the automated authoring embodiments, the content of a card 14 can be populated by a data processing system that automatically uploads predefined content into various defined fields of a card template.

By authoring (i) the horizontal and/or vertical sequence order for swipe-browsing the cards 14, (ii) the media content in each card 14, (iii) application functionality and/or (iv) the e-commerce services for each card 14, it is possible to author wrap packages 10 that are content-rich, highly interactive, and that define a palette of services, functions and experiences related to the wrap package 10, all within the context of a story book-like narrative that unfolds as the cards 14 are browsed in their sequence order(s).

In addition, the use of component libraries and the authoring tools allow for the authoring of cards 14 with a diverse, easy to use, reusable, set of component modules that provide a wide variety of application functions and e-commerce services. Such application functions include, but are not limited to, for example, calendar functions, scheduling of an appointment functions, reserving or booking goods and/or services, such as a car rental, hotel room, or table at a restaurant, map or GPS related functions, support for online conversations, streaming live video or other media feeds, etc. In addition, e-commerce related services include displaying product and/or service offerings, displaying user account information, engaging a sales representative in an online chat session, and enabling the purchase of goods and/or services, etc. These card services or "plugins" are all part of an ecosystem supported by a Wrap run-time engine viewer (described in more detail below), which allows the various plug-in services to all communicate and inter-operate together. For example, a calendar plugin could be configured to communicate with a reservation booking database plugin, which could communicate with a chat plugin. The communication among the various plug-in services is accomplished through a common set of APIs. As a result, the interactivity, functionality and usefulness of wrap packages 10 are significantly enhanced by such an ecosystem of connected plug-in services.

Finally, the integration capabilities of cards 14 enable the bi-directional flow of data from users browsing a wrap package 10 to other cards 14 in the same wrap package 10, to another wrap package 10, or a remote data processing system. For example, a card 14 can be integrated with the back end software system for a large online retailer, which will automatically populate the content of a card 14 with product images, user account information, prior purchase information, and a host of other user-related information. Alternatively, a card 14 can be used to capture data input from a user and provide it to a retailer's back end e-commerce software system. For example, a card 14 may display a one-click "Buy Now" function for a displayed item. When the Buy Now function is selected, previously saved user account information is automatically delivered to the back end software system of the online merchant, which then processes the information to complete the transaction.

The data entered by the user and/or the data presented via a card 14 of a wrap package 10 may thus be integrated with the back-end database, cloud computing services, web sites, etc., regardless if managed by an author and/or distributor of the wrap package or by a third party. The data processing for the purchase of goods and/or services, appointments, and/or other application functionality and e-commerce related services may, therefore, be performed either within the wrap packages 10 itself or integrated with a remote data processing resource.

The data integration capabilities of cards 14 can also be shared among other cards 14 in the same wrap package 10, with other wrap packages, with web sites, or just about any other data processing system.

Figure 3:
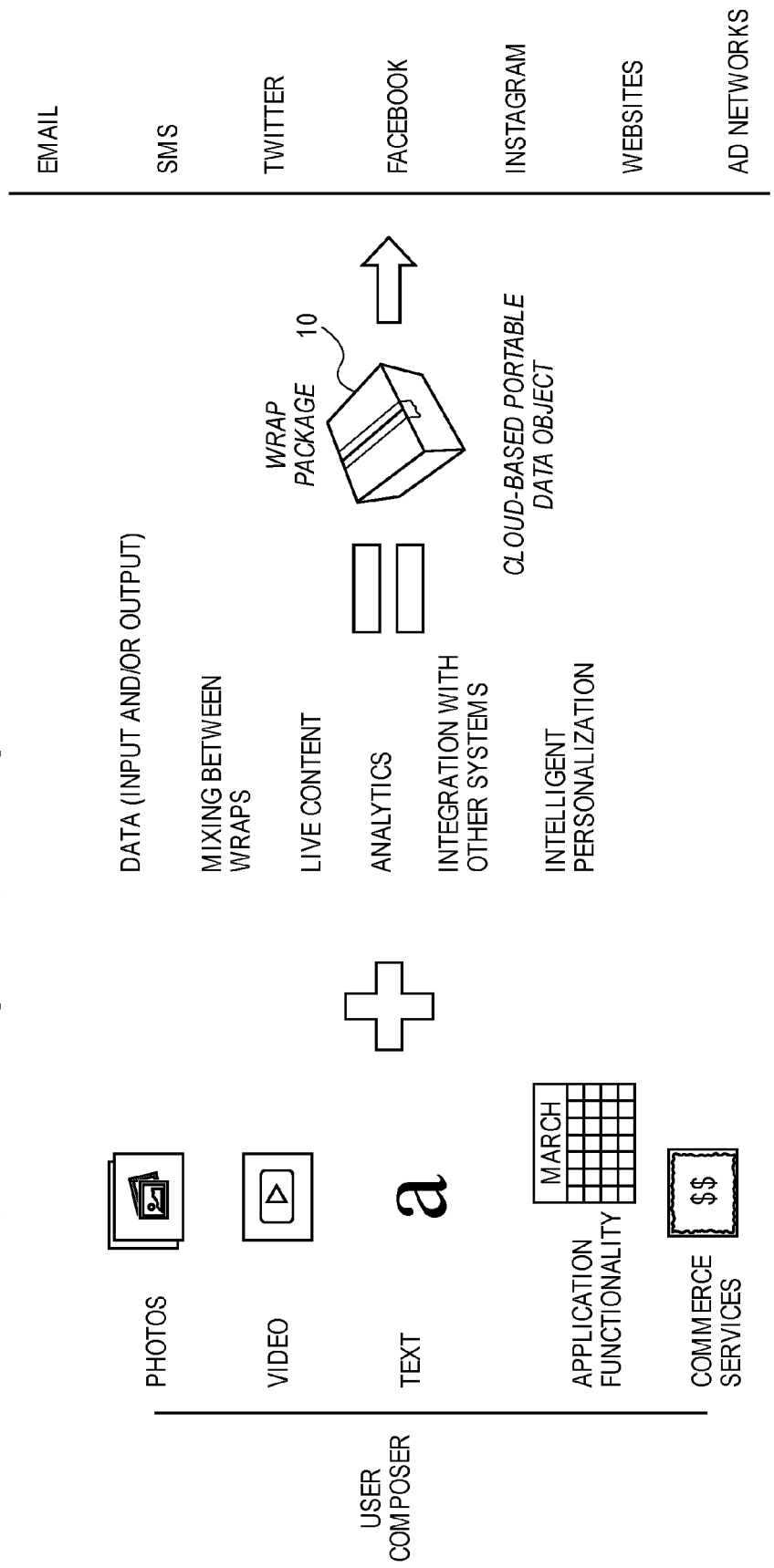
FIG. 3 is a diagram illustrating the media content and distribution model for distributing digital companion wrap packages in accordance with the principles of the present invention.

Referring to FIG. 3, a diagram summarizing the content and distribution model for wrap packages 10 is shown. As illustrated in the left most column, the content that may be included in the various cards 14 of a wrap package 10 may include photos and/or images, audio, video, text, 3-D objects, various types of streaming media (e.g., audio, video, audiovisual, data, biometric information, tickers, sensor outputs, etc.), other data types, application functionality and/or e-commerce services. This content may further be combined with content mixed from other wrap packages 10 as well as live or streaming content. The cards 14 of the wrap package 10 may be further modified based on analytics, intelligent personalization based on the demographics of targeted users or viewers, as well as the integration of either data input or data output to/from with other cards 14, other wrap packages 10, or remote data processing systems and processes, as explained above.

All of the above are then combined during the authoring process into a group of digital objects, defined herein as the wrap package 10. In non-exclusive embodiments where URLs are used as identifiers (i.e., wrap ID 42), the wrap packages are "light-weight", meaning content of the wrap package 10 is delivered over a network to a user only when the wrap ID 42 for the wrap package 10 and/or each card 14 is identified. As a result, the media content, application functionality, and/or e-commerce related services is delivered only when needed. Also, by authoring the cards 14 using a widely supported language such as HTML, the cards 14 of wrap packages 10 can be written once and are viewable on a display associated with almost any computing device running a browser. Accordingly, unlike applications, multiple version of a wrap package 10 need not be authored for multiple platforms.

The wrap package 10 is thus essentially a cloud based portable object that may be readily distributed in a number of ways. In non-exclusive examples, wrap packages 10 may be distributed by email, SMS messaging, ad networks, Twitter, merchant/retailer web sites, photo and/or video sharing web sites that support messaging, social networking web site such as Facebook, through the down-loading of applications from aggregators such as the Apple App Store or Google Play, or just about any means for electronically distributing data over a network, currently known or developed in the future.

Authoring and Distribution of Wrap Packages

Figure 4:
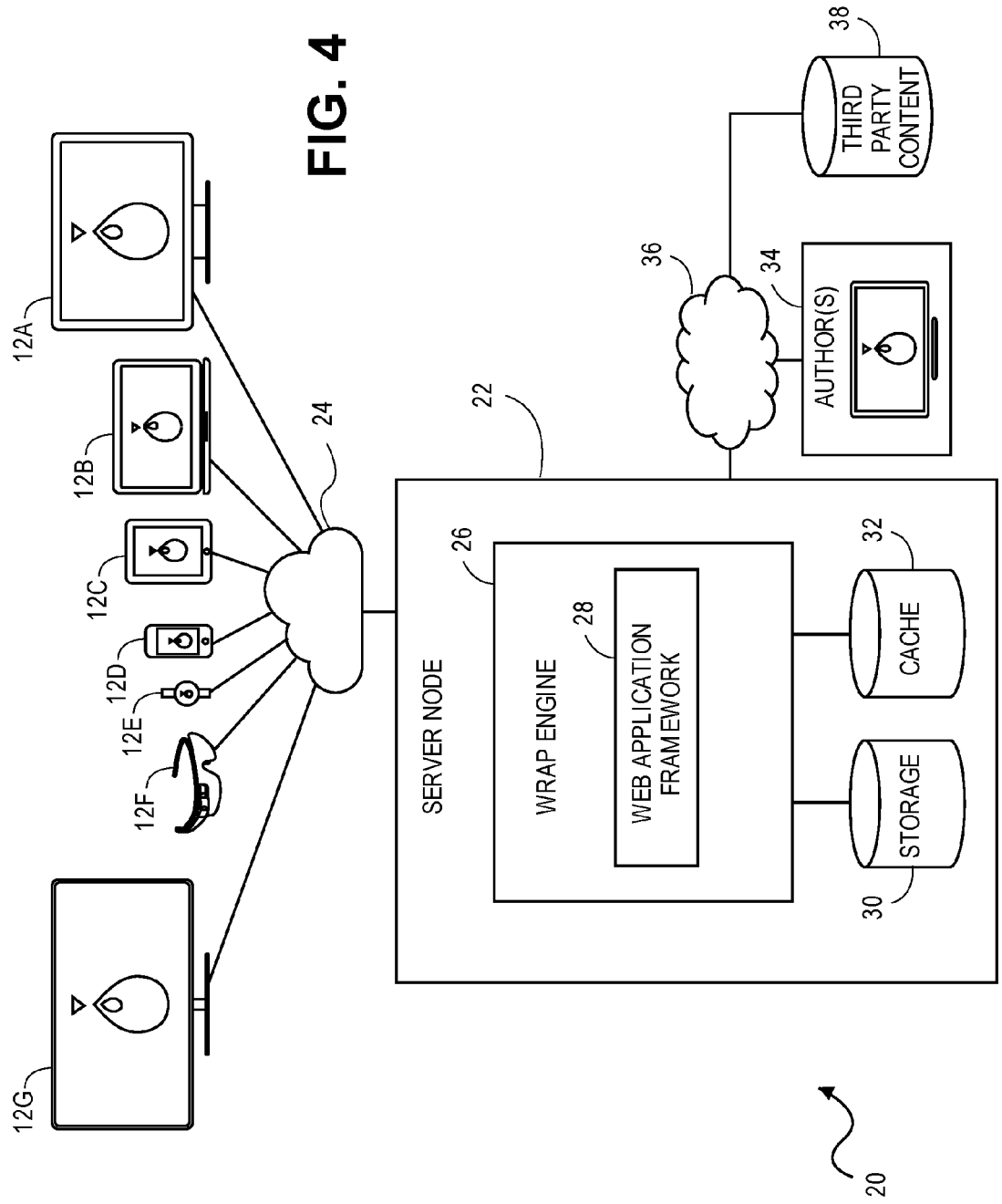
FIG. 4 is a block diagram of a representative system for authoring, storing, distributing and consuming wrap packages in accordance with the principles of the present invention.

Referring to FIG. 4, a block diagram of a non-exclusive system for authoring, storing, distributing and consuming wrap packages 10 is illustrated. The system 20 includes a server node 22, a plurality of computing devices 12, including but not limited to a desktop computer 12A, a laptop computer 12B, a tablet computer 12C, a mobile "smart" phone 12D, a wearable computing device, such as a smart watch 12E or smart glasses 12F and "smart" TVs 12G. The server node 22 and the computing devices 12A-12G communicate with one another over a network 24. In various embodiments, the network 24 may be the Internet, an intranet, a wired or wireless network, a Wi-Fi network, a cellular network, other types of communication networks, or any combination thereof.

The server node 22 includes a "wrap" engine 26, which defines a web application framework 28, a storage device 30 and cache 32, each for storing wrap packages 10 and other data. The server node 22 also may include a suite of tools, such as an authoring tool, an analytic engine tool, a media collaboration tool and a data transformation tool, for authoring wrap packages 10. Suitable authoring tools are describe, for example, in U.S. patent application Ser. Nos. 14/740,533 and 14/740,539, each filed Jun. 16, 2015, both of which are incorporated herein by reference.

The web application framework 28 is a software platform designed to support the manual and/or automated authoring of wrap packages 10. The framework 28 is designed to alleviate the overhead associated with common activities performed during the authoring of many wrap packages 10. For example, the framework 28 may include one or more libraries to help with the authoring of common tasks, and modularizes and promotes the reuse of code designed to perform specific tasks, such as implementing application functionality and/or supporting e-commerce. In various embodiments, the web application framework 28 may be implemented using, but is not limited to, Ruby, Rails, JavaScript, Angular-JS, and/or any other language or framework currently known or developed and used in the future.

In a non-exclusive embodiment, the web application framework 28 of the wrap engine 26 also performs content management as a way of organizing, categorizing, and structuring the media and other content resources such as text, images, documents, audio files, video files and modularized software code so that the content of wrap packages 10 can be stored, published, reused and edited with ease and flexibility. The content management function is also used to collect, manage, and publish content, storing it either as components or whole documents, while maintaining dynamic links between the components and/or cards 14 of a wrap package 10.

In yet another non-exclusive embodiment, the web application framework 28 of the wrap engine 26 is structured around multiple tiers, including but not limited to a client tier, an application tier and a database tier. The client tier refers to the browser enabled communication devices 12 that execute and display cards 14 of wrap packages 10, as well as web pages written in HTML or another mark-up language. The database tier, which is maintained in storage 30, contains the one or more libraries of user and/or platform provided media content, software components, modules, etc. used for the authoring of wrap packages 10. The application tier contains the software that runs on the server node 22 and that retrieves and serves the appropriate wrap package 10 from storage 30 and/or cache 32 when requested by a computing device 12.

Since wrap packages 10 are essentially data objects, they can be both cached and delivered over a Content Delivery Network Interconnection (CDN), both of which can be effectively used to deliver wrap packages 10 with minimal delay. For example, commonly requested wrap packages 10 may be cached in the cache 32, which provides faster access and delivery times than storage 30. Also other caching techniques, such as pre-caching, may be used with popular wrap packages 10, to speed up delivery times. Since the amount of storage in the cache is typically limited, cached wrap packages 10 and other data may be periodically replaced by any known replacement algorithm, such as first-in, first-out or least recently used for example.

During the composing of a wrap package 10, one or more author(s) 34 may access the server node 22 over a network 36, which may be different or the same as network 24. The author(s) 36 interact with the wrap engine 26, including the web application framework 28, and the above-mentioned suite of tools for the creation, editing, optimization and storing of wrap packages 10. In yet other embodiments, the one or more author(s) 34 can also access third party content 38 for inclusion into a wrap package 10. As previously noted, wrap packages 10 can be authored manually by one or more individuals or electronically in an automated process.

For more details on the authoring of cards 14 of wrap packages, see U.S. provisional applications 62/062,056 and 62/062,061, both entitled "Wrapped Packages of Cards for Conveying a Narrative With Media Content, Providing Application Functionality, and Engaging Users in E-commerce", both filed Oct. 9, 2014, and both incorporated by reference herein for all purposes.

Once the authoring of a wrap package 10 is complete, it is maintained in storage 30 and possibly cached in cache 32. In response to receiving an identifier, the wrap engine 26 fetches the corresponding wrap package 10 from storage 30 or the cache 32 and serves it to the requesting computing device 12 for consumption in a format customized for the viewing device.

It should be noted that the authoring and distribution diagram of FIG. 4 is merely representative and should not be construed as limiting. For example, multiple server nodes 22 for the authoring and/or distribution of wrap packages 10 may be provided at the same or different locations. In addition, multiple instantiations of a given wrap package 10 can be stored at multiple server nodes 22, typically located at different geographic locations. With this arrangement, the server node 22 that is most capable of quickly delivering a requested wrap package 10, sometimes referred to as the "publication server", is the node 22 that will deliver the wrap package to the requesting device 12.

The Wrap Package

Figure 5A:
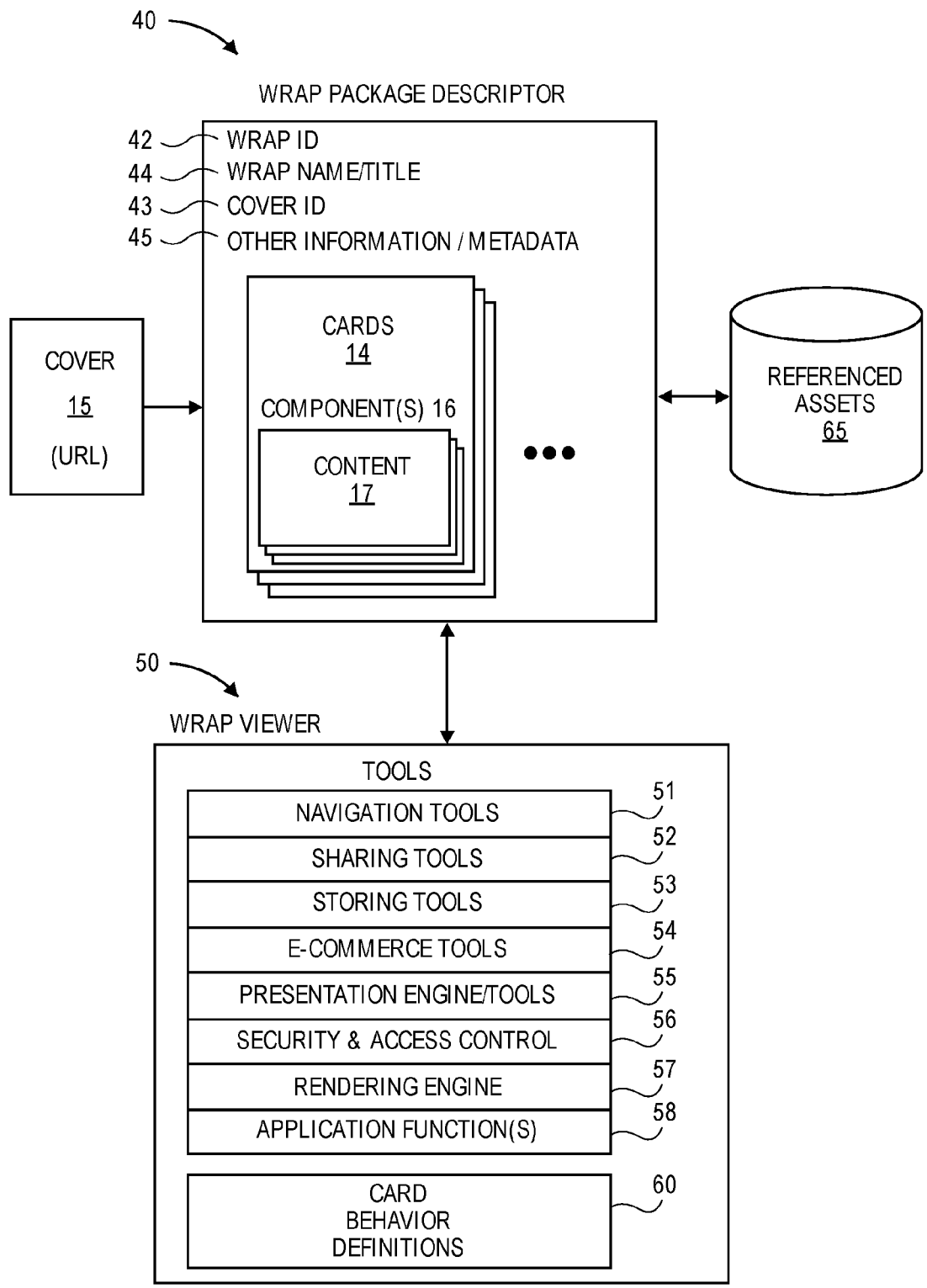
FIG. 5A diagrammatically illustrates selected components associated with defining and rendering a representative wrap package.

As diagrammatically illustrated in FIG. 5A, a wrap package 10 includes a set of one or more cards 14. Each card 14 may contain one or more components 16 that serve as containers for content objects 17. The content objects 17, together with the behaviors associated with the cards and components 16, define the content and functionality of the cards. The content objects 17 may be simple or complex. Simple content objects 17 include standard web-based content types such as text, images, video clips, etc. More complex content objects 17 may include objects having more complicated structures and/or behaviors, as will be described in more detail below.

The structure of the wrap 10, including the structure, layout and components 16 of each of its cards 14 is preferably defined by a wrap descriptor 40. The actual structure of the descriptor 40 may vary widely and a few different suitable descriptor structures are described in more detail below with respect to FIGS. 6-6F. In general, each descriptor 40 has a number of descriptive elements that together define the structure, layout, components, behaviors and content of the wrap.

Some content objects 17, such as text, may be directly included (in-line) in the component 16. Other content objects 17, such as images or video clips, may be included by reference, e.g., through simple URL references, or in-line through an encoding method such as MIME (Multi-Purpose Internet Mail Extensions). Complex content objects 17 may be specified in-line or by reference and may (a) contain other components 16 or content objects 17 and/or (b) specify abstract behaviors.

Referenced content objects 17 stored outside of the wrap descriptor 40 are sometimes referred to herein as assets 65. The referenced assets 65 may take the form of almost any type of content that can be included in the wrap package. This can include text, photos, images, 3-D objects, audio, video, and other media content or streams and/or a variety of executable objects, services and/or other functionality. Sometimes an asset may take the form of a stream and the wrap descriptor 40 is arranged to identify the source of the feed. By way of example, the stream could be a live audio or video stream, a data feed such as a stock ticker, sensor outputs, biometric information, etc.

In certain circumstances, some or all of the assets 65 associated with a wrap 10 may be stored and accessible from a dedicated wrap server. However, that is not a requirement. Rather, an asset can be retrieved from any location that would be accessible by the consuming device (e.g., through the Internet, an intranet or private network or any other reliable means), and there is no need for the various assets 65 to be located in a single asset store, although that may be desirable in many circumstances.

The wrap package 10 has an associated identifier, the wrap ID 42, that uniquely identifies the wrap 10. The wrap ID is preferably a globally unique identifier (GUID). In some embodiments, the wrap ID 42 takes the form of a URL, or any other identifier that can be converted to, or extracted from, a URL, which facilitates access to the wrap 10 over the Internet using conventional mechanisms. An example of a conversion of the wrap ID to a URL might be adding a domain as a prefix to the wrap ID to form a URL (e.g., www.wrap.com/wrap/<wrapID>).

FIG. 5A also diagrammatically illustrates selected components associated with defining and rendering a representative wrap package 10. The illustrated components may optionally include one or more covers 15, a wrap descriptor 40, a wrap runtime viewer 50 and various referenced external assets 65. As previously noted, the wrap descriptor 40 defines the structure, layout and components 16 of each of the cards 14 within the wrap package 10. The wrap descriptor 40 typically includes the wrap ID 42 and a set, deck or array of card definitions or card descriptors 46, each defining the structure of an associated card (as described with respect to FIG. 6 for example). The wrap descriptor 40 may also include other information of interest such as a wrap name/title 44 and optionally one or more cover identifier(s) 43 and/or other information or metadata 45 about the wrap package 10.

To facilitate rendering the wrap package 10 on various different devices, the wrap is preferably stored in a data format that separates the data from the presentation. At the time of this writing, JavaScript Object Notation (JSON) is a popular, light-weight, data-interchange format that can be used to describe the wrap package 10. Thus, by way of example, the definition of the wrap package 10 may be stored as a JSON data object at the server(s) 22. That is, the descriptor 40 may take the form of a JSON object. In other embodiments, a BSON (Binary JSON) data object may be used. Although the use of JSON or BSON data objects is described, it should be appreciated that in other embodiments, the wrap package 10 may be stored in a variety of other suitable formats, whether now existing or later developed.

The optional cover 15 of the wrap package 10 is typically a graphic object that contains an embedded hyperlink to the wrap (e.g., the URL used as wrap ID 42) and can be placed in any suitable type of electronic media to represent the wrap package 10. Thus, a wrap 10 may be accessed by clicking on or otherwise selecting the cover 15 or by clicking on, or otherwise selecting any other type of link containing the wrap ID 42. As such, in order to "distribute" a wrap package 10, either the cover 15 or a link can be distributed to potential viewers of the wrap package 10 using any available tool. For example, the wrap package 10 may be distributed by: (i) placing the cover 15 or a link on a webpage, in an ad or in any other location that can be accessed by a potential viewer via a browser; (ii) by posting the cover 15 or a link on a blog, a microblog, a forum, a wall etc. or any social media distribution mechanism such as Facebook, Twitter, etc.; (iii) by including the cover 15 or a link in a message such as e-mail, SMS message, a Twitter Tweet, text messages, etc.; or (iv) using any other available distribution mechanism or platform, either known now or developed in the future. Therefore, in many circumstances, it is desirable to create a cover 15 that is attractive and entices viewers to access the associated wrap package 15. In some instances, the cover 15 may take the form of an image from the wrap package 10 itself (e.g., the first card), however, that is not a requirement.

The wrap package 10 is configured to be rendered on a consuming device 12 in conjunction with a wrap runtime viewer 50, which is also sometimes referred to as the wrap run-time engine or simply the viewer. The runtime viewer 50 provides a set of tools and functionalities that are helpful for viewing and/or interacting with the wrap. In some circumstances, the viewer 50 will take the form of a dedicated, platform specific, wrap viewer application (e.g., an applet or app in the context of a mobile device), a plug-in (e.g. a browser plug-in) or other mechanism installed on the viewing device that provides the necessary functionality. In other circumstances the wrap viewer functionality may be incorporated into other types of applications. However, limiting the rendering of wraps to devices which have preinstalled wrap viewing applications/functionality would greatly reduce their portability since users are not always motivated to install such applications unless or until they see a compelling need. Therefore, as will be explained in more detail below, the delivery of a wrap packages 10 may optionally be accompanied by a run-time viewer 50 that includes a set of associated tools and functionalities suitable for use by a conventional browser to generate and/or render the runtime instance of the wrap based on the wrap descriptor 40 and to facilitate user interaction with the wrap package 10. These tools and functionality can be thought of, and are often referred to herein as a wrap toolset that is part of the wrap runtime viewer 50. By providing the wrap construction, viewing and interaction toolset in a browser executable form together with the wrap descriptor 40, the wrap package 10 can be consumed on a wide variety of different devices and operating system platforms (e.g., iOS, Android, Microsoft, etc.) without requiring the users to download and install a device and/or platform specific viewer application. This is a powerful construct for enhancing the portability and viral distribution of wrap packages among a myriad of devices and operating system platforms In the embodiment illustrated in FIG. 5A, the viewer toolset provided with the wrap viewer 50 includes navigational tools 51, sharing tools 52, storing tool 53, various e-commerce tools 54, presentation engine/tools 55, security and access control tools 56, a rendering engine 57, and application functionality tools 58. Of course, it should be appreciated that not all of these tools are required in all implementations and that in other implementations, a variety of other tools and functionalities may be provided as well. The navigational tools 51 facilitate navigation within the wrap package 10. The sharing tools 52 provide mechanisms by which a consumer of the wrap 10 may share the wrap with others, e.g., by e-mail, by SMS message, via a social media post, etc. Storing tool 53 allows a user to persistently store the wrap and/or when applicable, the wrap state, either locally or remotely. The e-commerce tools 54 may include a variety of functionalities that can help facilitate a variety of e-commerce tasks including purchasing, making reservations, etc. Application functionality tools 58 enable "app-like" functionality within the wrap package 10, such as conducting online chats, GPS functionality, etc. Presentation engine 55 controls the presentation. In some embodiments, the presentation engine 55 may be arranged to present the wrap on the consuming device at a scale and in an aspect ratio that is at least somewhat optimized for the device.

Security and access control tools 56 provide security and access control functionality, which might include encryption functionality and user authentication services. For example, in some circumstances, the publisher of a wrap may want to limit the circulation of the wrap to specific users or groups of users. A few, nonexclusive examples of such circumstances include when the wrap is created for use as: (i) an active receipt for a purchase as described in U.S. Provisional Application Nos. 62/062,056 and 62/075,172 (both incorporated by reference herein for all purposes) and (ii) a ticket for an event as described in U.S. Provisional Application No. 62/079,500; (also incorporated by referenced herein for all purposes) (iii) an item customized for a customer such as a travel itinerary; (iv) an employee manual as described in U.S. Provisional Application No. 62/114,731 (also incorporated by reference herein for all purposes); etc. Encryption services may be desirable to protect confidential information. Of course, there are a very wide variety of other circumstances where security and/or access control/permission functionality may be desired.

With certain embodiments, the viewer 50 may optionally also include a rendering engine 57 arranged to create and/or render a runtime instance of the wrap on a consuming device 12 based on the descriptor 40. In such embodiments, the rendering engine is arrange to dynamically generate the HTML (or other markup language) use by a browser or other viewing mechanism on the device 12 to render the wrap at runtime. In some implementations, the rendering engine 57 is arranged to create an object graph based on the descriptor 40 and a document object model (DOM) based on the object graph. The browser or other suitable app or application may then use the DOM to render the wrap package 10.

Figure 5B:
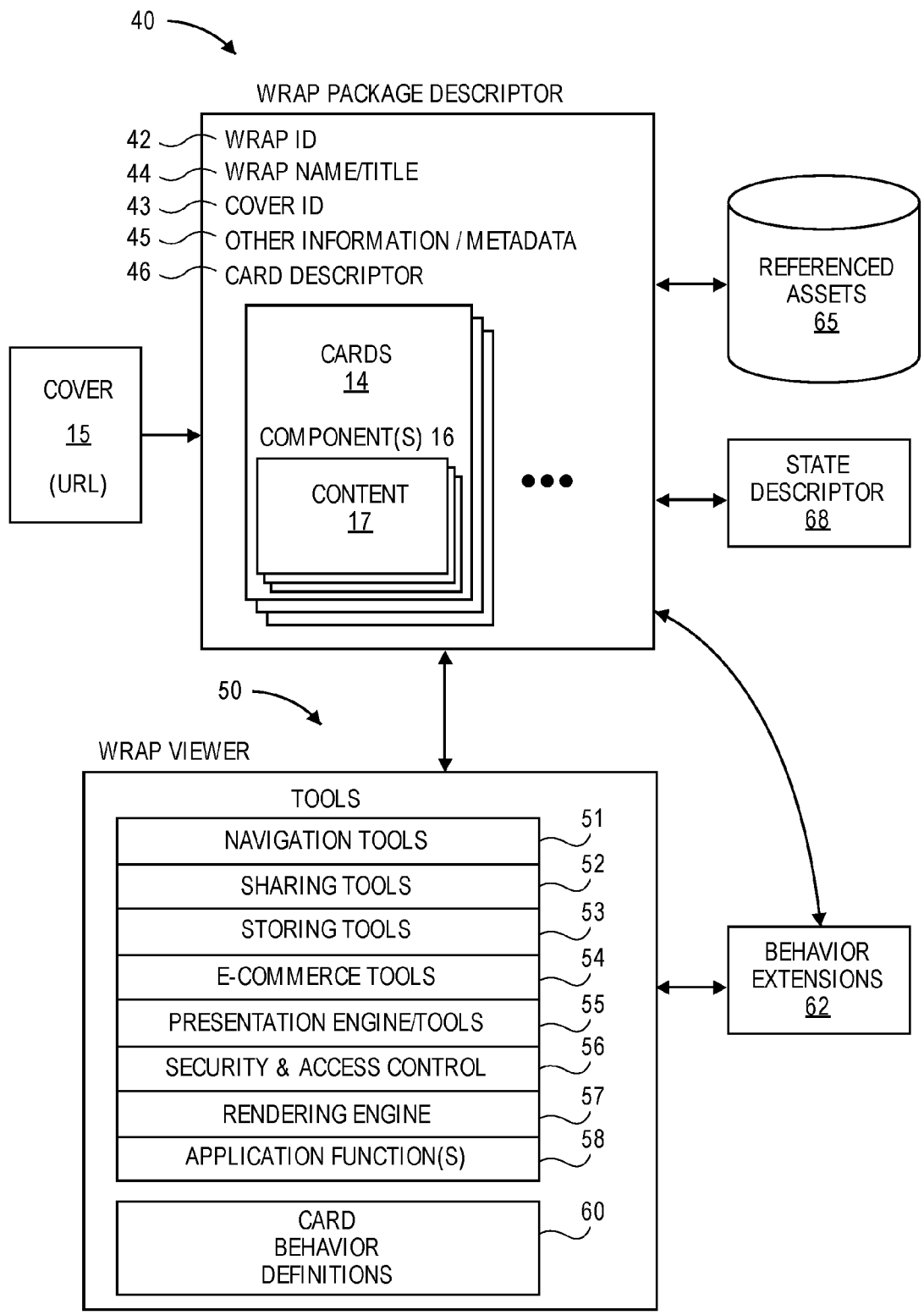
FIG. 5B diagrammatically illustrates selected components associated with defining and rendering a representative wrap package in accordance with another embodiment that utilizes state descriptors and/or behavior extensions.

With yet other embodiments, the viewer 50 may also optionally have any number of card behaviors definitions 60. As will be described in more detail below, different cards can be designed to exhibit a wide variety of different behaviors. In order to simplify the card, and card template creation processes, various desired behaviors can be defined separately from the cards themselves. The behaviors are known to or accessible by the wrap viewer 50 (e.g., desired behaviors may be defined through behavior definitions 60 or may be accessible as behavior extensions 62 as seen in FIG. 5B). Thus, the descriptor for any particular card or component may simply declare the desired behavior and the viewer 50 will know how to impart such behavior to the wrap/card/component and/or how to obtain an extension that imparts such behavior.

In FIG. 5A, the behavior definitions and the various tools are illustrated as separate items to facilitate their description. However, in practice, some of the illustrated tools are simply sets of associated behaviors, and therefore, the illustrated distinction between the behaviors and such tools is/are largely for emphasis.

As discussed above, the wrap package 10 may be rendered on a wide variety of different devices 12A through 12G. These devices may have a wide variety of different screen sizes, capabilities, and viewing mechanisms. When a particular device 12 requests a wrap package 10, a determination is effectively made as to whether a suitable wrap runtime viewer is already present on the requesting device. If not, a browser compatible runtime viewer 50 is provided in addition to the wrap or wrap descriptor 40. The browser compatible run-time viewer may be written in any format that is appropriate for execution by a browser. By way of example, JavaScript (JS) is a dynamic programming language that is currently popular and supported by most general purpose browsers and many other rendering mechanisms. Thus, JavaScript works well for the browser compatible viewer since the same wrap viewer can be used for a wide variety of different browsers. However, it should be apparent that in other embodiments, the wrap viewer 50 may be implemented using a wide variety of other now existing or future developed frameworks and/or languages. For example, the DOM rendering may be replaced with a React framework or another suitable framework currently known or developed in the future. When the wrap viewer is incorporated into a native application, it will sometimes be desirable to write the viewer (or portions of the viewer) in a format that executes more efficiently or is otherwise preferred for execution on the underlying operating system, etc.

A specific wrap is illustrated in FIGS. 7A-7M. The illustrated wrap 310 is an informational wrap about a particular product line—Hint® water. The wrap includes a deck of nine cards—i.e., cards 311-319. Card 311 is the first card. Cards 312-315 are informational cards that describe the Hint® water flavored products as illustrated in FIGS. 7B-7E respectively. Card 316 is a gallery card that shows a number of different available flavored water non-carbonated products as illustrated FIGS. 7F-7H respectively. Card 317 is a second gallery card that shows a number of different available carbonated flavored water products (Hint Fizz) as illustrated in FIGS. 7I-7K respectively. Card 318 is an e-commerce card that allows a user to order a monthly subscription of Hint products as illustrated in FIG. 7L. Card 319 is the last card and includes various tools that allow a user to share the wrap and/or comment on the wrap on various social media forums as illustrated in FIG. 7M.

The wrap 10 may be constructed in a variety of different formats. As previously described, a descriptor 40 defining the wrap may be constructed using JavaScript Object Notation—i.e., in the form of a JSON data object. By way of example, a representative JSON descriptor that defines the wrap 310 shown in FIGS. 7A-7M is provided in Appendix I of U.S. Provisional Patent Application No. 62/210,585, which is incorporated herein by reference.

Defining Card Behavior

Different cards 14 within a wrap 10 can be designed to exhibit a wide variety of different behaviors. To simplify the card authoring process, the card descriptor 46 within a wrap 10 can be arranged to declare the behavior of the card 14 without internally defining that behavior. Rather, in such circumstances, the desired card 14 behaviors are defined within the wrap viewer 50 as part of the behavior definitions 60 or through behavior extensions 62. With this arrangement, a card template designer can define the behavior for cards 14 authored using the template, or can define a set of available behaviors from which a card author can choose. If a set of behaviors are available to the card author, then the authors selects the desired behavior from the available set. In either case, the desired behavior is declared as part of the card. With this arrangement, different cards 14 within a wrap 10 can exhibit different behaviors and such behavior remains with the card even if the card is used in a different wrap. If a new card behavior is desired, the new behavior can be created and added to the behavior definitions 60. In this manner, the newly defined behavior becomes available to other template designers and/or card authors.

Figure 7D:
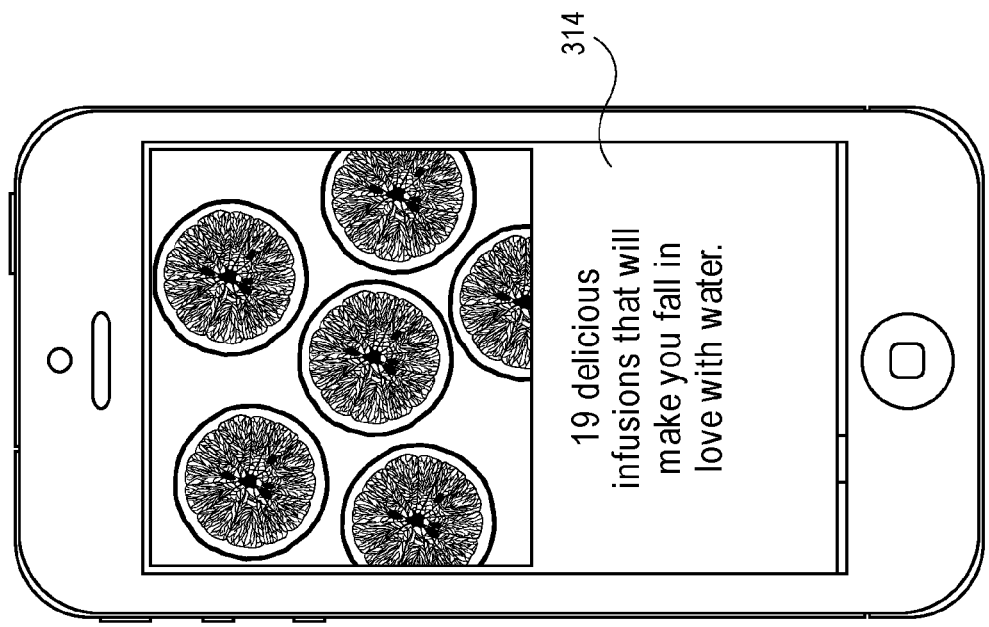
Figure 7C:
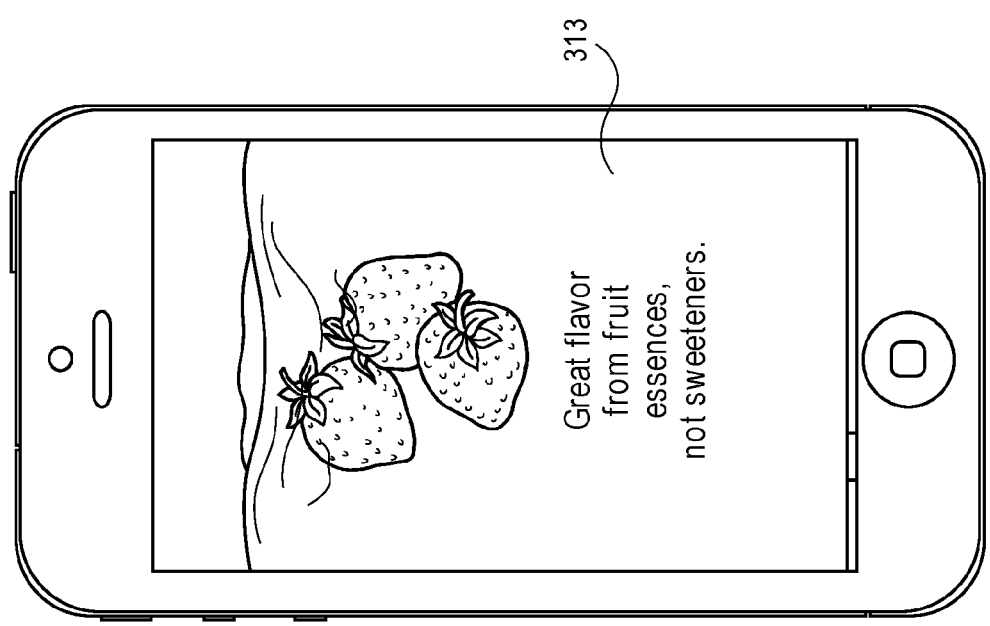
Figure 7F:
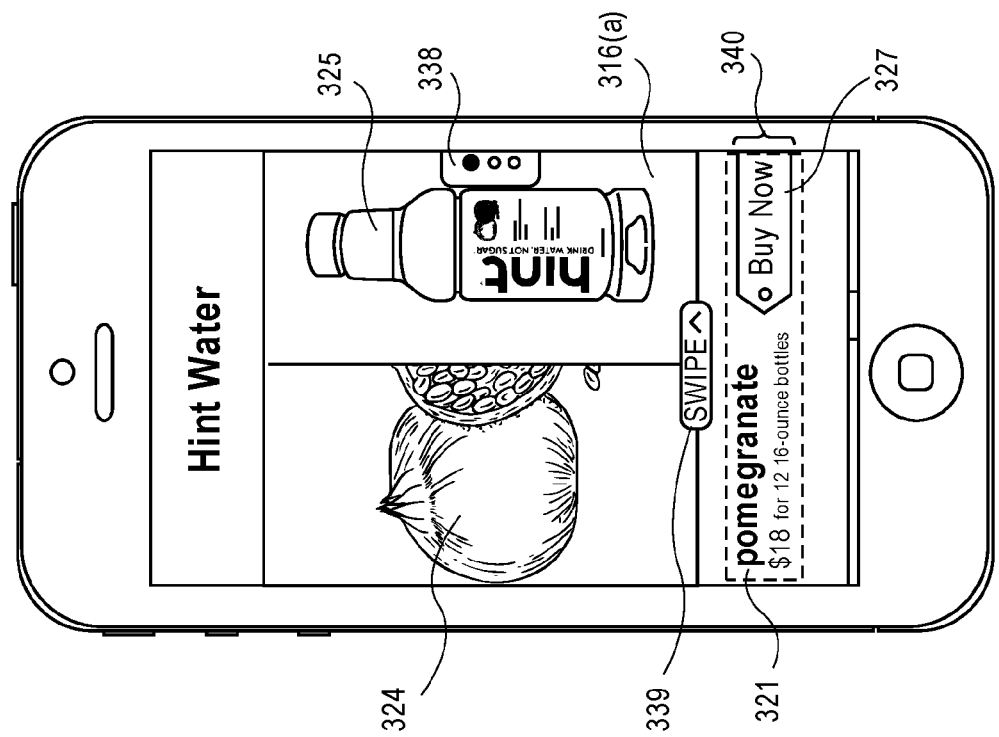
Figure 7E:
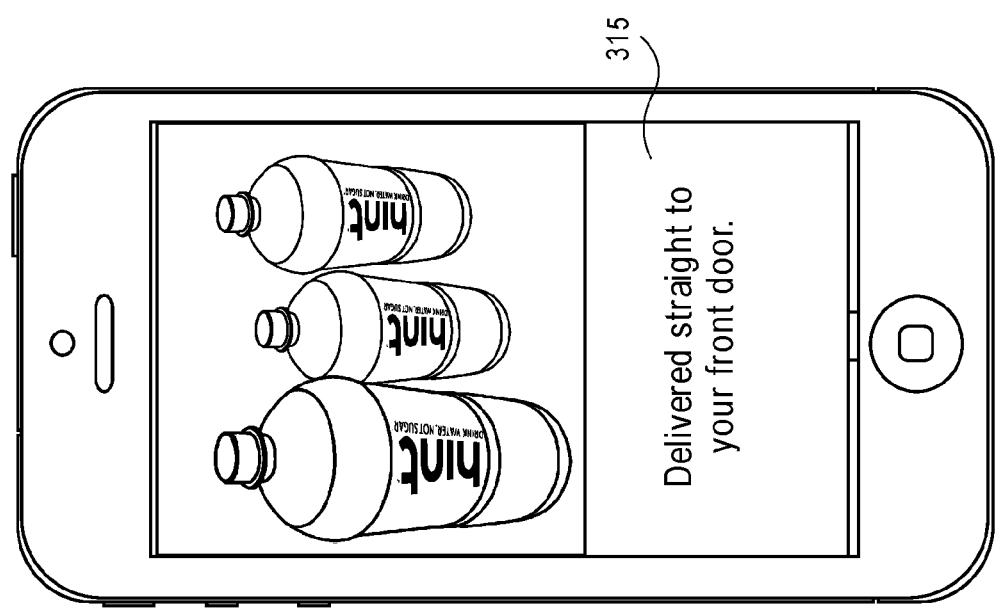
Figure 7H:
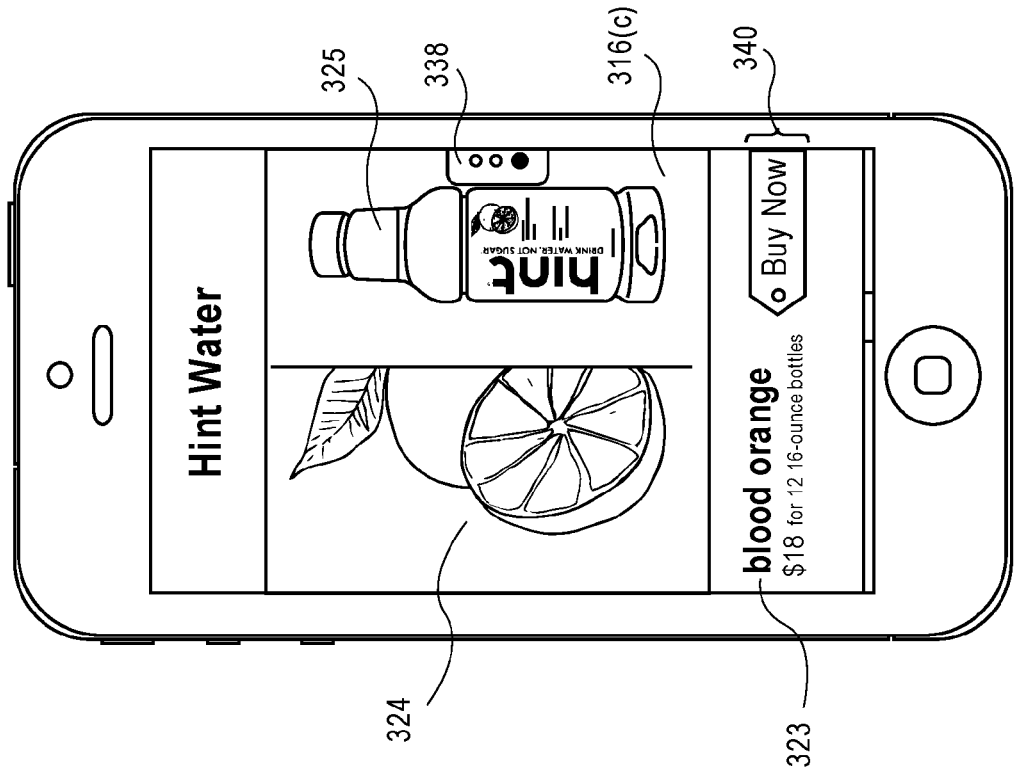
Figure 7G:
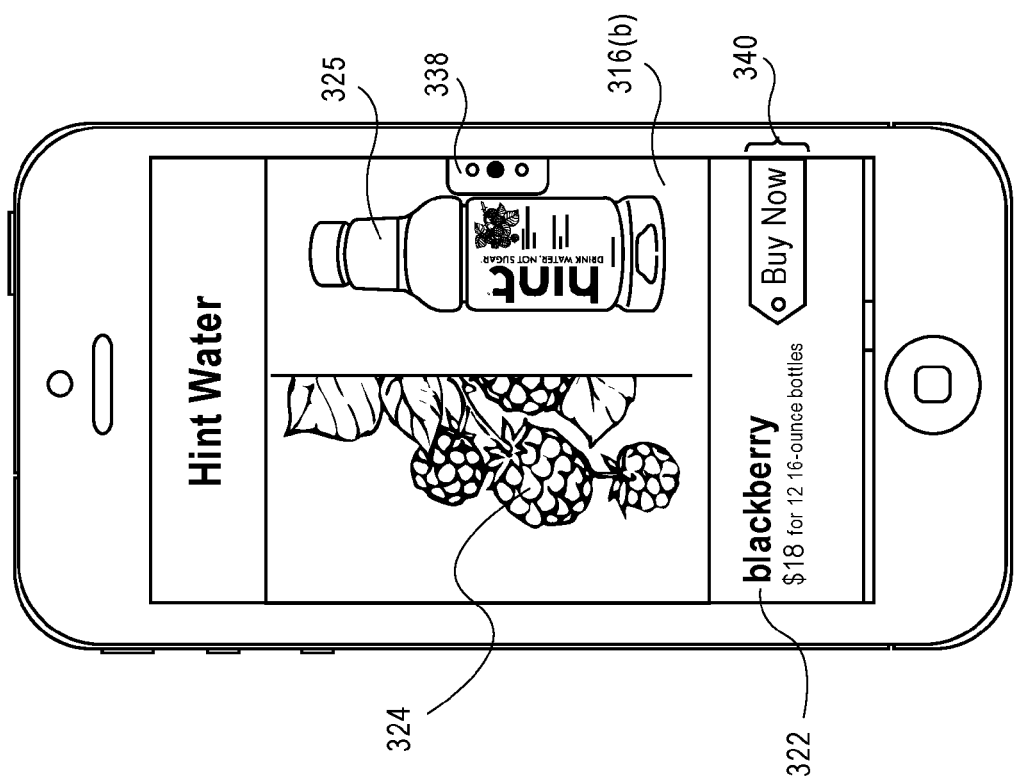
Figure 7J:
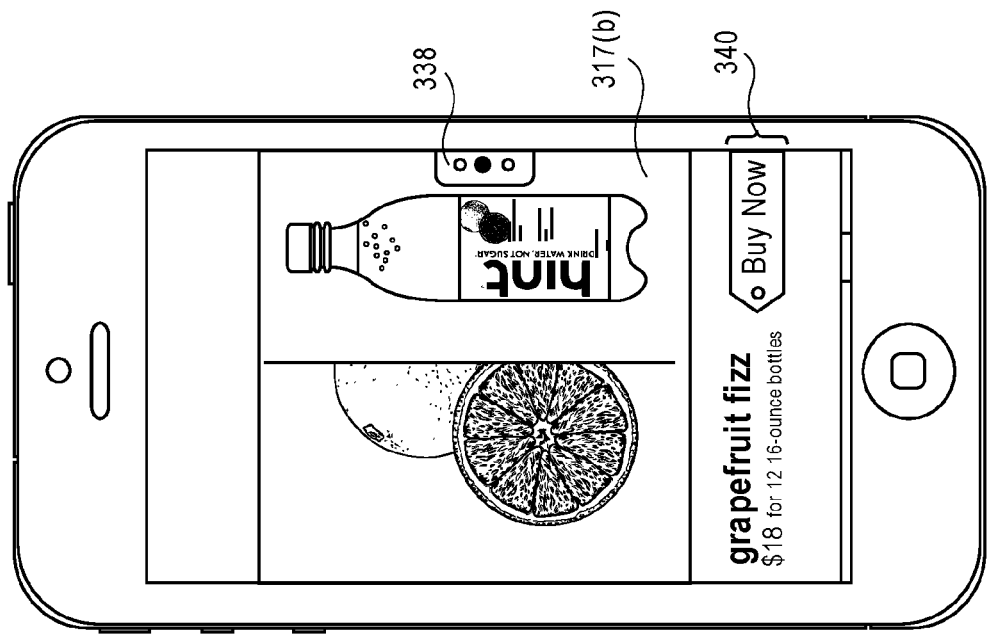
Figure 7I:
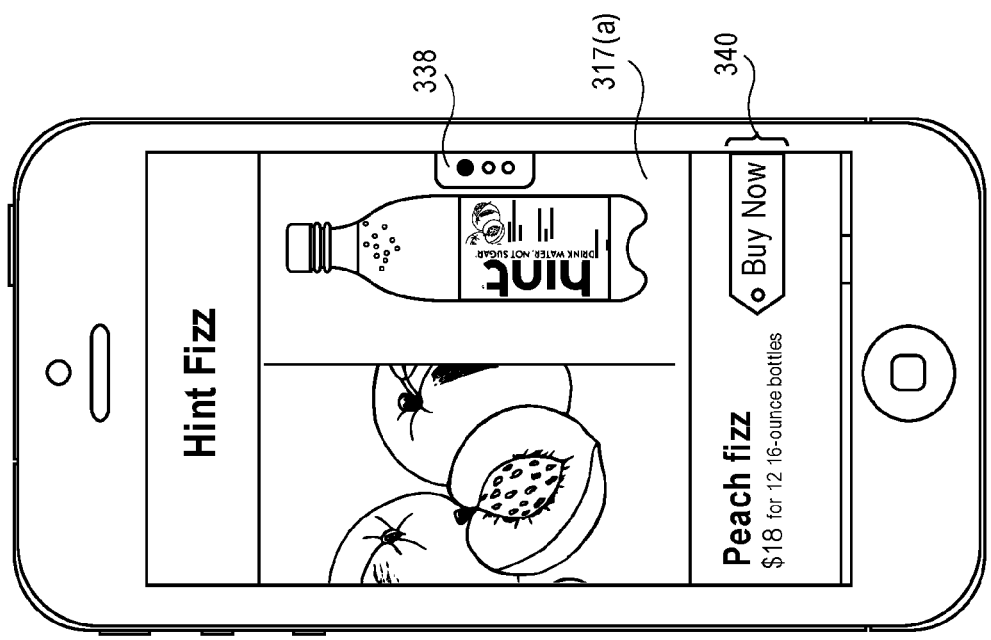
Figure 7K:
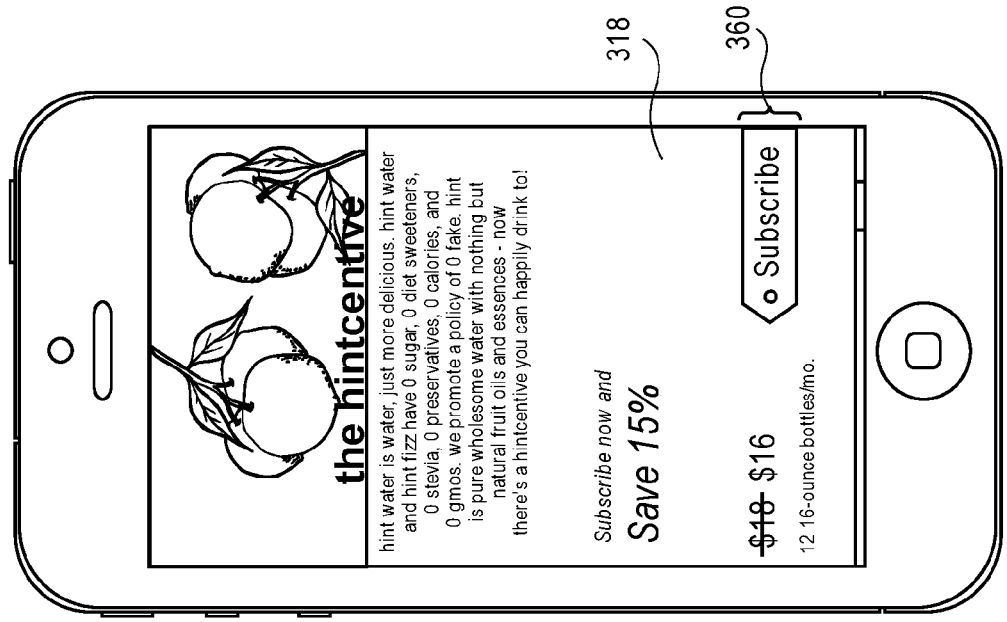
Figure 7L:
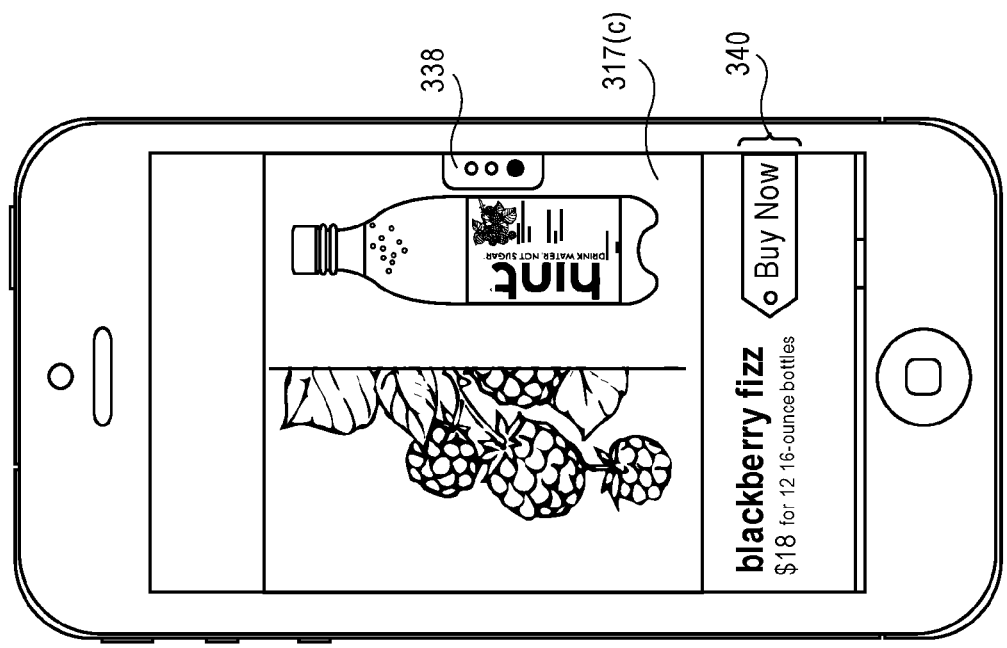
Figure 7M:
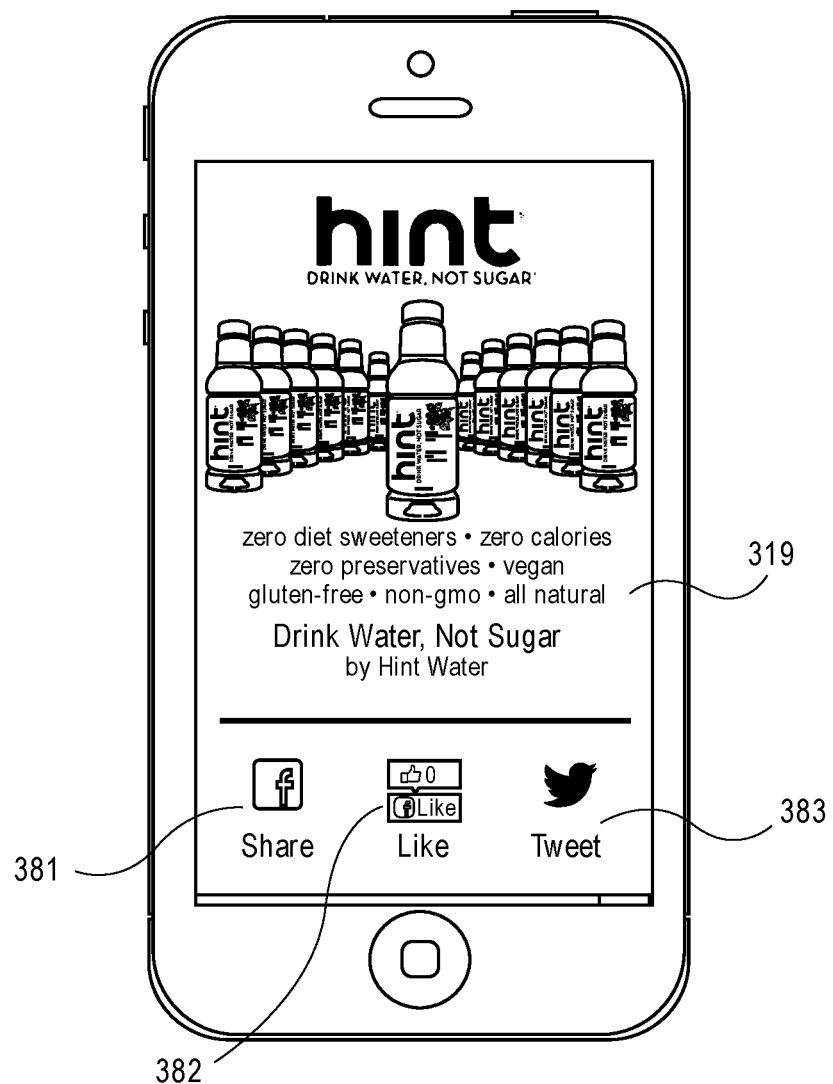

To illustrate the concept of defining card behaviors, consider the gallery cards 316, 317 illustrated in FIGS. 7F-7K. Generally a gallery card is arranged to display a number of items. The items are presented in a vertically extending sequence that extends beyond the display screen of the expected viewing device. Thus, to view the items in the gallery, a user would vertically scroll through the array of items. Typically (although not necessarily), the items in the gallery all have substantially the same structure. By way of example, in the embodiment illustrated in FIG. 7, card 316 is a gallery card as illustrated in FIGS. 7F to 7H—which are screen shots of a set of gallery item panes, with each gallery item describing a different flavor of Hint® water—specifically, pomegranate 321, blackberry 322 and blood orange 323 respectively. As can be seen, each item has a similar layout with an image 324 on the left being an image of the fruit that flavors the water, and image 325 on the right being an image of the relevant water bottle and a trigger 340 which identifies the product, indicates it cost, has a "Buy Now" graphic 327 and provides a mechanism that can be used to purchase the displayed item as will be discussed in more detail below.

It can be imagined that the designer of a gallery card may wish the card to be scrolled in a variety of different ways. By way of example, one approach may be to conceptually divide the gallery card 316 into a number of frames or "pages" 316(*a*), 316(*b*), 316(*c*) that have the visual appearance of being separate cards as seen in FIGS. 7F-7H. In such an arrangement, it may be desirable to have the displayed image snap to the next adjacent page when a scroll command (e.g., a vertical swipe gesture) is received. In another example, the items in the gallery may be relatively smaller such that the displayed item does not take up the entire card display area. In such a circumstance it may be desirable to have the displayed image snap to the next adjacent item when a scroll command is received. In still other circumstances, the card designer may prefer to provide free (continuous) scrolling. Of course, other types of scrolling behavior could be provided a well. In a non-exclusive embodiment, a key 338 may be included for providing a visual indicator of the relative up/down position that is being displayed relative to the overall number of views of the gallery card.

As illustrated in FIG. 7F, the runtime viewer may optionally be arranged to display a graphical hint element 339 (e.g. the "swipe" graphic) on the first pane of a gallery card to help convey to the user that the card may be navigated vertically to view additional gallery items. Of course, the visual appearance, text (if any), size and/or display location of the hint element 339 may be widely varied. Additionally, the rules regarding when such hints are used may be widely varied. For example, in some implementations the hint can be provided on the first frame of a gallery card only the first time that the gallery card is displayed. In another example, the hint can be displayed each time the gallery card is displayed.

The card descriptor 46 for the gallery card includes a behavior declaration that identifies the desired behavior for the card which can then be bound to the card at run-time by the wrap viewer (e.g., browser based viewer, native viewer, etc.). For example, this could take the form of a statement such as:

"Behaviors": ["vertical-snap-to-card"]

Further examples are shown in Appendix I of incorporated U.S. Provisional Patent Application No. 62/210,585.

The developer of the wrap viewer 50 can define any number of card behaviors that are supported by the viewer, such as but not limited to the different scrolling techniques in the example above. Third parties can provide extensions that define still other behaviors (e.g., a scrolling behavior in which a two finger swipe reacts differently than a one finger swipe, etc.). The developer of a card template can define which of the available behaviors are available for use with the template (e.g., a subset, or all of the defined scrolling behaviors). Wrap and card authors using the template can then select which of the behaviors available to the template they would like to associate with the card, and the chosen behavior is declared as part of the card descriptor 46.

Although the specific example of scrolling behavior in a gallery card has been given, it should be appreciated that virtually any desired type of card behavior can be defined and declared in a similar manner. It should be appreciated that differences in card behavior may take a wide variety of different forms. For example, different types of cards may have different accompanying behaviors; the behavior of a particular type of card may be different based on its position within the wrap 10; and/or the animations associated with transitions may vary with respect to card position.

Returning to the wrap 310 of FIGS. 7A-7M, several different card behavior(s) can be implemented. For instance, the first card in a sequence (e.g., card 311) may be arranged to facilitate a transition to the second card (e.g., card 312) by swiping to the left—but a swipe to the right may have no effect. The transition may be animated, as for example, by an animation that resembles flipping the first card in a manner that resembles turning the page of a physical book. The final card in the deck (e.g., card 319) may be arranged to facilitate a transition back to the second to the last card (e.g. card 318) by swiping to the right, whereas a swipe to the left may cause an animation that starts looking like a page turn but snaps back to indicate that the end of the wrap has been reached. Intermediate cards may be arranged to facilitate transitioning to the next page in response to a left swipe and transitioning to the right in response to the preceding page in response to a right swipe.

As previously suggested, the gallery cards 316, 317 may also be responsive to vertical swipes to facilitate scrolling through the gallery, whereas various other cards which do not have associated galleries may not be responsive to vertical swipes. In some embodiments, a left swipe from any of the gallery card items or "pages" (e.g., 316(*a*), 316(*b*), 316(*c*)) transitions to the same next card 317. However, in other embodiments, the gallery card behavior can be set such that the next page that the sequence transitions to varies based on the currently displayed gallery item or page. Of course, a wide variety of other card behaviors can be defined and implemented using the same behavior definition approach.

The actual structure of the descriptor used to define a gallery card may vary significantly. By way of a representative card descriptor structure suitable for implementing a gallery card is described in more detail below and is illustrated in FIG. 6C.

Triggers

A card can have one or more triggers embedded therein. Triggers are hooks associated with displayed items that can cause an action or behavior in response to an event (e.g. a user input). That is, a predetermined user action or other event (such as the selection of the displayed item) triggers a defined action. In general, a trigger is a component 16 of a card. The trigger has associated behaviors and one or more associated handlers. When a triggering event is detected, the associated handler causes execution of the desired behavior.

Virtually any type of computer detectable event can be used to activate a trigger. In many circumstances, the triggering event may be a user input such as the selection of a displayed trigger component (e.g., by tapping or performing another appropriate gesture relative to a displayed item configured as a trigger component). However, in other circumstance, the activating event may be system generated. System generated events can include sensor input based events, time or timer based events, the receipt of a particular message, the determination that a particular navigational sequence has occurred within a wrap, geo-location or proximity based events (e.g., the viewing device is located within a particular store or geographic area, or near to other users viewing the same wrap) or any of a wide variety of other computer detectable events.

Once activated, a trigger may exhibit any desired behavior which can be associated with the trigger through appropriate behavior declarations 95. Virtually any type of computer implementable behavior can be associated with a trigger. By way of example, a linking trigger may be used to link the user to another card within the current wrap, to send the user to another wrap, webpage or other destination. The linking trigger may also be arranged to define a desired linking behavior (e.g., open in same tab, open in new tab, etc.). Other triggers may initiate a wide variety of other action.

The ability to generally define triggering events and the resulting behaviors is an extremely versatile construct that provides wraps with tremendous flexibility and power. Thus, triggers can be used to enable a wide variety of actions, including invoking of a number of different application-like functionalities or e-commerce related services. For example, a trigger may be used to initiate an action (e.g., order a product, conduct an online chat, sharing the wrap with others, book or reserve a table at a restaurant, a hotel room, a rental car, etc.). Almost any type of wrap component/asset can be associated with a trigger, which gives authors tremendous flexibility in guiding the user experience.

The wrap 310 illustrated in FIG. 7 has a number of triggers. These include purchasing trigger 340 (FIGS. 7F-7K), subscription trigger 360 (FIG. 7L) and social media triggers 381, 382, 383 (FIG. 7M). The purchasing trigger 340 is arranged to facilitate a user purchase of the displayed product. As an illustrative example, the trigger 340 of FIG. 7F, is associated with a generally rectangular region that bounds the text and graphic located at the bottom of the card, including the text "pomegranate $18 for 12 16-ounce bottles" and the adjacent "Buy Now" button. The region that involves the trigger is generally shown by a dashed box in FIG. 7F. Selection of the trigger 340 links the user to a mechanism that facilitates the purchase of the identified item. The other above-identified triggers in the wrap 310 are characterized by and operate in a manner similar to the Buy Now trigger 340 of FIG. 7F.

The implementation of a purchase mechanism within a wrap package 10 may be widely varied. For example, in some implementations, the user may be linked to the vendor's website, where the purchase may be made in a conventional manner through the website. If this approach is taken, it is often desirable to access the target website through a "Cul-de-sac" so that the user is returned to the wrap when finished with any transactions they wish to make (a Cul-de-sac has the property of returning to the initiating wrap card/page when the user closes the target website). In another approach, the selection of the trigger causes the wrap to transition to a purchasing card (or sequence of cards) within the same wrap where the desired transaction can occur. One such approach is described below with respect to FIGS. 8A-8C. Alternatively, the transition could be to a separate purchasing wrap. Regardless of the mechanism, it is often desirable (although not necessary) to use a cul-de-sac approach so that the user is returned to the card from which the transaction was initiated after the transaction is completed. In still other implementations, the transaction can be completed without leaving the current card—particularly when the user is using a secure viewer that knows the user's identity and relevant purchase related information. In such an embodiment, the transaction can be completed using a "one-click" purchasing option, where previously stored customer billing, shipping and other account information is used to process the purchase.

In a non-exclusive embodiment, the specific behavior associated with the link may be declared in the same manner described above. For example, consider a situation where the trigger activates a link to an external website. There are several ways that such a link could be implemented. One approach might be to link to the target web page in the currently active browser tab, which has the effect of navigating away from the wrap. A second approach might be to open a new browser tab and open the target webpage in that new browser tab. A third approach might be to initiate a Cul-de-sac in the current browser tab and open the target webpage in the Cul-de-sac (a Cul-de-sac has the property of returning to the initiating wrap card/page when the user closes the target website). In such an arrangement, the card template developer can make these three link behaviors available to the trigger and the card author can select the desired behavior. The card developer can also define a default link behavior selection in the event that the card author does not affirmatively make a selection. As can be seen in Appendix I of incorporated U.S. Provisional Patent Application No. 62/210,585, trigger 340 in card 316 has these three possible linking behaviors in response to activation of a trigger.

The ability to direct a user to a target website to complete a transaction can be helpful in many scenarios. However, a drawback is that it can be more difficult to track or guide user behavior after the user has navigated away from the wrap. Therefore, it is often preferable to design the wrap in a manner that facilitates handling user side interactions involved with a transaction from within the wrap itself.

The actual structure of the descriptor used to define a trigger may vary significantly. By way of example, a representative trigger component descriptor structure is described in more detail below and is illustrated in FIG. 6D.

Wrap Descriptors

Figure 6:
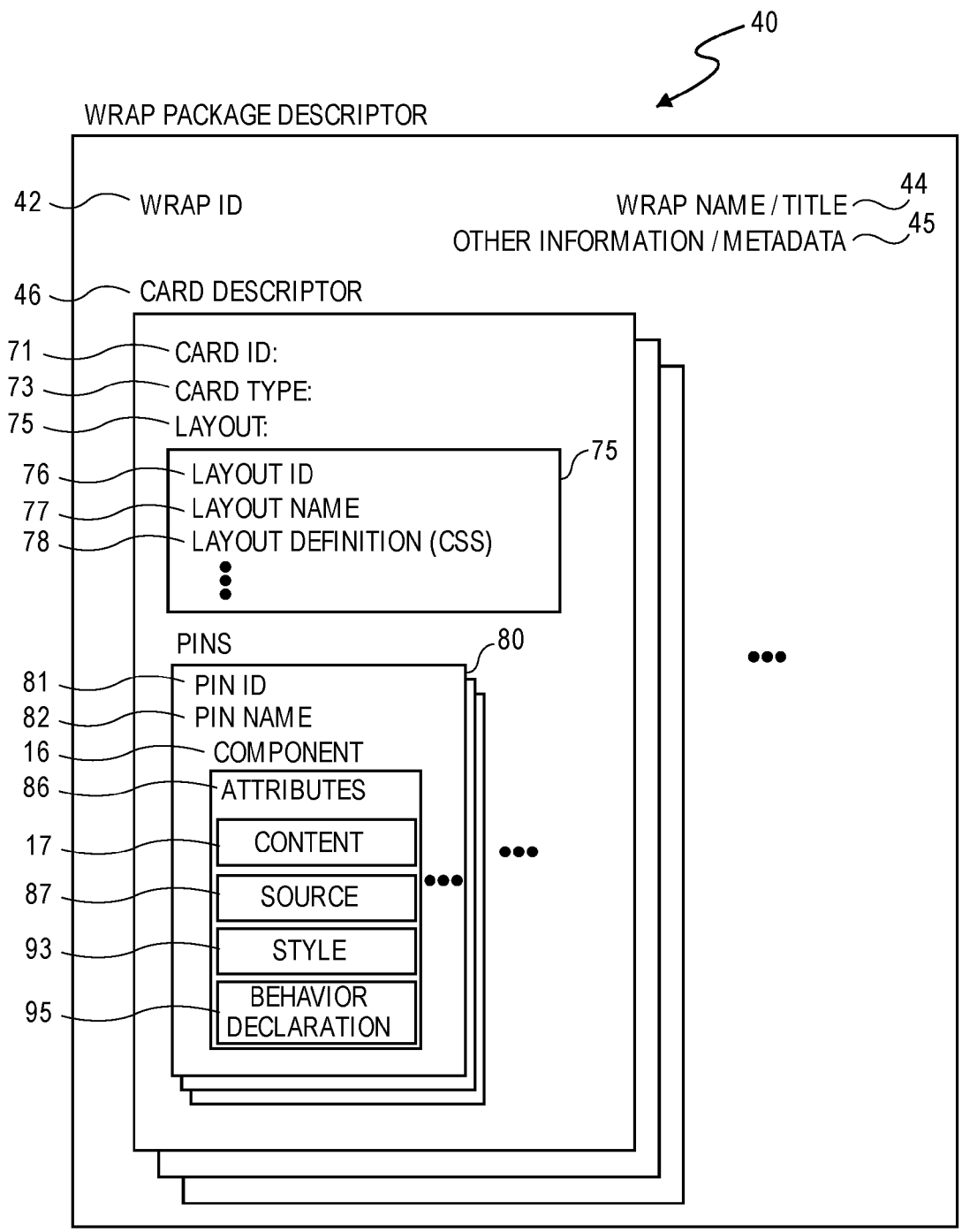
FIG. 6 is a diagram illustrating the hierarchy of a wrap descriptor.
Figure 6A:
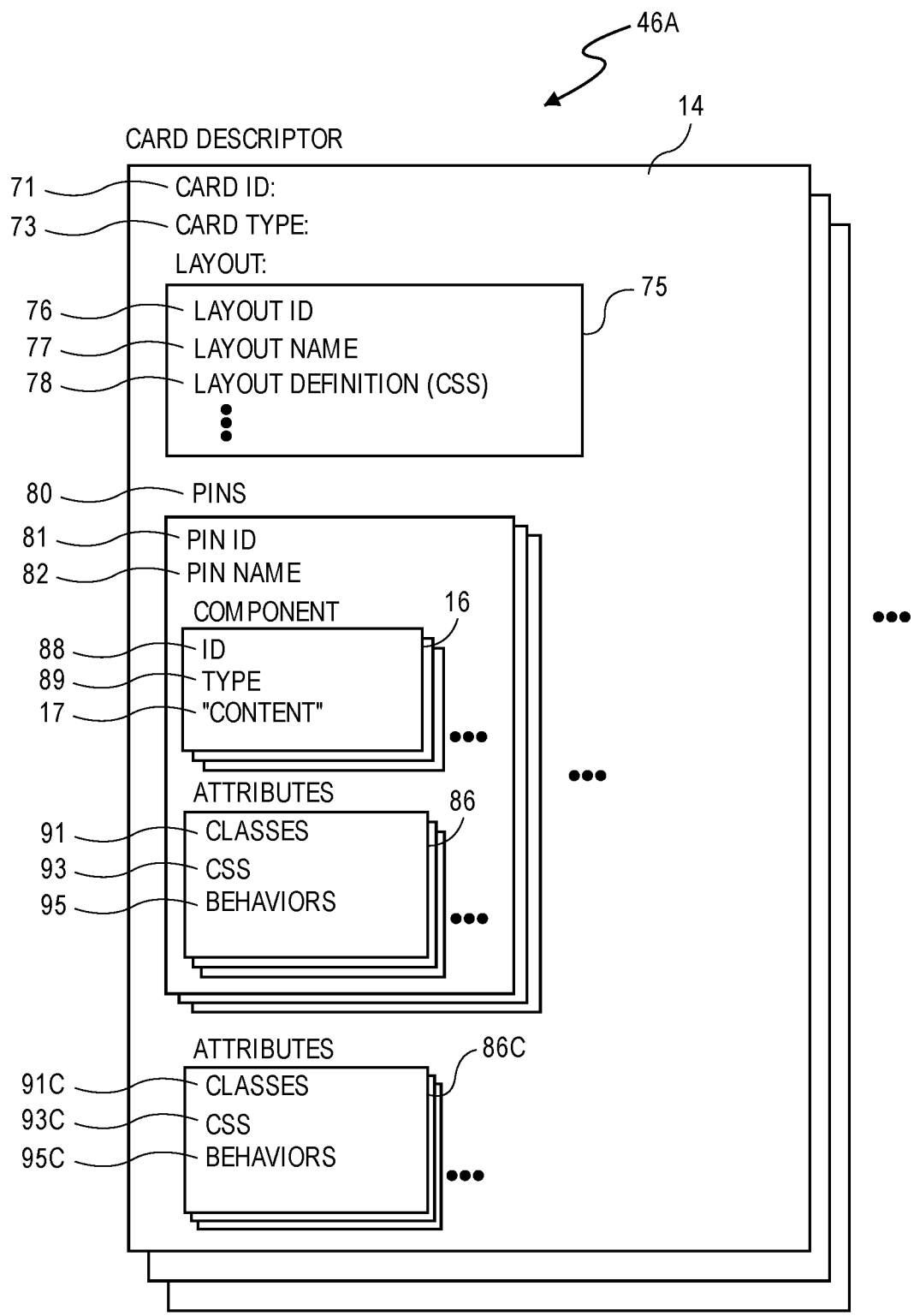
FIG. 6A is a diagram illustrating the hierarchy of a particular card descriptor.
Figure 6B:
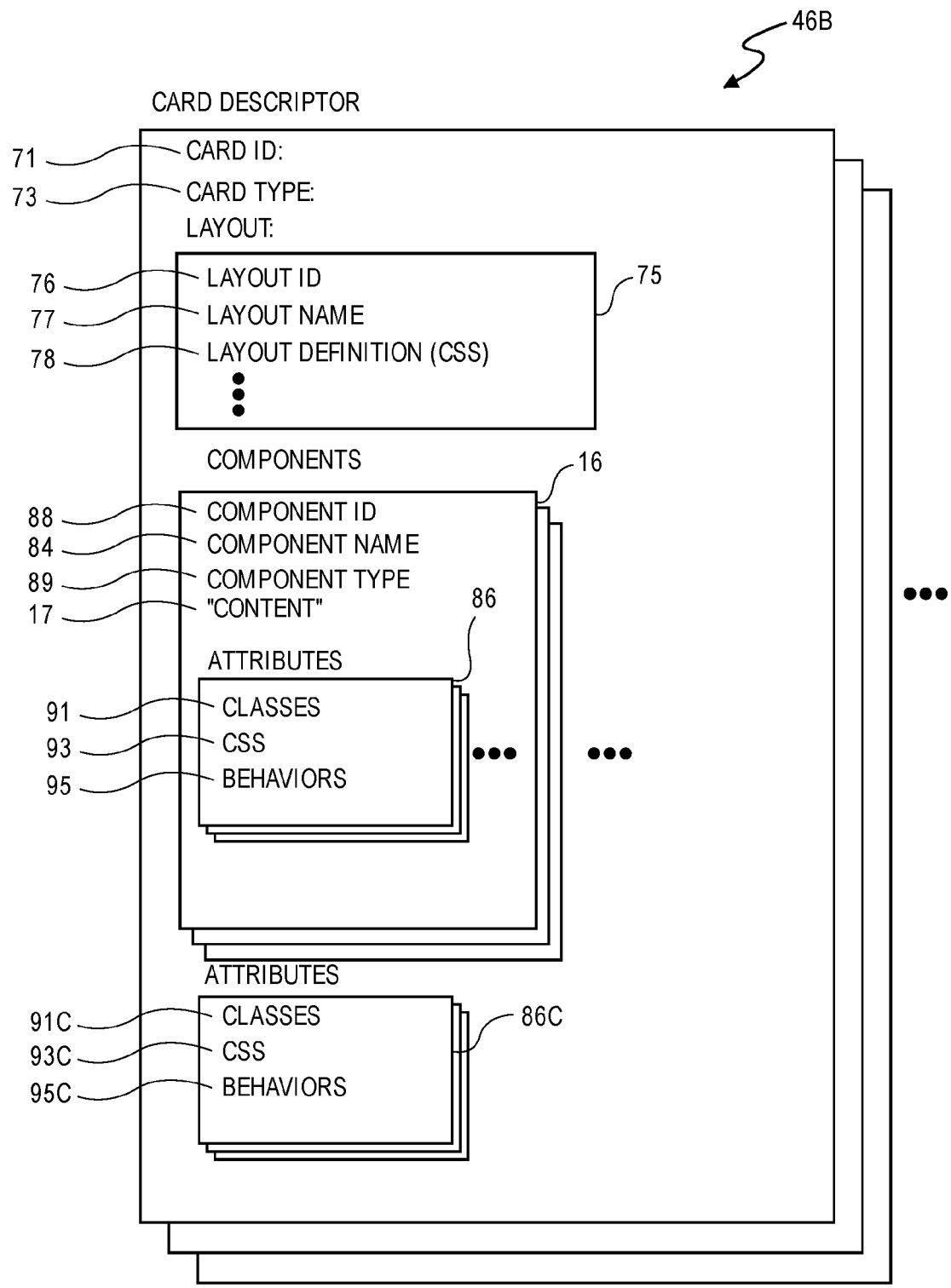
FIG. 6B is a diagram illustrating the hierarchy of a second card descriptor embodiment.
Figure 6C:
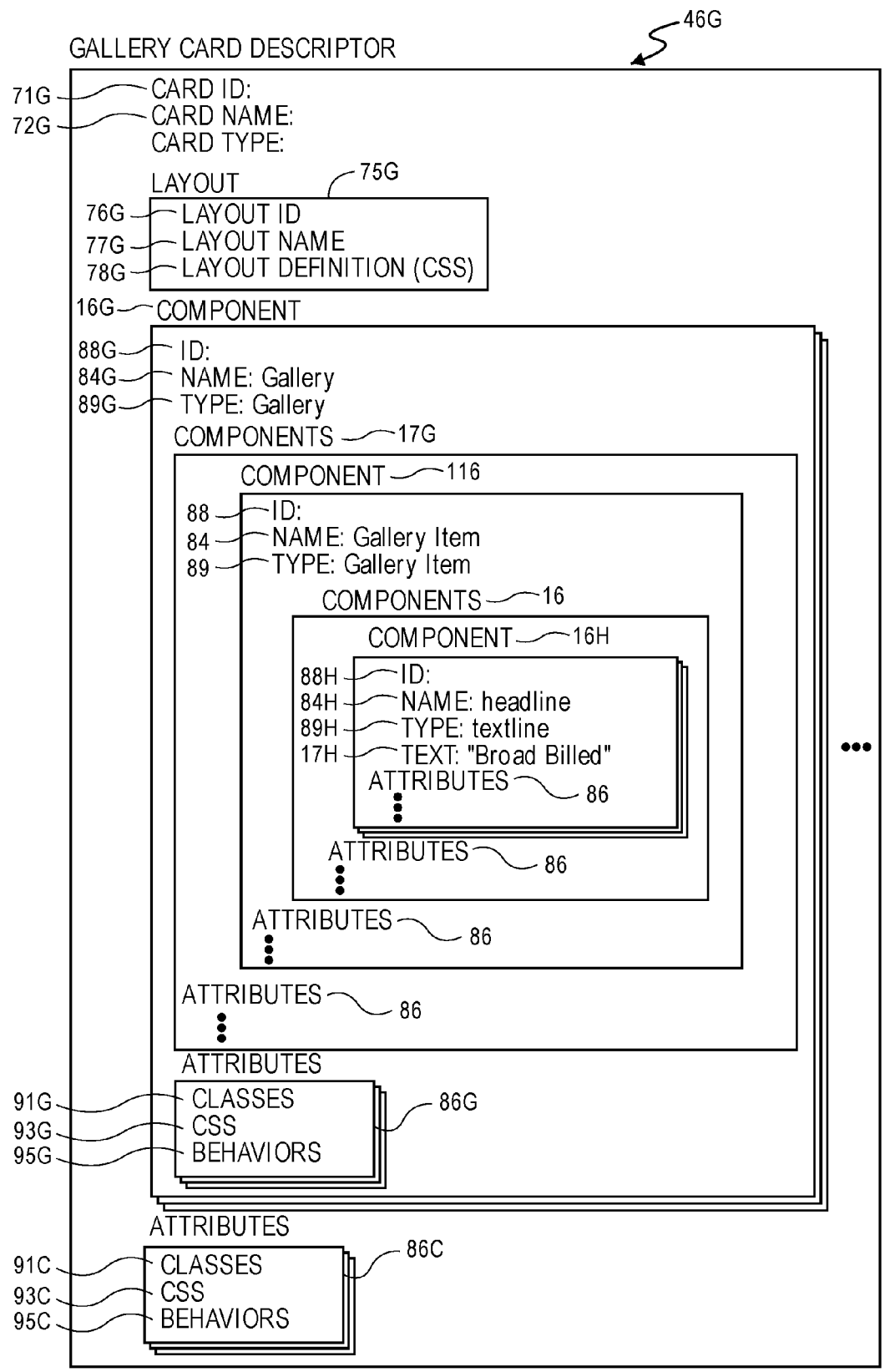
FIG. 6C is a diagram illustrating the hierarchy of an embodiment of a gallery card descriptor.
Figure 6D:
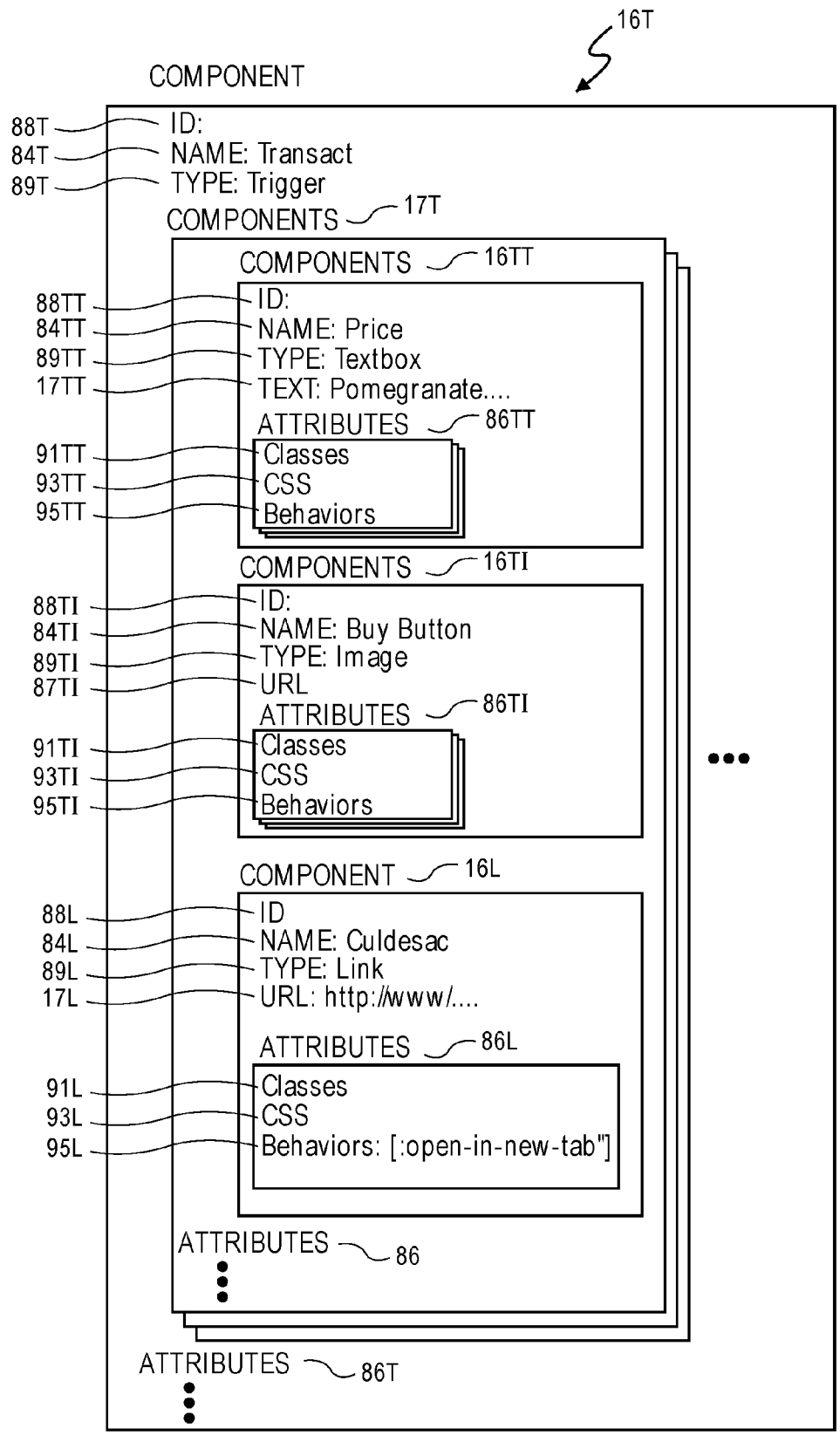
FIG. 6D is a diagram illustrating the hierarchy of an embodiment of a trigger component descriptor.
Figure 6E:
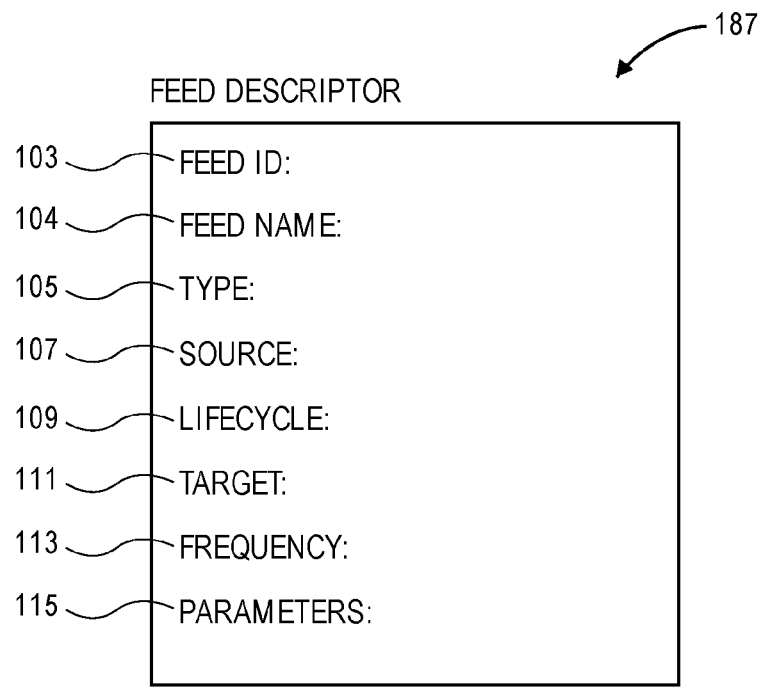
FIG. 6E is a diagram illustrating the hierarchy of an embodiment of a feed descriptor.
Figure 6F:
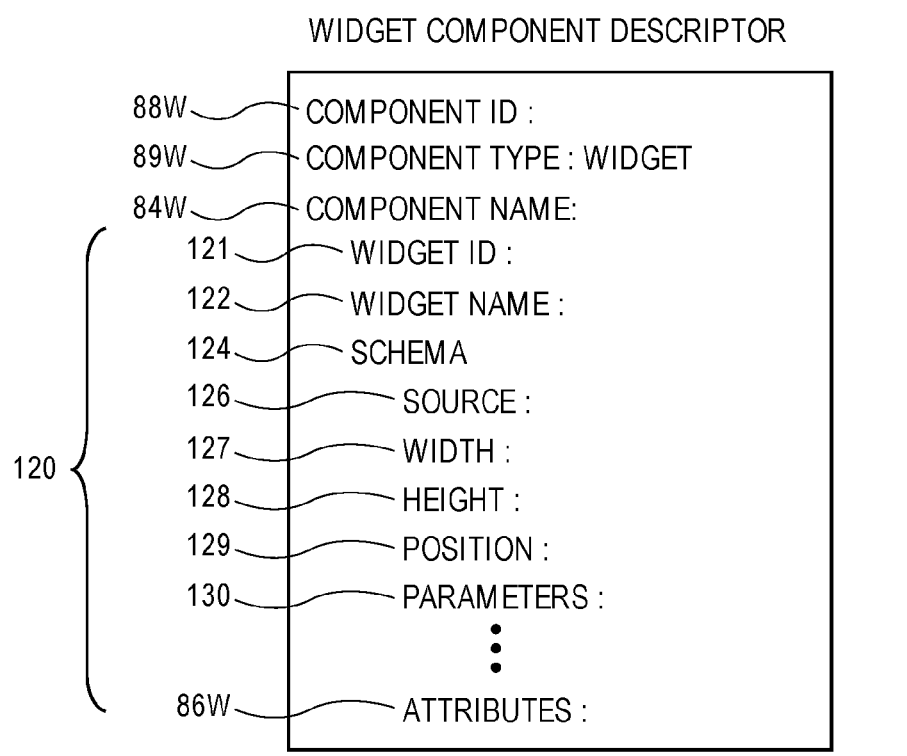
FIG. 6F is a diagram illustrating an embodiment of a widget descriptor.

Referring next to FIGS. 6-6F, a variety of specific descriptor structures suitable for use in defining various wraps, cards and/or components will be described. Although specific descriptor structures are illustrated, it should be appreciated that the structure of the various descriptors can be widely varied. In general, the descriptors are arranged to define the structure, layout, content and behaviors of the wrap without details of its presentation on a particular device. That is, the descriptors capture the functional and behavioral intent of the author, in a platform independent way, such that the runtime may implement the described structures and behaviors in a way optimal for the platform in question.

A wrap generally will include multiple cards and the corresponding wrap descriptor will typically have discrete descriptors for each of the cards. The card descriptors each include a unique card identifier and define the structure, behavior, layout and content of the corresponding card. Behaviors associated with any particular card can be applied at the card level (i.e., associated with the card as a whole), at a component level (i.e., associated to a particular component alone—which may or may not include subcomponents) or at any subcomponent level. Since the card descriptors are discrete, self-contained, units with a unique identifier, it is very easy to mix wraps (i.e., use cards created for one wrap in a second wrap). When cards are mixed, their components and associated behaviors remain the same—although it is possible to define behaviors that are context or state aware and therefore exhibit different states/properties/responses/etc. in different circumstances.

The components are encapsulated units that may have defined content (although such content may be dynamic) and, when desired, specific defined behaviors, styles and/or other attributes. In some preferred embodiments, each component has a unique identifier and may optionally also have an associated type and/or name. The use of encapsulated components with unique component identifiers makes the components highly modular such that an authoring tool can readily use and reuse the same components in different cards and/or wraps. Behaviors can be associated with the component and any component can be composed of one or more subcomponents which themselves are fully defined components.

Regardless of the level to which they are applied (i.e., wrap level, card level, component level, subcomponent level, etc.), the behaviors are preferably declared in the descriptor rather than being explicitly defined within the descriptor. In that way, the behavior declaration acts as a hook which can be used to associate virtually any programmable logic with a card/component/etc. The behaviors are preferably defined (or at least obtainable) by the runtime viewer.

FIG. 6, diagrammatically illustrates the structure of a first representative wrap descriptor 40. In the illustrated embodiment, the wrap descriptor 40 includes the wrap ID 42, the wrap title 44, and a card descriptor 46 for each of the cards 14. Each card descriptor 46 describes of the structure, layout and content of the associated card. The wrap descriptor 40 may also optionally include cover identifier(s) 43 and/or any other desired information or metadata 45 relevant to the wrap. The cover identifier(s) 43 identify any cover(s) 15 associated with the wrap. Other information and metadata 45 may include any other information that is deemed relevant to the wrap, as for example, an indication of the creation date and/or version number of the wrap, attributions to the author(s) or publisher(s) of the wrap, etc.

The card descriptors 46 may be arranged in an array, deck, or in any other suitable format. In the diagrammatically illustrated embodiment, each card descriptor 46 includes: a unique card identifier (card ID 71); a card layout 75; and optionally, an associated card type 73. The card layout 75 preferably includes at least one of a layout identifier (layout ID 76) and a layout definition 78 and optionally, a layout name 77. When the layout definition is not explicitly provided in the card descriptor 46, it may be obtained by reference through the layout ID 76. The layout definition 78 may be provided in a variety of different format. By way of example, Cascading Style Sheets (CSS) works well. As will be appreciated by those familiar with the art, CSS is a style sheet language used for describing the look and formatting of a document. Of course, in alternative embodiments, other style sheets and/or other now existing or future developed constructs may be used to define the layout of the cards.

The card ID 71 is preferably a unique identifier that uniquely identifies the associated card 14. An advantage of using unique identifiers as card IDs 71 is that the cards 14 are not wed to a particular wrap package 10, but rather, can to be used in or shared among a plurality of wrap packages. That is, once a card is created it can be used in any number of different wraps by simply placing that card's descriptor 46 at the appropriate locations in the card decks of the desired wrap package. Thus, the unique card IDs 71 can be used to help streamline the process of using one or more cards 14 from one wrap package 10 in a second wrap (sometimes referred to as the "mixing" of cards 14 and/or wrap packages 10), which can help simplify the process of creating the second wrap package. In some implementations, the card IDs 71 may also take the form of URLs, although this is not a requirement. A potential advantage of using URLs as the card IDs 71 is that the URLs can potentially be used to allow a card in the middle of the wrap to be more directly accessed from outside of the wrap.

The card layout 75 defines the layout of the components 16 of the associated card 14. Preferably the card layout 75 includes a card layout ID 76 which uniquely identifies the associated layout. In some embodiments, the descriptor itself defines the layout using a conventional web presentation definition mechanism such as Cascading Style Sheets (CSS). In other embodiments, the layout definition may be accessed from a server using the layout ID 76. As will be familiar to those skilled in the art, CSS is a style sheet language used for describing the look and formatting of a document written in a markup language. CSS enables separation of document content from the document presentation, including elements such as the layout, colors and fonts. Thus, CSS is very well adapted for inclusion within the wrap descriptor 40 itself.

It should be noted that the layout ID 76 is also useful in the context of the aforementioned authoring tool used to create and author wrap packages 10. Specifically, in some embodiments, the authoring tool is provided with a number of pre-defined templates (card layouts) from which an author of a new card can choose. Each template has one or more containers/components 16, which are arranged on the card in a predetermined manner for holding card content 17. The template itself can have any particular layout, or can be used to create a particular layout. In either case, the particular layout can be assigned a unique layout ID 76, and thereafter, be used and reused in conjunction with different cards thereby simplifying the card creation process.

The card type 73 (which is optional in the descriptor) relates primarily to such an authoring tool. For convenience, the templates may be categorized into different groups or classes. By way of example, the classes/groups may relate to their intended uses, the entity for which the templates are to be used, to the creator of the templates or any other logical grouping of templates. For example, card type 73, can be assigned to one or more predefined card templates, depending on their intended function. For instance, an authoring tool may include one or more card templates, each centric for the display of text, visual media such as photos or images, the playing of video, live or streaming media, application functionality (e.g., scheduling appointments, GPS, etc.), or supporting e-commerce (e.g., displaying products and/or services for purchases, chatting with online sales representative, etc.) respectively. Thus for each template type and class/grouping, card type ID 73 may be assigned.

With the template-based approach, the author(s) of a wrap package 10 can easily select a desired template/card layout that meets their need from a set of available templates and create a new card by readily inserting the desired content, functionality and/or services into the predefined containers. Such a template based approach can greatly simplify the authoring of cards 14 and wrap packages 10, since the author(s) need not be an expert in HTML, scripting or other typical web page language constructs required in order to create the card(s) 14 as typically required with creating conventional web pages. Rather, those details are embodied in the selected template itself, which translates to a specific layout 75, which in turn is identified by the layout ID 76. When a run-time instance of the wrap package 10 is created, layout 75 is used to format the associated card 14.

The associations between components 16 and their contained content objects 17, whether explicit in the card descriptors, or implicit and anonymous, are sometimes referred to herein as "pins" 80. When explicit, pins 80 are identified in the card descriptors 46 by a universally unique Pin ID 81, and by a symbolic pin name 82. When implicit, pins are anonymous at runtime, but may at design time be instantiated in order to provide operable constructs to the authoring tools, in which case they will share the name and ID of the component they bind and associate.

Whether implicit or explicit, these conditions are equivalent, and one representation may be trivially transformed into the other and vice versa, with no loss of meaning. The runtime, authoring environment and other tools are free to transform the object graph as they see fit, and whether the association is treated as intrinsic or extrinsic is irrelevant for the purposes of the determination of the structure of the wrap and its contents, this transformation being a matter of convenience.

The symbolic name of a pin (pin name 82) or component is both Human and Machine-Readable, for example, "Headline", "Glyph", "Body", "Image", "Video", "Cul-de-sac", or any other heading that the template designer deems appropriate. The symbolic name is used to identify its function;

can be used and bound to by constraints and layouts to further constrain their display, behavior and function; and is used by the authoring tools to identify the role of the thus-associated component and map fields from one layout to another when changing the layout associated with a card. Multiple pins or components can share the same symbolic name. When they do, it implies that they serve the same role in the system, and that the same rules will apply to them.

Components 16 contain there associated content 17 and may also contain or reference zero or more attributes or constraint objects, specifying metadata to manage or modify the display of, or behavior of, that component. Constraint objects may specify abstract symbolic data used by the runtime to determine how to display or manage the object containing it, (the Constrained Object) or the behavior of that object. Examples of such abstract symbolic data are CSS class names, behavior names, or other symbolic names acted on by other objects in the system. Constraints may also contain concrete specifications to modify the display or behavior of the object, or its container or any contained objects. An example of the former is containing CSS rules applied to the content. An example of the latter is inclusion inline or by reference of JavaScript code that acts on the constrained object.

The various constraint objects may be thought of as attributes that define the style, format, behaviors, source/feed, and/or constraints associated the corresponding content 17. In the illustrated embodiment, these attributes 86 include style attributes 93, source attributes 87 and other constraint objects such as behaviors 60, 62. Of course, other attributes of a component can be defined and declared as appropriate for the associated content.

The style attributes associate various styles with the content 17 and may take the form of style sheets (e.g. CSS) or other conventional style definition mechanisms. By way of example, if the content 17 is a text string, the style attributes 93 may include features such as the font, size, case, color, justification, etc. of the text. If the content is a glyph, the style attributes may include the color of the glyph, the size, etc.

The source attributes 87 indicate the source of the associated content 17. In some circumstances, the source attribute may simply be a reference or pointer (e.g. a URL) that identifies the location of a static content object (e.g., an image, a photo, a video, etc.). However, it should be appreciated that the content can also be dynamic. For example, the content object associated with a component of a wrap could be the current price of a particular stock. In such a case, the source attribute identifies the feed from which the current price will be retrieved when the card is rendered.

The ability to incorporate content from feeds into a wrap is a powerful construct that facilitates a wide variety of different functionalities including streaming media and/or the dynamic updating of information presented in a wrap after the wrap has been rendered. In general, a feed is a structured source. As will be appreciated by those familiar with the art, there are a wide variety of different types of feeds and different feed structures. For example, a web feed is a data format for providing users with frequently updated content. When desirable, web feeds may be structured to provided content that can be dynamically updated after the wrap has been rendered. Some web feeds are server side event driven as is commonly used to facilitate live updates—as for example, sports score updates, stock price updates, etc. Other web feeds are polling feeds in which the wrap periodically polls a source. Another type of feed is a streaming feed. For example, a live streaming feed may present a live stream that is progressively rendered as the stream is received. Examples of live streams include live video streams, audio streams, biometric streams, stock ticker streams.

It is anticipated that in some circumstance, it may be desirable to transform the feed source on the server side, specifically for the purpose of better consumption by the wrap runtime, in the context of the wrap package in which it is to be presented. In such circumstances, specific middleware may transform external sources in order to prepare them for this consumption.

The source attribute 87 may take the form a feed descriptor that defines the nature and structure of the feed as well as its feed characteristics including source location, data format(s), update semantics, etc. For example, some feeds (e.g. live feeds and live update feeds) require that a socket be opened and kept open as long as the feed is active. Polling feeds require the identification of the desired polling frequency. This and other metadata addressing the update semantics of the feed may be contained in the feed descriptor, and inform the runtime of the desired update behavior. In other embodiments, the source attribute may include a reference to a data feed object (not shown) that defines the data feed.

It should be appreciated that there are a very wide variety of different types of information/content that a wrap author may desire have updated dynamically while a wrap is being displayed. These might include items that may be expected to update frequently and others that may update very slowly. By way of example, a few examples of items that may be desirable to update dynamically include sports scores, stock prices, the number of tickets still available for purchase for an event, number of units of a product that are available or simply an indication of whether a product is in our out of stock, breaking news headlines, etc. A number of services can also benefit from the ability to dynamically update content based on information that can change while a wrap is displayed such as, the user's geographic location, social networking group information (e.g. friends or peers that are nearby, online, etc.), featured information, etc. For example, a card in a wrap for a sports stadium could show the nearest concession stands, restrooms, etc. which can vary as the user roams around the stadium. Another card could show the stats of a baseball player currently at bat. A social networking card may inform a user when their friends or others sharing similar interests are nearby. A retailer may wish to run special offers that update periodically. Of course, these are just a few examples, and the types of content that a wrap author may wish to be able to update dynamically is only limited by the creativity of the author.

Other constraint objects may include declarations of specific behaviors that are intended to be associated with the component 16 and/or content 17. Such behaviors may include behaviors 60, 62 known to or accessible by the runtime viewer 50 as discussed above.

FIG. 6A diagrammatically illustrates an alternative pin based card descriptor structure 46A. Appendix II of incorporated U.S. Provisional Patent Application No. 62/210,585 illustrates a representative wrap descriptor 40A that takes the form of a JSON object that utilizes the pin based card descriptor structure 46A illustrated in FIG. 6A. FIGS. 27A-27E illustrate the wrap defined by the wrap descriptor of the referenced Appendix II. To facilitate correlation between the Appendix and FIG. 6A, various descriptor elements are labeled with corresponding reference numbers in that Appendix II.

In the embodiment of FIG. 6A, the card descriptor 46 includes a unique card ID, 71, a card name 72, card type 73 and a card layout 75. The layout 75 includes a layout ID 76, optionally a layout name 77 and an explicit layout definition 78. In the illustrated embodiment, the layout definition takes the form of style sheets (e.g., cascading style sheets (CSS)). Although the illustrated embodiment includes both the layout ID 76 and an explicit layout definition 78, it should be appreciated that either could be eliminated from the descriptor if desired. For example, if the explicit layout definition is not part of the descriptor structure, it could be accessed through the use of the layout ID. Alternatively, when the layout definition 78 is explicitly provided, the explicit use of the layout ID 76 may be eliminated. However, it is generally preferable to explicitly provide the layout ID.

The descriptor 46A also includes an array of zero or more pins 80, with each pin 80 corresponding to a first level component 16. Each pin 80 includes a pin ID 81, a pin name 82 and an associated component 16. The component 16 includes a component ID 88, a component type 89, and the component content 17. As indicated above, the content may be provided in-line or by reference. Any desired attributes and behaviors may then be associated with the component through a set of zero or more component attributes 86 which potentially include any desired component style class declarations 91, component style sheets (CSS) 93 and component behavior declarations 95. In the illustrated embodiment, the style class declarations 91 refer and bind to CSS classes defined in the layout definition 78 that are used to define the format of the associated component 16. Numerous examples of this binding can be seen in the Appendix II of incorporated U.S. Provisional Patent Application No. 62/210,585. By way of example, the first pin 80(1) in Appendix II has an associated component style class declaration 91(1) that refers to and binds the font size style "font size-×1" 96 defined in layout 78 to the associated text content 17(1).

Component style sheets 93 provide an alternative component level mechanism for associating specific styles and formatting with a component 16. In general, it is expected that the card layout definition 78 will define the styles and formats associated with each component in a robust manner that is satisfactory to the card author. In such implementations, there is no need to include any component level style sheets 93, and it is expected that in many (indeed most) such card implementations, no component style sheets would be provided. Rather, the associated styles may be bound through the use of class declarations 91. However, the component style sheets 93 provide a mechanism by which the style assigned to the component by the layout definition 78 may be overwritten, which gives card authors great flexibility in defining the stylistic presentation of their content without altering the card layout definition. In other implantations, it may be desirable to define some of the style attributes at the component level rather than the card level. In such implementations more aggressive use of component level style sheet 93 would be expected. In still other embodiments, the availability of component level style sheets can be eliminated altogether. In the illustrated embodiment, style sheet are used to assign styles to the components since they are currently a popular format for associating different styles with HTML content. However, it should be appreciated that other now existing or later developed constructs can readily be used to associate styles with the content as appropriate.

Behaviors 60, 62 can be associated with a component on the component level in the same manner as the style sheets. This can be accomplished, for example, through the use of behavior declarations 95 which declare specific behaviors 60, 62 with their associated component. It should be appreciated that the ability to associate specific behaviors with specific components in a general manner provides tremendous flexibility in the card creation process that facilitates the creation of cards having an incredibly wide range of functionality and behaviors while maintaining a simple, compact, and highly portable wrap structure. Even though there is an ability to associate behaviors with specific components, it is expected that the behavior set may be null for many components because they would have no need to have any specific behaviors associated therewith.

The card descriptor 46A also associates any desired card level attributes and/or behaviors with the card through a set of zero or more attributes 86C that are associated with the card at the card level. Like the component attributes 86, the card attributes 86C potentially include any desired card level style class declarations 91C, card level style sheets 93C and/or card level behavior declarations 95C which work in substantially the same way as the component attributes, except that they operate at the card level. When desired, the wrap descriptor 40 can also have similar wrap level attributes 86W. Similarly, when the content of a component includes one or more subcomponent(s), the various subcomponent(s) may have their own associated component attributes 86 regardless of the tier of the component/subcomponent. Still further, when desired, attributes can be associated with groups of components.

FIG. 6B diagrammatically illustrates an alternative card descriptor structure 46B that does not utilize pins 80. The structure of card descriptor 46B is generally similar to the structure of card descriptor 46A described above with respect to FIG. 6A except for the use of pins. Therefore, the attributes (e.g., styles and behaviors) are associated with their corresponding components 16 rather than with pins 80. Like in the embodiment of FIG. 6A, the card descriptor 46B includes a card ID 71, a card name 72 and a layout 75. The layout 75 includes a layout ID 76, layout name 77 and layout definition 78. The descriptor then includes an array of zero to many components 16.

Each component 16 includes a component ID 88, a component name 84, a component type 89, the associated content 17 and the associated attributes 86. Like in the previously described embodiment, the associated attributes may include associated classes 91, component style sheets or definitions 93, behavior declarations 95 and/or their associated behaviors 60, 62. Thus it can be seen that card descriptors 46B are functionally substantially equivalent to the card descriptors 46A described above.

Appendix III of incorporated U.S. Provisional Patent Application No. 62/210,585. illustrates a representative wrap descriptor 40B that takes the form of a JSON object that utilizes the component based card descriptor structure 46B illustrated in FIG. 6B. This descriptor defines the same wrap illustrated in FIGS. 27A-27E and is generally equivalent to the wrap descriptor of Appendix II of incorporated U.S. Provisional Patent Application No. 62/210,585. To facilitate correlation between Appendix III and FIG. 6B, various descriptor elements are labeled with corresponding reference numbers in the Appendix. It is noted that the attributes container 86 is labeled "Styles" in the JSON code of Appendix III.

Although only a few particular card descriptor structures have been described, it should be appreciated that equivalent functionality can be obtained using a wide variety of different descriptor arrangements.

Gallery Card Descriptors

FIG. 6C illustrates a representative gallery card descriptor 46G. The illustrated embodiment uses the component based descriptor approach of FIG. 6B although it should be appreciated that other card descriptor hierarchies (such as those illustrated in FIGS. 6 and 6A can be used as well. Gallery card descriptor 46G includes card ID 71G, card name 72G (in this case "Gallery Card"), and card layout 75G with layout ID 76G, layout name 77G and CSS layout definitions 78G, which together define a layout suitable for a gallery card. The initial component is gallery component 16G, which has a component ID 88G, a component name 84G, a component type 89G, gallery component content 17G, and any associated attributes 86G (including class declarations 91G, style sheets 93G and behavior declarations 95G).

In the illustrated embodiment, both the component name 84G and the component type 89G are "Gallery." The "content" of the gallery component 16G is a set of one or more gallery item components 116. Each of the gallery item components 116 typically, although not necessarily, has the same component structure previously described and can be thought of as subcomponents. This introduces a powerful feature of the described architecture. That is, the "content" of any particular component may be one or more "subcomponents". Similarly, the content of any of these "subcomponents" may also include one or more next tier components and so on, with the components at each tier having the same generic structure. Thus, each gallery item component 116 includes: a component ID 88, which may be thought of as a gallery item ID; a component name 84, a component type 89, content and any associate attributes 86 (potentially including class declarations 91, style sheets 93 and behavior declarations 95).

In the illustrated embodiment, the component name 84 and component type 89 for the gallery item 116 is "Gallery Item". The content of the gallery item 116 is a set of components (subcomponents) that make up the gallery item (that is, gallery items 116, which are subcomponents of the gallery component 16G, themselves have subcomponents which might be thought of as third tier components). Each of these gallery item components has the same structure as any other component. By way of example, the gallery item components may include a headline component 16H, and an image component 16I (shown in Appendix III of incorporated U.S. Provisional Patent Application No. 62/210,585). Only the headline component 16H is shown in FIG. 6C, but the content of a representative headline component 16H and image component 16I may be seen in gallery items 116(1)-116(3) shown in FIGS. 27B-27D and the corresponding JSON descriptor is shown and labeled in Appendix III.

With the described structure, specific behaviors or styles can be associated with components at any level. Thus, for example, a behavior can be associated at the card level, the gallery item level, the component of a gallery item level or at any other level at which components are used. An example of a card level behavior might be the aforementioned gallery card "snap to item" behavior 60C, which can be seen in the Appendices I, II and III. An example of a gallery item subcomponent level behavior might be a trigger as described below.

Although a particular gallery card descriptor structure has been described, it should be appreciated that equivalent functionality can be obtained using a wide variety of different descriptor arrangements.

Trigger Descriptors

Referring next to FIG. 6D a descriptor structure for a representative trigger component will be described. Like other components, the trigger component 16T includes an optional trigger component ID 88T, a component type 89T, a component name 84T, content 17T and any associated attributes 86T (including any class declarations 91T, style sheets 93T and behavior declarations 95T). In the illustrated embodiment, the component type 89T is labeled "trigger" and the component name 84T is labeled "transact" indicating that the trigger is a transaction trigger.

The content 17T of the trigger component 16T in this illustrative example includes three subcomponents. The subcomponents include a text box 16TT, an image 16TI that takes the form of a "buy button" and a link 16L. An example of such a trigger 340 can be seen in FIG. 7F wherein the content of the text box 321 is "pomegranate $18 for 12 16-ounce bottles", the content of the image is the buy button 327 and the link is a link to an external e-commerce site where a purchase transaction may occur. The link 16L has an associated behavior "open-in-new-tab", which causes the browser to open the target URL in a new tab when the trigger is activated by tapping on a touch sensitive display anywhere within the region defined by the trigger or by otherwise activating the trigger. The described link trigger behavior is a good example of a component level behavior.

In the illustrated embodiment, the link component 16L is a first level component of the trigger and therefore the link is activated by tapping on (or otherwise selecting) any component within the trigger—as for example either the text box 321 or the buy button 327. If the card creator preferred to have the link activated only by selection of the buy button 327, that can readily be accomplished by making the link a component of the buy button 327 rather than a first level component of the trigger—or, by moving the text box component definition out of the trigger—as for example to the same component level as the trigger itself. Any tap or click in the bounding rectangle of the trigger, as defined by the components contained by the trigger, results in the trigger being activated.

It should be apparent that the trigger component may be included as a first tier component in the card descriptor or as a subcomponent at any level within the card descriptor hierarchy. Although a particular trigger descriptor structure is illustrated, it should be appreciated that equivalent functionality can be obtained using a variety of different descriptor arrangements. It should further that FIG. 6D is illustrative for providing an example for the purchase of an item for sale. It should be understood, however, the cards can be authored with triggers for a wide variety of actions besides purchasing an item, such as the reservation or booking of goods and/or services, online chats, GPS related services and functionality, etc.

Feed Descriptors

As indicated above, there are a wide variety of different types of feeds and feed structures that may be desirable to incorporate into any particular wrap. To facilitate the use of feeds, any wrap descriptor 40 or individual card descriptor 46 may include one or more feed descriptors 187. Each feed descriptor 187 has a number of descriptive elements that together define an associated feed in a manner that can be used by the runtime to integrate information from the feed into a rendered wrap instance in the manner desired by the wrap author.

Referring next to FIG. 6E, a representative feed descriptor 187 in accordance with a nonexclusive embodiment will be described. In the illustrated embodiment, the descriptive elements of feed descriptor 187 include a feed type 105, a feed source 107, a desired lifecycle 109, a feed target 111, an update frequency indicator 113 and any required feed parameters 115. Of course, not all of these descriptive elements are required in every feed descriptors and any particular feed descriptor may include one or more additional descriptive elements as appropriate. The feed descriptor 187 may also optionally include a feed ID 103 and/or a feed name 104.

The feed type 105 indicates the type of the associated feed. In general, most feeds can be categorized into categories or "types" that share similar traits and/or requirements. As previously discussed, some of the feed types might include "live" (server side event driven) feeds, polling feeds, streaming video feeds, streaming audio feeds, etc. When the feed descriptor is processed by the runtime, the feed type can be used to help identify the resources that may be required to support the feed. For example live streaming feeds and server side event driven feeds may require the opening of a socket for the feed and keeping the socket open for the duration of the defined feed lifecycle 109.

As will be appreciated by those familiar with the art, most web feed are formatted using either RSS or Atom and the runtime can be configured to handle either of these web feed formats or any other desired feed format. Typically, it is not necessary to specifically identify the feed format in the descriptor, however, we desired, a feed format field (not shown) can be added to the descriptor or the feed format can be dictated by the feed type.

The feed source 107 indicates the location from which the feed can be obtained. Often, the feed source 107 takes the form of a URL, although other endpoints or source identifiers may be used in alternative embodiments.

The lifecycle 109 indicates the feed's lifecycle semantics. That is, when and how the feed in activated, the conditions under which it remains active and potentially, when it is closed. For example, a few potential lifecycles might include: (a) "while-card-visible" which opens the feed when that associated card is displayed and keeps the feed active as long as the associated card is the visible card within the wrap; (b) "always" which opens the feed when the associate wrap is rendered and keeps the feed active as long as the wrap is displayed; (c) "on-card-open"—which activates a feed any time the wrap transitions to the associated card; (d) "on-wrap-load" which opens the feed when the wrap is loaded; (e) "on-user-selection" which opens and/or updates the feed in response to a user input (e.g., the selection of a displayed button or other user activated trigger). Some of the lifecycles, such as "while-card-visible" and "always" may be more appropriate for live and streaming feeds, or feeds that affect globally-visible wrap state (e.g. in a globally visible sports score ticker or stock ticker) whereas others, such as "on-card-open" or "on-wrap-load" may be more appropriate for polling feeds. Which type of feed is most appropriate is highly context-dependent, and will be determined by wrap authors.

The semantics of feed lifecycle management when a feed is no longer active may also vary widely based on what is appropriate for a particular feed. To illustrate this point, consider a feed that is active "while-card-visible." When the user navigates away from the relevant card, the feed becomes "inactive" and there are several different feed handling approaches that can be utilized at that stage. For example, in some circumstances, it may be desirable to simply close the feed and the associated connection when the user navigates away from the relevant card. Thereafter, if the user navigates back to the card, a new feed/connection is opened—with or without retained knowledge of what was previously downloaded. In other circumstances, it may be desirable to continue to accumulate any updates associated with the feed at the server while the feed is "inactive", and to forward such updates to the wrap in a batch if, and when, the user returns to the associated card. In such circumstances, the connection associated with the feed might be kept open while the user continues to navigate within the wrap, and thus, the connection would only be closed when the wrap itself is closed or the feed times out. Although only a few "inactive" feed management approaches have been explicitly described herein, it should be appreciated that a wide variety of other mid-life and end of life feed management techniques can be used as appropriate for any particular implementation.

Feeds may also remain active in order to collect events, and to initiate alerts related to those events. For example, in a chat session, it may be desirable for a wrap may indicate that there was activity on another card, based on an incoming chat message, and in some cases not force the user back to that card. In other cases the wrap author may choose to cause the user to be brought back to a chat card when a new message comes in. Moreover, a feed may be manually initiated or terminated, e.g. in the case of a user chat session, when the user chooses to initiate or terminate a chat session, perhaps with a customer service person, or another user.

The target 111 indicates the callback endpoint for the feed—which may be the method to call when an event happens. In many implementations, the target will be a container within the wrap that the feed is to be associated with. In many circumstances, the intended container will be the component or other structure (e.g., card/wrap) within which the feed descriptor 187 is defined within the wrap descriptor 40. That is, when the feed descriptor 187 is included as part of a particular component definition, it might be assumed that the feed is intended to be bound to that particular component. Alternatively, if the feed descriptor 187 is included as part of a card descriptor 46 outside of any of the associated component descriptions, it might be assumed that the feed is intended to be bound to the associated card. Still further, if the feed descriptor is included as a part of a wrap descriptor 40 outside of any of the associated card descriptors 46, it might be assumed that the feed in intended to be bound to the wrap as opposed to any particular card or component.

However, in other situations, it may be desirable to bind a feed to an endpoint or containing structure that is different than the structure within which the feed descriptor appears within the wrap descriptor. For example, in some circumstances it may be desirable to overlay the feed content over all of the cards or a subset of the cards within a wrap. In such a circumstance, it may be desirable to associate the feed descriptor with the overlay or the wrap rather than a particular card or card component. At the same time, the feed may be defined as part of a particular card, or as part of a particular component of a particular card. As such, although the feed is defined (via the feed descriptor 187) as part of a particular card/card component, it may be desirable to associate the feed with an endpoint other than the card/component. The target field 111 provides a simple mechanism that provides great flexibility in allowing a card author to associate a feed with any suitable structure within the wrap without forcing a rigid feed descriptor authoring syntax, while the default behaviors make it easier for the author to build more standard feed behaviors.

In embodiments, in which the target 111 is not explicitly defined, the default target may optionally be set to the container associated with the structure within which the feed descriptor appears in the wrap descriptor 46. Alternatively, the default target could be the containing card, wrap or other level container. In still other embodiments, the explicit target definitions can be eliminated and all targets can be implicitly defined by the location of the feed descriptor 187 within the wrap descriptor. Although such an arrangement can work well, it should be appreciated that it lacks some of the flexibility provided by supporting explicit target definitions.

When explicit, the target can be identified relatively, by reference or through the use of explicit identifiers. By way of example, in a particular embodiment, representative targets include: "container"—which refers to the container associated with the structure within which the feed descriptor 187 appears; "parent"—which refers to the parent of the structure within which the feed descriptor 187 appears; "card"—which refers to the card within which the feed descriptor 187 appears; "warp"—which refers to the wrap within which the feed descriptor 187 appears; "grandparent", etc. It is noted that when a relative term such as "parent" is used, the level of the containing structure will be dependent on context. For example, when "parent" is used in the context of a subcomponent, the "parent" would be the containing component. However, when the term "parent" is used in the context of a first level component, the term "parent" would refer to the containing card, etc. It should be noted that the same target can be identified by multiple methods: relative references, absolute references, and default references being the primary embodiments.

The frequency 113 is particularly relevant to polling feeds and indicates how often the feed should be polled. In some circumstances it will only be desirable to poll the feed once—e.g., when the associated card is opened, which can be uniquely defined by the combination of Lifecycle: on-card-open and Frequency: once. In other circumstances it may be desirable to periodically poll the feed, as for example, every minute, every 15 seconds, every 5 minutes, etc. In still other circumstances it may be desirable to poll when the card or wrap is first opened and thereafter only poll in response to user inputs or other events, as for example in response to the user selection of an "update" button (not shown). Of course, a very wide variety of other update rules can be defined through the use of different frequency and lifecycle constraints, and the feed may itself update the polling frequency for subsequent reads, over the life of the interaction.

Some feeds may require the passing of specific parameters to the server that may be used by the server for various control, tracking or authentication or other purposes. Feed parameters 115 can be used to pass such parameters to the feed server. In the illustrated embodiment, the feed parameters take the form of name/value pairs although other data structures can be used in other embodiments. In some circumstances, the feed parameters 115 may be static and explicitly included in the wrap descriptor. For example, if a card employing a feed is associated with a particular ad campaign, it may be desirable to identify the ad campaign through the use of campaign identifier passed a feed parameter. In other circumstances the feed parameters may be variables. For example, a card arranged to provide current MLB scores sports may use team identifier parameters to identify the teams of interest to the user, with the user being given the ability to select the teams of interest—as for example through the selection of one or more teams of interest through a menu provided on the card. Of course the specific parameters that are appropriate for any given feed and the manner in which the parameters are obtained may vary widely and will often depend in large part on the APIs associated with the feed.

As described in more detail below, a feed engine 540 in the runtime viewer has a set of rules that know how to access and bind the feed appropriately based on the descriptor information. Thus, the runtime viewer can readily access the feed source and deliver the content to the appropriate container when the associated card/wrap is rendered based on this descriptor information.

The actual contents of any particular feed descriptor can vary significantly based on the nature of the feed and its intended use within the wrap. For example, a representative, nonexclusive, polling feed descriptor 187a may have the following structure:

| | |
|---|---|
| Feed: | (187a) |
|   Type: polling | (105) |
|   Source: https://feed.wrap.com/macys/catalog-spring_15 | (107) |
|   Lifecycle: on-card-open | (109) |
|   Target: container | (111) |
|   Frequency: once | (113) |

In this embodiment, the feed descriptor 187a defines a "polling" feed as indicated by "polling" feed type 105. The feed is queried once each time the card is opened as indicated by frequency indicator 113 and lifecycle 109 respectively. The source 107 of the feed as well as the target container 111 are also provided. In this example the target is "container" which refers to the structure within which the feed descriptor 187 appears. Of course, the feed descriptor may also optionally include a feed ID 103 and/or a feed name 104, in addition to any feed-specific parameters.

In another example, a representative, nonexclusive, server side event driven feed descriptor 187(b) may have the following structure:

| | |
|---|---|
| Feed: | (187b) |
|   Type: live | (105) |
|   Source: https://live-feed.wrap.com/mlb/scores | (107) |
|   Lifecycle: while-card-visible | (109) |
|   Target: container | (111) |
|   Parameters: | (115) |
|     Teams: [SFG, NYM] | (116) |

In this embodiment, the feed descriptor 187b defines a "live" server side event driven feed as indicated by "live" feed type 105. The feed is activated any time that the card is visible so that updates can be displayed as they are received. The runtime feed engine 540 knows to open a connection with the server when the associated card is displayed and to keep it open as long as the card is visible based on the feed engine rules associated with "live" feed types 105 and the declared "while-card-visible" lifecycle 109. The source 107 of the feed as well as the target container 111 are indicated in the same manner as the previously described polling feed 187a. The card associated with the illustrated feed is designed to provide current scores for MLB baseball games. The feed is arranged such that the specific teams to be followed can be identified in feed parameters 115 (i.e., Team parameters 116) sent to the server. In the illustrated example, two teams, the San Francisco Giants and the New York Mets are indicated. As such, the feed will only provide updates on games involving at least one of those teams. In the illustration above, the team parameters 116 are specifically identified in the descriptor. For cards that are associated with one or more specific teams, it may be desirable to include explicit team parameters 116 in the descriptor. However, in other instances, the associated card may include a selector interface that allows users to select which games they are interested in following. In such a case, the team parameter in the descriptor might specify that selector, might be a null or default field that can be filled and/or overridden by user selection, or other structure as appropriate.

One of the application functionalities that is supported by the wrap runtime is chat services. Thus, chat functionality can readily be integrated into the any wrap. Chats typically require the use of a feed which can be defined in the same manner as other feeds. The feed used in a chat session can take the form of a live feed, a polling feed, or any other available feed structure. The feed structure that is most appropriate for any particular chat will depend in large part on the nature of the communications that are expected. In implementations where communications are expected relatively continuous, a live feed may be most appropriate. In implementations where communications are expected to be relatively infrequent, a polling feed with an appropriate polling interval may be more appropriate. The specific chat feed structure may vary with the design intent of the chat tool provider. By way of example, a representative, nonexclusive, chat feed descriptor 187(*c*) may have the following structure:

| | |
|---|---|
| Chat: | (187c) |
| Type: Customer Service | (105) |
| Source: https://chat.wrap.com/macys/customer_service | (107) |
| Lifecycle: open-on-user-selection | (109) |
| Target: chat-overlay | (111) |
| Frequency: every 30 seconds | (113) |
| Parameters: | (115) |
| User Name: [$user_name] | (116) |
| Account No.: [Account-#] | |

In this embodiment, the feed type is customer service 105 which is a polling type feed with the update frequency 113 is "every 30 seconds." In the frequency example, 'every' is a keyword indicating a polling interval, 30 is a parameter indicating the number of units, and 'seconds' indicates the units applied to the unit parameter. There are a number of other chat types that may be appropriate, but way of example, "group" chat which may involve multiple participants, "single user" which may be a point to point chat, etc.

The lifecycle 109 is defined as "open-on-user-selection" which indicates that the feed is activated directly or indirectly by user selection as opposed to automatically when the wrap is renders or an associated card us displayed. Any suitable gesture can be used to activate the feed—as for example, by a user tapping or clicking on a "Chat Now" button (thereby activating a trigger that in turn launches the chat session). Some chat sessions may require or request certain information to initiate the session. When some (or all) of the required information is known at the time the wrap is authored, the appropriate information/values can be included in the feed descriptor parameters 115. For example, in the illustrated embodiment, a user name and an account number is desired (if available). Although user specific information would not be known at the time the wrap is authored, variables can be provided in the descriptor, (e.g. $user_name) as placeholders, (e.g. [Account #]), or be incorporated dynamically from session state information, user cookies, or other available state information.

User specific information such as user name, account number (in illustrated embodiment a Macy's account number) may be stored persistently at any appropriate location, as for example in a state descriptor, the runtime viewer, a cookie associated with the runtime viewer, etc. The runtime viewer 51 can then look up the information corresponding to the declared variables appropriately at runtime—e.g., when the wrap is rendered, when the chat session is launched or at any other time that is deemed appropriate. In some circumstances, the requested information may not b available to the wrap. If the requested information is optional, then the chat session can be initiated without that information. If required, the user may be prompted to input the requested information.

Widgets

Application functionality can be incorporated into a wrap in a wide variety of different manners. In some wraps, behaviors are integrated directly into one or more card to instill desired wrap functionality. Another construct that the wrap runtime supports to facilitate the integration of different functionalities into a wrap is the component type "widget." Conceptually a widget component creates an internal frame within the associated card (e.g. an HTML iframe) and points to an external source that supplies the content for the internal frame. The widget component typically contains a URL that points to the source (e.g., a server associated with the widget) and may specify any number of parameters to be passed to the server that may be helpful to the server in determining the specific content that is appropriate to supply to the internal frame. When a widget component is loaded by the runtime, the runtime creates an internal frame within the associated card and obtains the contents to populate the internal frame from the identified source. Thus, the content rendered within the internal frame associated with the widget is dictated by a source/server that is external to the wrap runtime rather than by the wrap descriptor itself. By using widget components, third parties can introduce any desired content or functionality into a wrap.

In a specific example, the internal frame may take the form of an HTML iframe which is a well established HTML construct that facilitates embedding a document inside another document. The iframe effectively creates a blank frame within the associated card that can be populated with content supplied by a server associated with the widget. The content may be provided in HTML format which allows standard browsers to render the content within the frame. The HTML may include any desired scripts (e.g. JavaScript) to provide the widget with desired behaviors. HTML iframes work particularly well because HTML is currently the de facto standard markup language used to create web pages and is therefore supported by virtually all state of the art web browsers and is familiar to most web designers. Although HTML iframes are used in the specific example, it should be appreciated that in other embodiments, the internal frames may be constructed using other structures and/or may be have their content delivered in a variety of different now existing or later developed formats, markup languages, etc.

To incorporate a widget into a card, a widget component descriptor 118 is included in the associated card descriptor 46. A representative widget descriptor architecture is illustrated in FIG. 6F. In the illustrated embodiment, the widget descriptor 118 includes a component type 89W (which in this case is type "widget"), a component ID 88W, an optional component name 84W, and a widget definition 120. The widget definition 120 includes a widget ID 121, a widget name 122 and a definition 124 which is labeled "schema" in FIG. 6F. The definition 124 includes a source identifier 126 that identifies the location of the server that will supply the widget content and parameter(s) 130 that represent parameter(s) to be passed to the server when the widget is instantiated. The widget definition 120 also preferably includes frame size and position related identifiers such as width 127, height 128 and position 129. The width 127 and height 128 identify the internal frame's intended height and width, while the position 129 identifies its position within the card—e.g., the X-Y coordinates of its origin. It should be appreciated that the actual dimensions of the displayed cards may vary with the size of the screen upon which the wrap is displayed. Therefore, the various size parameters may be relative rather than absolute (e.g., 10%, etc.) Of course, in alternative embodiments, the dimensions and location of the internal frame can be defined in other manners. As with all components, the widget may also have associated attributes 86 (e.g., styles, behaviors, etc.).

The nature of the parameters 130 that are included in any particular widget descriptor will vary widely with the nature of the widget itself and the information that the widget developer deems important to the widget content server. If the widget content is static and the frame size is known to the server, there may be no need to include any parameters in the widget descriptor. However, it is expected that more often, it will be desirable to provide some additional types of information to the server as part of the content request. For example, in some circumstances the parameters might include one or more parameters that indicate the originating source of a request such as the associated wrap, card or widget component identifier(s); a user or system ID; the geographic location of the user, etc. Other parameters might be variables that provide information about the user (e.g. user demographic information), the current wrap viewing state, and/or information inputted or selected by the user, etc. Such information may be available from a variety of different sources, as for example: (i) a cookie associated with the wrap; (ii) the runtime viewer; (iii) a wrap state descriptor associated with the wrap and user; etc. Still other parameters may convey information that is particularly relevant to the widget. For example a Pinterest widget may identify specific pins, hosts, boards or tags of interest for the particular Pinterest card; a shopping cart widget may convey information identifying the user's identity, account number, shipping/billing address, items selected for purchase, credit card information, etc. It should be appreciated that these are just examples and that the parameters may be configured to provide whatever information is relevant to the specific widget.

In the embodiment illustrated in FIG. 6F, the widget definition includes a unique widget ID 121 that is distinct from the component ID 88W. The widget ID is optional, but can be useful to identify a widget class or object that is used to create the component. This is particularly useful from an object oriented programming and tracking standpoint in that a particular class/object may be utilized in multiple different widgets and the use of a widget ID allows the base class to be explicitly identified within the widget descriptor.

The content and functionality provided by a widget is only limited by the imagination of the widget author. By way of example: a Twitter widget can be configured to render a Twitter feed and facilitate Twitter services; a chat widget can be configured to provide a chat service; a countdown widget can be configured to provide a timer-like functionality; a live sports score widget can be configured to display sports scores in real time; a receipt widget can be configured to interact with a company's backend financial systems to provide purchase receipts; a purchase transaction widget can be configured to facilitate purchase transactions; cul-de-sacs can be implemented using a cul-de-sac widget; a stock widget can be configured to display stock prices and/or support trades etc. The specific parameters that may be useful for each of these widgets may vary dramatically with both the widget's purpose and its particular implementation.

Figure 26:
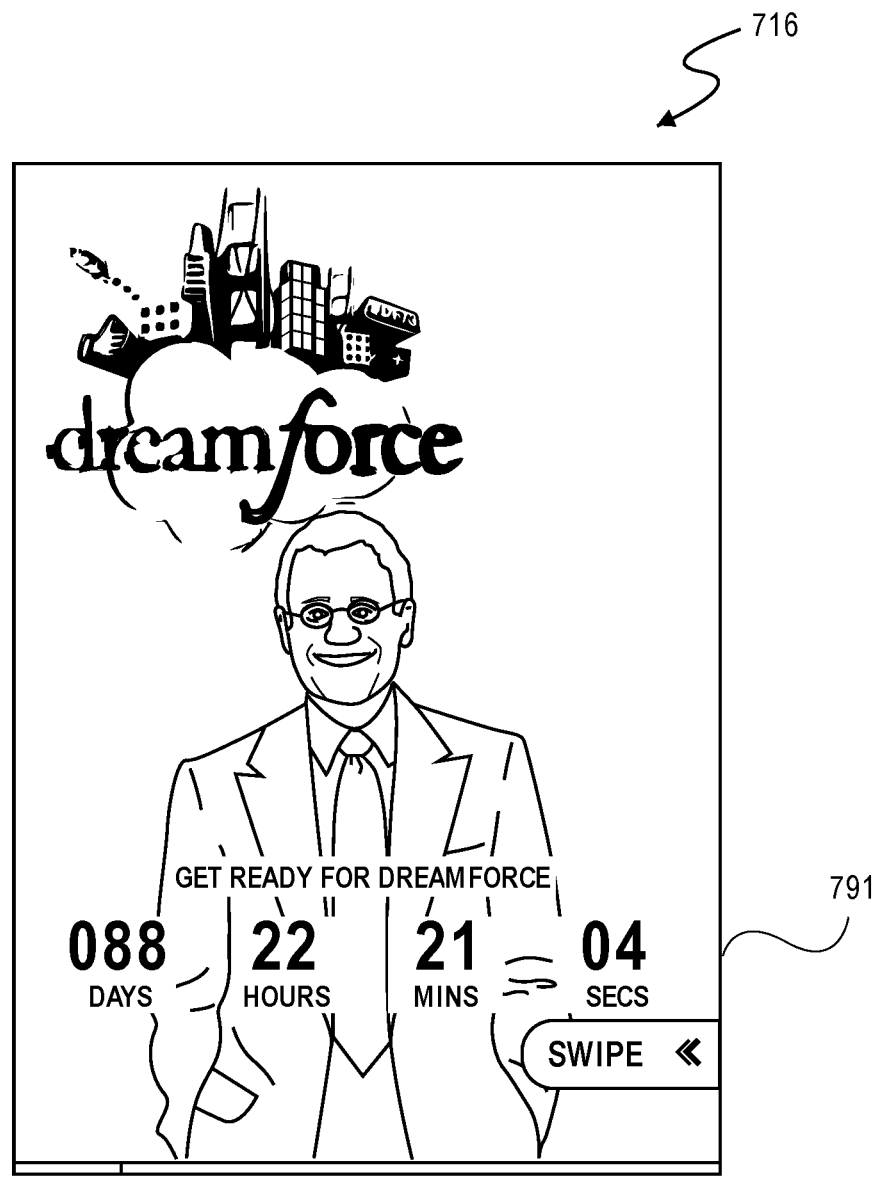
FIG. 26 illustrates a card incorporating a countdown widget.
Figure 27B:
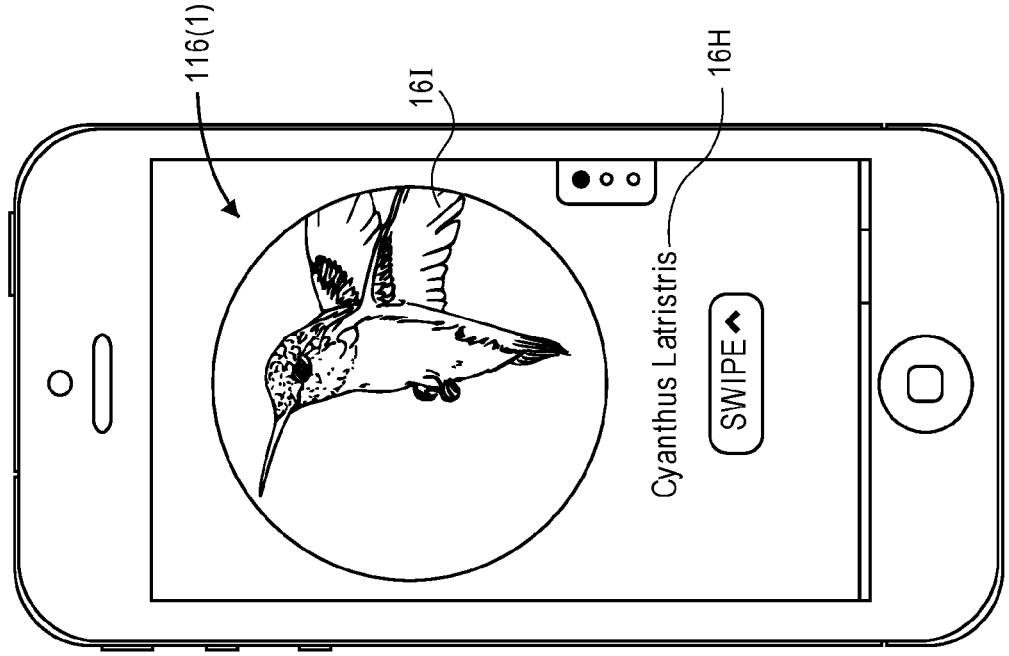
FIGS. 27A-27E illustrate a series of cards of another exemplary wrap package.
Figure 27A:
Figure 27D:
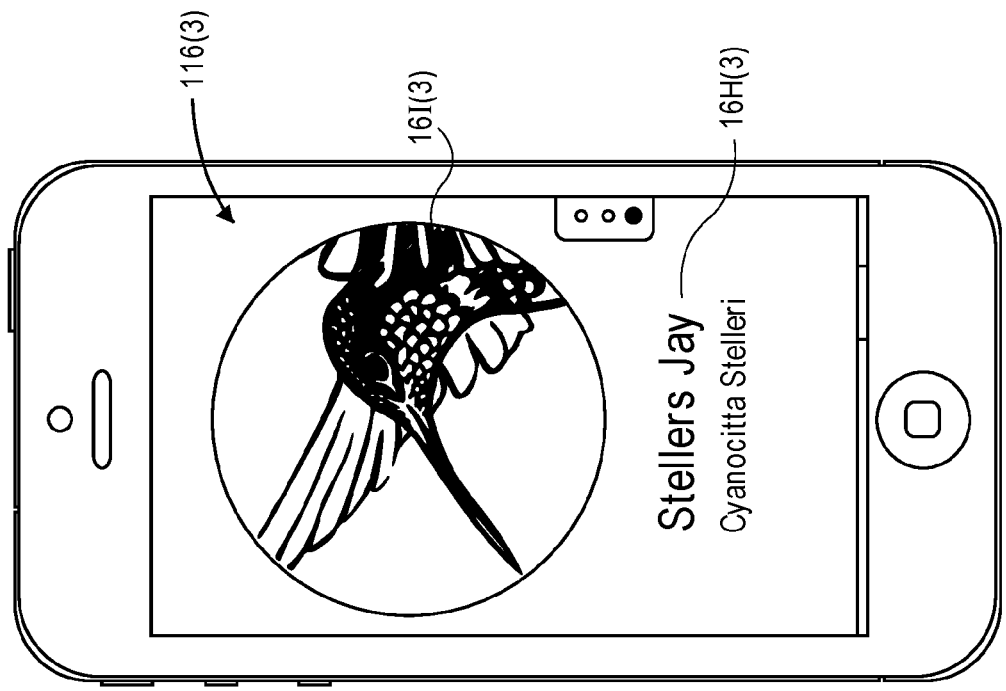
Figure 27C:
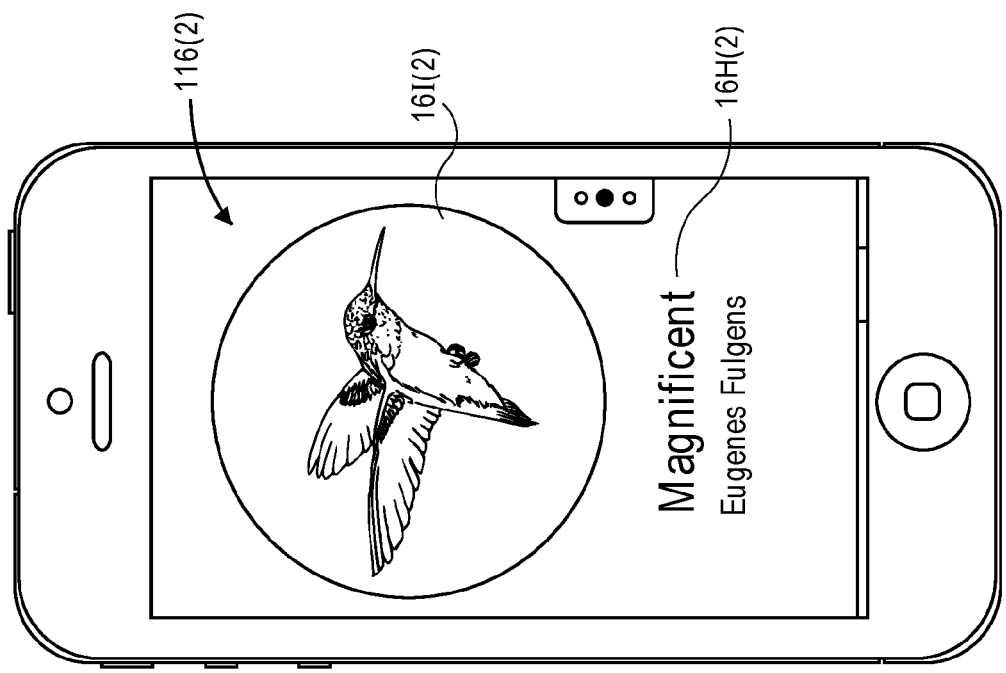
Figure 27E:
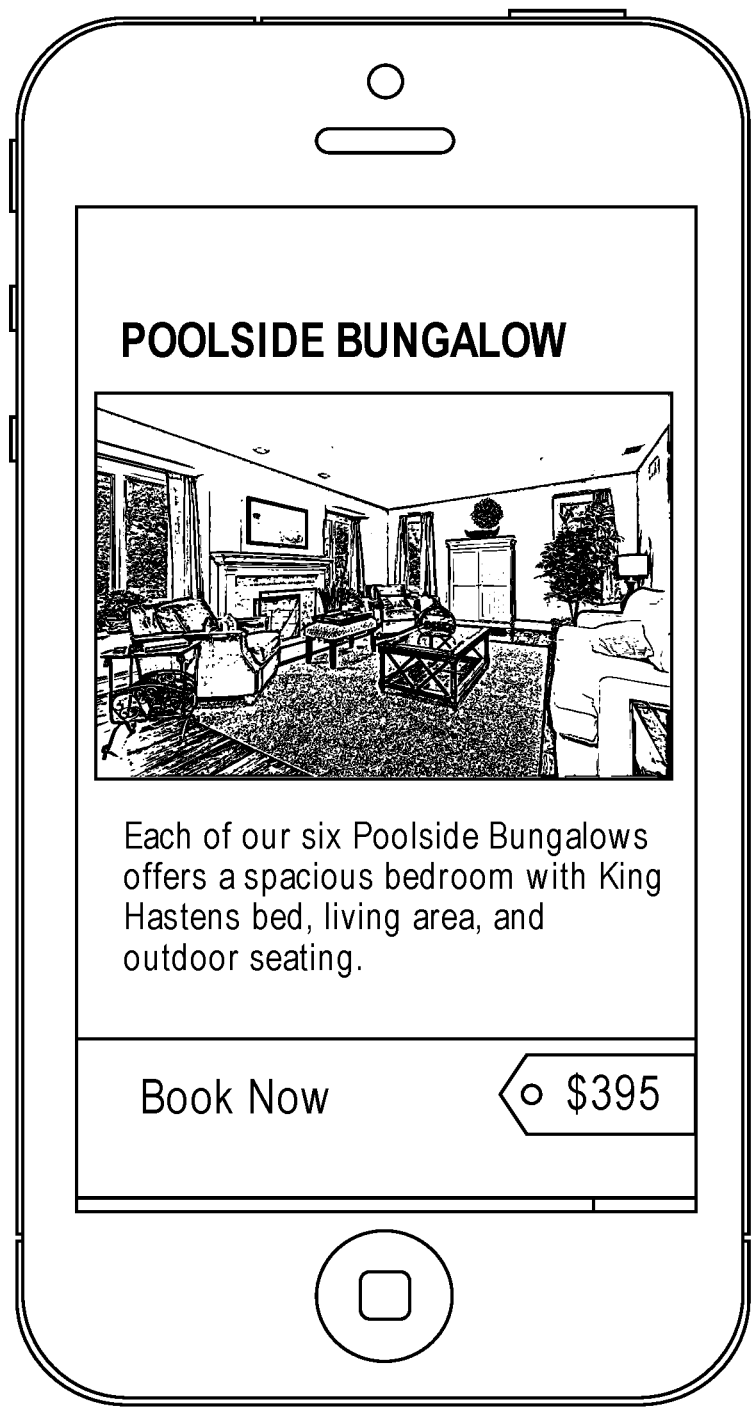

A representative JSON card descriptor 46 that includes a widget descriptor 118 is provided in Appendix IV of incorporated U.S. Provisional Patent Application No. 62/210,585. The corresponding card 716 is shown in FIG. 26. The widget in the illustrated card is a Date Countdown widget. That is, it provides a counter 791 arranged to show the time remaining until a specified date/time. In the illustrated card 716, the specified event is the Dreamforce conference and the countdown counter 791 is arranged to display the time remaining until the conference begins. For clarity, some of the components in Appendix IV are labeled with reference numbers corresponding to the Figures.

The widget descriptor 118 illustrated in the Appendix IV begins at page 6 of the Appendix and includes a component type 89W (i.e. type widget), a component Id 88W, a component name 84 (i.e., "widget") and a number of attributes 86 (labeled "styles" in the Appendix IV). The widget definition 120 appears on page 8 of the Appendix IV. As seen therein, the widget definition includes a widget ID 121; a widget name 122 (i.e., Date Countdown); a definition (schema) 124 that includes the frame width 127, frame height 128, source identifier (i.e., iframeUrl:) 126 and a set of three parameters 130. The illustrated parameters include the end date 131 (i.e., the date/time that is being counted down to), an optional message 132 and a time zone 133. The time zone 133 indicates the time zone associated with the end date/time. The message 132 is other information to be transmitted to the wedge server. These parameters are used by the widget server to help determine the specific content to be loaded into the iframe reserved for the widget in card 716.

In another particular example, a representative, nonexclusive, widget descriptor suitable for presenting a Pinterest pin may have the following structure:

```
Component Type: Widget                                      (89W)
Component ID: <UUID>                                        (88W)
Component Attributes:                                       (86W)
Widget Type:
    ID: <UUID>                                              (121)
    Name: Pinterest Widget                                  (122)
    Schema:                                                 (124)
        iframeURL: https://pinterest.com/wrap_widget_server/   (126)
        width: #                                            (127)
        height: #                                           (128)
        Parameters:                                         (130)
            PinID: <pin #1>
            PinID: <pin #2>
            *
            *
```

In this example, component is of type widget (89W), and has a universally unique component identifier (88W). Any desired component level styles or other attributes are associated with the component through component attributes 86W. The widget includes a universally unique widget identifier 121 and a name (Pinterest widget) 122. The widget definition 124 includes the source 126 from which the contents associated with the widget are to be obtained from—specifically, the URL https://pinterest.com/wrap_widget_server/ and the parameters 130 to be sent to the widget server. In the example above, the only parameters specifically shown are the Pin Ids of interest. The Pin Ids are used by the widget server to identify the particular Pinterest pin(s) to be transmitted to the wrap. In the illustrated example, two pins are shown although it should be appreciated that any number of pins and/or other relevant parameters may be included.

To illustrate a few additional uses of widgets, consider some features that a retailer might wish to include in a wrap to facilitate transactions. In some circumstance it may be desirable to include a short term "specials" card (e.g., "today's special(s)", this week or month's special(s), the "blue light" special, "clearance" items, etc.). A potential problem with special cards is that the card's contents will become stale relatively quickly. This drawback can be addressed in part by frequently putting out new wraps with fresh content. While wraps with fresh content are usually desirable, older versions of the wrap may still be circulating which doesn't eliminate the problem. Another potential approach would be to periodically update the wrap. This can be accomplished, for example, by updating the wrap (and thus the wrap descriptor) periodically such that a different (i.e., modified) descriptor is delivered in response to the same wrap request (e.g., by clicking on the same cover). However, such an approach is often disfavored and it doesn't solve the problem with respect to copies of the wrap descriptor stored at away from the wrap server.

Another approach is to utilize a widget in the "specials" card. In this example, an iframe is created within the specials card and the contents for the card may be delivered directly to the card at runtime by the merchant's server (e.g., a web server). Thus, the desired content of the specials card can be updated by the merchant at any time simply by updating servers it controls, and such updates are immediately applied to any wrap that is instantiated after the update is made without requiring the generation or use of a new descriptor. When desired, the widget in a "specials" card can be configured as a gallery (i.e., a gallery widget) so that the resulting card has an appearance that is similar to a gallery card. Gallery widgets can also be used to present frequently updated items like catalog items so that it is not necessary to update the wrap each time items are added or deleted (e.g., each time an item is added to or deleted from the catalog).

Transaction Handling Using Widgets

Referring next to FIG. 8A-8H, a widget based approach for in-wrap transaction handling will be described. The illustrated example is a shopping purchase transaction. Although particular card layouts and functionalities are shown and described, it should be appreciated that these features are merely illustrative of a very specific example and that virtually any desired card based functionality and presentation could be provided in their place.

FIG. 8A reproduces the first page of gallery card 316 as shown in FIG. 7F. In this embodiment, trigger 340 is arranged to link the user to another card 321 within the wrap (e.g., wrap 310) rather than to an external web page. Therefore, when the user presses the "Buy Now" button 327 on card 316 (or any other portion associated with trigger 340), the wrap transitions to an associated shopping card 321 as illustrated in FIG. 8B, which facilitates the beginning of the purchase process.

In the embodiment illustrated in FIG. 8B, the card descriptor associated with the shopping card 321 includes a widget descriptor 118 that indicates that the internal frame occupies the entire card. The widget descriptor also identifies the source 126 for the card content—in this case a transaction server. Thus, the entire content of card 321 is dictated by the transaction server. The card may contain links which can then provide new information to be rendered in the internal frame.

In the illustrated embodiment, the content of shopping card 321 contains product information 403, a quantity selector 405, and Add to Cart button 407, a Proceed to Checkout 409 button, a navigational link 411 for continued shopping and a cart icon 413. The product information 403 provides some information about the selected product and may take any suitable form. In the illustrated embodiment, an image and textual description is provided. The quantity selector 405 allows the user to select the number of units of the displayed product that the user would like to purchase. User selection of the Add to Cart 407 button adds the selected item (including the quantity purchased) to a list of purchased items which is graphically indicated to the user by incrementing the number shown in the cart icon 413. This change in cart icon state can be seen by comparing FIG. 8B, which shows the cart icon prior to adding an item to the card and FIG. 8C, which shows the cart after adding an item. Any changes in the card's state, such as updating the quantity 405 and/or the cart 413, would typically be sent back to the transaction server using appropriate APIs, although in other embodiments, such changes can be stored locally in association with the wrap until the purchase process is completed. Navigational link 411 includes the text "Continue Shopping". When selected, the navigational link 411 returns the user to the card 316 from which they began or some other card within the wrap.

To complete a transaction, the user selects the "Proceed to Checkout" button 409. The transaction can then be completed in a number of ways. In some embodiments, selection of Proceed to Checkout triggers a Cul-de-sac to a website at which the transaction is completed (e.g., to the vendor's website or other suitable location). This allows the vendor to make use of their existing purchase transaction infrastructure. However, in other embodiments, it may be desirable to complete the transaction within the widget itself. A representative but nonexclusive widget based approach is described below with reference to FIGS. 8D to 8H.

Figure 8D:
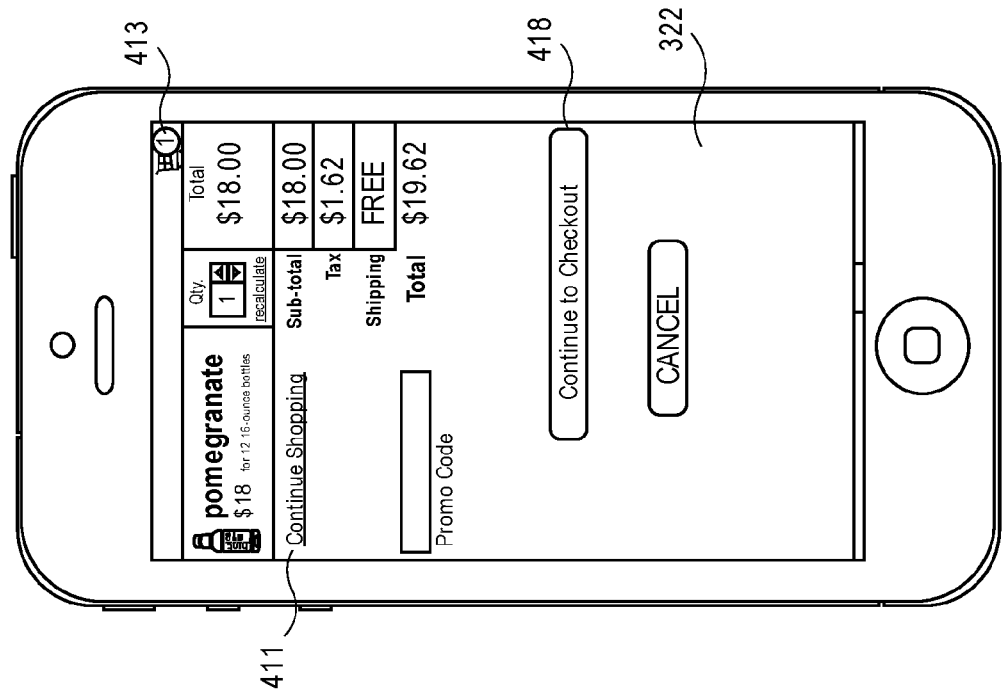
Figure 8C:
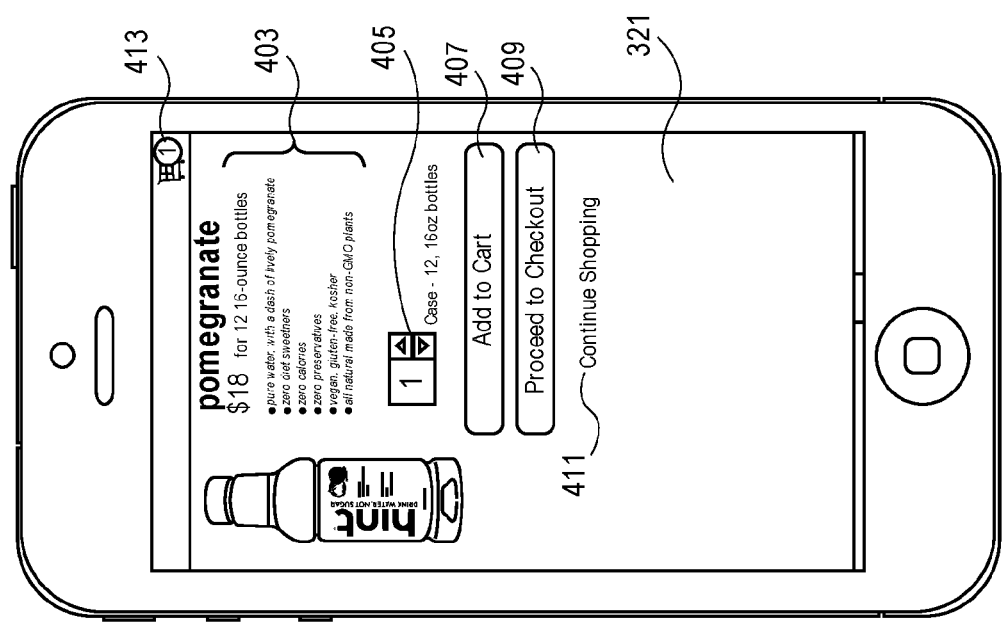

In the illustrated widget based approach, selection of "Proceed to Checkout" button 409 triggers a link that causes the transaction server to serve new content to the iframe which is diagrammatically illustrated as Order Summary frame 322 as shown in FIG. 8D. In the illustrated embodiment, the Order Summary frame 322 summarizes the items in the shopping cart and provides mechanisms by which the user can enter additional information relevant to the purchase (e.g. a Promo Code), cancel the transaction, or return to shopping by selecting button 411.

Figures 8E, 8F:
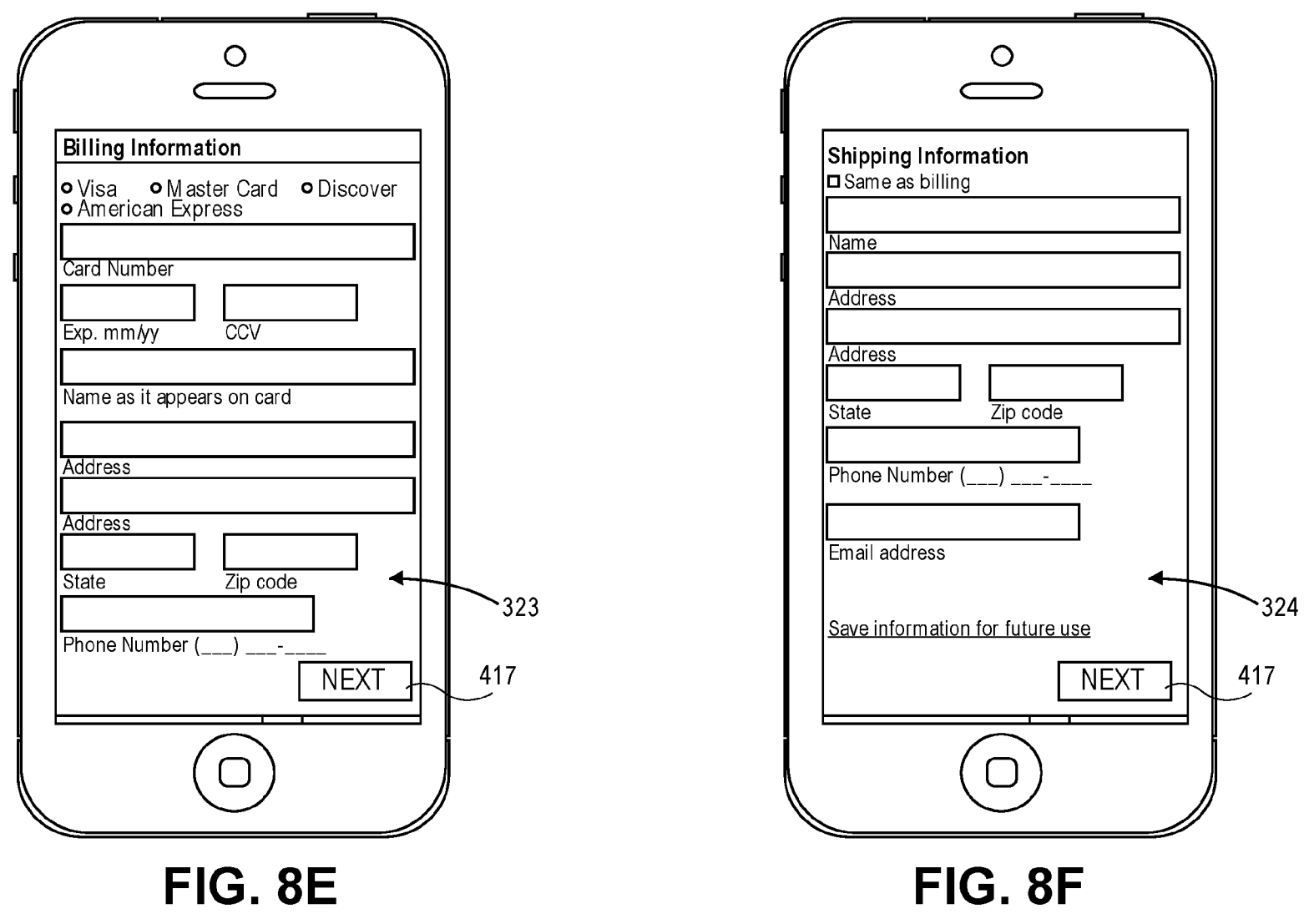

Selection of the "Continue to Checkout" button 418, causes the transaction server to serve new content to the iframe which is illustrated as the Billing Information frame 323 as shown in FIG. 8E. The Billing Information 323 provides text entry boxes for inputting the buyer's billing information. In various embodiments, the information can be entered manually or automatically using an auto-fill function as is well known in the art.

Once the user billing information is entered, the user may continue to the Shipping Information frame 324 seen in FIG. 8F by selecting the "next" icon 417.

Figure 8H:
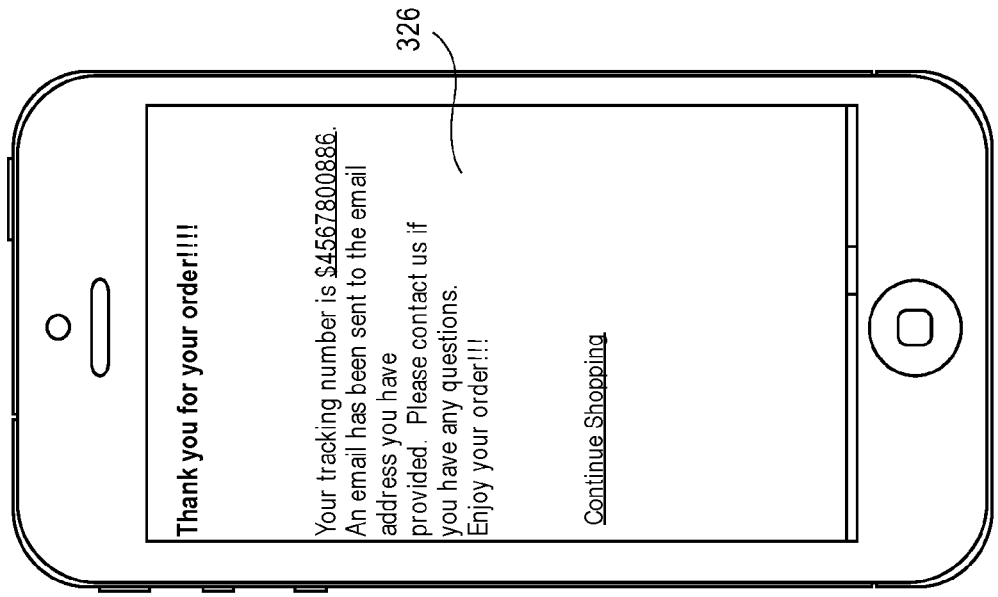
Figure 8G:
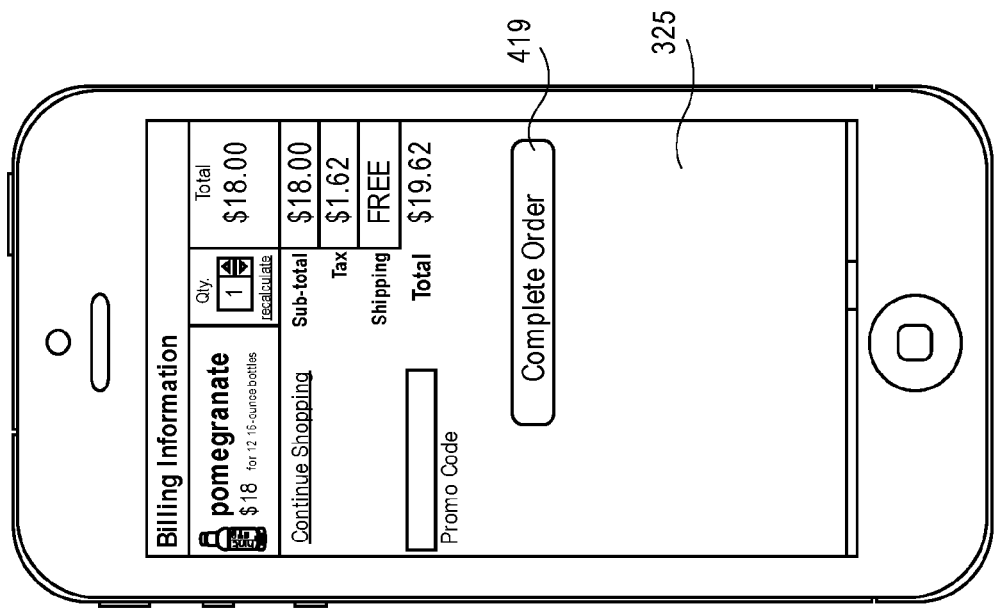

Similarly, once the required shipping information is entered, manually or automatically using auto-fill, into the text entry boxes on the Shipping Information frame 324, then the user may transition to the Purchase Summary frame 325 seen in FIG. 8G. Selecting the "Complete Order" button 419 on Purchase Summary frame 325 commits the purchase, causing the order to be transmitted to the vendor shopping platform where it is processed and a receipt is returned to the user and displayed in Receipt Confirmation frame 326 as seen in FIG. 8H.

In still other implementations, stored user information can be auto-filled into the various frames. It can be imagined that the desired frame sequences may vary significantly based on both the current state of a particular frame and what persistently stored user information is available to the wrap.

The ability of a wrap designer to provide content and functionality directly into a wrap from an external source gives the wrap designers a powerful tool for both updating wrap content and integrating a wide variety of different services into a wrap.

Maintaining State Information

In many circumstances it may be desirable to transitorily or persistently maintain state information associated with a user and/or state information associated with a wrap 10. Some information, such as general information about the user, may be shared state information that is relevant to a number of different wraps. Other state information may be specific to a particular wrap (e.g., a particular user selection or input within a wrap, etc.). Still other relevant state information can be more global state information that is relevant to all instances of a particular wrap independent of the specific user.

State information can be stored in a number of ways and the appropriate storage techniques will vary in part based on the nature of the state information. By way of example, general information about a user and other user specific shared state data can be maintained in a cookie, or when the user has a persistent viewer application, the user state information can be persistently stored locally in association with the viewer application. If desired, any or all of the shared state information can also be stored on the server side. The shared state information may be useful to support a wide variety of different services including: user login and/or authentication; e-commerce applications where the identity, contact info, mailing address, credit card information etc. of the user may be necessary; integration with other applications (e.g. a calendar application, a chat application, etc.); and many other services. User specific shared state information can also be used to affect the navigation within a wrap. For example, user demographic information can be used to determine which card to display next in a set of cards.

There are also a variety of circumstances where it will be desirable to persistently maintain state information about the state of a particular wrap. For example, if a card includes a dialog box that receives a user selection or a textual input, it may be desirable to persistently store such selections/inputs in association with the wrap itself so that such information is available the next time the wrap is opened by the same user (or same device).

In a nonexclusive embodiment, a state descriptor 68 is created and used to maintain state information associated with a particular wrap as illustrated in FIG. 5B. The state descriptor 68 is associated with both a specific wrap and a specific user and thus can be used to store state information relevant to that specific user's interaction with the wrap. When persistent state descriptors are used, the state descriptor 68 may be stored with the wrap on the publication server 22. When the user has a persistent viewer application, the state information can additionally or alternatively be stored locally in association with the viewer application either in the state descriptor form or in other suitable forms. Generally, a state descriptor 68 will include a wrap ID 42 and a user ID that identify the wrap and user that the descriptor is associated with respectively. The state descriptor 68 also stores the relevant state information in association with the card and component IDs for which the state information applies.

In certain embodiments, it may also be desirable to synchronize different instantiations of state information, depending on the where the state information is stored. For example if a user updates their credit card or shipping address information at a publication server 22, then the corresponding state information residing within any particular wraps associated with the user, or within a persistently stored wrap viewer residing on a communication device belonging to the user, would preferably automatically be updated. Conversely, any state information locally updated within a wrap and/or a persistently stored viewer would also selectively be updated in any other instantiations of the state information, such as but not limited to, other wraps, publication servers 22, on a network, or any other remote data processing location for example.

Transaction Handling

Referring again to FIG. 8A-8H, a card based approach for in-wrap transaction handling will be described. The illustrated example is a shopping purchase transaction. Although particular card layouts and functionalities are shown and described, it should be appreciated that these features are merely illustrative of a very specific example and that virtually any desired card based functionality and presentation could be provided in their place. It should be appreciated that the card based approached described herein can be used to create the same appearances as the widget based approach previously described. Thus, the same figures are used for this explanation.

FIG. 8A reproduces the first page of gallery card 316 as shown in FIG. 7F. In this embodiment, trigger 340 is arranged to link the user to another card 321 within the wrap (e.g., wrap 310) rather than to an external web page. Therefore, when the user presses the "Buy Now" button 327 on card 316 (or any other portion associated with trigger 340), the wrap transitions to an associated shopping card 321 as illustrated in FIG. 8B, which facilitates the beginning of the purchase process.

In the embodiment illustrated in FIG. 8B, the shopping card 321 contains product information 403, a quantity selector 405, and Add to Cart button 407, a Proceed to Checkout 409 button, a navigational link 411 for continued shopping and a cart icon 413. The product information 403 provides some information about the selected product and may take any suitable form. In the illustrated embodiment, an image and textual description is provided. The quantity selector 405 allows the user to select the number of units of the displayed product that the user would like to purchase. User selection of the Add to Cart 407 button adds the selected item (including the quantity purchased) to a list of purchased items which is graphically indicated to the user by incrementing the number shown in the cart icon 413. This change in cart icon state can be seen by comparing FIG. 8B, which shows the cart icon prior to adding an item to the card and FIG. 8C, which shows the cart after adding an item. The changes in the card's state would typically be stored locally in association with the wrap until the purchase process is completed, although in other embodiments, such changes can be immediately communicated to a vendor's shopping platform using appropriate APIs. Navigational link 411 is a trigger that includes the text "Continue Shopping". When selected, the navigational link 411 returns the user to the card 316 from which they began or some other card within the wrap.

Selection of "Proceed to Checkout" button 409 causes the wrap to transition to Order Summary Card 322 as shown in FIG. 8D. Alternatively, a left swipe gesture from Shopping Card 321 will also cause the wrap to transition to Order Summary Card 322. In the illustrated embodiment, the Order Summary Card 322 summarizes the items in the shopping cart and provides mechanisms by which the user can enter additional information relevant to the purchase (e.g. a Promo Code), cancel the transaction, or return to shopping by selecting button 411.

Swiping to the left on the Order Summary Card 322, or selection of the "Continue to Checkout" button 418, causes the wrap to transition to the Billing Information Card 323 as shown in FIG. 8E. The Billing Information card 323 provides text entry boxes for inputting the buyer's billing information. In various embodiments, the information can be entered manually or automatically using a auto-fill function as is well known in the art.

Once the user billing information is entered, the user may transition to the next card—Shipping Information Card 324 seen in FIG. 8F by either swiping left or selecting the "next" icon 417.

Similarly, once the required shipping information is entered into the text entry boxes on the Shipping Information Card 324, then the user may transition to the Purchase Summary Card 325 seen in FIG. 8G. Selecting the "Complete Order" button 419 on Purchase Summary Card 325 commits the purchase, causing the order to be transmitted to the vendor shopping platform where it is processed and a receipt is returned to the user and displayed in Receipt Confirmation Card 326 as seen in FIG. 8H.

Each of the user buttons 327, 407, 409, 417, 418, 419 as well as links 411 may be implemented as triggers. In circumstances where the object of the trigger is to link to another card, then the link associated with the triggers is simply the target card. Where other functionality is required, the trigger can initiate the desired action(s) and also link to a target card if appropriate.

It should be appreciated that it may be desirable to define somewhat different card transition behaviors for different cards in the shopping purchase sequence. For example, a left swipe on Receipt Confirmation Card 326 (FIG. 8H) may be arranged to return the user to the card from which the purchase sequence began—i.e., Gallery Card 316 (FIG. 8A) or some other location within the receipt deemed appropriate by the wrap author. It may be desirable for a right swipe on Receipt Confirmation Card 326 to cause a transition back to the Purchase Summary Card 325 but to have the state of the Purchase Summary Card 325 changed to provide an "Order Submitted" message in place of Complete Order button 419.

The desired behavior of Purchase Summary Card 325 may be more complex. For example, when the Purchase Summary Card 325 is in the state shown in FIG. 8G (i.e., the purchase order has not yet been committed), it may be desirable to have a right swipe transition the wrap back to Shipping Information Card 324 and to disable a left swipe since the author may not want to commit a purchase transaction without an affirmative selection of the "Complete Order" button by the user. Conversely, when the Purchase Summary Card 325 is in the "Order Submitted" state (not shown), it may be desirable to allow the user to left swipe back to the Receipt Confirmation Card 326, whereas a right swipe might transition the wrap back to the Gallery Card 316 (FIG. 8A), where the purchase sequence began, or some other predetermined landing card. In still other implementations, the right swipe could be disabled if desired. Regardless of the desired card transitioning behavior, the desired behavior can readily be defined using the behavior definitions described above. Importantly, the behavior definitions can also take the current state of the cards into the account in determining the card transition logic. It should be apparent that any of the described cards can be arranged to interact with vendor e-commerce websites (e.g., Shopify APIs), back-end e-commerce systems, platforms and the like.

In the embodiment illustrated in FIGS. 8A-8H, the purchase of a product is accomplished through a series of sequential cards designed to illicit from the viewer the information necessary to complete the electronic transaction. In an alternative embodiment, the content of these cards, including the various data entry fields, can also be implemented in one or more gallery cards. In such embodiments, the viewer would be required to scroll up and down the gallery card(s) and enter the appropriate information in the displayed data entry fields.

In the illustrated card deck, Order Summary Card 322 and Purchase Summary Card 325 are described as separate cards. It should be appreciated that the functionality of these two cards could be implemented as a single card shown in two different states, with the Order Summary state (e.g., the state shown in FIG. 8D) being shown when purchaser information is still missing and the Purchase Summary state (e.g., the state shown in FIG. 8G) being shown when all needed purchaser information is present.

A potential advantage of using an installed or native wrap package application based viewer is that user information can be securely stored within the viewer and, if desired, automatically associated with the order as appropriate, thereby potentially eliminating the need to render the Billing and Shipping Information Card 323, 324.

In still other implementations, the stored user information can be auto-filled into the various cards. It can be imagined that the desired card sequences may vary significantly based on both the current state of a particular card and what persistently stored user information is available to the wrap. The ability to simply select/declare a desired behavior from a palette of predefined card behaviors give card authors (and template designers) a powerful tool for providing complex card behaviors without requiring the authors to learn or understand the intricacies of card navigation programming. Rather, system designers can define a number of card behaviors that are believed to be useful, and any of those predefined behaviors can be used by the template designers and card authors. If new card behaviors are desired, they can readily be written and added to the card behavior definitions 60.

Serving a Wrap Package

There are a number of items associated with defining and rendering a wrap package. These include the wrap descriptor 40, the wrap runtime viewer 50, the referenced assets 65, and when appropriate, the behavior extensions 62 and/or state descriptor 68. On the wrap server side, these items may be stored in any arrangement that is deemed appropriate for securely delivering the various items in an efficient manner.

Figure 9A:
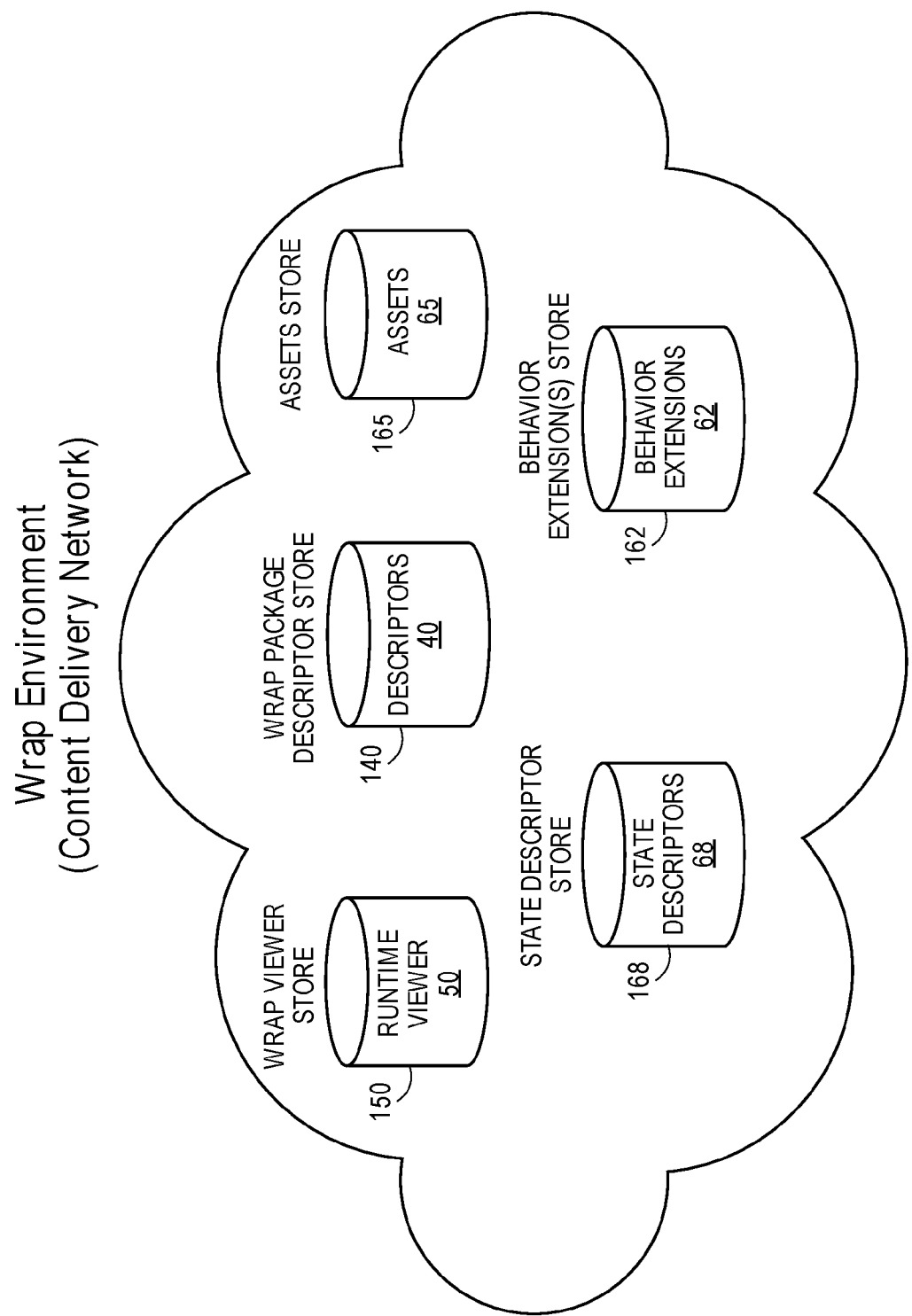
FIG. 9A is a diagrammatic representation of a wrap distribution environment highlighting item stores useful in delivering wrap packages.

Conceptually, the various wrap items may be thought of as being stored separately from one another as illustrated in FIG. 9A. By way of example, these may include one or more of each of: a wrap package descriptor store 140 that stores wrap descriptors 40; a wrap viewer store 150 that stores the runtime viewer(s) 50; a state descriptor store 168 that stores the state descriptors 68, an extensions store 162 that stores extensions 62; and an assets stores store that 165 stores assets 65. In various embodiments, it is understood that the assets 65 used to populate wrap packages 10 may be obtained from any available source and there is no requirement that all of the assets be contained or included in a single store.

Although the various stores are shown separately for emphasis, it should be appreciated that their respective functionalities can be combined into one or more physical store(s) in the same or different locations in any desired manner. Furthermore, each of these store items is discretely cacheable both on the network side and on individual devices.

In non-exclusive implementations, the wrap distribution environment as depicted in FIG. 9A may be configured as a Content Delivery Network (CDN), meaning that servers and stores are deployed at different data centers across the Internet. As a CDN, the wrap distribution environment is preferably optimized to serve various wrap packages to a large numbers of users with minimal delays.

In the wrap descriptor framework described above, much of the actual content of the cards (e.g., assets 65) is maintained outside of the wrap descriptor 40. That is, many, most or all of the wrap package's assets are referenced within the wrap descriptor 40 rather than being stored within the descriptor 40. Thus, the wrap descriptor 40 can be quite small even for large wraps that are rich in media content. As a result, the wrap package (i.e., the wrap descriptor 40) can be quickly downloaded while still providing the viewer with a full description of the entire wrap structure. This separation of assets from the descriptor helps make wrap packages highly portable.

An asset 65 referenced by a card 14 of a wrap 10 assets can be downloaded to the consuming device 12 using any desired scheme. By way of example, in some scenarios, the assets 65 associated with any particular card 14 can be downloaded on an "as needed" basis, only when the card is to be displayed or is expected to soon be displayed. In other scenarios various caching schemes can be use, whereby the assets associated with nearby cards are downloaded while a given card is displayed. In still other scenarios the downloading of some, or all, of the wrap package assets is begun shortly after the wrap descriptor is received and, when necessary, other assets are downloaded on an as needed or other appropriate basis.

Figure 9B:
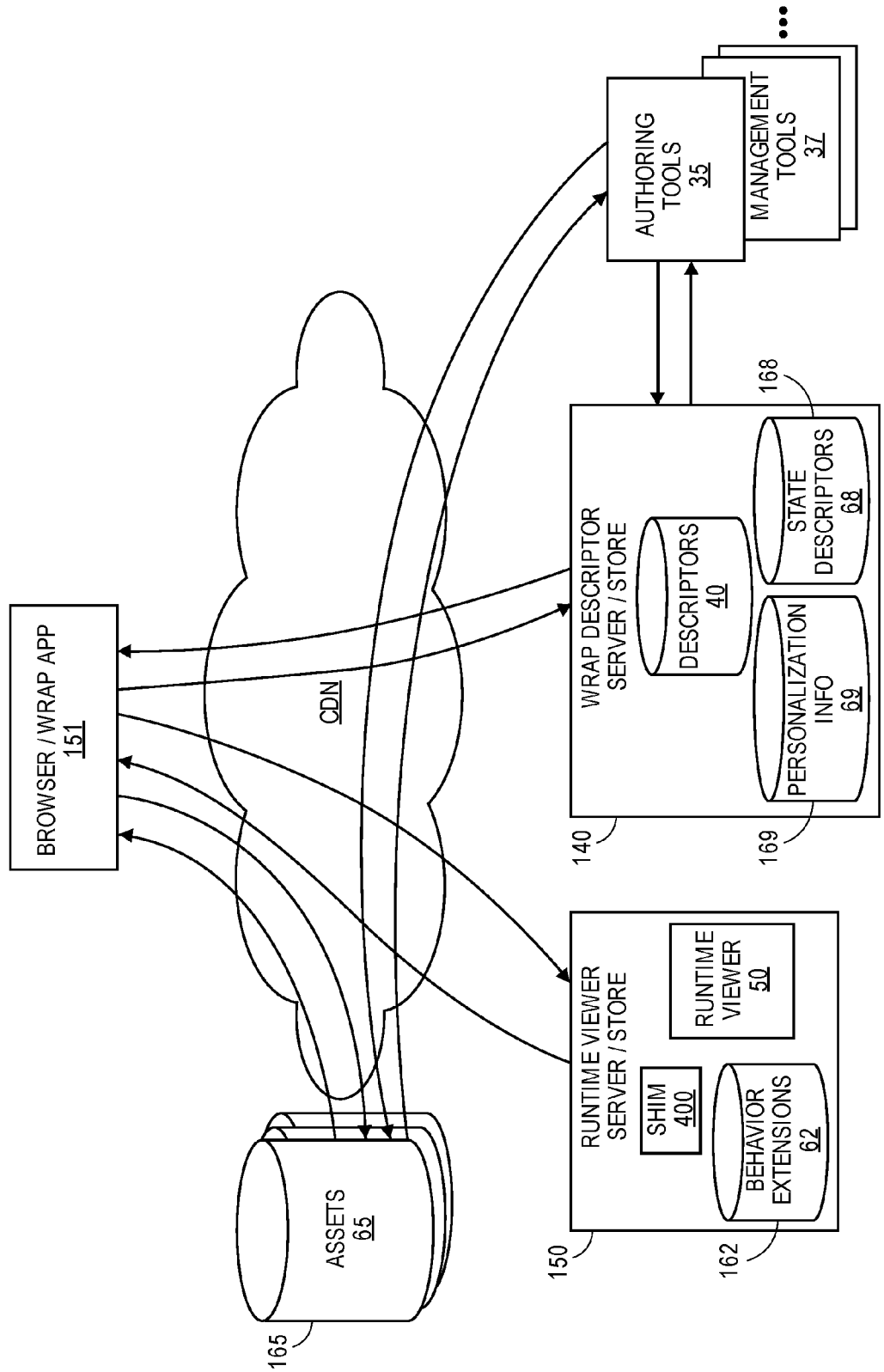
FIG. 9B is a diagrammatic representation of an alternative server/store architecture suitable for delivering wraps.

Referring next to FIG. 9B, another embodiment of an environment for the creation and distribution of wrap packages will be described. The environment includes one or more of each of wrap descriptor server/store 140, runtime viewer server/store 150 and asset stores 165. A browser 151 or runtime viewer app running on a communication device 12 communicates with the server/stores through an appropriate network (e.g., the Internet), which is preferably configured as a content delivery network CDN. The runtime viewer server/store 150 is arranged to store and deliver the runtime viewer 50, a store 162 of extensions 62 and/or a shim 400 (described later) upon request. That is, requests for the runtime viewer 50, extensions 62 and shim 400 are directed towards and fulfilled by the runtime viewer server/store in the illustrated embodiment.

The wrap descriptor server/store 140 is arranged to store and deliver upon request the wrap descriptors 40, state descriptors 68 and any other personalization information 69 relevant to a particular user. Thus, requests for specific wrap descriptors 40, state descriptors 68 and any other personalization information 69 are directed towards and fulfilled by the wrap descriptor server/store 140. The state descriptor store(s) 168 and personalization store(s) 169 may be contained within the wrap descriptor server/store 140. When desired, multiple different wrap descriptors server/stores 140 may be used and/or the state descriptors 68 and/or personalization information 69 can be stored and delivered from other locations.

As previously mentioned, the assets 65 may be stored at a wide variety of different locations as diagrammatically represented by asset stores 165. Wrap authoring tools 35, management tools 37 etc. can also communicate with wrap descriptor server/store 140 and asset stores 165 as appropriate. The authoring tools may access existing wrap descriptors 40 to facilitate new wrap creation, wrap mixing and/or wrap editing (when permitted). The authoring tools would also access the wrap descriptor server/store 140 to upload new wrap descriptors, etc. Similarly, assets stores 65 may be accessed and/or added to as part of the wrap creation process. Similarly various management tools 37 may be arranged to communicate with the various stores to facilitate any desired management, tracking and other functionality.

Figure 10:
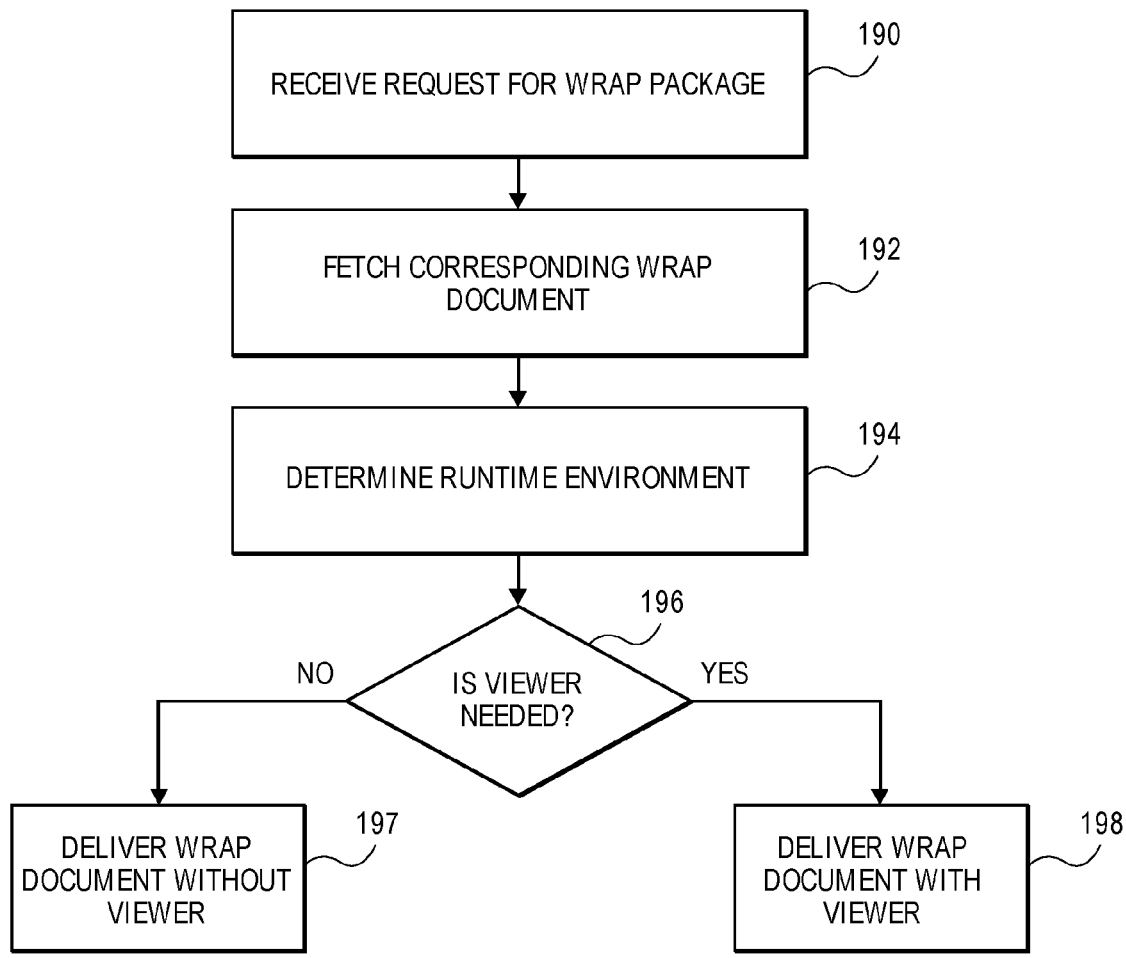
FIG. 10 is a flow chart illustrating a method of delivering a wrap package to a consuming device.

Referring to FIG. 10, a representative process suitable for delivering wrap packages is described. In the illustrated embodiment, a server (e.g., publication server node 22 or runtime viewer server/store 150) initially receives a request for a particular wrap package 10 (step 190). In embodiments in which the wrap ID 42 is a URL, the request can be invoked at a requesting device 12 simply by activating (e.g., clicking on or otherwise selecting) a link that contains or otherwise defines the URL. Thus, the wrap 10 can be accessed from virtually any platform capable of accessing a web link. As previously discussed, a cover that represents the wrap may include the wrap ID URL and thus the request can be invoked by simply clicking on a cover which may be embedded in a web page or an ad served in conjunction with a web page, embedded in a messages, such as an email, a text or SMS message, embedded in a Twitter tweet, or may be included with any other delivery mechanism that supports the embedding of a link.

When the server receives the request it identifies and fetches the desired wrap package 10 based on the wrap ID 42, contained in the target URL (step 192). The server also determines the run-time environment on the requesting device (step 194). This can be accomplished using standard bootstrap queries to the requesting device 12. The determination of the run-time environment will typically include an identification of the type or class of the requesting device 12 and viewing software, such as the operating system of the device 12 and/or a particular browser that the device 12 may be using. For example, the determination would typically ascertain the particular model of the requesting device (e.g., an Apple iPhone 6 Plus, a Samsung Galaxy S4, or other particular smart phone, tablet, laptop computer, desktop computer, smart watch, etc.) and the version of the software (e.g., browser or app) that is making the request, etc., and whether or not the requesting device has an installed wrap viewer or not. Of course, the server can also ask the requesting device for any additional information considered useful.

A determination is also made regarding whether a runtime viewer is already present on the requesting device (step 196). If a suitable viewer is present on the requesting device (e.g., the device has a wrap viewer app installed thereon or a browser based viewer is already present on the device), the requested wrap is delivered without a viewer in step 197.

Alternatively, if a viewer is not present on the device, an appropriate run-time viewer 50 is delivered together with the requested wrap in step 198.

The delivered wrap package 10 is opened and consumed by the user on the device 12 via either a browser operating in cooperation with a wrap viewer 50 or the wrap package app. In either case, the layout of the cards 14 is customized for display on the screen of the requesting device 12. Once opened, the user can view, experience and interact with the wrap package 10 as intended by the author.

Regardless of whether the wrap viewer 50 is already present on the requesting device or is supplied together with the wrap 10, the presentation tools 55 are responsible for rendering the wrap 10 in a format suitable for the requesting device. Thus, when the wrap 10 is rendered, all of the content of the card(s) 14 is preferably arranged to fit on the display screen without the user needing to manually size the screen or scroll through the card, unless the card is specifically designed for scrolling such as may be the case with a gallery type card. This can be done because the presentation tool 55 knows the screen dimensions for the rendering device 12 and selects the presentation that is optimized for the particular display on the requesting device 12.

In a nonexclusive embodiment, the browser based versions of the run-time wrap viewer 50 may be written in a widely accepted format that can be executed by general purpose browsers operating on most any device. By way of example, JavaScript currently works well for this purpose, although other frameworks may be used as well. In some embodiments, the viewer 50 is a general purpose viewer that includes many, most, or all of the viewer tools and behavior definitions 60 that are available in the wrap ecosystem so that virtually any wrap can be viewed and all of its featured implemented using the accompanying viewer. In other embodiments, it may be desirable to provide a more compact viewer that includes a basic set of viewer tools and behavior definitions that is suitable for rendering and interacting with most wraps, or a basic set accompanied by any additional tools/behavior definitions that deemed necessary to render and/or interact with the specific wrap delivered.

It is anticipated that as the popularity of wrap packages increases, more users will install wrap viewers on their devices in the form of mobile apps, applications, browser plug-ins, etc., which is expected to reduce the proportion of wrap requests that require run-time delivery of a browser based viewer.

Figure 11:
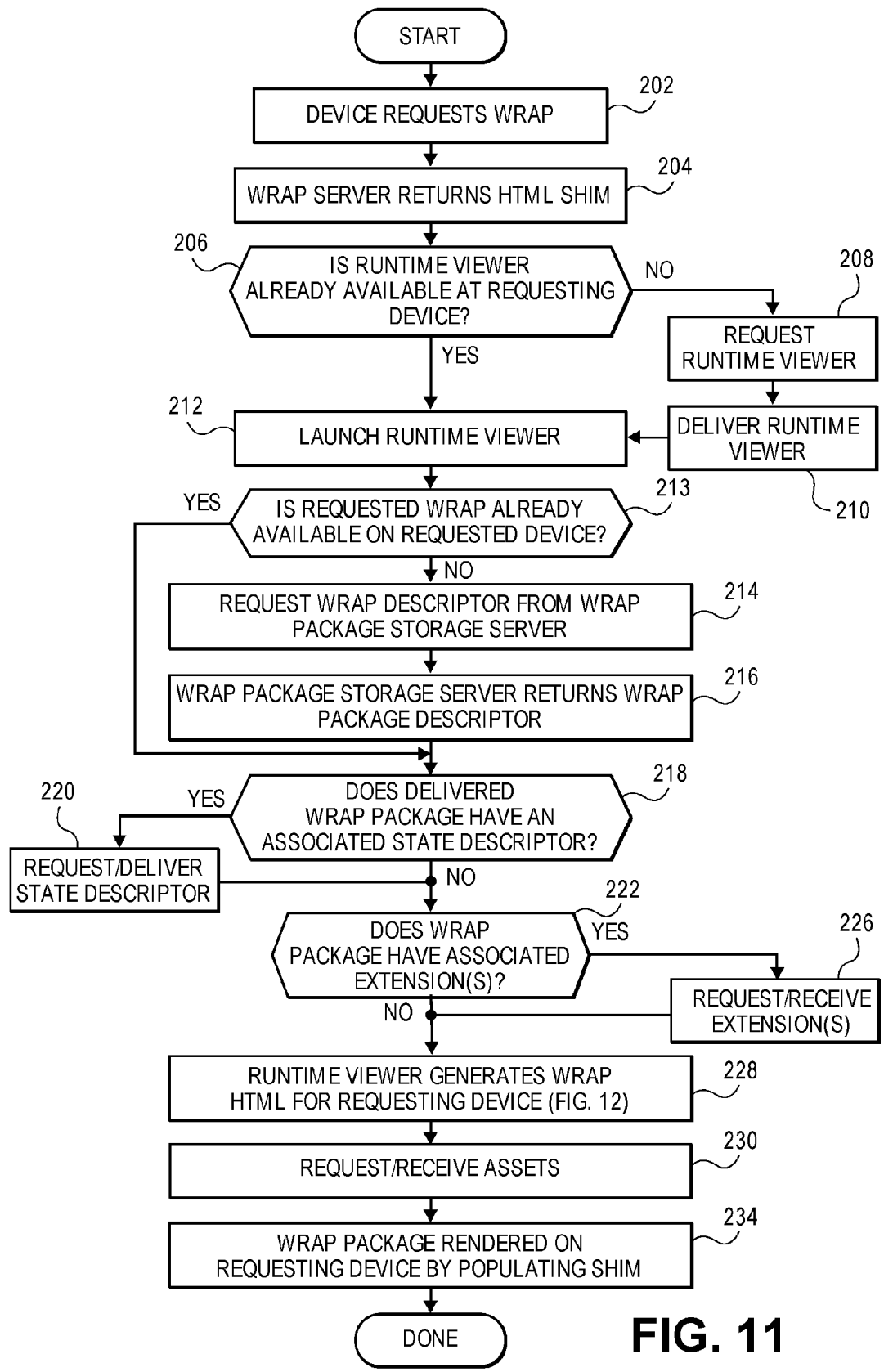
FIG. 11 is a flow chart illustrating a shim based method of delivering a wrap package to a consuming device.

Referring next to FIG. 11, an alternative, browser based process for requesting, delivering and rendering wrap packages will be described. This embodiment is well suited for use with the multi-tier wrap engine architecture of FIG. 9B. In this embodiment, the runtime instance of the wrap package is constructed locally at the requesting device based on the wrap descriptor at runtime. Such an approach may have several potential efficiency related advantages over the process described with respect to FIG. 10 including supporting simpler wrap caching strategies.

Initially, in step 202, a browser 151 on a requesting device 12 requests a particular wrap package 10 using the wrap ID 42. As previously described, in embodiments where the wrap ID 42 is a URL, the request can be invoked at a requesting device 12 simply by activating (e.g., clicking on or otherwise selecting) a link that contains or otherwise defines the URL. Thus, the wrap 10 can be accessed from virtually any platform capable of accessing a link. In the embodiment of FIG. 9B, this request is directed to the runtime viewer server/store 150, although in other embodiments, the same function can be performed by wrap server node 22.

When the runtime viewer server/store 150 (wrap server node) receives the request, it returns a generic HTML shim 400 to the requesting device 12 (step 204) rather than directly returning the requested wrap at this stage. The shim opens into a page (e.g., a blank browser webpage) that will be populated with the wrap and includes scripts suitable for initiating the process of accessing and rendering the requested wrap package 10.

By way of example, FIG. 13 illustrates a nonexclusive embodiment of a shim 400 suitable for use for this purpose. The primary function of the illustrated shim 400 is to provide a mechanism for calling the runtime viewer 50. This is accomplished by script tag 1402 in the illustrated embodiment. Thus, the shim 400 ensures that the requesting device has, or obtains a runtime viewer suitable for handling the wrap before the wrap is actually delivered.

In a non-exclusive embodiment, the shim is implemented in HTML code that is delivered to a browser in step 204 in response to a wrap request 202. As can be seen in FIG. 13, the shim 400 is a highly compact. It includes a script tag 1402, a default page title 1403, a style sheet 1405 that defines the initial layout of the page that will hold the wrap, an icon image 1407, and a div 1409. The script tag 1402 is primarily responsible for requesting the runtime viewer 50. The default page title 1403 is the label that is typically displayed in the browser tab associated with the blank window page that the wrap is opened into (the page title 1403 is simply "wrap" in the illustrated embodiment). The style sheet 1405 defines the layout of the page that is initially displayed, which is essentially blank at the initial stage. In the illustrated embodiment, CSS is used to define the page layout, although any other layout definition that can be interpreted by the browser can be used. The icon image 1407 is an image that some browsers display in the browser tab adjacent the title. The div 1409 causes the browser to allow the runtime viewer to rewrite the DOM for the page starting from that defined div node.

Returning to FIG. 11, the browser that receives the shim 400 will typically handle the runtime viewer request by first checking to see whether an appropriate runtime viewer 50 is already present on the device (step 206). If so, the runtime viewer 50 is launched in step 212. If a suitable runtime viewer is not already present on the requesting device, a suitable viewer is requested and delivered to the requesting device (steps 208/210) and launched by the browser (step 212). In the embodiment of FIG. 9B, the runtime viewer request is also directed to runtime viewer server/store 150.

The downloaded runtime viewer may be written in a format that can be executed by most browsers so that the same generic runtime viewer may be used to view any wrap on virtually any computing device that contains a general purpose browser. By way of example, JavaScript is a dynamic programming language that is currently well supported by most browsers, and is therefore, well suited for use in the runtime viewer. Of course, other now existing of later developed programming languages and frameworks may be used in other embodiments.

Once the runtime viewer 50 launches, it requests the wrap based on the wrap ID 42 used in the initial request. In a non-exclusive embodiment, the request may take the form of WRAPI.WRAP.CO/WRAP/<WrapID>, where <WrapID> is the wrap ID 42. In response, the browser or viewer will typically check to see whether the wrap descriptor 40 corresponding to the wrap ID 42 is available locally (step 213). If not, the wrap descriptor 40 is requested from and returned by the wrap descriptor store 140, as represented by steps 214, 216.

In embodiments where the initial wrap request comes from an executing runtime viewer (as for example from a native viewer app), then there would be no need for steps 204-212 and the initial wrap request 202 would initially check for the requested wrap descriptor locally (step 213) and proceed from there.

Once the wrap descriptor 40 is received, it is processed by the runtime viewer 50 resulting in the construction and rendering of the wrap in the browser page associated with shim 400. Some of the steps performed or caused by the runtime viewer 50 as it processes the wrap descriptor 40 are schematically represented as elements 218-234 in the flow chart of FIG. 11. Although a particular flow is illustrated, it should be appreciated that the described steps are functional in nature and are not necessarily performed in the illustrated order.

While processing the wrap descriptor 42, the runtime viewer 50 determines whether the wrap package 10 has an associated state descriptor 68 (step 218). As discussed above, it is contemplated that many wrap packages will not have an associated state descriptor while others will. A number of mechanisms can be used to indicate the intended/expected presence of a state descriptor 68. By way of example, in some embodiments, the wrap descriptor 42 includes a state descriptor flag (not shown) that indicates whether a state descriptor 68 is intended to be associated with the wrap. In such embodiments, the runtime viewer 50 determines whether to request the state descriptor 68 based on the status of the state descriptor flag. In another example, wraps 10 that require state descriptors 68 may be arranged to simple declare the existence of an associated state descriptor and the runtime viewer may be arranged to request the appropriate state descriptor. If a state descriptor 68 is intended, it is requested and received as diagrammatically represented by step 220. In the embodiment of FIG. 9B, any state descriptor requests are directed to wrap descriptor server/store 140, although they may be directed to wrap server 22 or other suitable stores in other embodiments. Typically, the browser or runtime viewer would first check to see if the state descriptor is cached or stored locally before sending a request to the server.

Another step performed by the runtime viewer 50 is determining if the wrap 10 has any associated behavior extensions 68. As discussed above, the wrap 10 may have a number of associated behaviors. The runtime viewer 50 may internally support many, most or all such behaviors. However, to help keep the runtime viewer 50 relatively compact while supporting a wide variety of functionality, the runtime viewer 50 is configured to support additional extensions 62 that may be utilized to define additional behaviors. Thus in step 222, the runtime viewer 50 determines whether any extensions 62 are needed to properly render the current wrap (step 228). If yes, the needed extensions are requested and retrieved (step 226). There are a number of mechanisms that can be used to trigger the extension request(s). For example, the wrap descriptor 40 may be arranged to identify the needed extensions 62 such that they can be retrieved as a group early in the wrap rendering process. In other embodiments, the extensions 62 may be retrieved on an as needed basis as the descriptor 42 is processed or in any other suitable manner. In still other embodiments, the required extensions 62 (which may be written in JavaScript or other suitable form) may be included as part of the descriptor 42 itself—as for example, in a block after the card descriptors or at the end of the descriptor. In such circumstances there would be no need to separately request the extensions. Regardless of the embodiment used to retrieve the extensions 62, or if no extensions 62 are needed, the runtime viewer 50 generates the HTML for the requesting device 12 in step 228. In the embodiment of FIG. 9B, any extension requests are directed to the runtime viewer server/store 150.

The runtime viewer is arranged to process the wrap descriptor 40 in a manner that generates the HTML appropriate for rendering the wrap on the requesting device (Step 228). This processing is described in more detail below with respect to FIG. 12.

As part of the processing and rendering, the assets 65 associated with the various cards 14 associated with the wrap 10 are retrieved in step 230. In many cases, the assets 65 associated with a particular card will be retrieved as their associated card descriptors are processed during the wrap descriptor processing. However, it should be appreciated that the actual timing of the asset requests may be widely varied. For example, in some circumstances it may be desirable to only download certain assets 65 when the associated card is displayed or just prior to the card being displayed, in accordance within some predetermined caching strategy. In some embodiments, the runtime viewer 50 determines the timing of the asset requests, while in other embodiments, such decisions may be delegated to the browser. As previously discussed, the assets may be stored at a variety of different locations as diagrammatically illustrated as asset stores 165 in the embodiment of FIG. 9B.

As the wrap descriptor is processed, the wrap is rendered on the requesting device by populating the tab or page opened by shim (step 234).

In some circumstances the initial wrap request may come from a runtime viewer that is already open and executing. In such circumstances it may be desirable for the runtime viewer to directly request any needed wrap descriptors from the wrap descriptor storage server (e.g. wrap descriptor store 1040). Such a process would effectively skip described steps 202-212.

Rendering Wrap Packages

Wrap packages are each an abstract, platform-independent data structure containing all the information needed for a wrap runtime engine 50 to render the wrap and facilitate its interaction and behaviors. Although a non-exclusive implementation of the wrap runtime is in the JavaScript programming language for execution within a conventional web browser using HTML, and CSS, the wrap runtime could also be implemented using other languages and technologies specific to different operating systems and devices. Since the runtime engine 50 renders the wrap at the time of consumption, it can optimize the rendering and interface for the device it is running on as well as dynamically generate content based on context.

Figure 12:
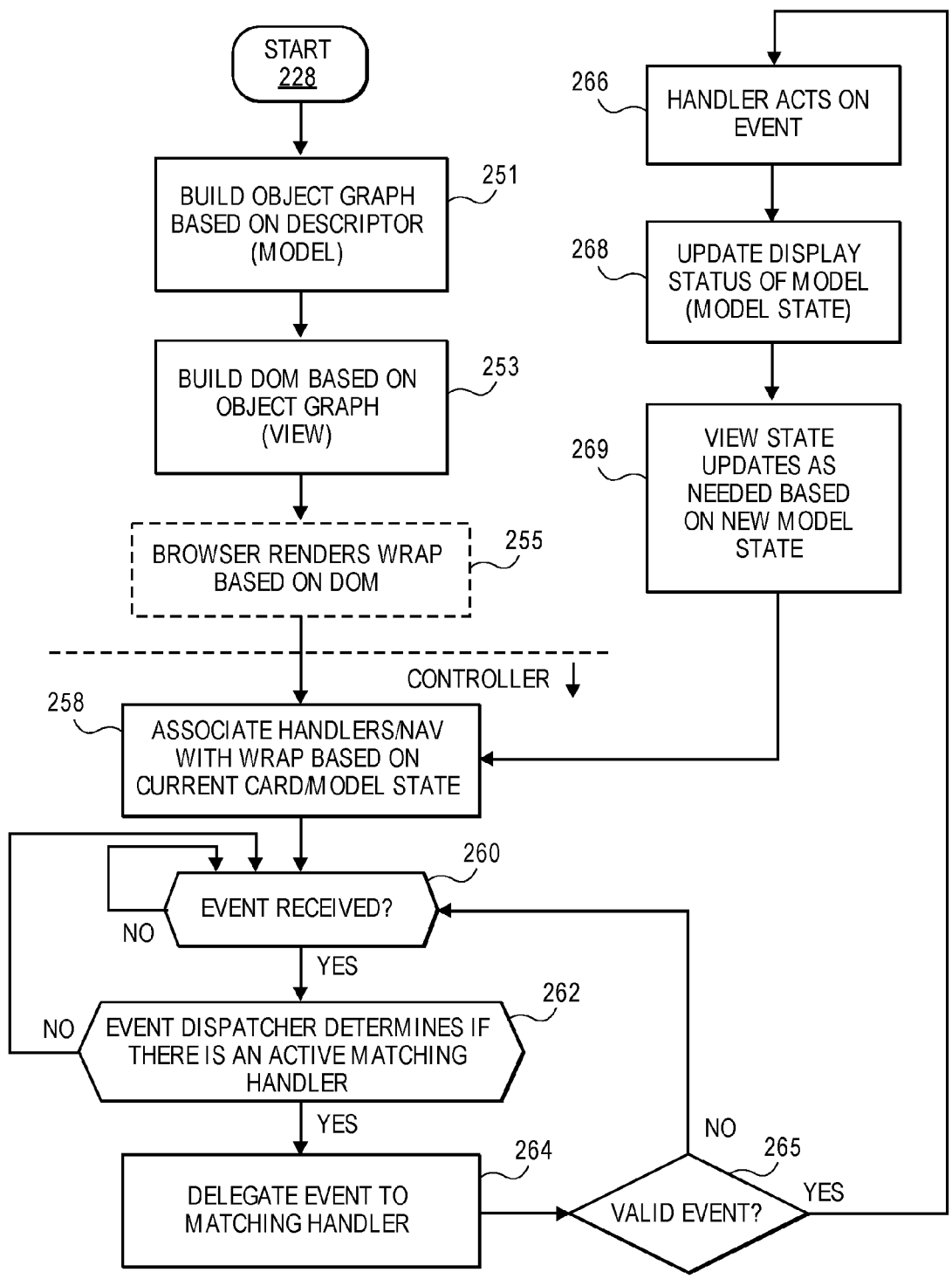
FIG. 12 is a flow chart illustrating a method of generating a view based on a wrap descriptor and updating the view based on user inputs.

Referring next to FIG. 12, a process of generating and updating the view of the wrap 10 during rendering is described. Initially, in step 251, the runtime viewer 50 generates an object graph based on the descriptor 40. The object graph serves as the state model for the wrap. In the illustrated embodiment, the wrap descriptor 40 uses the JSON data format. In general, the object graph is arranged to represent the structure of the wrap document in a manner that: (1) is simpler to transform for presentation; and (2) that makes the behaviors and styling information readily available for the runtime to apply as needed. The object graph can be created using a variety of techniques. As will be appreciated by those familiar with the art, using JSON objects as the wrap descriptors makes runtime generation of the object graph a relatively simple and straightforward task. The JSON object is transformed into JavaScript objects automatically by the runtime. Then straight-forward transformations take place to transform the on-disk representation into a runtime object graph from which it is easier to render the desired views and attach the desired behaviors.

After the object graph has been built, the runtime viewer creates a document object model (DOM) based on the object graph (step 253). The DOM corresponds to the view, and as will be appreciated by those familiar with the art, the DOM is a standard representation that may be used directly by the browser to render the wrap in a conventional manner (step 255). That is, the DOM is an internal representation that can be directly used by the browser to render the wrap.

Once the DOM has been built, the runtime viewer associates the appropriate handlers and navigation tools based on the current model state (step 258). That is, if the first card is displayed, the viewer will associate the event handlers and navigation tools with the wrap that are appropriate for the first card. These include the handlers associated with triggers as previously discussed.

Thereafter, when a user input event is received from a user interacting with the wrap, the appropriate handler processes the received event. This process is diagrammatically represented by the event loop that begins at step 260.

When an event is received at 260, an event dispatcher determines whether there is an active handler that matches the event (step 262). If so, the event is delegated to the matching handler (step 264), which determines whether the event is valid (step 265). If valid, the handler acts on the event (step 266) and updates the display status of the model (i.e., the handler updates the state of the object graph model). In step 268, the view state is then updated as needed based on the new model state. Any time the view state changes, the active handlers are updated as necessary based on the new (i.e., then current) model state (step 269). Thereafter, control is returned back to step 258 and the above process is repeated if a new event is received in step 260.

To give a specific example, consider the navigation behaviors that might be associated with the first card 311 of wrap 310 illustrated in FIG. 7A. In a simple example, the only permitted navigational behavior for card 311 may be a left swipe gesture, which is arranged to flip the displayed to the second card 312 shown in FIG. 7B. In such a case, when the first card 311 is rendered and displayed, the only valid navigational handler associated with the wrap in step 258 would be a left swipe handler arranged to cause the display status of the model to change to the next card 312 of FIG. 7B in response to a left swipe. In this state, the only time the event dispatcher will find an active matching handler is when a left swipe event is detected. Thus when a left swipe is detected, the event dispatcher would delegate the event to the left swipe handler (step 264), which is validated in step 265 and acted upon in step 266 by updating the display status in of the model (i.e., making the next card active—in this case second card 312)—which in turn will cause the view state to update to the second card (step 268) and a new state model in step 269.

As previously discussed, the navigation behaviors for the second card 312 are somewhat different than the navigation behaviors for the first card. The left swipe handler remains the same (i.e., causing a transition to the next card)—however a right swipe is now relevant and will cause a transition to the previous card (i.e., back to the first card 311). Thus, in step 258 and 269, a right swipe handler would be activated when the model state transitions to the second card.

Of course, there may be a wide variety of different handlers that are appropriate for specific cards and/or model states. In some circumstances the same gesture may invoke different behaviors based on the active card or model state. For example, a left swipe gesture made on the last card may invoke an animation that gives the appearance of the card beginning to flip, but then springing back, to graphically suggest that the displayed card is the last card. To facilitate this, a final card left swipe animation handler may be activated when the last card is displayed, whereas the left swipe page transition handler would be deactivated.

The handlers associated with triggers are also particularly important to the wrap environment. For example, selection of a trigger component (e.g., by tapping at any location on a screen within the bounds of a displayed trigger component) may activate the trigger. Of course a wide variety of different events can be used to activate a trigger. In many instances, the events will be user initiated events such as selection or tapping of a trigger through the performance of a selection gesture or based on some other user input. In other circumstance, the activating step may system generated (e.g. an elapsed time, a sensor input that exceeds a threshold, the receipt of a particular message or a very wide range of other potential events).

Once activated, a trigger may exhibit any desired behavior which can be associated with the trigger through appropriate behavior declarations 95. By way of example, if the trigger is a linking trigger, the trigger may initiate a navigational link to another card or wrap, or link to an external webpage once activated using a defined linking behavior (e.g., open in same tab, open in new tab, etc.) Other triggers can have a wide variety of different associated behaviors to support almost any type of application functionality.

Component Model

Figure 14:
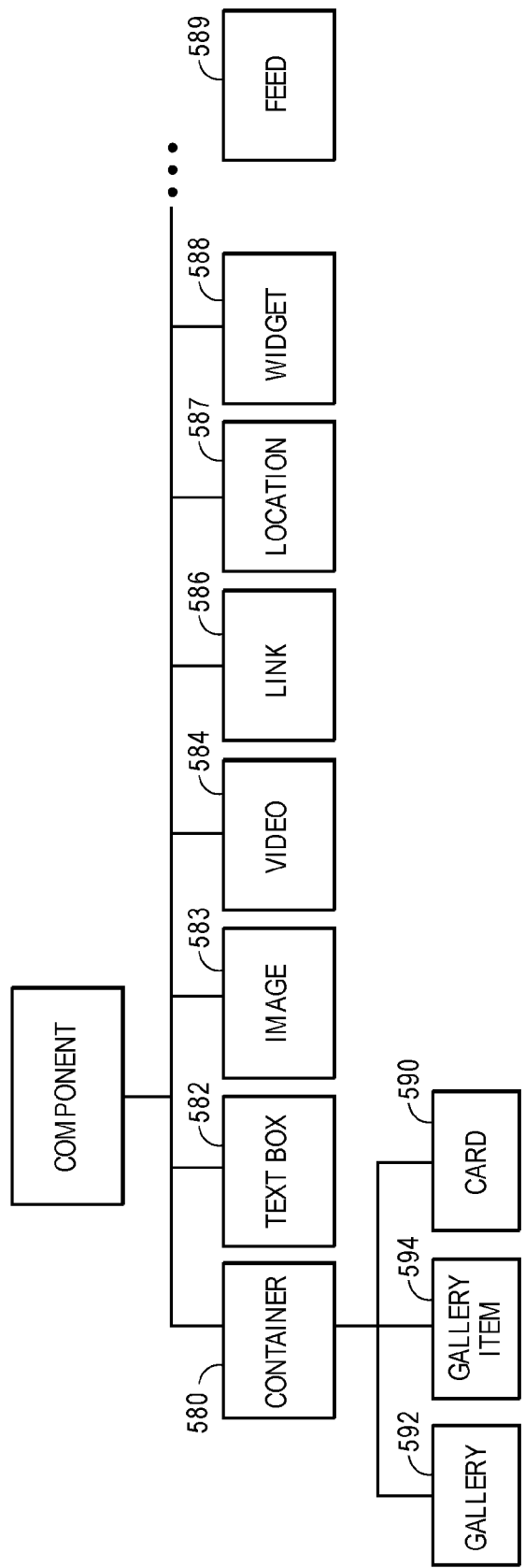
FIG. 14 illustrates a representative wrap component model.

Wraps are composed of a number of different types of components and the wrap runtime has rules for handling the various component types that it is expected (and designed) to encounter. FIG. 14 illustrates a nonexclusive wrap component model suitable for use in the wrap environment. The component types illustrated in the non-exclusive embodiment of FIG. 14 include containers 580, textbox 582, image 583, video 584, link 586, location 587, widget 588 and feed 589. Some of the component types may have subtypes that are handled in different ways. There may be a number of different container types that are handled differently by the runtime. A container component is generally arranged to hold other components and different container types may be used for different purposes. For example, in the illustrated model, three specific container types are shown, specifically card 590, gallery 592 and gallery items 594.

The card container type 590 is the standard card container. As such, the "card" container type 590 has specific dimensions that will be set based on the size of the screen that the wrap (and thus the cards) is/are intended to be rendered on. In the primary described embodiments, standard cards are expected to be rendered in a portrait view that is fully visible on a screen such that scrolling is not necessary to see the entire content of the card. It is expected that in many mobile devices, the card will occupy the full screen (or substantially all of the screen) in a portrait orientation, whereas in devices with landscape or other non-portrait oriented display screens (e.g., most desktop displays, etc), the card would typically not occupy the entire display screen (e.g., desktop and laptop displays). Since the card size will vary with the size of the available display, the runtime has rules that define the card size for any particular wrap instance based on the size and aspect ratio of the target screen. By way of example, one approach to automatically sizing a wrap is described in application Nos. 62/144,083 and 62/191,079 which are both incorporated herein by reference.

It is contemplated that the card's aspect ratio (e.g., the ratio of card height to card width) will typically be maintained the same regardless of the screen size, however, that is not a requirement, and if desired, the runtime can also have rules relating to the card's aspect ratio.

Another container type is gallery 592. As suggested above a gallery is a special type of card that has the ability to scroll multiple frames beyond a single screen. Thus, when the runtime encounters a gallery card container type, it knows to bestow the gallery card with the desired gallery behaviors as previously discussed. Galleries are composed of gallery items and thus another container type is the gallery item 594 which is a component of a gallery. When the runtime encounters a gallery item, it knows it belongs in an associated gallery.

A number of other component types relate to other specific types of content. For example, a textbox component type is arranged to hold text. Typically, the text would be included in-line within the descriptor, although that is not a strict requirement. An image component type is arranged to hold an image and/or photo. Typically, the associated image/photo would be obtained by the runtime using a source identifier (e.g., URL) provided in the image component descriptor. Alternatively, the image/photo could also be provided inline as well. A video component type is arranged to display a video. Like the image, a video is typically obtained by the runtime using a source identifier (e.g., URL) provided in the video component descriptor.

The link component type 586 incorporates is a specialty component that is arranged to link to another location. The link could be an internal link within the wrap, a link to another wrap, a link to a website or other designated location.

The location component 587 is also a specialty component that is arranged to provided GPS or other location functionality, such as maps, driving directions, etc. The location component 587 can be implemented in a number of ways, such as by accessing and inter-operating with a location/GPS app (e.g., Google maps or a similar app) on the device consuming the wrap, by linking to a remote website or other designated location providing such services, or via a widget, as described herein.

The widget component type 588 is used by widgets. As described above widgets are arranged to open an internal frame within the associated card. The content of the internal frame is not defined by the descriptor itself. Rather, the content is supplied by an external source identified in the widget descriptor.

The feed component type 590 is used to create feeds. In various embodiments, the feeds can be either static or dynamic.

Of course a variety of other component types could be added, and some of the above component types can be eliminated, modified or combined. Thus, it should be appreciated that the component type set is extensible so long as the runtime is configured to handle such components or has the ability to obtain the rules appropriate for handling such components when they are encountered.

Global Components

Up to now, wraps 10 have primarily been described in terms of a collection of card descriptors 46. Each card descriptor 46 may include data object(s) representative of one or more components 16 authored or otherwise associated with the corresponding card 14. Together, the one or more components 16 define the structure, content and/or functionality of the corresponding card 14. With this arrangement, individual cards 14 can each be imbued with functionality, content, style(s), attribute(s), trigger(s) and behavior(s) as intended by the author. In most of the examples provided above, the characteristics are card specific. However, when desired, component(s) can also be associated at the wrap level rather than the card level. When applied at the wrap level, a component is herein referred to as a "global" component, meaning the component applies to either all or some designated subset (i.e., two or more) of the cards of the wrap. In other words, the same functionality, content, style(s), attribute(s), trigger(s) and behavior(s) of global component(s) can be applied to be multiple cards 14 of a wrap 10, without requiring the same component(s) 16 to be authored into each card individually.

Figure 28:
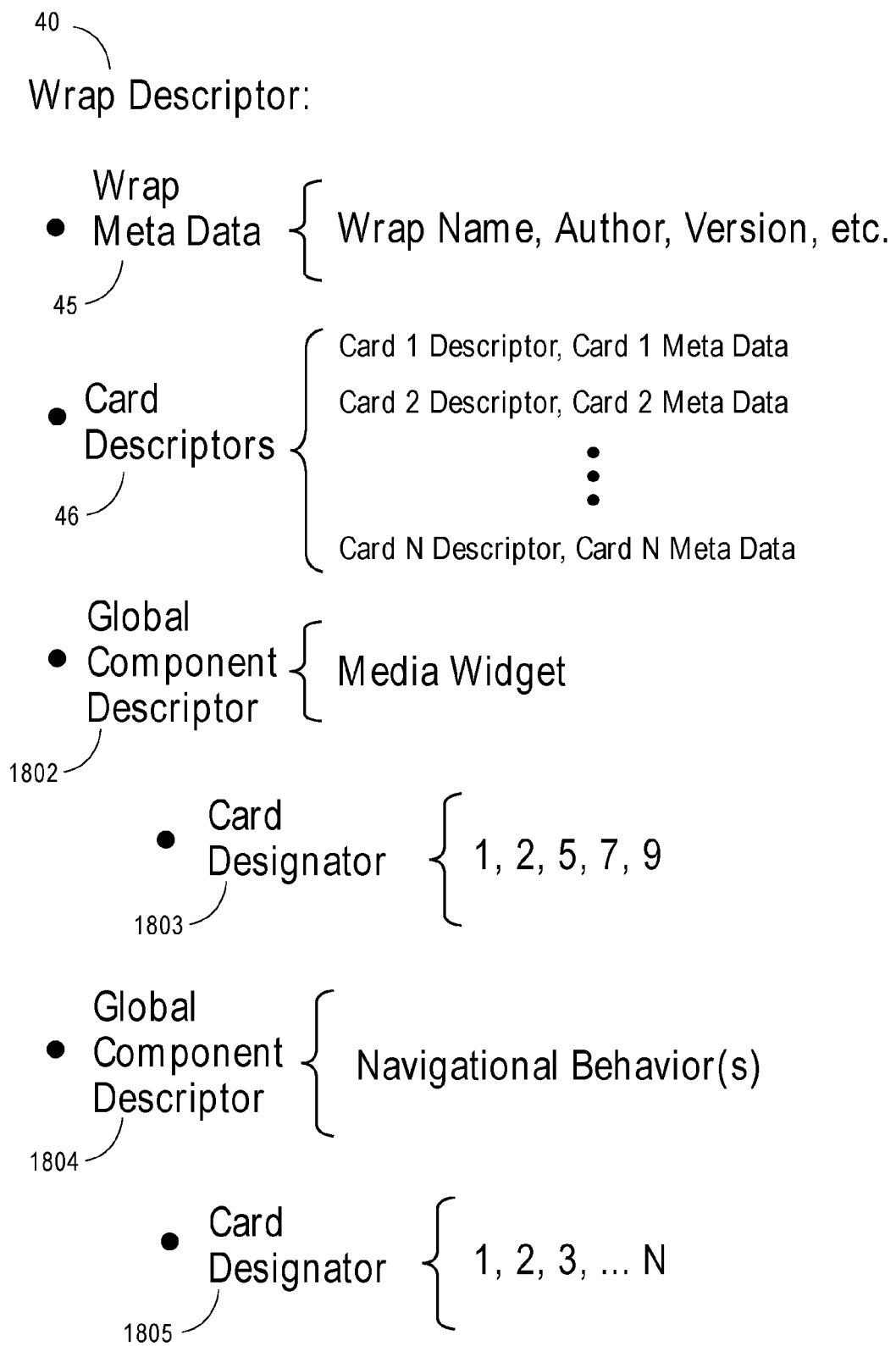
FIG. 28 is a diagram illustrating the hierarchy of a wrap descriptor that includes global components.

Referring to FIG. 28, a representative wrap descriptor 40 with global components for a wrap package 10 is shown. In this non-exclusive embodiment, the wrap descriptor 40 includes wrap meta data 45 (e.g., wrap name, author, version, etc.), a plurality of card descriptors 46 for a collection of N cards 14 respectively, one or more global component descriptors 1802 for specifying a global component, and one or more card designator(s) 1803.

Each card designator 1803 designates the cards 14 of the wrap for which a corresponding global component descriptor 1802 will apply. In many situations, the default setting for a card designator 1803 will be inclusive of all the cards 14 of a wrap 10, meaning the corresponding global component defined by a descriptor 1802 will be associated with all of the cards 14 of the wrap 10. Alternatively, the card designator 1803 may be selectively set to specify only a group or subset of the cards 14 (i.e. two or more), but not all of the cards 14. In this latter case, the global component designated by descriptor 1802 is associated with only those designated cards. In a non-exclusive embodiment, the default may be implicit such that if no card designator is explicitly provided, the global component is applied to all of the cards 14.

Unlike components 16 that are card specific, global components designated by a descriptor 1802 globally imbue specified function(s), content, style(s), attribute(s), trigger(s) and/or behavior(s) to all (or some designated subset) of the cards 14 of the wrap 10, not just an individual card 14.

In the examples provided in FIG. 28, two global components descriptors 1802 are provided. The first is a Media Widget. The second is/are navigational behavior(s). In addition, card designators 1803 are provided for each global component respectively. In each case, the designator specifies either all or some subset of the cards of the wrap the corresponding global components applies. The functionality imbued by the two global components specified herein are described below with regard to the provided examples. Again, it should be understood that these examples are provided for illustrative purposes only and in no way should be construed as limiting.

Most of the component types discussed above with respect to FIG. 14 can be used as global components, although certain component types such as card 590, gallery 592, and gallery item 594 are generally not included as global components because they are typically card-specific. As such, the global component types may include, but are not limited to, containers 580, textbox 582, image/photo 583, video 584, link 586, location 587, widget 588 and feed 589. Although any of the above-listed component type can be used as a global component, in practice global component(s) will often be text, an image, and/or a photo, since an author will most likely want to replicate this type of content within a plurality of cards 14 of a wrap 10. Whatever the type, the global component will appear at the same location, and will have the same style(s) and/or attribute(s), on each card 14, or designated subset of cards 14, of the wrap package. For example, an author of a wrap package 10 may wish to have text and/or a company logo appear at the same location n each card 14 of a wrap.

Although text, images and photos are the likely candidates, the content of global components are by no means limited to just these types of media. On the contrary, any type of media may be designated as a global component, including video and/or audio.

In addition, other types of components may also be designated as global components, such as those used for implementing transactions (i.e., the purchase and/or reservation/booking of goods and/or services), online chats, GPS/location services, or any other app-like functionality that can be embedded or otherwise associated with a single card. In other words, virtually any type of component that can be included in a single card can also be implemented as a global component.

In addition, attributes may be associated with the wrap as a whole rather than with a specific card or component. For example, a navigational behavior can be associated at the wrap level to provide the wrap with a specific or custom navigational behavior.

In the non-exclusive examples provided below, the global component designated by descriptors 1802 include a media widget and certain navigational behavior(s). These examples are provided for illustrative purposes. It should be understood that these specific global components are merely exemplary and in no way should be construed as limiting. In real-world embodiments, a wide variety of global components may be used as discussed above.

A global component media widget may be implemented in a number of different ways. For example, the media widget may be a media player capable of playing audio, music and/or video streamed from a server associated with a specified streaming service (e.g., Pandora, Spotify, a radio station, etc.). Alternatively, the media widget may refer to and access a specific music, audio and/or video file, or a library of the same, such as an iTunes playlist, that may reside either on the same computing device 12 consuming the wrap or a remote location, such as a server. As a global component, regardless of how it is implemented, the media widget enables the functionality of playing of music, audio and/or video content while all (or a designated group) of the cards 14 of the wrap 10 are rendered.

Similarly, navigational behavior global components specify or imbue specified behavior(s) on all (or some designated subset) of the cards 14 of the wrap.

A further explanation of both the global media widget and global navigational behaviors is provided with respect to the non-exclusive examples provided below.

FIG. 29 shows a global media player widget 1808 appearing within all the cards 14 of a wrap package 10. As illustrated, the media player 1808 includes a listing of the name of the artist and song that is playing, audio controls for playing, pausing, jumping forward and backward, volume control, etc. As the widget 1808 is global, the player will appear on all the cards 14 of the wrap 10 during consumption, regardless of the given card 14 that is currently rendered at any given point in time. As a result, the viewer will be able to play access to the media player and control the playback of media from any card 14 in the wrap.

Figure 30A:
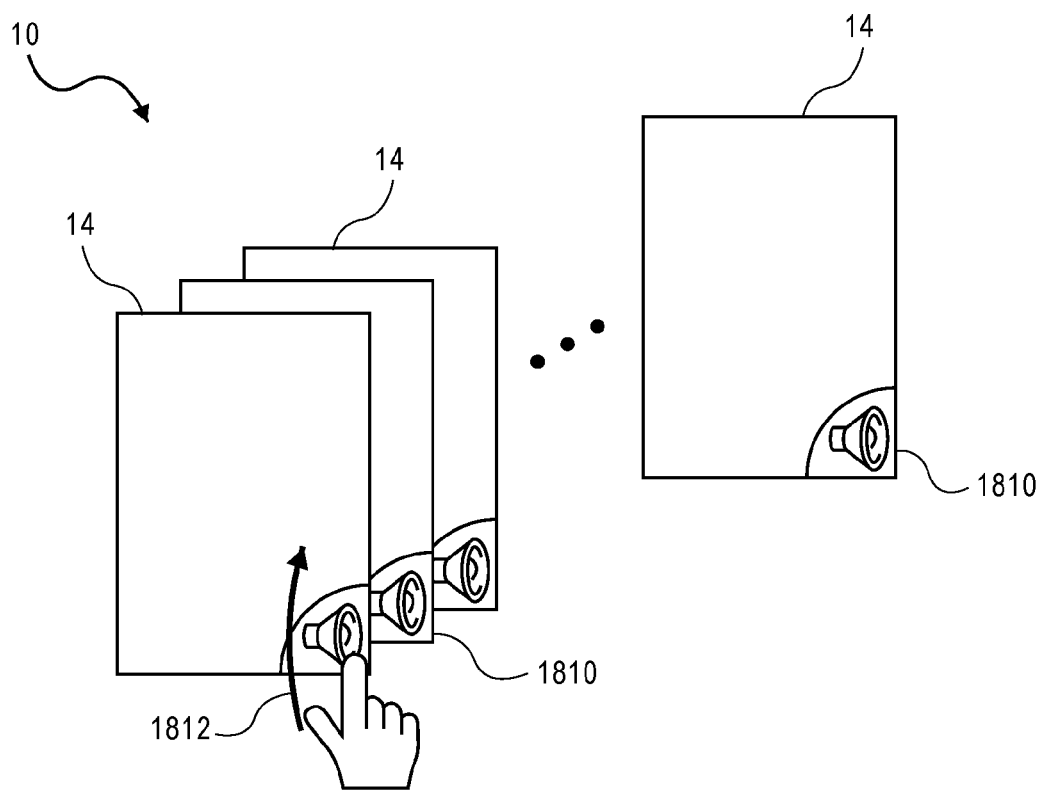
FIG. 30A illustrates a global audio widget appearing within all of the cards of a wrap.
Figure 30B:
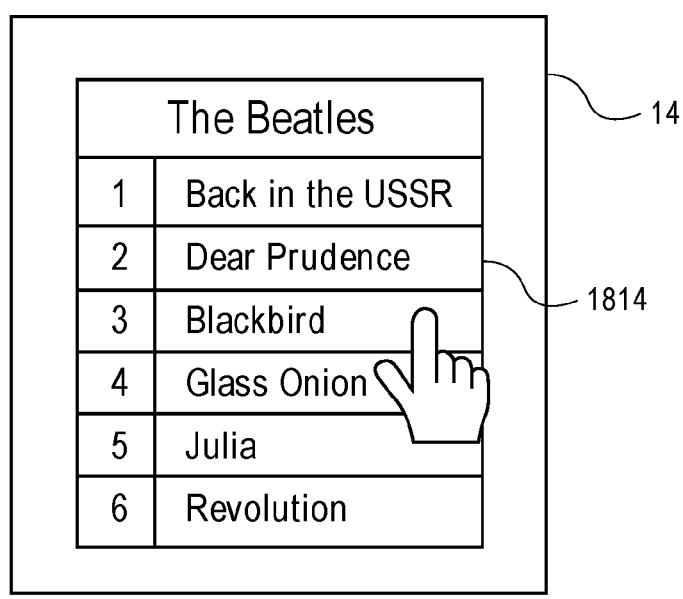
FIG. 30B illustrates a play list overlay associated with the audio widget of FIG. 30A.

FIG. 30A shows a global audio widget 1810 appearing on all of the cards 14 of another wrap package. In this particular example, the audio widget 1810 is an image of a speaker that appears on the lower right corner of each card 14. The global audio widget 1810, in this example, is also imbued with a specific global navigational behavior that is invoked in response to a designated trigger. In this illustrative example, when the audio widget 1810 is swiped upward (as represented by the arrow 1812), regardless of the card 14 that is currently being rendered, a pop-up music playlist 1814 overlay appears on the currently displayed card 14, as shown in FIG. 24B. By selecting a particular song name, the corresponding track will play. In variations of this embodiment, once the pop-up overlay 804 is invoked, it may appear on all of the cards 14 as they are swipe navigated. Alternatively, the pop-up overlay may appear only on the originating card 14 and will go away when a swipe to another card occurs. In the latter case, the viewer would be required to again swipe the audio widget 1810 on another card 14 for the overlay 1814 to again appear.

Figure 31:
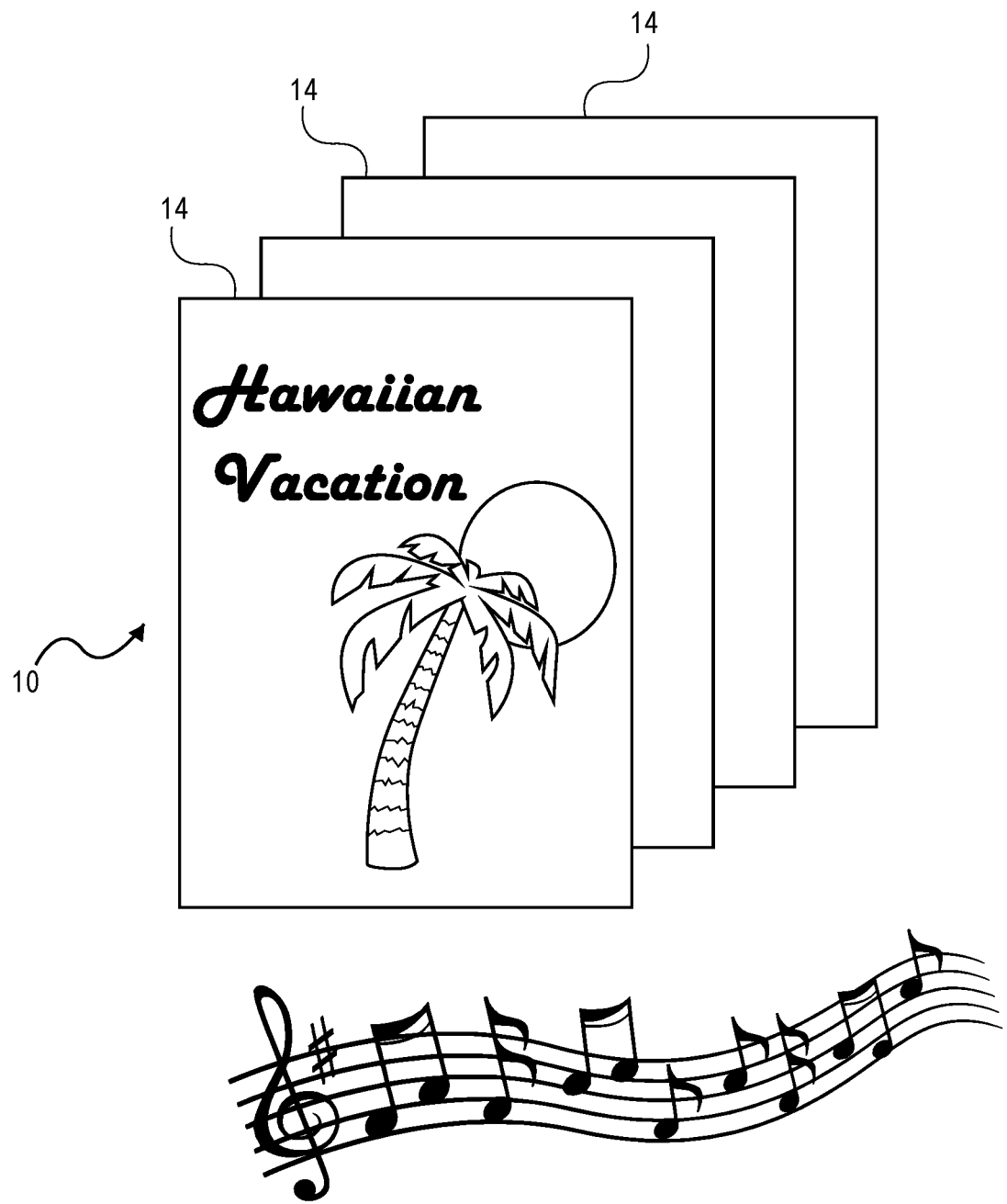
FIG. 31 illustrates a wrap package that includes an alternative global audio widget.

FIG. 31 illustrates another example of a wrap package 10 authored to include a global audio widget that plays audio during consumption, regardless of the given card 14 that is being displayed. In this particular example, the wrap 10 pertains to a promotion for a Hawaiian vacation. When the wrap is consumed, a related audio file (e.g., "theme" music pertaining to the wrap, such as background Hawaiian music in this example) is played. In this particular example, no visual audio player interface is provided as in the previous examples. On the contrary, just the music is played to enhance the viewer experience while consuming the wrap. Since no audio player interface is provided in this example by design, the viewer has minimal control over the playback of the audio, which will play continuously when the wrap is being consumed. In this example, the iframe associated with the widget would typically have no corresponding size and there would be no need to define a position. Thus the height, width and position fields of the widget descriptor can be null or eliminated from the corresponding descriptor.

Figure 32:
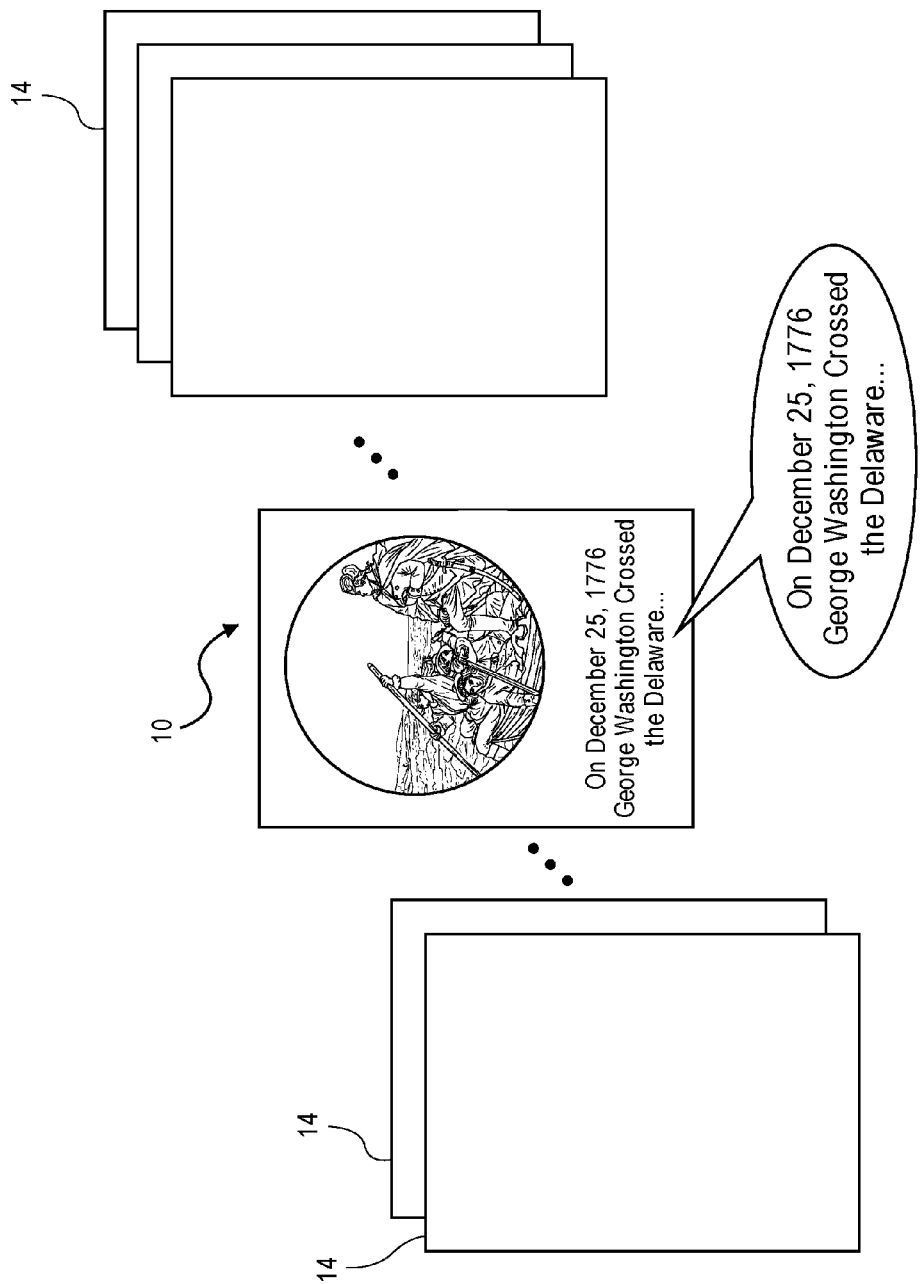
FIG. 32 illustrates a global behavior.

FIG. 32 illustrates yet another example of a global behavior. In this example, the global behavior is the automatic transition, as opposed user-swiping, between the cards 14 in the wrap 10. In one variation of this embodiment, the automatic transition from one card to the next in sequence order may occur at a fixed interval of time (e.g., every 2 or 3 seconds). In an alternative embodiment, an event may cause the automatic transition. For example in FIG. 26, one more card(s) 14 of the wrap 10 includes some text. In this particular example, an audio file narrating the text on each card is played (In the particular card shown, the text regarding George Washington crossing the Delaware River is narrated). When the narration is complete, the transition to the next card is automatically performed. This process is continually repeated until all the cards 14 in the wrap are consumed. With this arrangement, the timing between transitions may vary. For example, if it takes four seconds to narrate the text of one card and ten seconds for the next card, then the transitions will occur in four seconds and ten seconds respectively. As this process is repeated for all of the cards of the wrap, the resulting user experience is analogous to an audio book, with the added benefit of incorporating appropriate images, photos, video, embedded functionality, etc.

With a children's book implemented in a wrap package for example, the various cards can include text that is narrated, as well as images, photos, video and/or animation illustrating the story. As the text of each card is narrated and completed, the transition to the next card automatically occurs. As a result, user experience is multi-sensory, providing a user experience previously not possible.

A wrap package, authored as an audio book, can also be used to market products and/or services. Again, using a children's book as an example, consider the implementation of Disney's story (i.e., Winnie the Pooh) in the form of a wrap package. In addition to the multi-sensory effects as described above, the Winnie the Pooh wrap can also include, for instance, a gallery card for items to be purchased (e.g., stuffed dolls of the main characters, such as Winnie the Pooh, Tigger, Eeyore, etc.) or other promotions such as gift certificates, coupons for Disney merchandise, vacation packages to a Disney resort, etc. In other words, transaction functionality, via a widget, cul-de-sacing, or built into the cards of the wrap itself, can be authored into the wrap. Again, given the unique ability to convey a story in a book-like format, including functionality interwoven with various types of media, wrap packages authored as audio books can provide a marketing and promotional channel previously not possible.

As noted above, the specified source of the audio content for the widget may vary and may include, in alternative embodiments, a streaming music service or a library of music files for example. It should be understood, however, that these examples should in no way be construed as limiting. The type of media and application functionality that can be incorporated into a global widget may widely vary and is limited only by the imagination of the author. Examples include, but are not limited to besides audio and music, video, images, photos, text, transactional widgets for the purchase or reservation/booking or goods or services, online chat widgets, GPS or location widgets, etc.

Gallery Components

Components can also be associated with galleries to create gallery components in substantially the same way that they can be associated with the wrap to serve as global components. That is, a component can be associated with a gallery card 316 instead of being bound to a specific gallery item or being a global component that is associated with multiple cards. When a component is associated with a gallery card, the associated content can be displayed on the gallery card regardless of which gallery item frame is currently shown. As with other components, the specific content associated with a gallery is limited primarily by the imagination of the gallery's author. By way of example, if a gallery shows a number of products from a particular company, an image component associated with the gallery card can be used to display the company logo in a corner of the gallery card so that the logo appears at the same location regardless of which gallery item is currently being viewed.

In other embodiments, gallery item designators can be used to identify specific gallery items that the gallery component is to be associated with. In some implementations, the gallery item designators work substantially the same was as card designators 1803. That is, the gallery item designator may selectively identify a specific subset of gallery items to which the corresponding gallery component will apply. In embodiments that support gallery item designators, the default setting for a gallery designator may be that the gallery component applies to all of the gallery items in the gallery. The default may be implicit such that if no gallery item designator is explicitly provided, the gallery component is applied to all of the gallery items.

In still other embodiments, the content of a gallery level component can be a variable. For example, using the logo analogy, the content of the image component could be a variable "Company_Logo", which obtains the logo of the company whose product is highlighted in the corresponding gallery item. The use of such variables tend to be particularly useful in applications in which the wraps are automatically generated as described in U.S. application Ser. Nos. 14/816,935, 14/816,662 and 14/816,678, all incorporated by reference herein for all purposes. Of course, variables can be used in global components and/or ordinary components as well.

In summary, any component that can be embedded in or otherwise is associated with a card can also be a global component by associating the component at the wrap level rather than the card level. Designator(s) 1803 further provide the ability to flexibly apply a global component to a subset of cards, but not necessarily all the cards, of a wrap. In a similar manner, any component can also be a "gallery" component by associating the component at the gallery level as opposed to the gallery item level. Gallery designator(s) also provide the ability to flexibly apply gallery components to two or more gallery items, but not necessarily all the gallery items of a gallery card.

Runtime Environment

Figure 15:
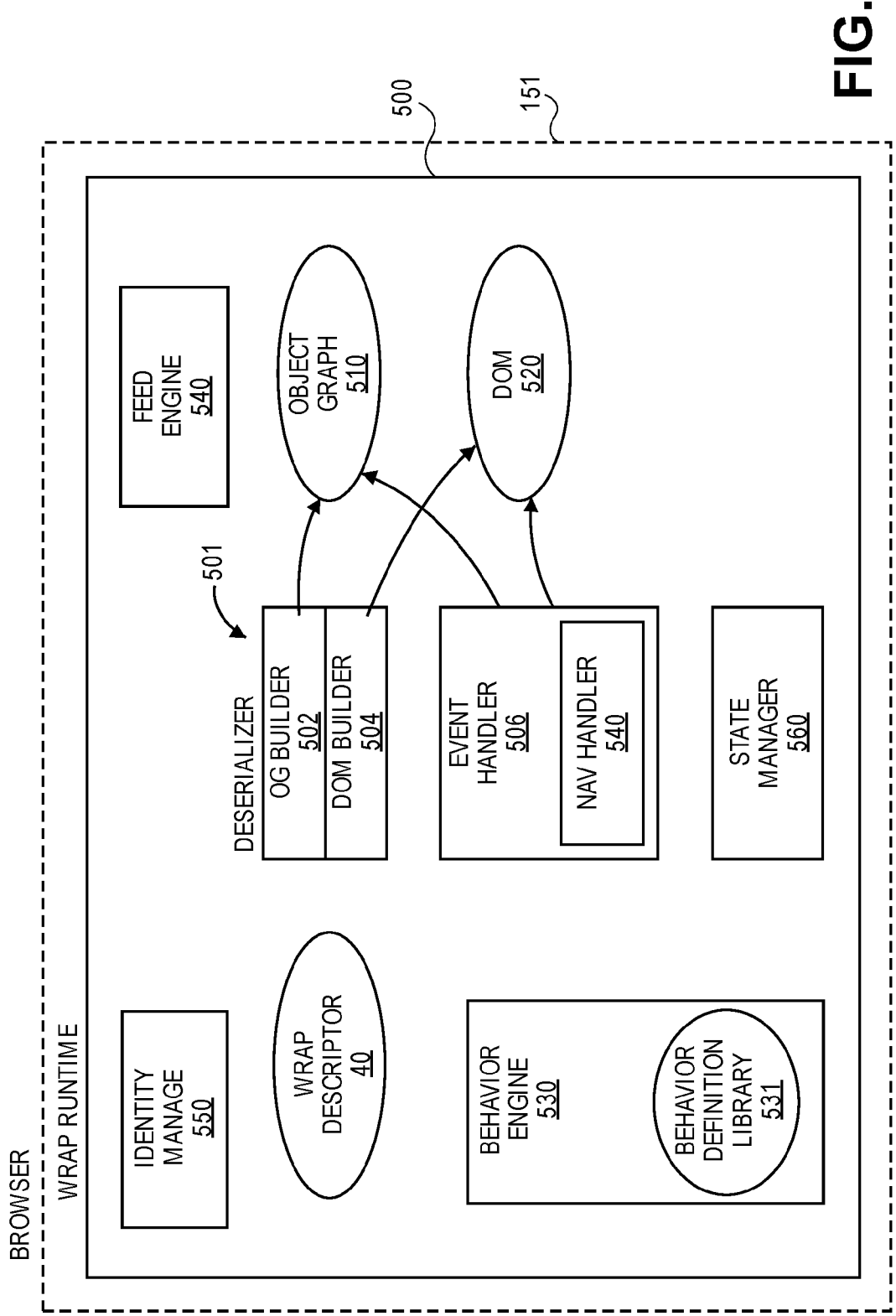
FIG. 15 is a block diagram illustrating various components of an exemplary wrap runtime viewer.

FIG. 15 illustrates representative components of another specific, but nonexclusive embodiment of a runtime viewer 500. The illustrated runtime viewer 500 includes deserializer 501, event handler 506, behavior engine 530, feed engine 540, identity manager 550, and state manager 560.

The deserializer 501 is arranged to transform any given wrap descriptor 40 into a runtime instance of the wrap defined by the descriptor. In essence, the deserializer steps through the wrap descriptor, generates the indicated cards and components, and binds the various attributes (e.g., styles, declared behaviors, etc.) and any referenced assets, feeds etc. with their associated components/cards, etc.

In the illustrated embodiment, the deserializer 501 is shown as functionally including an object graph building module (OG builder) 502 and a DOM building module (DOM builder) 504. The object graph building module 502 is arranged to process a wrap descriptor 40 to create an object graph 510 that binds the various attributes (e.g., styles, declared behaviors, feeds, etc.), referenced assets and anything else declared or referenced in the descriptor with their associated components/cards, and serves as the runtime instance of the wrap. The DOM building module 504 uses the object graph 510, to create a document object model (DOM) 520 that serves as a browser readable instance of the wrap. Although the object graph 502 and the DOM building module 504 are illustrated as discrete components, it should be appreciated that many implementations they would be highly integrated such that they work together to create the object model and the document object model from the wrap descriptor. Since runtime viewer 500 is arranged to create a document object model based runtime instance, it is well suited for execution in a general purpose browser 151—although that is not a requirement. In circumstances where a native runtime viewer is utilized, the viewer may be arranged to render the wrap based on the object graph 510 or based on an alternative final representation of the wrap suitable for the specific platform.

The actual structure of the object graph 510 may vary in accordance with the needs of a particular implementation. By way of example, in the non-exclusive embodiment of FIG. 16, the object graph 510 includes an ordered card list 512, a set of cards definitions 514 and an asset load state tree 515. The card list 512 represents the sequential order of the cards and provides a simple mechanism for supporting linear navigation through the card set. The card list may use a wide variety of different formats. By way of example, a doubly linked list works well in many applications. With this arrangement, other than the first and last cards in the wrap, each card is linked to the previous end next card in the list. Thus the linked list serves as a mechanism for readily identifying the previous and next cards in the wrap which can be used when navigating the wrap. That is, when a swipe is detected, the next or previous card is identified by the linked list for rendering as appropriate based on the swipe direction. The first and last cards include only a single link to the next or preceding card respectively.

The card definition set 514 includes a card definition 517 for each card in the wrap. Each card definition 517 includes all of the component objects of the card and associates all of the relevant characteristics (e.g., assets, styles, behaviors, other attributes, etc.) with the respective component objects and any dependent component objects. If a special item such as a feed descriptor is associated with the component, then the card definition 517 will also include the binding to the associated feed.

Figure 16:
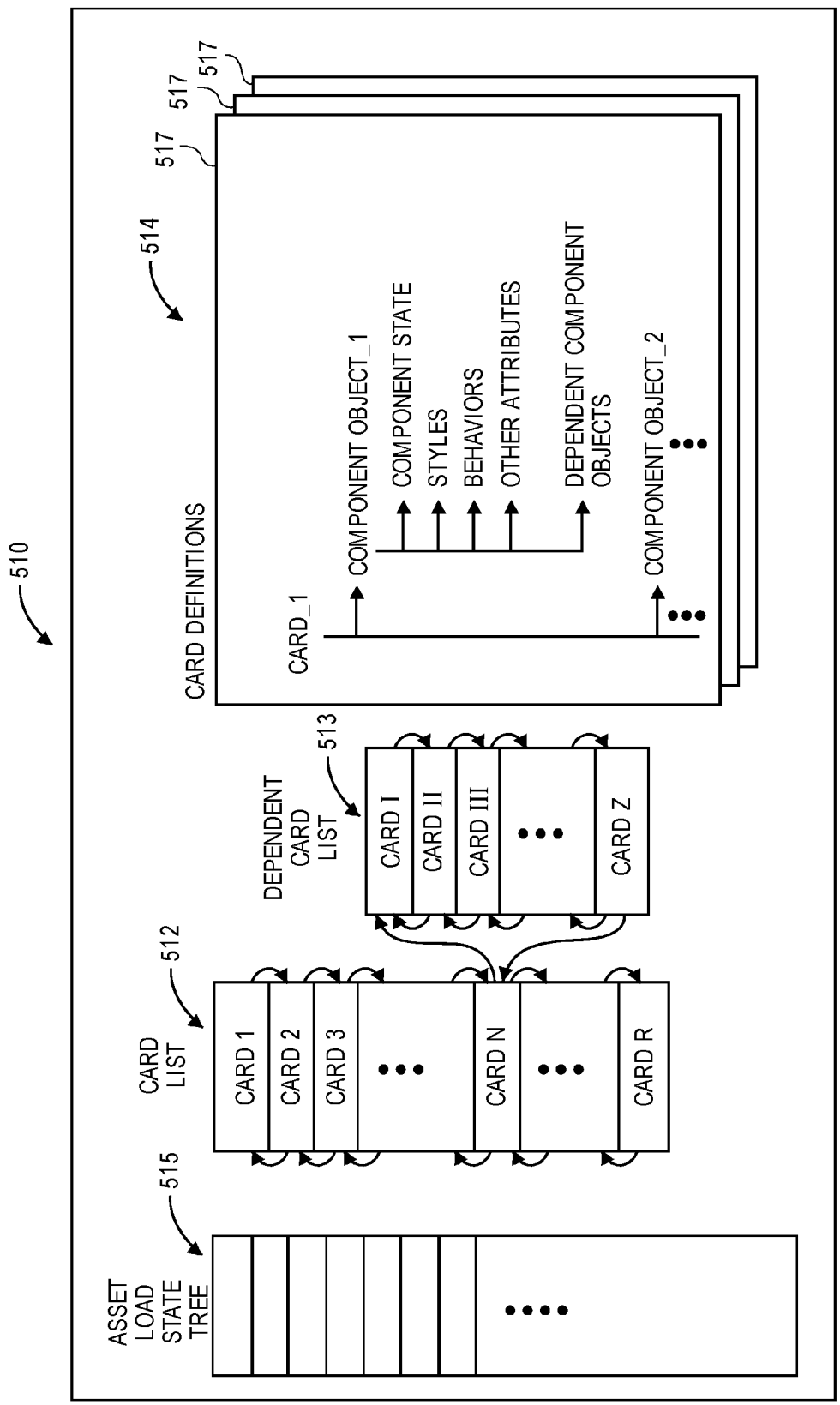
FIG. 16 is a block diagram illustrating various components of an exemplary object graph.

In some circumstances it may be desirable to have a set of one or more cards that are dependent upon a user selection, or an event, that occurs in the context of a particular card. One example of such a circumstance is the purchase transaction described above and illustrated in FIGS. 8A-8H. Specifically, when a user selects the "Buy Now" button 327 on card 316 (FIG. 8A), a set of purchase transaction cards 321-326 (FIGS. 8B-8H) become available, whereas they would not have otherwise been part of the linear wrap sequence. That is, selecting "Buy Now" button 327 causes a transition to card 321 (FIG. 8B)—which would not have otherwise been available to the user by simply swiping left. Once in the purchase transaction card set, the user may navigate within and out of the purchase transaction card set in the same manner that other cards are navigated. One way to facilitate such navigation is to provide a dependent card list 513 within the object graph 510 as illustrated in FIG. 16. The base card (card N) has a pointer to dependent card list 513 that is activated by selection of the "Buy Now" button 327. The last card in dependent card list 513 points back to the base card N (or to any other appropriate card as designated by the wrap designer).

It should be appreciated that the dependent card list 513 can be independent of the specific originating cards such that the same dependent card list can be accessed from multiple cards within card list 512. By way of example, such an approach may be desirable, when multiple cards have "Buy Now" buttons that are intended to access the same check out mechanism. To facilitate returning to multiple different originating cards, the pointers to the originating card may take the form of a variable in the dependent card list with the value of the variable being an identifier for the originating card.

The asset load state tree 515 is a data structure that identifies each asset that is referenced in the wrap descriptor and indicates whether the referenced asset has been loaded into the runtime. In some embodiments, the asset load state tree takes the form of a tree of semaphores. Each time an asset is loaded, the corresponding entry (e.g. semaphore) in the asset load state tree is changed from a "not loaded" state to a "loaded" state. In this way, the runtime can quickly determine whether any given asset is already present, or needs to be retrieved, when rendering a card.

Referring again to FIG. 15, the behavior engine 530 includes a library 531 of behavior definitions 60. In embodiments that support behavior extensions 62, the behavior engine 530 is also arranged to obtain behaviors extensions 62 from one or more external stores as necessary. Thus, when the deserializer 501 encounters a behavior declaration while processing a wrap descriptor 40, the deserializer requests and receives the behavior definition corresponding to the declared behavior from the behavior engine 530. Once a behavior definition has been retrieved, it can optionally be cached or stored persistently in the behavior definition library 531 so that it is available for future use.

The behavior extensions 62 may be arranged as individual behavior definitions or in bundles or packages of behaviors. An advantage of bundling behaviors into packages is that a set of behaviors can be defined that are considered useful for particular functions (e.g., e-commerce functions; supporting reservations, supporting chat sessions, etc.) while keeping the base runtime size small. Then, card template designers can make use of any subset (or all) of the bundled behaviors when designing their templates. This allows the same bundle of behaviors to be used for a wide variety of different cards designed by different authors. To facilitate the use of behavior extension packages, the wrap descriptor or any card descriptor can include an Extension Identifier (not shown) that identifies any behavior extension bundle(s) that is/are used in that particular wrap/card. When the deserializer 501 comes to the Extension Identifier, it notifies the behavior engine 530 of the need for the identified extension package. Optionally, a Downloaded Extension Package List 533 may be maintained by the behavior engine 530 or other appropriate component to provide a readily accessible mechanism for determining whether a particular behavior extension package is already present within the runtime. If the behavior engine 530 does not already have the identified extension package, it requests the identified package form the Runtime Viewer Server, behavior extensions Store 162 or other suitable source.

Any time an extension package is downloaded, the associated behaviors can all be stored in the Behavior Definition Library 531 and the Downloaded Extension Package List 533 (if used) may be updated to reflect the change. Often it will be desirable to cache or persistently store any retrieved behavior extensions within the behavior definition library 531 so that such extensions don't need to be downloaded again the next time the extension is required by another wrap and/or the wrap is rendered in a different session. However, caching or persistent storage is not a requirement and in other embodiments a variety of different extension management techniques can be employed.

As described above, the wrap descriptors 40 may include various types of presentation or styling information, in data structures that define how styles should be associated with the various content. As the deserializer 501 processes the wrap descriptor 40, it stores style information, in the form of CSS class references, and/or literal CSS fragments, in the associated nodes of the object graph 510. Further, wrap descriptors 40 may include complete stylesheets, used to bind the CSS class references mentioned above to the intended presentational rules embodied in those stylesheets. In embodiments that rely on external implementations of HTML and CSS renderers (e.g. the mobile web-based embodiment, and any embodiments that rely on platform provided web views, such as the WebKit web view provided by iOS, Android and other platforms) the binding of CSS classes to stylesheets may be left to the external implementation to render the objects thus annotated. In other embodiments, a separate binding mechanism may be provided to conform the presentation to match the intended presentation rules embodied by the constellation of stylesheets, CSS fragments, and CSS class references contained in the wrap descriptor 40.

In some embodiments, the runtime itself provides baseline stylesheets, used in the rendering of the core runtime user interface components. These stylesheets may also be available to be referenced from CSS classes associated with individual nodes, as described above, to provide standard user interface treatments.

Further, in some embodiments, a standard set of extension stylesheets may be provided for inclusion by reference. In addition, certain extensions (e.g. a chat or shopping cart extension) may provide and load their own stylesheets, to provide standard treatments, or extensible treatments, for the rendering of associated UI elements.

The deserializer 501 has rules for handling all of the different component types supported by the runtime's component model. Thus, as the deserializer steps through the wrap descriptor 40 it creates an object graph 510 that represents the wrap. Each item in the descriptor that is encountered is handled in accordance with the rules. A representative, nonexclusive deserialization process is illustrated in, and described with reference to, FIGS. 12A-12C.

In the example illustrated, when a wrap descriptor 40 is first received, any initial metadata such as the wrap id 42, the wrap name/title 44 and any other relevant information 45 is associated with a new wrap instance as represented by step 802. The deserializer 501 then gets the next item in the wrap descriptor (step 803).

At the wrap level, there are typically only a handful of different types of items that will be encountered during deserialization. By way of example, these include metadata about the wrap as referenced above, cards (e.g., card descriptors 46), global components, and potentially global attributes. Of course the card descriptors 46 may themselves include a wide range of different types of components as well as various attributes (e.g., styles, behaviors, etc.) associated therewith to define the structure, content and functionality of the associated cards respectively.

Referring again to FIG. 12A, if the next item encountered is a new card (as represented by decision 805), then a new card node (which is essentially a blank or empty card definition 517) is created in the object graph 510 and the new card is added to the card list 512 as represented by 806. A corresponding "empty" new card is then created in the DOM (807). After the new card has been created, the associated card descriptor is processed to populate the associated card as represented by flow chart step 808. During the processing of the card descriptor, the deserializer effectively steps through the card descriptor to populate the card with all of the components, attributes and functionality of the card defined by the card descriptor as described in more detail below with reference to FIG. 12B. Once the card descriptor has been deserialized, the logic passes to step 817 where it is determined whether any additional items are present in the wrap descriptor.

At various locations within the present application, we have referred to different types of cards. In some embodiments, the different card types are differentiated primarily by their content. Thus, for example, a gallery card is simply a card that contains one or more gallery item components, a video card is a card that has a video (e.g. YouTube) channel, a checkout card is a card that facilitates a purchase transaction, a feed card is a card that contains a feed component, a widget card is a card that contains a widget component, a location card is a card that has a map/GPS component, etc. Therefore, if the new card is anything other than a standard card, its nature will be defined during the deserialization of its contents and there is no need to differentiate between card types when the card node is first created in the object graph. However, it should be appreciated that in other implementations, different types of card nodes (e.g., standard card nodes, gallery card nodes, video card nodes, checkout card nodes, widget card nodes, location card nodes, etc.) can be created in the object graph based on the type of card that is being created, which may be explicitly defined in the descriptor through the use of card type 73. If desired, the runtime can be arranged to associate specific attributes (e.g., behaviors, functionality, styles, etc.) or even specific components with a new card based on the card type.

Returning to FIG. 12A, if the next item encountered during deserialization isn't a card, but rather is a component that is not associated with any particular card (as represented by decision 810), then the component is understood to be a global component and one or more new corresponding component nodes are created in the object graph. Generally, as discussed above with regard to FIG. 28, a global component can be any type of component that is intended to be applied to multiple (or all of the) cards. There are multiple different ways that a global component can be represented in the object graph 510. In some embodiments, a new component node corresponding to the global component is created in the object graphs card definitions 517 for each of the cards that the global component applies to (step 811). The corresponding components are then created in the DOM (step 812). Thus, if the global component is associated with all of the cards, each of the cards will have a corresponding component node. If the global component is only associated with a subset of the cards, then a corresponding component node is created in each of the cards in that subset. As the global component descriptor is processed, any subcomponents and attributes contained in the global component descriptor are associated with each of the global component nodes in the object graph and DOM as represented by flow chart step 813. Thus, when separate component nodes are created for each of the cards, the global component appears as if it is a component of each of the cards.

Global components may be used for a wide variety of applications and are described in more detail above with regard to FIG. 28 through FIG. 32. By way of example, one use case for a global component may be a logo that the wrap creator desires to associate with every card in a wrap. Since the global component applies to multiple cards, it is often desirable for the global component to be positioned after the card descriptors in the wrap descriptor. However that is not a requirement.

In an alternative embodiment, a single node may be created for the global component in the object graph and DOM. Such an approach may be preferred in certain circumstances such as when it is desirable for the global component to appear as an overlay for all of the cards in the wrap. In such a circumstance, the runtime can optionally be arranged to display the overlay in the same location as the user is flipping between cards.

Regardless of which approach is taken, after the global component has been processed, the logic proceeds to step 817 where it is determined whether there are additional items in the wrap descriptor.

In some circumstances it may be desirable to associate certain attributes (e.g., styles or behaviors) with the entire wrap as opposed to simply a particular card or component. An example use case of an attribute applied to the wrap might be a custom card transition behavior. For example, if the standard card transition behavior graphically mimics the appearance of the current card flipping to the side like a page would flip in a book, a custom card transition behavior might graphically mimic the current card sliding to the side from the top of a deck rather than "flipping." An example of a global style attribute might be a particular font or theme color that is intended to be used throughout the wrap. Of course, these are merely examples and the behaviors and other attributes that may be associated at the wrap level is limited primarily by the imagination of the wrap authors.

Returning to FIG. 12A, if the next item encountered during deserialization is a attribute (e.g., a style, behavior, etc.) that is associated with the wrap generally rather than any particular card or component (as represented by decision 814), then the attribute is understood to be a global attribute and is associated with multiple or all of the cards as defined by the descriptor as represented by processing step 815.

It should be appreciated that the described wrap descriptor architecture is readily extensible. Therefore, other types of containers, components or functionality can be defined/added at any time. Therefore, if the next item in the wrap descriptor is any other type of item supported by the runtime viewer, then the item is processed appropriately as represented by step 816.

After the processing of any particular item has been completed, the next item is obtained and the process repeated thereby effectively stepping through the wrap descriptor until the entire wrap descriptor has been deserialized. This process of stepping through the descriptor is represented in the flow chart by determination 817 which functionally asks whether the wrap descriptor contains any additional items not yet processed. If so, the logic returns to step 803 where the next item is obtained and then processed in the same manner described. When the entire wrap descriptor has been processed (i.e., there are no additional items to the processed), the deserialization of the wrap descriptor is completed.

The deserializer 501 processes (deserializes) the card descriptors 46 by stepping through the card descriptor in substantially the same way. One representative card deserialization process (step 808 from FIG. 12A) is described next with reference to FIGS. 12B and 12C.

In the example illustrated, once a card node has been created in the object graph, any card metadata such as the card id 71, the card name/title 72, the card type and/or any other relevant information is associated with the card node as represented by step 818. The deserializer 501 then gets the next item in the card descriptor (step 819).

The card defined by the card descriptor may be composed of a wide variety of different components. For example, if the next item encountered is a text box component (as represented by decision 820), then a new text box object is created in the associated card definition 517 in the object graph 510 (as represented by 821). The container or sub-container that the text box object belongs to is implicit based on the descriptor structure. That is, when the text box is presented as a component of the card descriptor, then the text box is associated with the card. Alternatively, if the text box is presented as a component of the wrap outside of the bounds of any particular card descriptor, then it would be considered a global text box. Still further, if the text box is presented as a part of a gallery item descriptor or other component, then the text box would be associated with that gallery item or other component.

After the text box object has been created in the object graph, a corresponding new text box is created in the DOM (822). Typically, although not a requirement, the text intended to populate the text box will be included in-line within the descriptor. Thus, the appropriate text is inserted directly into the text box object in both the object graph and the DOM.

In many circumstances a component (such as the text box or other type of component) will have one or more associated attributes (e.g. one or more styles, behaviors, etc.) and/or it may include one or more subcomponents. Thus, after the component has been "created" in the object and DOM, the deserializer processes any attributes or subcomponents associated with the component as defined by the component descriptor. This process will be described below with respect to FIG. 12C and is represented in the flow chart of FIG. 12B by the element labeled "Go To 870 FIG. 12C".

There are, of course, many types of components that may be included in a card other than text boxes. If the next item encountered during deserialization of a card descriptor is an image component (e.g., an image or photo as represented by decision 825), then a corresponding image object is created in the associated card definition 517 in the object graph 510 (as represented by 826). Like with other components, the container or sub-container that the image object belongs to is implicit based on the descriptor structure. A corresponding image object is then created in the DOM (827). Typically, the actual image asset of interest is identified by reference in the descriptor rather than being included in-line. For example, the descriptor may contain a URL from which the image asset can be obtained. Therefore, the deserializer adds an entry corresponding to the new image asset to the asset load state tree 515—and sets the entry to the "not loaded" state. At some point, the image asset is requested from its source (step 828). The actual request can be generated directly by the deserializer, or it can be delegated to a different routine. In browser based runtime viewers, responsibility for the actual request may be delegated to the browser. Thus, the actual image request will often not be part of the deserialization process, which is why the image request step 828 is shown in a dashed box in FIG. 12B.

After the image object has been added to the object graph 510 and DOM, the deserializer 501 processes the remainder of the image component descriptor as described below with respect to FIG. 12C. Thereafter the deserializer moves on to the next item without waiting for the image asset to actually be retrieved. The ability to continue processing the descriptor while assets are being retrieved can greatly enhance the speed at which wraps can be rendered at runtime.

Referring again to FIG. 12B, if the next item encountered is a video component (as represented by decision 830), then a corresponding video object is created in the associated card definition 517 in the object graph 510 (as represented by 831). A corresponding video object is then created in the DOM (832). Videos are generally not stored in-line within the descriptor. Thus, like images, the actual video asset of interest is identified by reference in the descriptor. Therefore, the deserializer handles the video in much the same way as described above with respect to images. Accordingly, an entry corresponding to the new video asset is added to the asset load state tree 515—and the entry is set to the "not loaded" state. The video is then requested (833) at the appropriate time based on the runtime's or browser asset request rules. After the video object has been added to the object graph 510 and DOM, the deserializer 501 processes the remainder of the video component descriptor in the same manner that other component descriptors are handled as described with respect to FIG. 12C. Thereafter the deserializer moves on to the next item without waiting for the video asset to actually be retrieved.

It should be appreciated that the actual requests to download referenced assets (e.g., images, videos, etc.) can be managed quite separately from the deserialization process. In some circumstances it may be desirable to request all referenced assets (images, videos, etc) as soon as they are encountered by the deserializer. In other circumstances, it may be desirable to manage the asset request in accordance with other asset request rule. For example, since videos typically require much more resources than images, it may be desirable to request images immediately or first, while waiting to a later time to request videos. The later time could be: (i) after some or all other reference items have been received; (ii) when the video card is actually rendered or is within some predefined distance (e.g. one or two cards) from the active card; when a user hits "play"; or any other time determined to be suitable by the runtime developer. In still other embodiments, the wrap template designer could be given some level of control over the download request order. In still other circumstances, a browser based runtime may delegate the requests to the browser so that the runtime has little direct control over the timing of the requests.

Referring again to FIG. 12B, if the next item encountered is a widget (as represented by decision 835), then a corresponding widget object is created in the associated card definition 517 in the object graph 510 (as represented by 836). A corresponding internal frame (e.g., an iframe) is then created in the DOM (837). A call is also sent to the source indicated in the widget descriptor to obtain the content for the iframe (838). As previously discussed, the call will often contain parameters to be passed to the source. When desired, the widget calls can be handled in a manner similar to the image or video asset requests discussed above, including inclusion in the asset load state list. However, in other embodiments, it may be desirable to handle widgets in a different way or to provide different classes of widgets that are handled in different ways. For example, in many implementations it may be appropriate to download the widget content when the wrap is instantiated. However, in other situations it may be more appropriate to request the widget content only when the user opens the associated card or activates a trigger. Regardless of the approach that is taken to populate the widget with content, after the widget object has been added to the object graph 510 and DOM, the deserializer 501 processes the remainder of the widget descriptor as described below with respect to FIG. 12C. Thereafter the deserializer moves on to the next item without waiting for the widget content to actually be retrieved.

In some browser based embodiments, it may be desirable to add an invisible event catching layer in front of the widget as described below in the more detailed description of widgets at runtime. In such implementations, an empty container/frame is also added to the object graph in step 836. The event catching layer having the same size and position as the widget and is arranged to appear in front of the widget to ensure that any user inputs that occur over the widget can be caught by the runtime. A corresponding frame (e.g., an HTML div element) would then be added to the DOM as part of step 837.

Referring again to FIG. 12B, if the next item encountered is a link (as represented by decision 840), then a corresponding link is inserted into the object graph (step 841) and a corresponding link is created in the DOM (842). Thereafter, the deserializer 501 processes any attributes associated with the link component descriptors as described with respect to FIG. 12C.

If the next item encountered is a gallery item container (as represented by decision 851), then a new gallery item is created in the associated card definition 517 in the object graph 510 (as represented by 852). After the gallery item container has been created in the object graph, a corresponding new gallery item container is created in the DOM (as represented by 853). As suggested above, in some embodiments, the presence of a gallery item effectively makes the associated card a gallery card. However, in other embodiments, the gallery cards may have a distinct structure and gallery items may be only be used in such gallery cards. In the component model illustrated in FIG. 14, the gallery item 594 is also a container, although it should be appreciated that when other component models are used, this would not necessarily be the case.

After the gallery item has been created, the deserializer processes the gallery item descriptor as represented by 854. The gallery item descriptor can be processed in the same manner as the processing of the card descriptor described herein with respect to FIGS. 12B and 12C, except that the components of the gallery item will be associated at the gallery item level rather than the card level and gallery items would typically not contain other gallery items, although such an architecture could readily be supported if desired.

Generally, attributes may be bound to any component, including container components. Thus, an attribute can be bound to a content type component such as text, an image, a video, etc., or to a container, such as a card, a gallery, a gallery item, the wrap itself or any other component that contains subcomponents. When the next item encountered during deserialization of a card descriptor 46 is an attribute that is associated with the card generally rather than any particular card component (as represented by decision 845), then the designated attribute is bound with the associated card node in the object graph and DOM (848). Thereafter, the logic proceeds to step 883 in FIG. 12C where it is determined whether there are any remaining items in the card descriptor.

It should be appreciated that the types of components listed above are by no means exhaustive. Rather, there can be a variety of other types of components in a cards descriptor and the same general processes or other appropriate processes can be used to deserialize those component types as well. For example, if feed components are used, the feed descriptor can be deserialized in a similar manner, with the actual feed content being obtained in accordance with the rules and parameters associated with the feed that is to be established. When the deserializer gets to the end of the descriptor there are no more items to be processed and the deserializing process is completed. The processing of other types of components is generally represented by box 848 in FIG. 12A.

After any component has been added to the object graph, the deserializer continues to step through the component descriptor to identify any attributes and/or subcomponents that are associated with the component. One such process is diagrammatically illustrated in FIG. 12C. Generally, after a component has been added to the object graph, the logic determines whether there are any items (e.g., attributes, subcomponents, etc.) associated with the newly defined component (step 870).

If so the next item is obtained as represented by step 872. If the next item is an attribute (step 874), the attribute (e.g., style or behavior) is associated with the component (step 876) in the object graph and DOM and the logic returns to step 870 where it looks for the next item in the component descriptor.

If the next item is determined to be a subcomponent (step 877), the subcomponent is processed recursively in the same manner as described above with respect to FIG. 12B, except that the subcomponent is contained within its parent component.

Figure 12A:
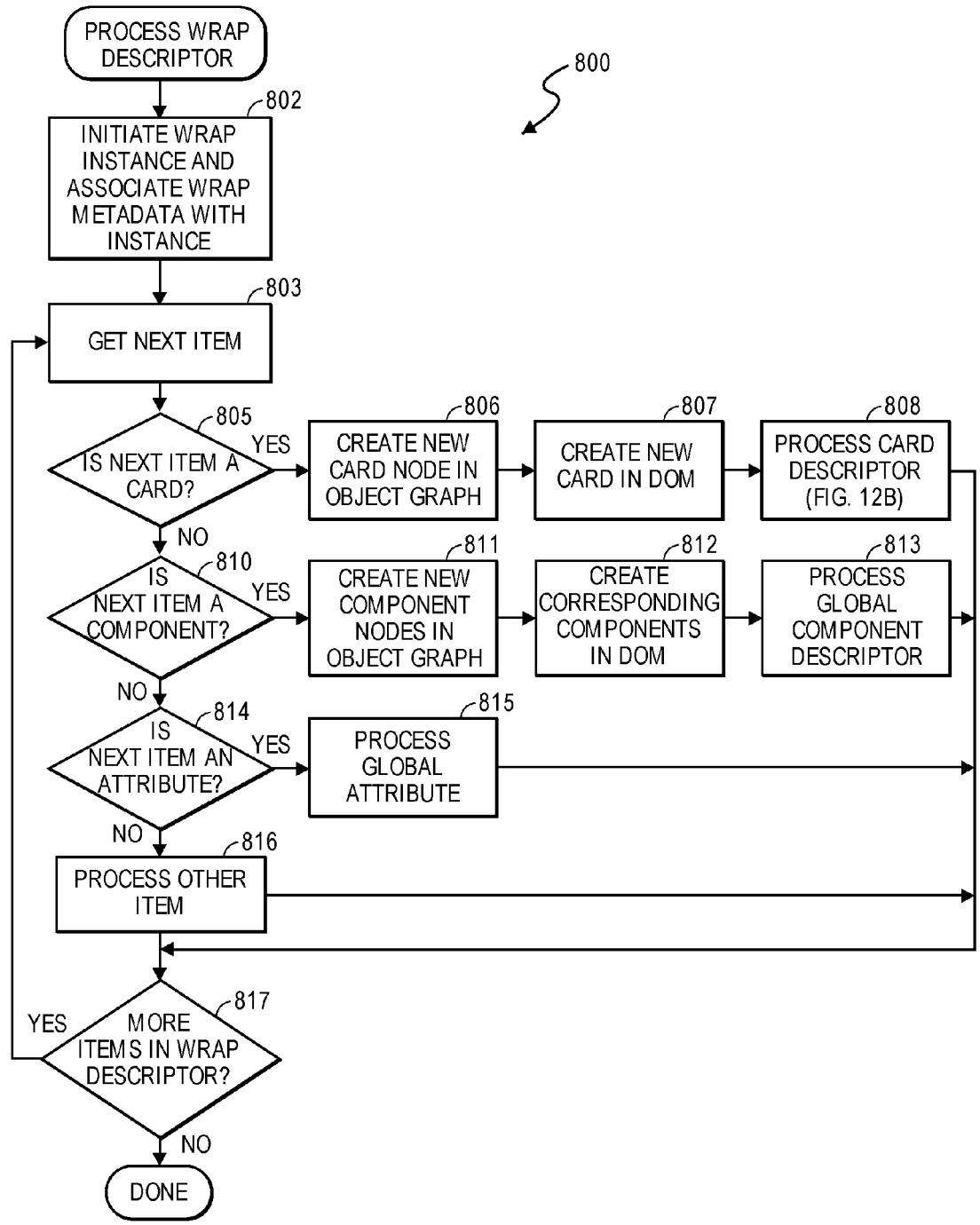
FIGS. 12A-12C illustrate a flow chart diagrammatically illustrating processing a wrap descriptor to create an object graph and DOM.
Figure 12B:
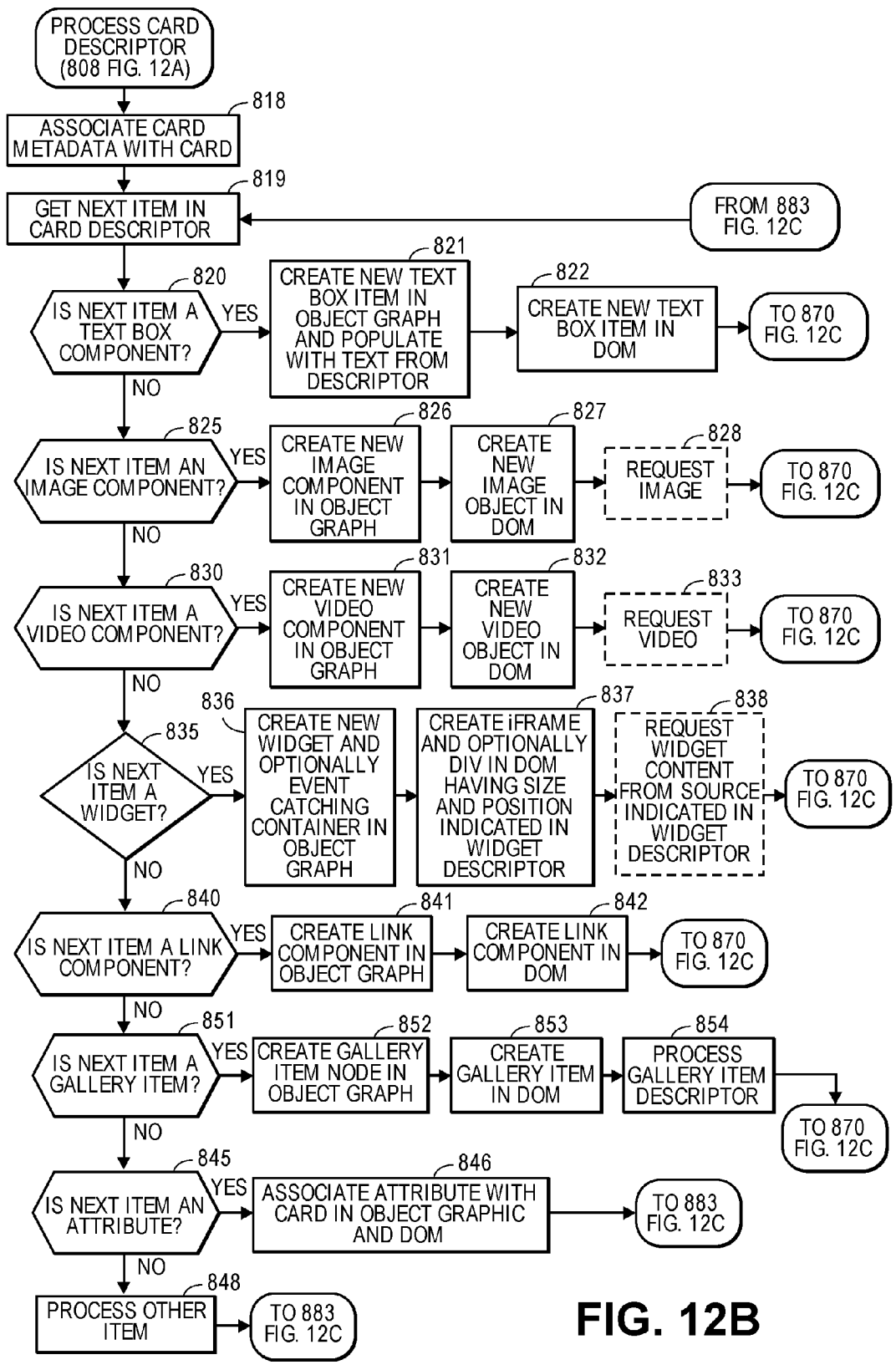
Figure 12C:
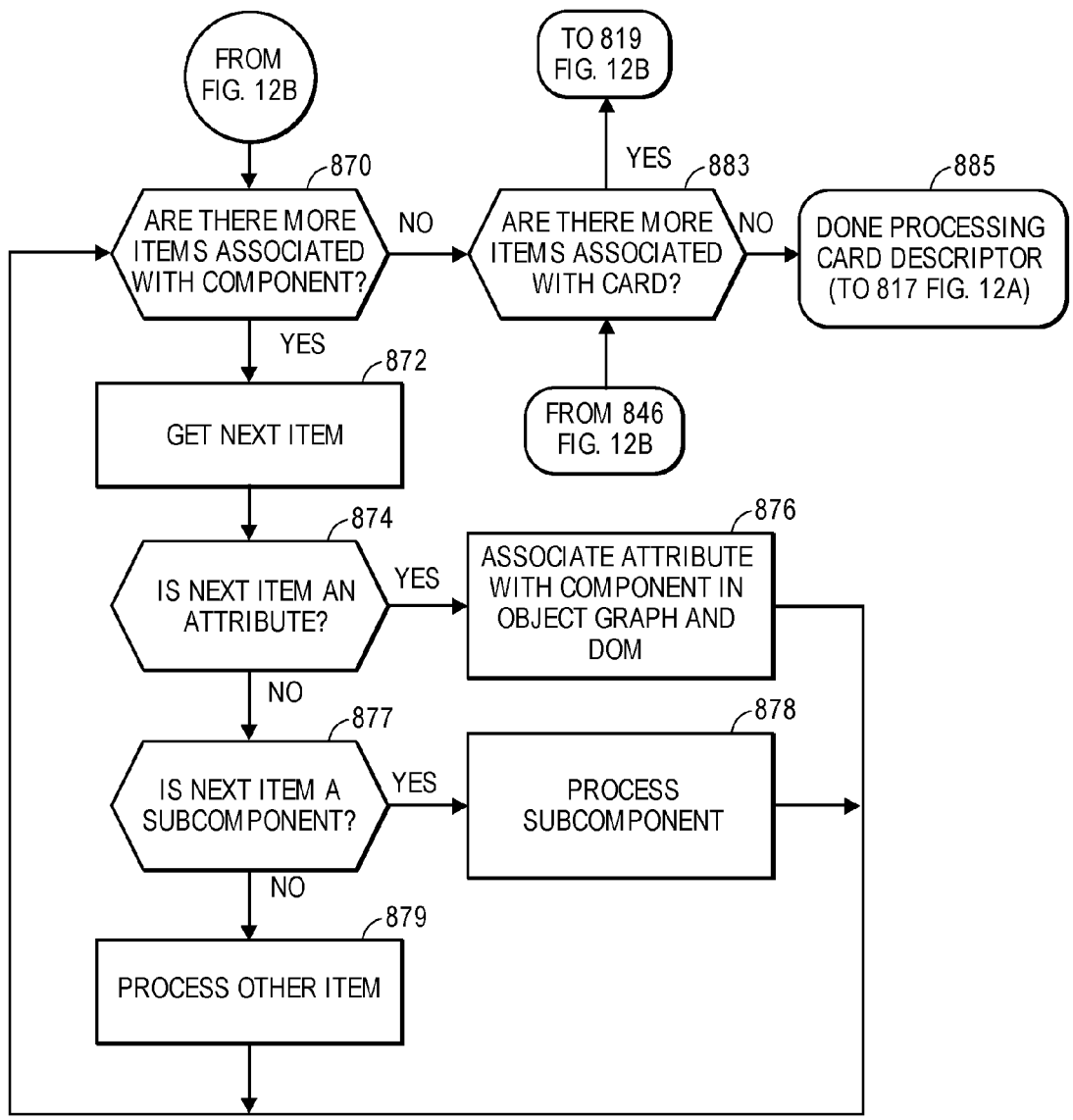

As indicated previously, the model is extensible so that if other types of items are defined that can be contained by a component, they can be processed appropriately in a similar manner as represented by box 879 in FIG. 12C.

After all of the items associated with a particular component have been processed (i.e., there are no more items associated with the component as represented by decision block 870), then the deserializer effectively determines whether there are any more items associated with the card as represented by decision block 883. If so, the logic returns to step 819 of FIG. 12B where the next item in the card descriptor is obtained and the same process is repeated for that item. This flow continues until there are no more items associated with the card (the no branch of decision block 883 of FIG. 12C) at which point the processing of the card descriptor is completed and the logic proceeds to decision block 817 of FIG. 12A where it is determined whether the wrap descriptor has any further items. The deserializer continues to step through the wrap descriptor in the described manner until the entire wrap descriptor has been processed and the wrap is ready to be rendered. It should be appreciated that the particular container or parent that any particular component belongs to is implicit based on the descriptor structure itself.

Although the deserializing process has been described in the context of the flowchart of FIGS. 12A-12C to simplify the description, it should be appreciated that in actuality, the logic of the deserializing algorithm can vary widely. Various described functions can be delegated and some can be performed in parallel and in different orders than the specific described embodiments. Typically the runtime will have deserializing rules associated with each component type that it supports and those rules can vary widely from the specific examples given.

Referring back to FIG. 15, the event handler 506 is arranged to handle events relevant to a wrap that are received once the wrap is rendered. As discussed above with respect to FIG. 12, any time a detected event impacts the wrap, the event handler will update the object graph appropriately, which in turn causes the DOM to update appropriately.

The architecture of the event handler 506 and its affiliated structures may vary widely. In some embodiments, the event handler 506 is arranged modularly to include an event handling core 507 that works in conjunction with a large number of specific event handling components (specific event handlers). Use of such an architecture is contemplated with the embodiment described above with respect to FIG. 12 and components affiliated with one such embodiment of event handler 506 are described with reference to FIGS. 17 and 18. Many of the events that are expected to be received in conjunction with a wrap are navigation related UI gesture events. Examples of such events might include swipe gestures (e.g., left, right, up or down swipes), taps (often used for selection of an item), etc. Discrete handlers may be provided for each such gesture, or multiple handlers may exist for a single gesture, in different contexts. For example, a first specific handler may be provided to handle left swipe events, a separate second specific handler may be provided to handle right wipe events and so on. Furthermore, the specific action that is appropriate in response to a particular gesture event may vary based on the card. For example a left swipe will typically have an associated behavior of flipping to the next card. However, in certain circumstances a left swipe may invoke a different action (e.g., when the user is viewing the last card in a deck a left swipe gesture may invoke a card flip bounce-back animation) and invoke a different handler, based on that different context. In a highly modular system, different handlers can be used to handle the same event in conjunction with different cards having different intended behaviors. For example, a first left swipe handlers can be utilized to handle left swipe events for most cards, while a second (and different) left swipe handler can be used to handle left swipes when the final card is active. Of course, the same principle can be applied to any card.

Figure 17:
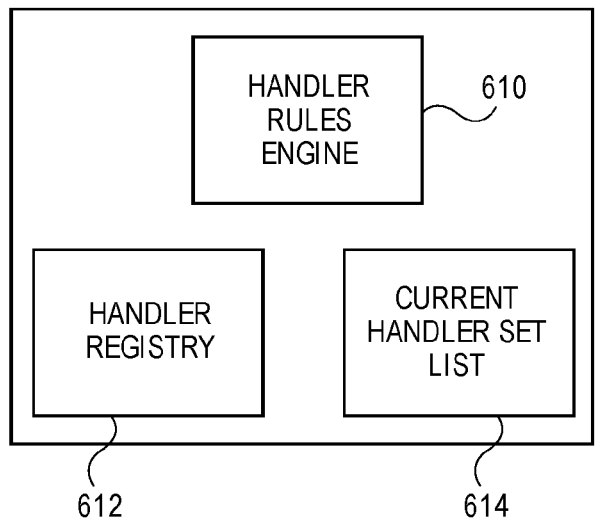
FIG. 17 is a block diagram illustrating components of an exemplary event handler.

FIG. 17 illustrates selected functional components of the event handler core 507. The event handler core 507 includes a handler rules engine 610, a handler registry 612, and a current handler set list 614. The handler registry 612 is a registry of all of the handlers that are available to the runtime. If a particular wrap requires a handler that is not present in the runtime, the event handler or other suitable mechanism can request the missing handler from a server side handler store or other appropriate location. The current handler set list 614 identifies all of the handlers that are currently active. That is, all of the handlers that are appropriate for wrap in its current state including the currently active card.

The handler rules engine 610 defines that rules by which the various handler are made active or inactive at any time. The specific rules may vary widely and may include immutable rules that cannot be changed, default rules that may be overridden by the appropriate instructions, special rules for particular cards/states, etc. Special and override rules may be provided in any appropriate manner, as for example, by definition or reference in a wrap or card descriptor, as part of an extension etc. Using the left swipe handler example, the handler rules may designate a default left swipe handler which transitions the wrap to the next card in response to a left swipe. However, the rules may further mandate that a default "last card left swipe handler" be used when the currently active card is the last card in the wrap. Still further, the rules may permit the wrap or card to identify a different left swipe handler for use in place of the default handler(s) a specific circumstances, or as long as the wrap remains active. The alternative left swipe handler, may exhibit different behavior. The behavior difference can be small as might be appropriate when the wrap author simply wants to use a different card transition animation, or it may be more complex. In either event, any time there is a object graph model state change, the current handler set list 614 is updated based on the handler rules to add any newly required handlers and to eliminate handlers that are no longer active.

Figure 18:
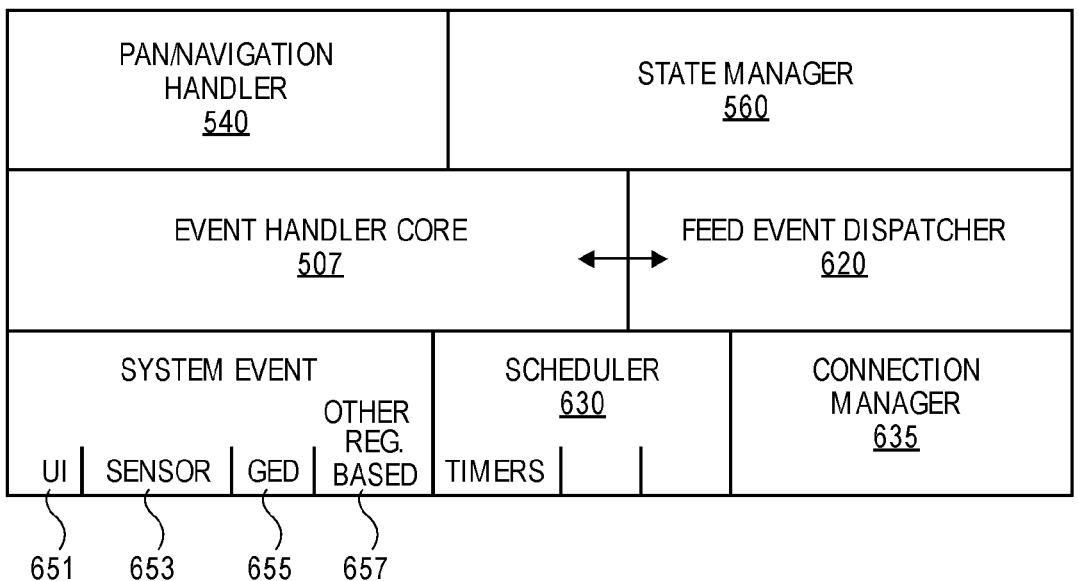
FIG. 18 is a diagram illustrating components associated with a representative event handler.

Referring next to FIG. 18, components associated with a representative event handler 506 will be described. In the illustrated embodiments, the components include the event handler core 507, feed event dispatcher 620, a scheduler 630, connection manager 635, navigation event handler 540 and state manager 560. The event handler core 507 is generally arranged to handle a number of different types of events including system events, UI events 651, sensor based events 653, Geo based events 655 and a variety of other types of events 657. UI events 651 include any events generated in response to user inputs including various gestures inputted on a touch sensitive display, keyboard entries, mouse clicks, three dimensional gestures performed over a touchless gesture recognition platform, inputs from other user I/O devices etc. Sensor based events include inputs from any sensors connected to the computing platform, as for example the accelerometers commonly used in cell phones and other mobile devices, heart rate or other biometric monitors, thermistors, etc. Geo events include events that are triggered based upon the user's geographic location. There are, of course a wide variety of other events the computing system may be arranged to receive or detect, including system events, registry based events, etc. System events are generally events generated by the computing system as for example responsive to a call from another process. An example of a registry source of event is a network registry—which may, for example initiate a "Wi-Fi available" event in response to the detection of a new Wi-Fi network when no networks were previously available.

The navigation event handler 650, which is sometimes referred to herein as the "pan handler", as it responds to panning events in the user interface, and includes the specific handlers that function to handle navigation based events. The navigation handler 540 can optionally be integrated into the event handler core 507 if desired. Alternatively, other event handler core functionality can be delegated to other types of handlers similarly to navigation handler 540.

Feed event dispatcher 620 is arranged to dispatch feed related events. As such, it communicates with the event handler core 507 and connection manager 635 as appropriate. The connection manager 635, in turn, manages connections as appropriate for any particular feed.

Scheduler 630 has a plurality of timers and is arranged to track scheduled events. When the time arrives for a scheduled event, the scheduler 630 notifies the event handler core 507 or the feed event dispatcher 620 as appropriate to handle the scheduled events. Either the feed event dispatcher 620 or the event handler core 507 can schedule events using scheduler 630. For example, if a particular polling feed requires updates every 30 seconds, the feed event dispatcher 620 would register the polling requirements with the scheduler 630. The scheduler 630, in turn would notify the feed event dispatcher every 30 seconds of the need to poll again. In response to each notification, the feed event dispatcher 620, in turn, manages the mechanics of the poll, which might require opening a new connection, polling the source, returning the results to the associated card or component and closing the connection.

Widgets at Runtime

When a wrap that incorporates a widget component is received by the runtime viewer 50, the widget descriptor may be processed in much the same manner as other components except that the runtime is arranged to create an internal frame within the associated card when a component of type widget is encountered. The content for the internal frame (e.g., the HTML formatted content) is then obtained from the identified source rather than being defined within the wrap descriptor. From the standpoint of the runtime viewer, retrieval of the widget content is much like retrieval of other assets such as images, videos, etc., although the call is generally more complex due to the inclusion of the parameters with the call.

When the deserializer 501 encounters a widget component in a particular card descriptor, it creates an internal frame (e.g., an HTML iframe) to contain the widget. This is accomplished by first associating an iframe with the corresponding node in the object graph and then creating the iframe in the DOM. The dimensions (height and width) of the iframe, as well as the location of its origin will typically be defined in the descriptor, although this is not a requirement. Indeed, in some circumstances such as widgets designed to present a gallery, it may be desirable not to assign a fixed height to the gallery. When the location and dimensions are defined, the corresponding dimensions are assigned to the iframe when it is created.

The runtime initiates a call to the widget server specified in the source identifier 126 passing the widget parameters 130 to the widget servers as part of the call. The call may be made directly by the runtime or through the browser. Based on the parameters received, the widget server knows the content to send to the runtime viewer to populate the iframe and to define its presentation and functionality. More specifically, the server sends an HTML document to be rendered in the iframe. The HTML document contains the desired content, scripts, etc. in a format suitable for rendering in the associated iframe. The received HTML document is then included as the content of the iframe in the DOM in step so that the desired widget content is rendered when the associated card is rendered.

As will be appreciated by those familiar with the art, iframes are standard HTML containers that are currently utilized in a variety of web applications and web developers are quite familiar with their usage, thereby providing a flexible and well understood way for developers to provide wraps with customized content and/or functionality. However, it should be appreciated that other internal frame structures can be used in place of iframes in alternative embodiments.

Virtually any type of web content can be rendered in a widget's iframe. When desired, the content can contain links, scripts that impart behaviors and/or other useful constructs. For example, the content may include a link or trigger that lunches a cul-de-sac or opens a new browser tab outside of the wrap. The card and widget designer(s) have complete control over the card's functionality and the targets to which the wrap user may link. Thus, for example, a card designer may wish to direct wrap viewers to a particular web page using either a new tab or cul-de-sac type structure.

As discussed above, the runtime viewer may be deployed in a variety of different ways, including, for example, by being executed on a general purpose browser, being incorporated into an application or applet, or in any other suitable manner Execution on general purpose browsers present some potential challenges that are more easily avoided in an application/applet. For example, most general purpose browsers are arranged to pass any user inputs that occur in the region of an iframe directly to the iframe. This can be problematic in the context of rendering a wrap because it is possible that a wrap related navigational gesture (as for example a swipe gesture) could be inputted or occur in full or in part over the region of the display allocated to the widget's iframe. When such an event occurs, standard browser operation would simply pass the gesture to the widget without notifying the wrap runtime viewer. Therefore, in any runtime viewer implementation designed to execute on such a browser that supports iframe based widgets, it is important to provide a mechanism for catching wrap related user inputs such that they can be executed by the runtime.

There are a number of ways to insure that the runtime viewer receives the appropriate user inputs. For example, in some implementations, the runtime is arranged to "block" all user input events from being captured by the internal frame so that all user input events are passed to the runtime rather than being passed directly to the widget. Many widgets will be "display only" widgets in that they do not need to directly interact with any user inputs. The Date Countdown widget illustrated in FIG. 26 is a good example of a display only widget. Generally, there will be no need to ever pass user input events to a display only widget. However, many other widgets, are more "interactive" in that they facilitate or prompt user selections/inputs which must be passed on to the widget or require messages to be passed from the widget to the runtime viewer. Therefore, when interactive widgets are desired, the runtime viewer must be configured to facilitate communications between the runtime and the widget.

One way to facilitate user input event blocking is to place an invisible event catching layer in front of the iframe to intercept all user input events associated with the widget/iframe as briefly discussed above in the description of widget deserialization illustrated in FIG. 12B. That is, for every widget that is created in a wrap instance, a transparent event catching frame layer is created by the runtime. The event catching frame then directs the user input events to the runtime for processing.

In an HTML based browser, the event catching layer may take the form of an HTML div element which is simply a container unit. The div element is placed in front of the widget and preferably has the same size and location as the widget frame. This assures that the runtime will receive any user inputs made within the widget frame. There is no need to define the event catching frame (div element) within the wrap descriptor. Rather, the runtime's widget processing rules may be arranged to simply insert an appropriately sized event catching frame in the object graph in front of the widget frame any time that a widget is encountered. The event catching frame causes a div element to be created in the DOM. In other embodiments, the event catching frame can be explicitly defined in the card or widget descriptor.

Since the runtime receives all user input events, any events that are interpreted as wrap navigational events are handled by the runtime in a normal manner as described above with respect to FIG. 12. Any other user inputs occurring within the region allocated to the widget are then passed to the widget as would normally occur when user inputs are made within the iframe bounds. Thus, any non-navigational user inputs occurring within the iframe that are not interpreted as a wrap related event are passed to the widget.

When the runtime viewer is executed on a web browser such that the wrap is rendered in the browser, the runtime viewer and the iframe will be in different domains. In general, most web browsers are not able to pass events between frames in different domains. Therefore, to support passing events between the runtime and the widget is such browsers, a mechanism must be provided to pass the events.

In non-exclusive embodiments, the widget is arranged to include a widget/runtime communication script tag to facilitate message passing. Thus, when the widget is loaded at runtime, the script tag triggers the loading of a message passing API via JavaScript. The message passing API facilitates passing messages between the runtime viewer and the widget iframe and can be used to inform the widget of incoming user input events as well as to pass messages from the widget to the runtime. The messages may be passed using any appropriate event messaging protocol. By way of example, one currently popular event messaging protocol that is suitable for this purpose is the window.postMessage method, although it should be appreciated that any other suitable event message passing protocol may be used in other embodiments.

When a messaging protocol such as window.postMessage is used, the user input events transmitted in the event messages may not be directly understood by the HTML that defines the content of the widget. When that is the case, it will be desirable to provide the widget and/or browser with scripts suitable for translating the event messages into events that can be interpreted by the widget. In general, such translation scripts are arranged to determine what kind of element was accessed and the proper action so that the widget acts as if it were directly addressed. In practice, a set of translation scripts may be provided to widget developers that can translate typical widget events for typical widget components, such as a tap or click event on a button, a text box, a form, a pull-down or pop-up menu, etc. so that the widget developers don't need to try to program the translation scripts to support most common GUI constructs.

In some circumstances the user action is fairly simple and can be fully handled directly by the translation scripts. A good example of such a situation is a simple button tap or click which can be simulated quite easily.

In other circumstances more complex responses are needed and it may be desirable to apply focus to the target element to thereby temporarily bypass or drop at least a portion of the invisible layer so that subsequent input events on that element pass directly to the widget. A good example of this type of circumstance is when a tap or click action occurs on a text field. In such a circumstance, it may be desirable to pop up a text input element (e.g., a keypad) and have subsequent keypad entries pass directly to the widget where they would presumably be entered into the text field without ever being intercepted by or known to the runtime. To facilitate this, focus may be applied to the text input element (keypad) and potentially the text box so that any input events made directly on the keypad/text box pass directly to the widget. Alternatively, when appropriate, the focus could be applied to the entire widget or another designated portion of the widget so that any inputs on the widget/designated portion of the widget would pass directly to the widget. When focus is applied, a callback is placed on the text input element so that when focus is lost (e.g. a "blur" event occurs), the widget will send a blur message back to the runtime viewer that causes the runtime viewer to restore the event interception. As will be appreciated by those familiar with the art, focus may be lost in a variety of different manners. For example, the focus may be lost when the user makes an input indicating that the text entry has been completed—(e.g. as may occur when a "return" or "enter" key is selected). Another example of a situation where focus may be appropriate is when the user activates a dropdown menu. Of course, focus may be appropriate for a variety of other GUI constructs as well. As will be appreciated by those familiar with JavaScript, focus and blur are JavaScript constructs designed to facilitate event delegation.

Some widgets will also need to communicate back to the runtime. Such widget to runtime viewer communication can be supported using the same messaging API. For example, in some implementations of the transaction flow described above with respect to FIG. 8A-8H, the transaction widget is arranged to open a cul-de-sac to a web page when a "proceed to checkout" button is selected so that the transaction can be completed using the merchant's website. To facilitate this, the widget may pass a message to the runtime viewer requesting that the runtime viewer open a cul-de-sac to a particular website and potentially passing various parameters relevant to the transaction. Again, window.postMessage works well for this purpose.

In most of the embodiments described above, runtime related user input events are caught by the runtime before they are passed to the widget. However, it should be appreciated that in alternative embodiments, all user inputs in the region of the widget iframe could be passed to the widget and the widget could be provided with event recognition code suitable for identifying wrap navigational gestures. In such an embodiment, the wrap navigational gestures would then be passed on to the runtime viewer.

Wraps as Messages

The described wrap packages 10 are essentially cloud based portable data objects that can readily be distributed using a wide variety of electronic techniques including messaging, posting and inclusion as links in documents, articles or other electronic communications. The wrap package 10 thus allows authors to take applet and website functionality and make them consumable as a message, delivered in a narrative storytelling format. This allows the transformation of an app or website functionality into a portable, sharable, and savable wrap package 10, that can be distributed like electronic messages (e.g. email, SMS, text) or within the content of a media feed, such as social media feeds like Twitter or Facebook, a news feed like Reuters or Bloomberg Business, etc.

Not only are the wrap packages 10 easy for publishers and others to distribute, but viewers and other recipients of a wrap may also readily share a wrap as a "message" with their friends, family, coworkers, colleagues, etc. This is a powerful construct that can greatly extend or enhance the market (or other target segment) reach and penetration of a well designed wrap since a "message" from a friend or acquaintance is often more favorably received than a message from an unknown party. Neither applets nor websites are well suited for such viral distribution.

For example as illustrated in FIG. 7M, media sharing triggers 381 and 383 can be used to share the wrap package 310 with others via various social media or content distribution platforms. In the illustrated embodiment, these include Facebook, and Twitter, although it should be appreciated that similar sharing triggers can be provided to facilitate sharing the wraps using virtually any desired social media or content distribution platform.

In the embodiment shown in FIG. 7M, media triggers are provided within or embedded in the wrap itself to facilitate sharing. However, it should be appreciated that the wraps can be shared in a number of other ways as well. For example, the cover 15 that includes a URL associated with the wrap (e.g., the wrap ID 42) can be posted on a social media site or feed, emailed to others, or otherwise distributed using an electronic communication protocol or platform.

Since the set of cards 14 that make up a wrap package 10 are encapsulated as a data object and can be sent as a unit, the wrap package 10 can also readily be stored on a viewer's device if the viewer so desires. Contrast this with a conventional multi-page website which is not designed to be persistently stored on a viewer's device as a unit, even if individual pages may sometimes be cached. It also eliminates third party aggregator (e.g., the Apple App Store; Google Play, etc.) control over the delivery of a company's services/messages to its customers as occurs in the distribution of conventional apps.

Integrating Wraps into Media Feeds

One of the powers of the described wrap architecture is that wraps can readily be integrated into a wide variety of different platforms, including any type of media feed. For example, a wrap can readily be posted into and viewed in the context of a social media feed such as a Twitter, Facebook, Instagram, Pinterest, etc. Similarly, a wrap can readily be integrated into other types of feeds, such as a news feed (i.e., Reuters, Bloomberg business news, etc.), an RSS feed, or just about any other type of media feed. In yet other embodiments, wraps can be integrated within various blogs and micro publication platforms such as Tumblr, etc.

The ability to insert and distribute wraps as messages within media feeds and blogs is a very powerful construct for facilitating widespread and even viral delivery of wraps to a wide variety of potential viewers and/or consumers in the content consumption environments that they prefer. The ability to consume the wrap within the context of a social media feed, for example, provides numerous advantages. First, it allows the viewer to view the wrap without closing out of, or navigating away from, the media feed they are already consuming Second, by defining the content of the wrap to be similar or related to the subject matter of the feed already being consumed, the effectiveness of the wrap, along with viewer engagement, are both significantly improved. Third, the appearance of a wrap as a "message" within the feed of similar content significantly reduces the "friction" for the viewer to select and consume the wrap, as opposed to for example a banner ad, which are commonly ignored.

Conversely, a wrap social media card can be configured to integrate a social media feed into a wrap such that the social media feed can be viewed within the context of a wrap, without forcing the user to leave the wrap and launch a separate app or open a new browser window. From the context of a wrap author, this has the potential to increase the "stickiness" of the wrap. That is, a user may be more inclined to spend more time viewing and interacting with the wrap if they are able to view desirable social media content, without having to close out of the wrap and/or open or otherwise navigate to a separate social media application. For example, a wrap dedicated to a specific event, such as a music concert, a sporting event, etc. can include a social media card that allows the viewer to view, and post to, a social media stream associated with that event.

Of course, there are a wide variety of other circumstances in which facilitating interaction between a wrap and media feeds will be desirable. By way of example, a few representative embodiments integrating wraps with social media are described below with reference to FIGS. 19 to 25.

Figure 19A:
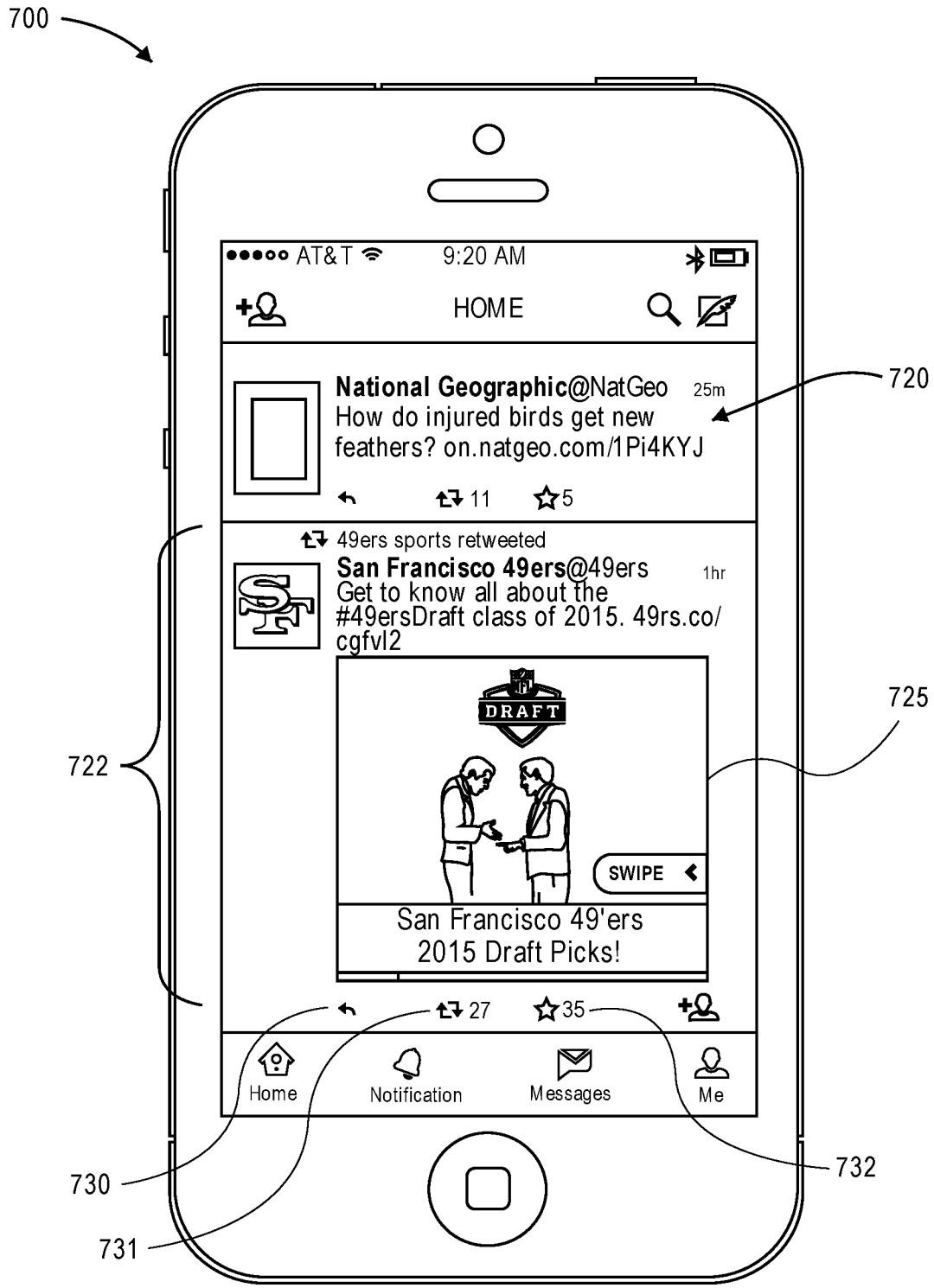
FIG. 19A illustrates a Twitter data feed rendered on a mobile device that has a wrap cover included therein.

FIG. 19A illustrates a Twitter feed 720 viewed on a mobile device 712. The feed 720 includes a wrap cover 725 included as part of a specific tweet 722. As previously discussed, the wrap cover 725 has an image and an embedded link suitable for accessing an associated wrap 700.

Figure 19B:
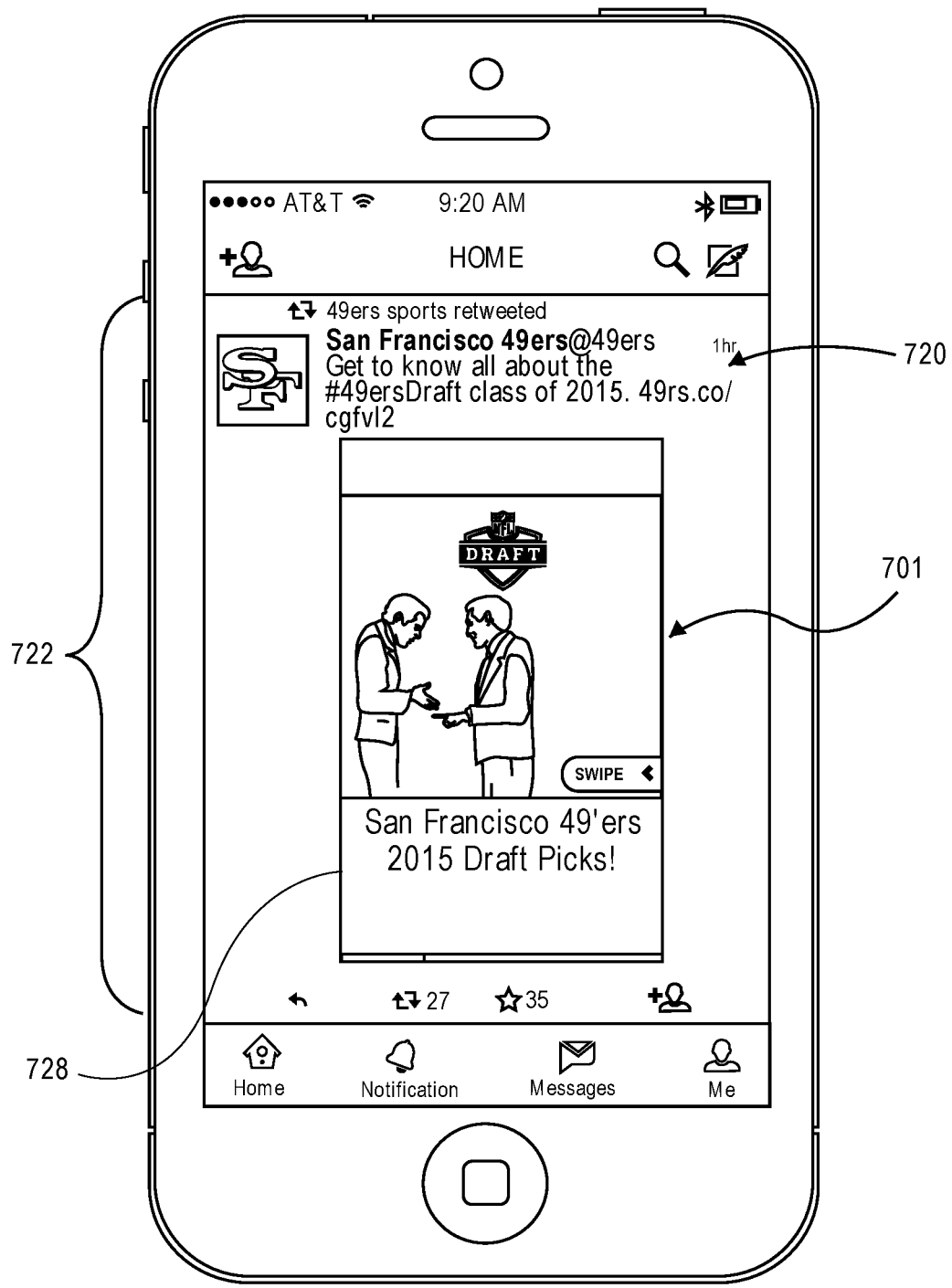
FIGS. 19B-19D illustrate selected cards of the wrap associated with the wrap cover of FIG. 19A rendered in-line within the Twitter data feed.

As illustrated in FIG. 19B, selection of the cover 725 launches the wrap 700 associated with the cover 725 in-line within the twitter feed 720. When the wrap 700 is launched, the first card 701 is displayed in place of the cover 725, but still within the twitter feed 720. That is, the wrap 700 appears within a frame of the twitter feed that was previously occupied by the cover 725—although the aspect ratio of the frame may optionally change to accommodate the wrap aspect ratio when the cover does not have the same aspect ratio as the wrap as can be seen by comparing FIG. 19B to FIG. 19A.

Figure 19C:
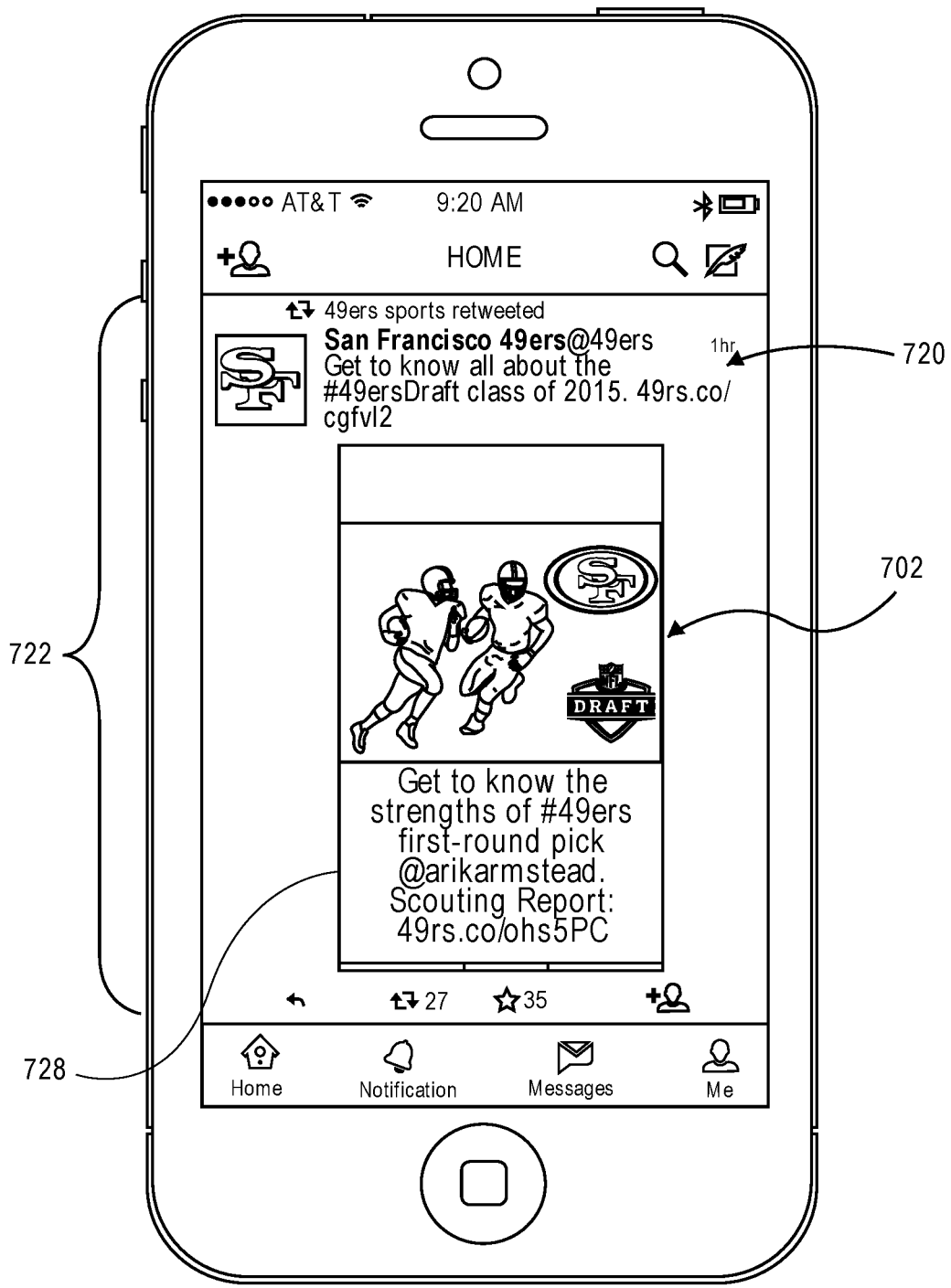
Figure 19D:
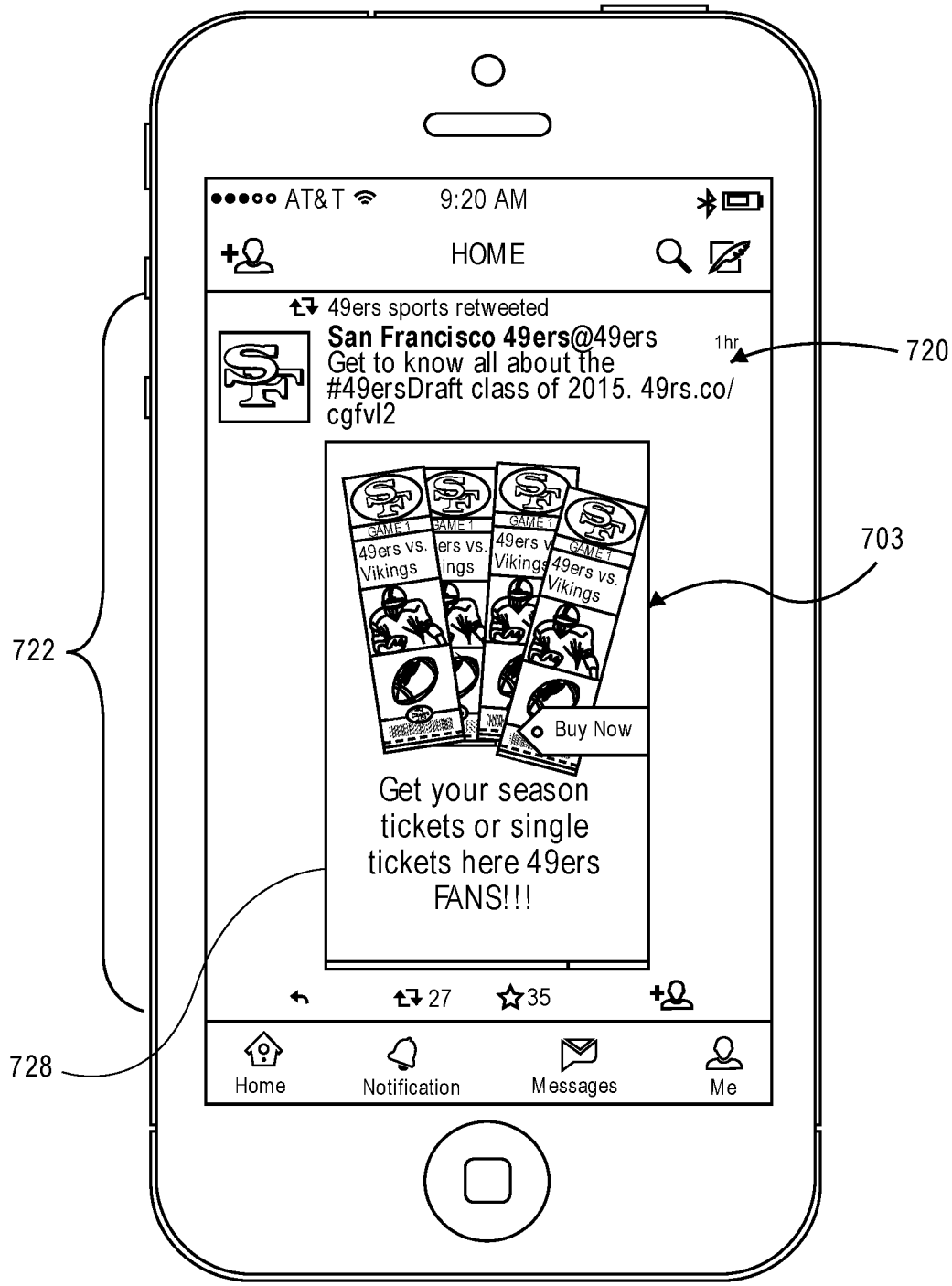

The now rendered wrap 700 may then be navigated, in situ, within the twitter stream 720 using swipe navigation as previously described. For example, swiping left on first card 701 causes the wrap to flip to the second card 702 as seen in FIG. 19C. Swiping left again on the second card 702 causes the wrap to transition to third card 703 as seen in FIG. 19D. Thus in the same manner as described above, the individual cards, including any gallery cards (not illustrated), can be navigated within the context of the twitter stream 720, by horizontal and/or vertical swiping.

It should be understood that a wrap included in a media feed, like any wrap, may be of any desired length and may be browsed using the same standard wrap navigation techniques. In addition, any of the above-mentioned types of cards may be incorporated into the displayed wrap, including gallery cards, transaction cards, appointment cards, booking and/or reservation cards, chat cards, cards incorporating feeds, etc.

Since the wrap is effectively incorporated into a tweet, the viewer is able to perform the standard Twitter function(s) on the tweet (and thus the wrap) through the use of standard Twitter tools. Thus, the viewer is able to reply to the tweet by selecting reply button 730, retweet the post (and thus the wrap) by selecting retweet button 731, mark the tweet as a favorite by selecting favorite button 732, copy a link to the tweet, embed the tweet and/or utilize any other Twitter functionality that is available to the user. Again, this provides a powerful construct for distributing and sharing wraps.

In the embodiment illustrated in FIG. 19, the wrap 700 is displayed in-line within the Twitter feed 720. In various alternative embodiments, selection of the cover may cause the wrap to open into a new container rather than appearing in-line within the Twitter feed. The new container may take the form of a new pane, a new tab, a new window or any other GUI construct that is appropriate for the underlying platform.

Figure 20B:
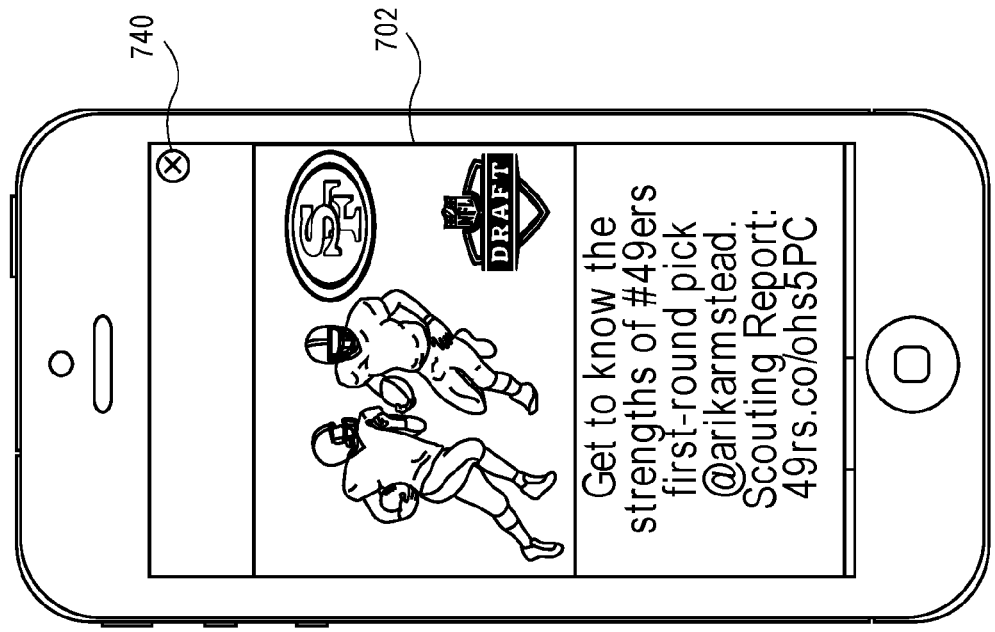
FIGS. 20A-20D illustrate selected cards of the wrap associated with the wrap cover of FIG. 19A rendered in a new frame that occupies the entire screen of the mobile device.
Figure 20A:
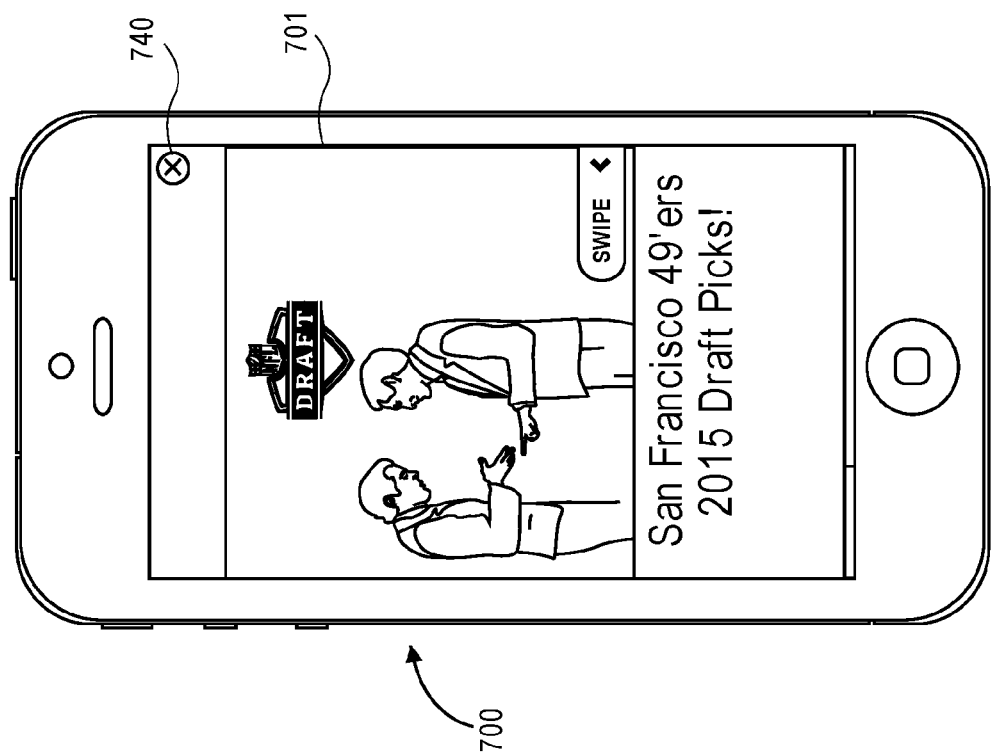
Figure 20C:

In another non-exclusive embodiment, FIGS. 20A-20C show the same first three cards of the wrap 700 rendered in a "full screen" mode on a mobile phone. In other words when the wrap cover 725 appearing within tweet 722 of the feed 720 is selected, the wrap 700 is rendered within the entire screen of the display of the consuming device, as illustrated. In variations of this embodiment, the wrap 700 may alternatively be rendered in a top-justified container, a bottom justified container, a "¾" size container within the center of the display screen, or in other specific locations relative to the screen.

With any of these embodiments, a "close" button or similar construct may be provided to allow the user to return to the twitter feed after finishing with the wrap. This type of behavior is sometimes referred to herein as a cul-de-sac. More generally, a cul-de-sac is a construct in which activating a link in a first container opens the target in a new container, and thereafter, closing the new container returns the user to the originating container.

In the embodiment of FIGS. 20A-20C, a close button 740 is overlaid on a small portion of the wrap. That is, the close button 740 is an active trigger and can be seen on each of the cards, regardless of which card is currently displayed. Selection of the close button 740 closes the wrap and returns the user to the feed 720 (e.g., back to the view of FIG. 19A). Of course the close button 740 or any other container closing mechanism can be provided and/or displayed in a wide variety of other forms. By way of example, common close container constructs used in other cul-de-sac applications include: (i) close buttons located to the side or above the active display region; and (ii) a "cancel" or "close" link or button in a toolbar located above or below the active display region. In such embodiments, the close functionality would be associated with the container rather than the wrap itself. In such circumstances, the closing of the container would typically, although not necessarily, be handled by the browser rather than the wrap itself.

Figure 20D:
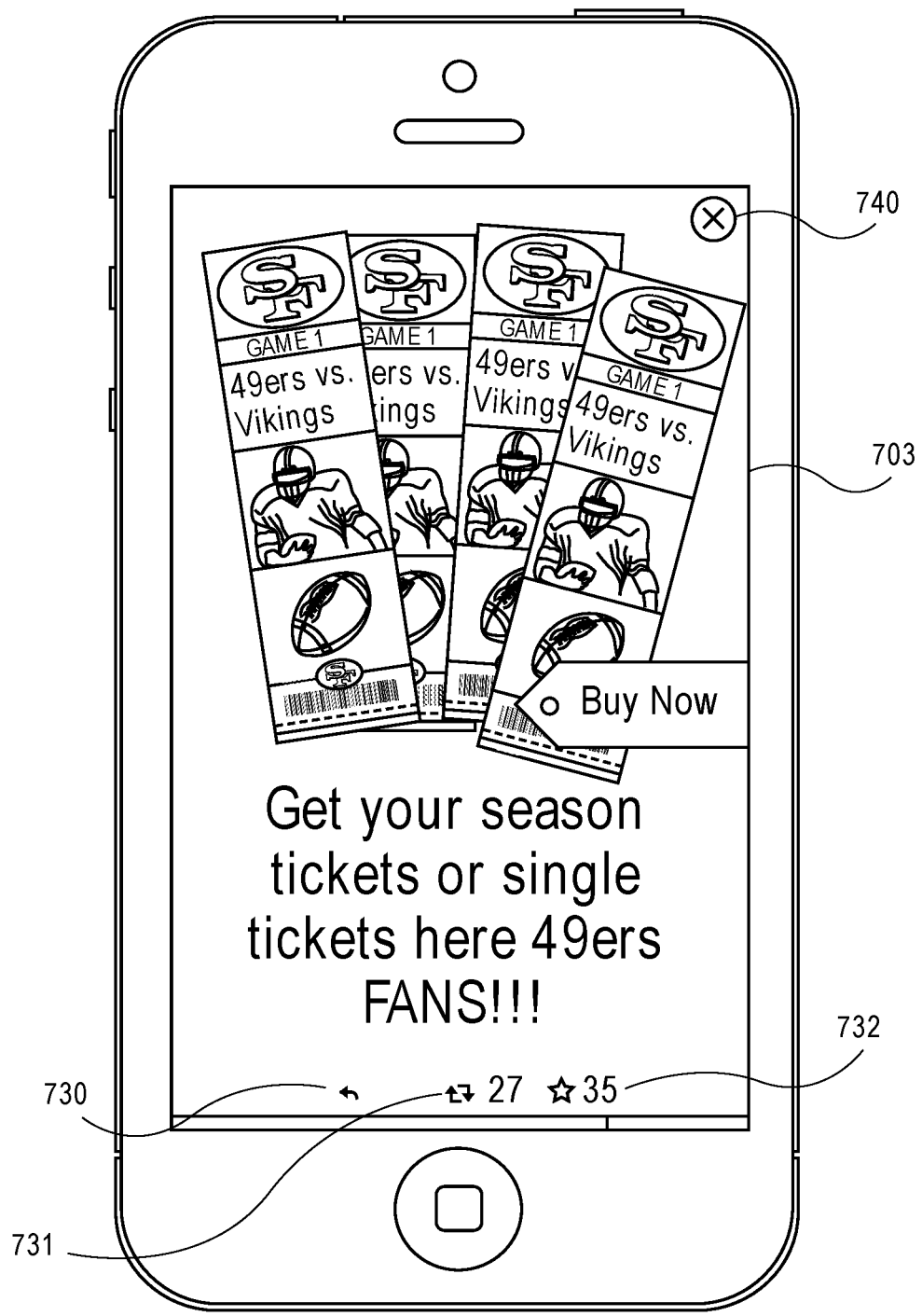

In yet another embodiment as illustrated in FIG. 20D, the new container may also include a Twitter toolbar if desired so that the user can perform standard Twitter operations such as reply 730, retweet 731, or mark as a favorite 732, etc.

In the embodiment illustrated in FIGS. 19B-19D, the aspect ratio of the wrap rendered within the Twitter feed is substantially the same as the aspect ratio of the wrap when rendered "full screen" on the mobile device 712, as seen in FIGS. 20A-20C. However, that is not always a requirement.

Figure 21:
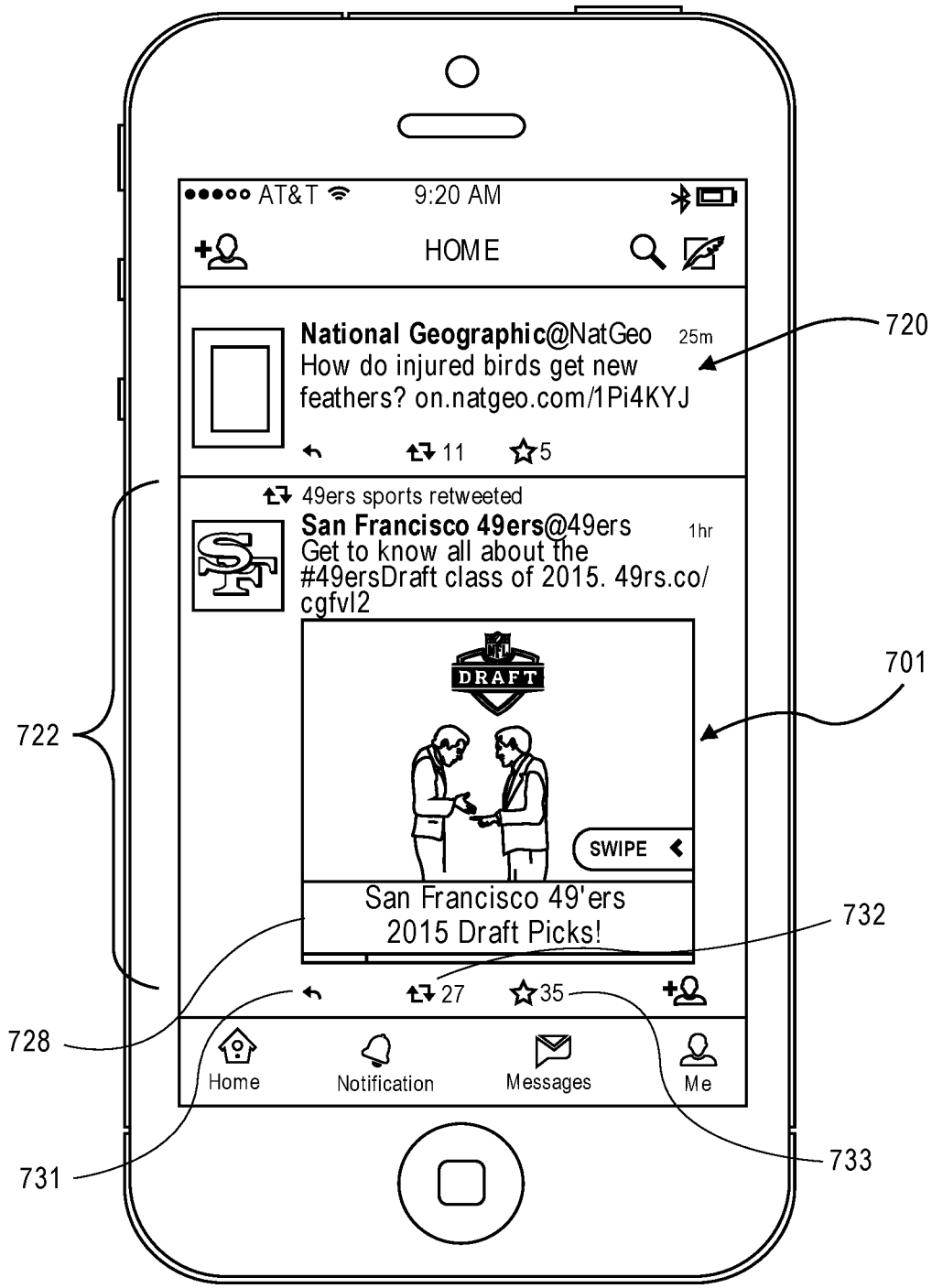
FIG. 21 illustrates a selected card of the wrap associated with the wrap cover of FIG. 19A rendered in-line within a Twitter data feed at a different aspect ratio than shown in FIGS. 19B-19D.

In other embodiments, the wrap can be rendered in a different aspect ratio as illustrated in FIG. 21, which shows card 703 of wrap 700 rendered at a different aspect ratio within Twitter feed 720. Of course, the same aspect ratio would preferably be used for all of the cards in the wrap.

Twitter, like many media feeds, can be viewed using either a general purpose browser window or with a dedicated Twitter app running on the consuming device. Regardless of which is used, a wrap runtime viewer is utilized to render the wrap. When a media feed is viewed using a browser, the wrap runtime viewer may be executed by the browser. When the feed is viewed using a dedicated Twitter app, the runtime engine may be either incorporated into the app so that the wrap can be viewed directly in the Twitter app, or the Twitter app may launch a browser that in turn renders the wrap.

Regardless of whether the runtime viewer is executed by a browser or by an app, the processes used to obtain the wrap descriptor and the runtime viewer may be the same as described above, as for example, with reference to FIG. 11. When the wrap is rendered, again either within a browser or within an app, it is rendered into the designated container, which as described above, can be in-line within a frame defined by a message within the media stream (e.g., FIGS. 19A-19D), full screen size (e.g., 20A-20D), or a partial screen size such as top or bottom justified or ¾$^{th}$ sized, etc.

In embodiments that utilize an overlay to provide a close wrap functionality, the runtime must be informed to add the close button 740 overlay. Of course, in other embodiments, the close functionality may be handled directly by the browser without involving the wrap. In either case, selection of the close button closes the associated container (e.g., pane, tab, etc.) and returns the user to the original media feed.

While the above examples were provided within the context of a Twitter feed, it should be understood that in no way should these examples be limiting. On the contrary, wraps can be incorporated into just about any type of media feed in substantially the same manner as described.

Figure 22A:
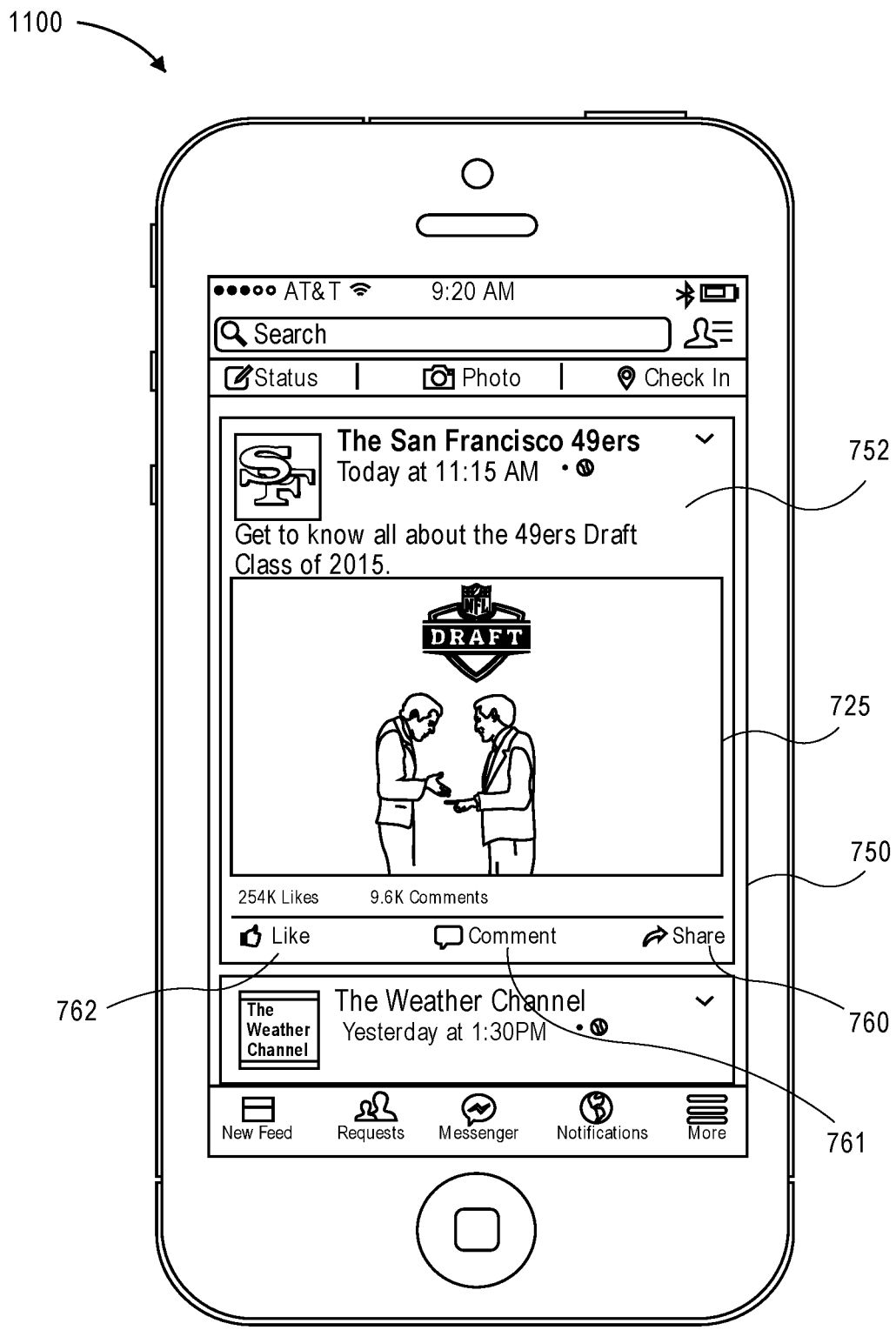
FIG. 22A illustrates a Facebook news data feed rendered on a mobile device that has a wrap cover included therein.
Figure 22B:
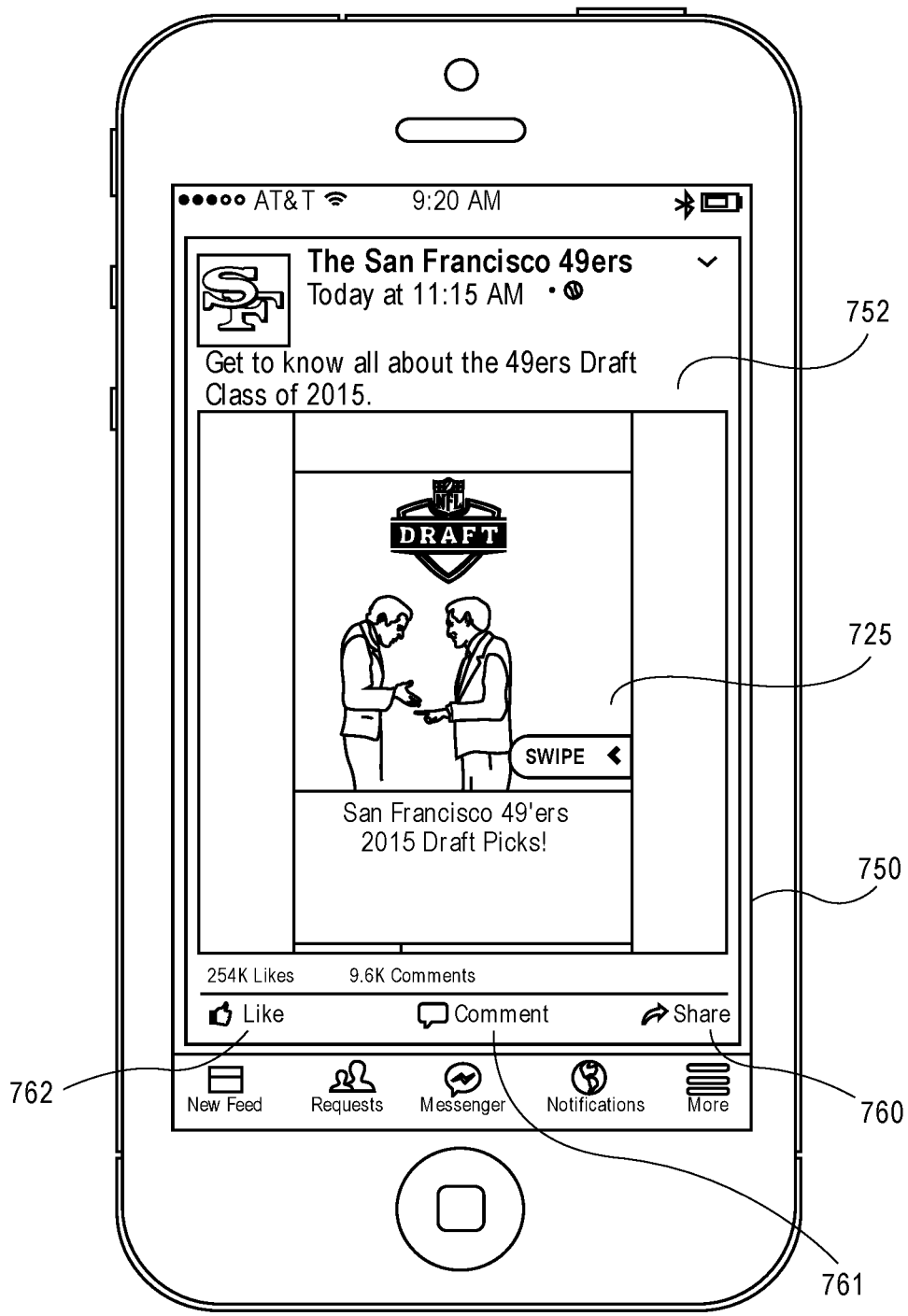
FIG. 22B illustrate the first card of the wrap associated with the wrap cover of FIG. 22A rendered in-line within the Facebook data feed.

For example, FIG. 22 illustrates the incorporation of a wrap into a post in a Facebook news feed. In this example, Facebook feed 750 includes a post 752 having wrap cover 725 included therein. Similar to that described above, selecting the cover 725 causes the wrap 700 to be launched and rendered in a manner similar to any of those described above with respect to the Twitter example. For example, the wrap may be displayed in-line within the Facebook feed 750 (as seen in FIG. 22B) or in a separate container (not shown), which can take any form (e.g., a full screen, partial screen, a cul-de-sac, etc.). Similarly, the wrap runtime can be executed by a browser used to display the wrap, or it may be incorporated into a Facebook app itself.

When a wrap is integrated into a Facebook post, the palette of Facebook tools that accompany posts can be used to interact with and/or share the wrap. For example, the wrap post can be shared with others using the Share tool 760, the user can comment on the wrap post using Comment tool 761 or "like" the wrap post using Like tool 762. Of course any of the other Facebook supported functionalities including embedding the wrap post on a website, etc. and be accomplished as well.

Although the integration of wraps into social media have been described primarily, in the context of Twitter and Facebook, because those are two currently popular social media platforms, it should be appreciated that wraps can be integrated with virtually any other now existing or later developed media platform. By way of example, other suitable and currently popular media platforms including news feeds, sports or gaming feeds, social media such as Instagram, Pinterest, MyFitnessPal, PhotoCircle, Vine, etc. Of course, there are a very wide variety of other media platforms that can be used as well. Additionally, wraps can readily be integrated into various blogs and micro publication platforms such as Tumblr, etc.

Media Feed Cards

Another way to integrate a wrap with media is to include a media feed card as part of the wrap. A media feed card may be arranged to display or render a media feed directly in a wrap itself.

Figure 23A:
Figure 23C:
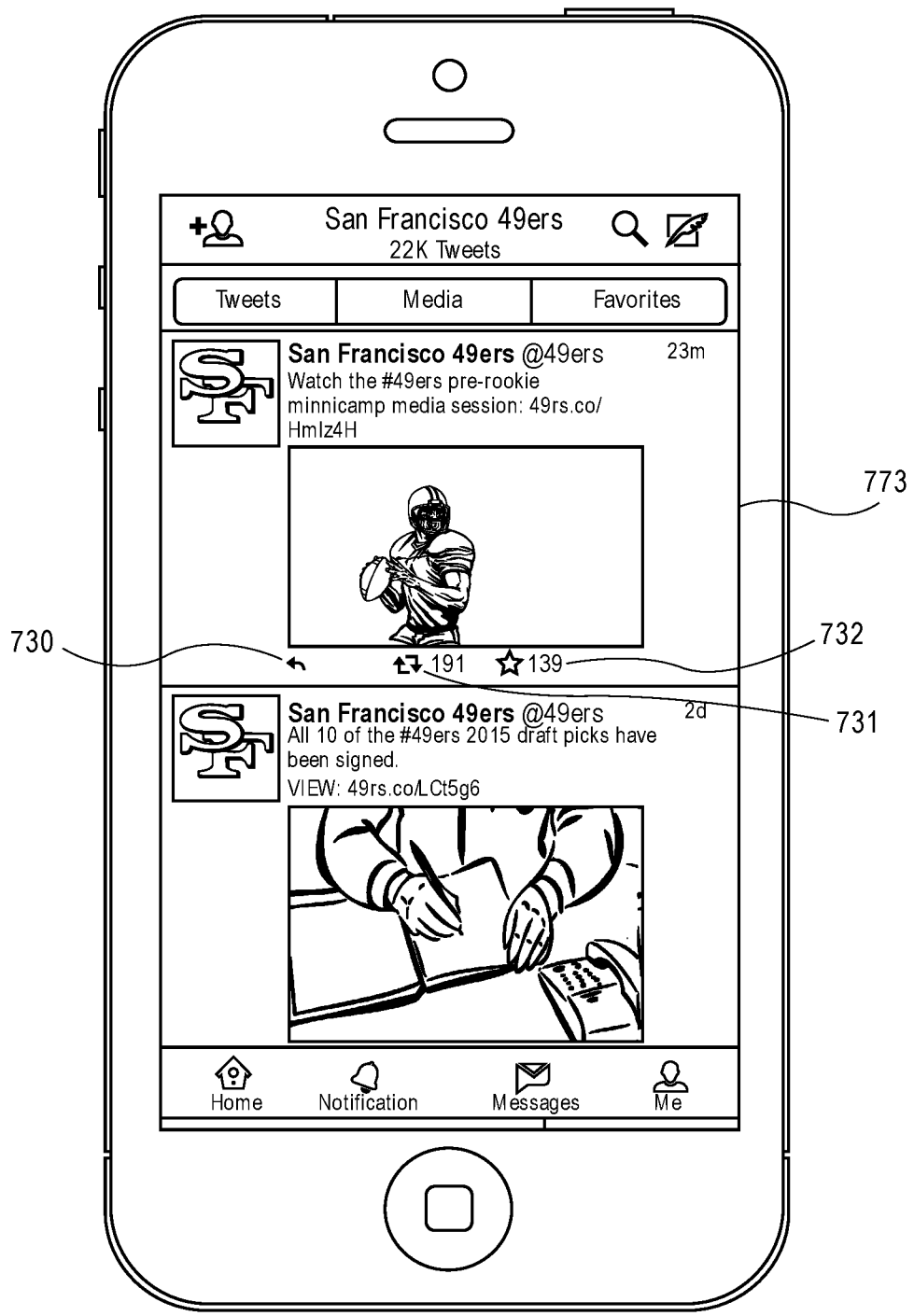
Figure 23D:

Referring to FIGS. 23A through 23D, a series of diagrams illustrating an exemplary wrap package with a media feed card is shown. In this particular example, the wrap package is by the San Francisco 49'ers football team to fans following the 2015 NFL draft. In FIG. 23, a card 771 showing the name of the drafted players in each round is shown, in FIG. 23B, a gallery card 772 providing a profile of each drafted player (note for FIG. 23B, just the individual windows of the gallery card are shown for the sake of clarity), FIG. 23C is a media feed card—specifically, a Twitter card 773 that includes a Twitter feed, FIG. 23D is a transact card 774 for purchasing 49er team merchandise.

FIG. 23C illustrates a Twitter media feed card 773 that includes a Twitter feed embedded within the card. As seen therein, the Twitter card 773 displays a Twitter data feed in the context of a wrap. The data feed that is displayed can be any data feed that the card author desires to include. For example, a wrap having to do with a football team might include a social media card that displays the team's Twitter data feed, a data feed associated with a particular hashtag, etc. In other embodiments, the user may be able to select a desired data feed from a menu of multiple available data feeds, or more generally, a search dialog box could be included on the card to allow a user to search particular terms. As fans consume the wrap, they are capable of consuming the various tweets posted in the feed or contribute and/or insert their own tweet, all within the context of the feed card 23C of the wrap package.

In order to create a social media card such as Twitter card 773, the layout of the card is defined in the same manner as other cards and its components and attributes are defined by the corresponding card descriptor. A data feed descriptor may then be used to define the location from which the data feed is to be obtained. The actual contents of any media feed card descriptor can vary significantly. By way of example, a representative, nonexclusive, polling data feed descriptor suitable for establishing a Twitter data feed may have the following structure:

```
Twitter feed:                               (787)
    Type: live                              (105)
    Source: https://twitter.com/            (107)
    Lifecycle: while-card-visible           (109)
    Target: container                       (111)
    Parameters:                             (115)
       lang: en                             (791)
       meta charset: utf-8                  (792)
       hashtag: [@hashtag#1, @hashta #2,]   (793)
       name: [$user_name]                   (794)
       Password: [$twitter_password]        (795)
    *
    *
    *
```

In this embodiment, the twitter data feed descriptor 787 is a "live" server side event driven data feed as indicated by "live" data feed type 105. The data feed source is https:/twitter.com/ as indicated by source 107. The lifecycle of the data feed is only while the card is visible as indicted by lifecycle 109. The descriptor further includes a set of parameters 115 that define the nature of the data feed to be retrieved. The actual parameters that are appropriate for any particular social media data feed will depend heavily on the APIs required by the social media platform (e.g. Twitter) in order to define the desired data feed and may vary significantly based on the nature of the data feed that the card author seeks to facilitate. In some circumstances, that may include metadata related parameters such as the language and character set to be used in the data feed. This type of information is represented by parameters 791 and 792 in the example above—e.g., name/value pair 791 (lang: en) indicating the use of the English language; and name/value pair 792 (meta charset:utf-8) indicating the character set to be used in the data feed. Other parameters may be used to define the content to be retrieved. This type of information is represented by parameter 793 (hashtag: [@hashtag#1, @hashtag#2]) which represent specific hashtags to be included in the data feed. Still other parameters may be used to identify and/or authenticate the viewer. This type of information is represented by parameters 794 and 795 (e.g. name value pair 794 name: [$user_name] indicating the Twitter user name of the person viewing the wrap, and name value pair 795 Password: [$twitter_password]). Of course, the specific parameters that are appropriate to define any particular data feed may vary widely and in some circumstances, the number of parameters utilized in the descriptor can be quite high.

Figure 24:
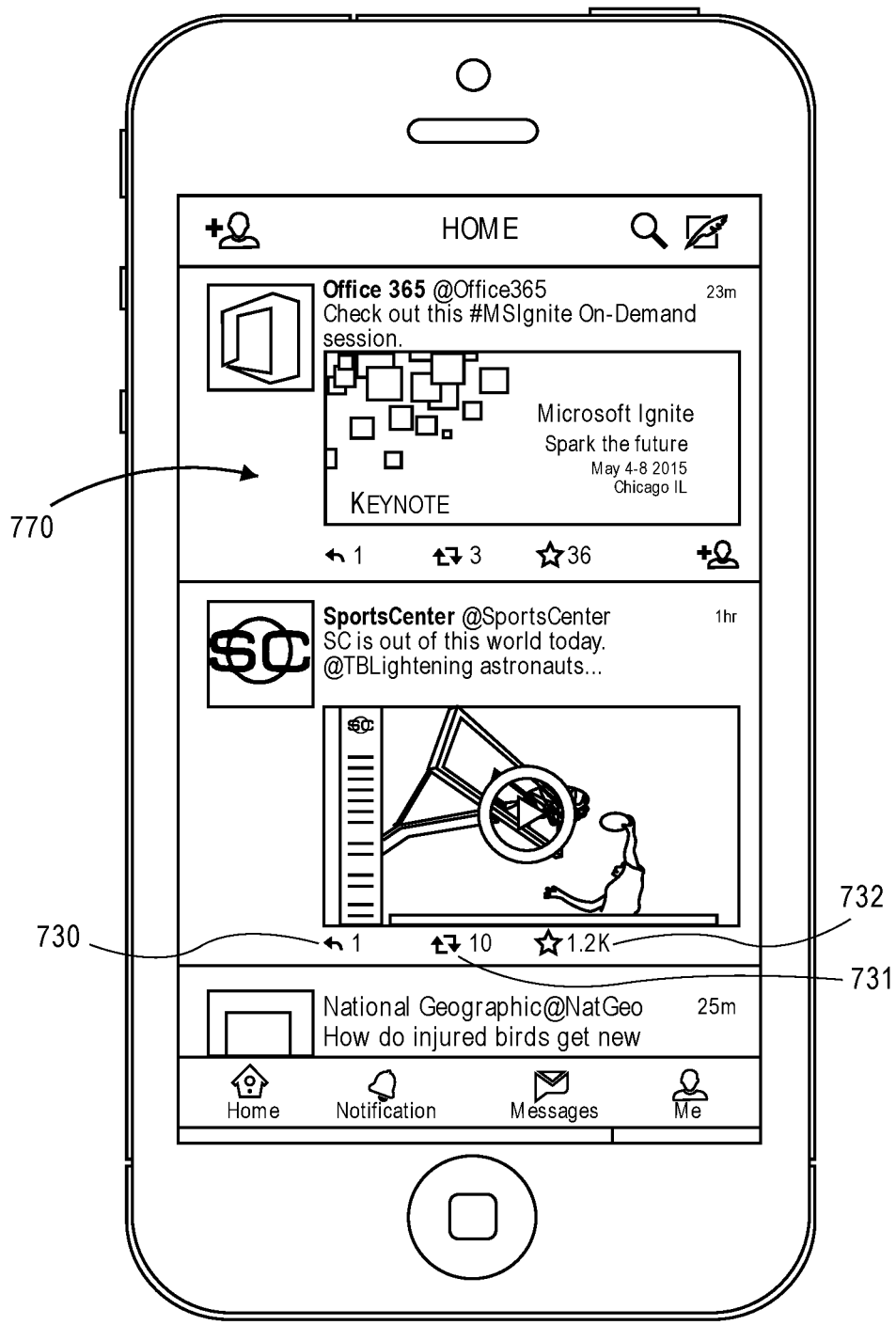
FIG. 24 illustrates a wrap Twitter card arranged to incorporate a personal twitter data feed into a wrap package.

If desired, a social media card 770 can be configured to provide the user's personalized data feed thereby allowing the user to view tweets from all of the people/entities that they follow as illustrated in FIG. 24. In order to support personalized data feeds, the card 770 needs to have an appropriate authentication mechanism. The authentication mechanism can be explicit by requiring the user to input their user name and password into appropriate dialog boxes on the card or may be more implicit by maintaining the user authentication information in a cookie or state descriptor associated with the user/wrap.

Figure 25:
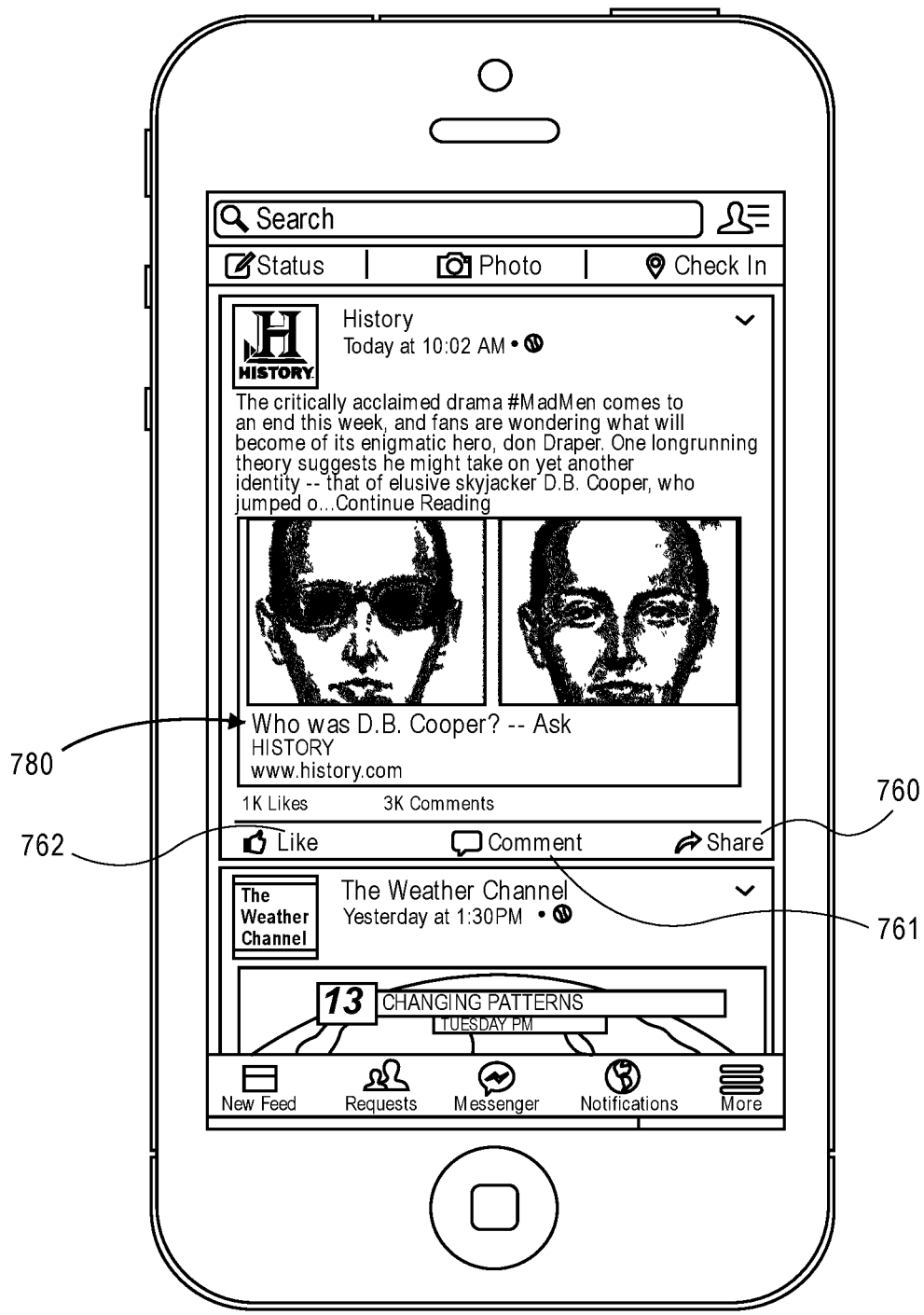
FIG. 25 illustrates a wrap Facebook card arranged to incorporate a Facebook news data feed into a wrap package.

Another social media card is shown in FIG. 25, which illustrates a Facebook card 780 arranged to facilitate Facebook access. Facebook card 780 is quite similar to the previously discussed Twitter card except that it facilitates access to Facebook.

Social media cards can be created to facilitate interaction with virtually any type of social media from within a wrap. In each case, the card author has the ability to define the scope of the cards use. In some applications, it may be desirable to limit the card's use for viewing and posting to specific predefined data feeds relevant to the wrap's publisher. In other circumstances, it may be desirable to facilitate more complete access to the associated platform. The actual level of access facilitated in any particular social media card is largely up to the card author.

Generating Wrap and Card Descriptors

Figure 33:
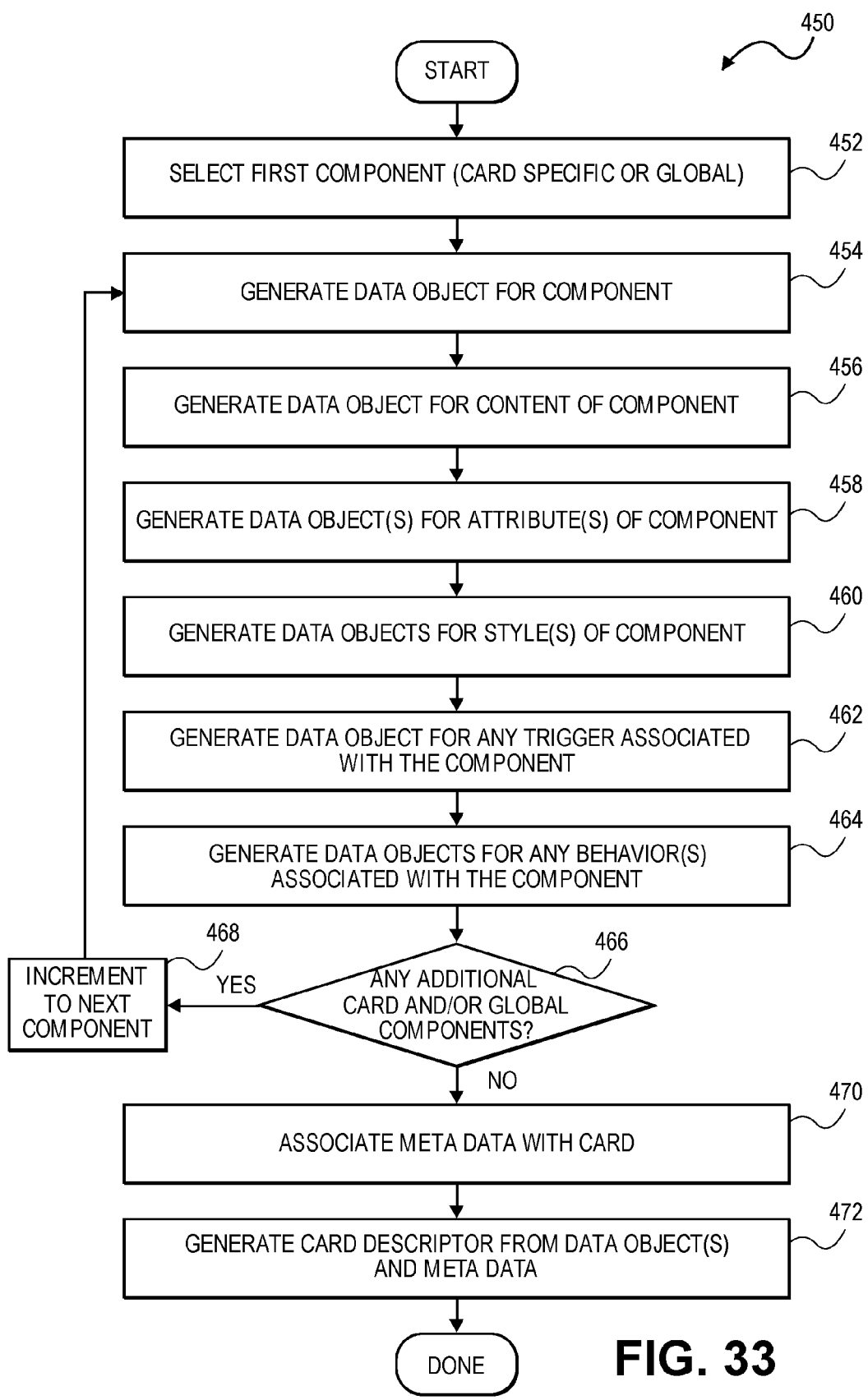
FIG. 33 is a flow chart illustrating a representative process for generating card descriptors.

Referring to FIG. 33, a flow chart 450 illustrating the steps of generating card descriptors 46 for each card 14 in a wrap 10 is shown. As previously noted, a card descriptor 46 is a collection of data objects. Thus, generating a card descriptor 46 generally involves generating and assembling individual data objects for all the component(s), content(s) and feature(s) contained in or associated with a the card 14, including any global component(s).

In initial step 452, a first component (either a component that is specific to the card or a global component designated for the card) is selected. Thereafter, data object(s) are generated for the component (step 454) along with any associated content, regardless if inline or referenced by an identifier such as a URL. In addition, data object(s) are generated for attribute(s) (step 458), style(s) (step 460), trigger(s) (step 462) and/or defined and/or declared behavior(s) (step 464) associated with the component. In decision step 466, it is determined if data object(s) have not yet generated for are any additional components (again, either card specific or global). If yes, then steps 454 through 466 are repeated for each component. If not, then in step 470, any meta data is associated with the card. Finally, the card descriptor is generated from all the data object(s) and the meta data (step 472). The card descriptor thus contains everything needed to render the card at runtime.

It should be noted that the flow chart 450 described above similarly applies to gallery cards. For each gallery item container of the gallery card, the above process is repeated for each component. When all the components have been exhausted for a given gallery item, the process is repeated for the next gallery item. A card descriptor is then generated for the gallery card when the above-described iterative process is complete for all of the gallery items.

Figure 34:
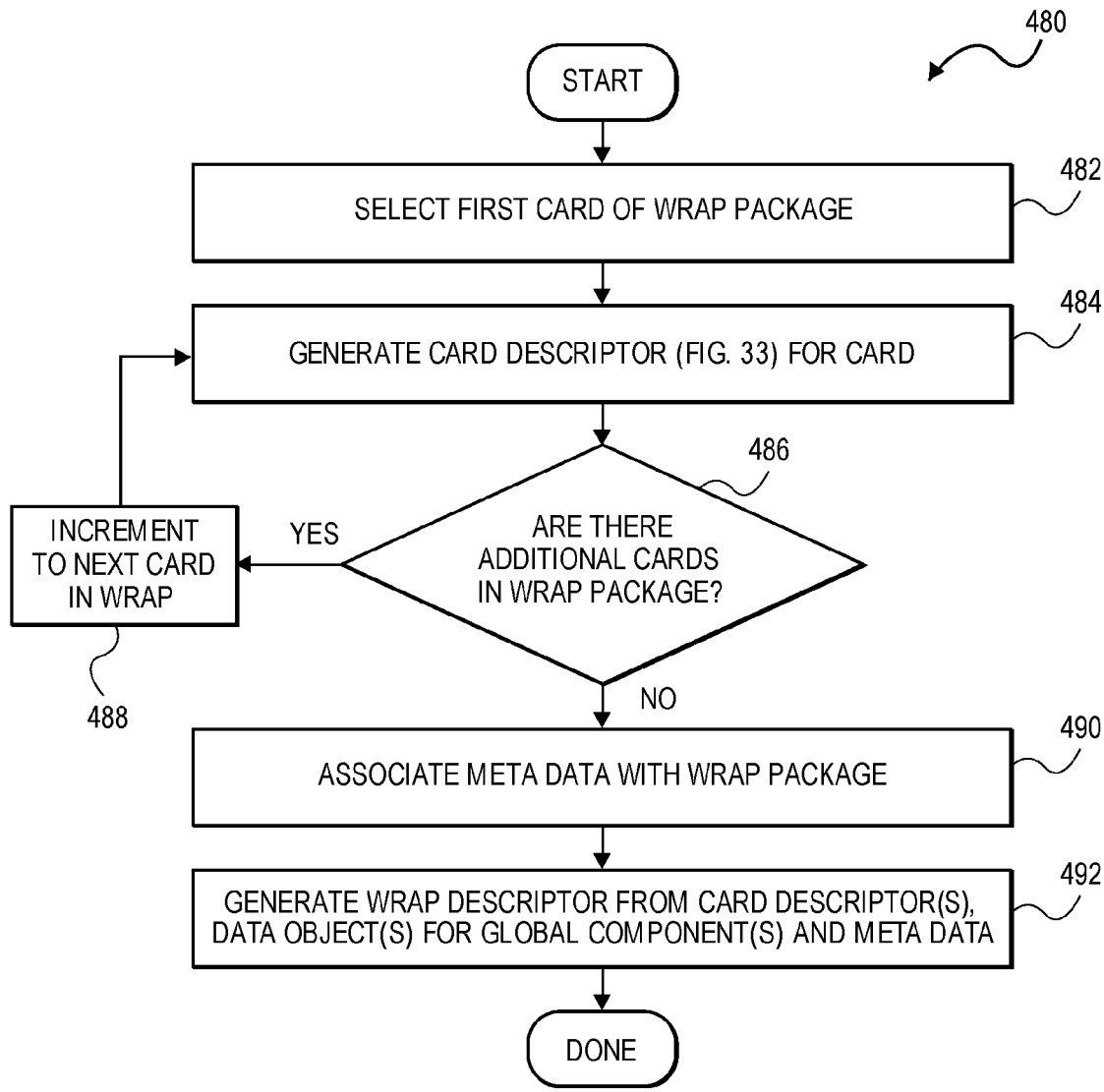
FIG. 34 is a flow chart illustrating a representative process for generating a wrap that includes global components.

Referring to FIG. 34, a flow diagram 480 illustrating the steps of generating a wrap descriptor 40 is illustrated. In the initial step (482), a first card of the wrap is selected and its card descriptor is generated (step 484) using the process described above with respect to FIG. 27. Thereafter, in decision 486, it is determined if there are any additional cards in the wrap package. If yes, then the next card in the wrap is selected or incremented (step 488) and the card descriptor for that card is generated in step 484. This process is repeated until a card descriptor is generated for all the cards in the wrap, as determined in decision 486. Then in step 490, any meta data is associated with the wrap package. Finally, in step 492, the wrap descriptor is generated from all the card descriptor(s), any global components, and any meta data 45 associated with the wrap 10.

The wrap descriptor 40 is thus a collection of card descriptors 46, each expressed as a collection of data objects defining the structure, layout and content for each of the cards 14, plus any global components. As such, the wrap descriptor 40 includes everything necessary to render the wrap upon runtime.

Benefits and Advantages of Wrap Packages

Wrap packages 10 offer a number of benefits and attributes currently not available with conventional methods of distributing content, such as with PDFs, web sites, or stand-alone apps. Since cards 14 can be sequenced and authored to include media content, application functionality, and e-commerce related services, wrap packages 10 have the unique ability to narrate a story, in a book-like format, that captures and holds the attention of the viewer, while also offering an "app" like user experience. As such, wrap packages 10 offer a new web-based platform for storytelling, communicating ideas, and delivering highly visual and functional user experiences. Wrap packages 10 thus enable a new business paradigm for selling, advertising, publishing, increasing brand loyalty, offering services, and contacting and engaging new and old customers alike, all ideally delivered to consumers on their mobile devices, where they spend their time and consciousness. Where businesses used to have to build destinations (e.g., websites) or monolithic systems (e.g., "apps"), they can now, instead, provide consumers with wrap packages 10, that are delivered like messages, and that provide the user experiences and functionality they really want and need. As a result, wraps 10 create opportunities for business to innovate and improve products and services, leveraging the mobile web in ways not before possible, because a convenient, enabling interface and platform did not previously exist.

Wrap packages 10 are also like interactive messages that can be easily shared, delivered over the mobile web, and locally stored. With the ability to share, distribute over the mobile web and locally store, popular wrap packages can readily go viral.

Wrap packages 10 are also preferably delivered using a SaaS (Software as a Service) model, meaning wrap packages are delivered only on an as-needed basis.

Wrap packages can be authored by anyone, from an individual with little technical or design skills, to large and sophisticated enterprises.

Wrap packages 10 can be distributed narrowly to a specific or targeted person or persons or widely distributed to many, many persons.

Wrap packages 10 can be written once and can run on just about any browser enabled device. As a result, wraps are not platform, operating system, or device dependent.

Since wrap packages 10 can be easily generated and optionally dynamically updated with new content, wrap packages can be used as a digital "corollary" or "companion", accompanying the sale or rental of goods and/or services. For example, wrap packages can be created and distributed as an "Active Receipt" accompanying the sale or rental of a good or service. The merchant can thus provide through the wrap package 10 ongoing contact and support to on-board, up-sell and/or cross-sell the customer with ancillary goods and/or services, potentially for the entire life cycle of the product or service, all delivered in a digital format that never gets lost or misplaced. Accordingly, wrap packages can be used as an essential component of any product or service, delivering better customer service and creating new selling opportunities.

In summary, wrap packages 10 introduce the "narrative web", which is a storytelling mobile user interface, delivered over a cloud-based platform, ushering in a digital evolution of mobile marketing and customer relationship management. As a marketing tool, wrap packages 10 have the unique ability to increase mobile engagement, lead generation, and conversion, enabling businesses to increase sales, improve loyalty, and enhance customer relationships and loyalty. Wrap packages 10 thus offer a compelling business proposition by solving one of the biggest problems in the mobile space of today; namely the lack of connectivity between apps. With wrap packages 10, however, consumers and other users can enjoy a multi-function app-like experience, without having to be in an app, download an app, or open any apps.

Finally, while many of the benefits and attributes of wrap packages 10 are realized on mobile devices operating on the mobile web, it should be made clear that there is nothing inherent with wrap packages 10 that limit their usefulness or functionality in non-mobile environments. On the contrary, wrap packages 10 can also be used, and all the same benefits and attributes realized, on non-mobile devices, such as desktop computers and/or smart TVs for example.

The present invention is thus intended to be broadly construed to cover any system and method, such as carousel ads for example, that enables publishers and marketers to tell sequenced stories with (i) a combination of images, photos, text, video and other types of media, (ii) a swipe-able format that enables viewers to navigate the media displayed in one screen shot or frame to the next, and (iii) includes embedded app-like functionality and/or links to other locations that provide additional information or such functionality and/or services. Consequently, the present application should not be construed to just those specific embodiments as described herein.

In the primary described embodiments, all of the behaviors are declared rather than being stored in-line within the descriptor. Thus, the descriptor itself does not have any programmable logic. In many embodiments, the declared behavior are all defined within the runtime viewer such that the runtime view can readily associate the desired behavior with the wrap, card or component as appropriate in a runtime instance of the wrap. It should be appreciated that this is a particularly powerful framework for enhancing portability of the wraps. With the descriptor/runtime viewer approach, a single item (the descriptor) can be used to define all of the content and functionality of a set of cards that can be rendered on virtually any platform. The declared functionality is provided (or obtained) by the runtime viewers when the wrap is to be rendered so that the author of the wrap is not required to know or understand any of the idiosyncrasies of any particular platform. The runtime viewer may be a generic runtime viewer (e.g., a viewer executable by a conventional browser) or may be native viewer customized for a particular platform. Regardless of the underlying platform, the runtime viewer handles the tasks of associating the declared behaviors with the wrap/cards/components which frees the wrap author and/or authoring tool from having to ensure that desired behaviors are programmed correctly for all of the different platforms that the wrap may be rendered on.

In most implementations, all of the sizeable assets that serve as content of the wrap are referenced in the wrap by appropriate identifiers rather than being stored directly in the wrap. This again significantly enhances portability by keeping the size of the descriptor small while facilitating the use of rich media content.

From the foregoing it should be apparent that the described wrap packages provide businesses with a powerful tool for engaging their customers, suppliers, employees or other constituents in a format that is particularly well tailored for display on mobile devices.

Although only a few embodiments of the invention have been described in detail, it should be appreciated that the invention may be implemented in many other forms without departing from the spirit or scope of the invention. For example several specific wrap descriptor structures have been described. Although such descriptor structures work well, it should be appreciated that the actual descriptor structure may vary widely. For example, in some embodiments some special behaviors can be defined within a wrap descriptor if desired. Such in-line behavior definition might be particularly useful in association with certain behavior extensions that are not otherwise readily available. For example, JavaScript can be included within a JSON object and various other descriptor structures. Thus, when JSON descriptors are used, selected behaviors or behavior overrides can be defined in-line using JavaScript if desired. Although programmed functionality can be included in some circumstances, it should be appreciated that liberal definition of behaviors within a wrap tends to defeat some of the primary advantages of the described descriptor/runtime viewer framework.

In many implementations much of the actual content of the wrap will be referenced by the descriptor rather than being stored in-line within the descriptor. However, the balance between in-line storage and references to external assets in any particular wrap descriptor may be widely varied anywhere from 100% referenced content to (at least theoretically) 100% in-line content—although the later is less desirable for media rich content and again, begins to defeat some of the advantages of using the descriptor approach. The choice between in-line and referenced content will typically be dictated in large part by the relative size of the content. For example, text, which tends to be very compact, is generally more suitable for inclusion in-line, whereas more graphic media, images, videos and/or audio files are typically more efficiently referenced.

A few different methods of and architectures for serving wrap packages and constructing runtime instances have been described herein. Although only a few approaches have been described in detail, it should be apparent from the foregoing that a wide variety other methods and architectures can be used as well. Therefore, the present embodiments should be considered illustrative and not restrictive and the invention is not to be limited to the details given herein, but may be modified within the scope and equivalents of the appended claims.

What is claimed is:

1. A method of delivering a wrap package of cards for display on a display screen associated with a computing device, the method comprising:
    receiving an indication of a selection of a wrap identifier in a social media feed displayed on the display screen associated with the computing device;
    delivering a JavaScript Object Notation (JSON) wrap descriptor that corresponds to the wrap identifier to the computing device in response to the selection, the JSON wrap descriptor defining the wrap package of cards and including a plurality of JSON card descriptors for the plurality of cards of the wrap package respectively, each JSON card descriptor defining for an associated card:
a JSON card container; and
one or more JSON content containers, each of the JSON content containers including inline or referencing content respectively,
wherein the JSON card container and the one or more JSON content containers define the content and layout for the associated card; and
providing a runtime viewer to the computing device, the runtime viewer configured to create a runtime instance of the wrap package at the computing device by processing the JSON wrap descriptor,
wherein the runtime instance is arranged to be rendered on the display screen by the computing device by displaying the cards of the wrap package sequentially in response to navigational inputs.

2. A method as recited in claim 1, wherein the runtime viewer is configured to render the runtime instance in the context of the social media feed by either:
(i) rendering the cards of the runtime instance within a frame appearing within the social media feed; or
(ii) rendering the cards of the runtime instance in an overlay frame appearing at least partially over the social media feed.

3. A method as recited claim 1, wherein the runtime viewer is configured to render the runtime instance by overlaying the rendering of the cards of the wrap package over where the social media feed would otherwise be visible on the display screen.

4. A method as recited in claim 1, wherein the runtime viewer is further configured to sequentially display the cards of the runtime instance, in response to swipe navigational inputs provided to the computing device, the computing device a mobile computing device have a touch-sensitive screen.

5. A method as recited in claim 1, wherein the selection of the wrap identifier is accomplished by selecting a wrap cover that is displayed in the social media feed, the wrap cover including an image representative of the wrap package and having the wrap identifier embedded or referenced therein.

6. A method as recited in claim 1, wherein the selection of the wrap identifier is accomplished by selecting a link that is displayed in the social media feed, the link including the wrap identifier embedded or referenced therein.

7. A method as recited in claim 1, wherein the social media feed is selected from the group consisting of a Twitter feed, a Facebook feed, an Instagram feed, or a Pinterest feed.

8. A method as recited in claim 1, wherein the social media feed is displayed by an app residing on the computing device, the runtime instance is displayed by a browser separate from the app and the runtime viewer is executed by the browser.

9. A method as recited in claim 1, wherein providing the runtime viewer in response to the selection of the wrap identifier occurs in cooperation with the delivery of the JSON wrap descriptor.

10. A method as recited in claim 1, wherein providing the runtime viewer further comprises providing a native application that includes the runtime viewer for execution on the computing device prior to the selection of the wrap identifier.

11. A method as recited in claim 1, wherein the JSON wrap descriptor is a BSON wrap descriptor.

12. A method as recited in claim 1, wherein the runtime instance is generated at the computing device by:

(a) creating an object graph from the JSON wrap descriptor;
(b) generating a document object model from the object graph; and
(c) generating the runtime instance from the document object model.

13. A method as recited in claim 1, wherein:
(a) each of the cards in the wrap package is rendered in either a portrait or landscape aspect ratio at runtime; and
(b) within each card, the relative positioning of the content of the card is immutable.

14. A method of rendering a wrap package of cards on a display screen associated with a mobile computing device, the method comprising:
receiving an indication of a selection of a wrap identifier in a social media feed displayed on the display screen, the wrap identifier identifying the wrap package of cards;
in response to the selection of the wrap identifier, initiating a runtime viewer and obtaining a JavaScript Object Notation (JSON) descriptor that defines the wrap package, the JSON wrap descriptor including a plurality of JSON card descriptors for the cards of the wrap package respectively, each JSON card descriptor defining for an associated card:
a JSON card container; and
one or more JSON content containers, each of the JSON content containers including inline or referencing content respectively,
wherein the JSON card container and the one or more JSON content containers defining the content and layout for the associated card;
creating a runtime instance of the wrap package using the runtime viewer, the runtime instance created based on the JSON wrap descriptor; and
rendering the runtime instance on the display screen by sequentially displaying the plurality of cards of the wrap package in response to navigational inputs.

15. A method as recited in claim 14 wherein the runtime instance is displayed in-line within the social media feed.

16. A method as recited in claim 14, further comprising opening a new frame on the display screen and displaying the runtime instance in the new frame.

17. A method as recited in claim 16, wherein either the new frame or the runtime instance includes a close interface and selection of the close interface by a user closes the new frame such that the social media feed is no longer displayed on the display screen.

18. A method as recited in claim 14, wherein the social media feed is displayed in a browser window and the runtime viewer is executed by the browser.

19. A method as recited in claim 18, wherein the runtime viewer is not an integral part of the browser.

20. A method as recited in claim 14, wherein the social media feed is displayed by an app residing on the computing device and the runtime viewer is executed by the app.

21. A wrap package of cards, embedded in a non-transitory tangible computer readable medium, the wrap package including a plurality of cards arranged to be rendered in one or more linear sequence(s), the wrap package including a social media card arranged to display a social media feed,
wherein the wrap package is represented by a JavaScript Object Notation (JSON) wrap descriptor that includes a plurality of JSON card descriptors for the plurality of cards respectively, each of the JSON card descriptors defining for an associated card:
a JSON card container;
one or more JSON content containers, each of the JSON content containers including inline or referencing content respectively,
wherein the JSON card container and the one or more JSON content containers define the content and layout for the associated card,
wherein the JSON card descriptor defining the social media card further defines the social media feed within the social media card,
the JSON wrap descriptor used by a consuming computing device to generate a runtime instance of the wrap package, the plurality of cards of the runtime instance of the wrap package sequentially rendered in the one or more linear sequence(s) on a display screen associated with the consuming computing device in response to navigable inputs.

22. A wrap package as recited in claim 21, wherein the JSON wrap descriptor is a BSON data object.

23. A wrap package as recited in claim 21, wherein a runtime instance of the wrap package is generated by:
   (a) creating an object graph from the JSON wrap descriptor;
   (b) generating a document object model from the object graph; and
   (c) generating the runtime instance of the wrap package from the document object model.

24. A wrap package as recited in claim 21, wherein the social media feed is either a Facebook feed or a Twitter feed.

25. A wrap package as recited in claim 21, wherein the social media feed is displayed within an iframe contained within the social media card.

26. A wrap package as recited in claim 25, wherein the JSON card descriptor defining the social media card includes a feed descriptor that:
   defines a position within the social media card for the iframe,
   identifies a feed server from which the content of the social media feed may be obtained; and
   provides parameters to be passed to the feed server at runtime to identify the social media feed to be displayed.

27. A wrap package as recited in claim 21, wherein the JSON card descriptor defining the social media card includes a feed descriptor that is used by a runtime viewer to establish the social media feed.

28. A wrap package as recited in claim 21, wherein the runtime instance of the wrap package is generated by a native application running on the consuming computing device.

29. A wrap package as recited in claim 21, wherein the JSON wrap descriptor is a portable data object that is deliverable to the consuming computing device over a data network.

* * * * *